United States Patent
Brown

(10) Patent No.: US 12,008,615 B2
(45) Date of Patent: Jun. 11, 2024

(54) NETWORKED OBJECT TRADING ACTIVITY AND SYSTEM USABLE FOR FACILITATING OBJECT ACQUISITION

(71) Applicant: Caboodle Technologies, Inc., Pittsburgh, PA (US)

(72) Inventor: Amber Brown, Pittsburgh, PA (US)

(73) Assignee: Caboodle Technologies, Inc., Pittsburgh, PA (US)

( * ) Notice: Subject to any disclaimer, the term of this patent is extended or adjusted under 35 U.S.C. 154(b) by 394 days.

(21) Appl. No.: 17/522,584

(22) Filed: Nov. 9, 2021

(65) Prior Publication Data

US 2022/0067804 A1 Mar. 3, 2022

Related U.S. Application Data

(63) Continuation-in-part of application No. 16/121,125, filed on Sep. 4, 2018, now Pat. No. 11,734,735.

(60) Provisional application No. 62/553,634, filed on Sep. 1, 2017.

(51) Int. Cl.
*G06Q 30/0601* (2023.01)
*G06Q 30/06* (2023.01)

(52) U.S. Cl.
CPC ..... *G06Q 30/0601* (2013.01); *G06Q 30/0641* (2013.01)

(58) Field of Classification Search
None
See application file for complete search history.

(56) References Cited

U.S. PATENT DOCUMENTS

| | | | |
|---|---|---|---|
| 7,353,192 B1 * | 4/2008 | Ellis | G06Q 30/02 |
| | | | 715/765 |
| 9,152,993 B2 | 10/2015 | Efraimov et al. | |
| 9,672,259 B2 | 6/2017 | Achuthan et al. | |
| 10,013,705 B2 | 7/2018 | Mikurak | |
| 10,115,105 B2 | 10/2018 | Viswanath et al. | |
| 10,748,196 B2 | 8/2020 | Branham et al. | |
| 11,734,735 B2 * | 8/2023 | Brown | G06Q 30/0601 |
| | | | 705/26.1 |
| 2006/0190416 A1 | 8/2006 | Himmelstein | |

(Continued)

OTHER PUBLICATIONS

International Search report from PCT Application No. PCT/US2022/079587, dated Feb. 2, 2023.

(Continued)

*Primary Examiner* — Nicholas D Rosen
(74) *Attorney, Agent, or Firm* — Haynes and Boone, LLP

(57) ABSTRACT

A commitment is received from a user to obtain an item from a plurality of items to be presented to the user after receiving an exchange credit from the user. Each item is represented individually in sequence for a predetermined duration before showing another item's image. A selection input by the user is monitored. Before the predetermined duration ends, if the presented item's image is rejected by the user, the image is removed, and that item is permanently removed from the items to be offered to the user, and another item's image is presented to the user. In response to the predetermined duration, a presentation of the item's image is graphically varied by visually conveying to the user that an ability to reject the item and view a next item in sequence will end at the end of the predetermined duration unless the user rejects the item.

20 Claims, 98 Drawing Sheets

(56) References Cited

U.S. PATENT DOCUMENTS

| | | |
|---|---|---|
| 2007/0124228 A1 | 5/2007 | Elias et al. |
| 2008/0228627 A1 | 9/2008 | Himmelstein |
| 2012/0304305 A1 | 11/2012 | Efraimov et al. |
| 2013/0151372 A1 | 6/2013 | Liu |
| 2014/0222610 A1 | 8/2014 | Mikurak |
| 2014/0316901 A1 | 10/2014 | Grabovski et al. |
| 2014/0358733 A1 | 12/2014 | Achuthan et al. |
| 2015/0242941 A1 | 8/2015 | Viswanath |
| 2017/0372388 A1 | 12/2017 | Branham et al. |
| 2019/0073705 A1 | 3/2019 | Brown |
| 2019/0178657 A1 | 6/2019 | Benbrahim et al. |
| 2022/0067804 A1 | 3/2022 | Brown |

OTHER PUBLICATIONS

Ariely, "Predictability Irrational, Hidden Forces that Shape our Decisions," (May 19, 2009) Table of Contents HarperCollins, London.

European Extended Search Report issued in EP Application No. 18851113.3-1213, dated Apr. 12, 2021.

International Search Report issued in PCT Application No. PCT/US2018/049304, dated Jan. 3, 2019.

\* cited by examiner

NETWORKED OBJECT TRADING ACTIVITY AND SYSTEM USABLE FOR FACILITATING OBJECT ACQUISITION

CROSS-REFERENCES TO PRIORITY AND RELATED APPLICATIONS

This application is a continuation-in-part of U.S. patent application Ser. No. 16/121,125 filed on Sep. 4, 2018, entitled "Networked Object Trading Activity and System Usable for Facilitating Object Acquisition", which claims the benefit of and is a non-provisional application of provisional U.S. Patent Application Ser. No. 62/553,634, entitled "Networked Object Trading Activity and System Usable for Facilitating Object Acquisition," filed Sep. 1, 2017, the disclosures of each which are hereby incorporated by reference in their respective entireties, as if set forth in full in this document, for all purposes.

FIELD

The present disclosure generally relates to a networked computer system for connecting user computer systems operated by users for use in processing trades among the users, and more particularly, for coordinating and controlling trades according to rules to provide for object trading and/or purchasing by a group of distributed users while implementing computer-mediated controls to constrain activity among the users to trade objects with other users or to acquire objects or services from vendors.

BACKGROUND

Purchase and barter activities are known, but can be limited. For example, a holiday party game called "White Elephant" is often played, where each participant in an office gathering, friends and family gathering, etc., brings an item and everyone leaves with a different item. This is feasible for a small group where everyone can meet in one place and where everyone, directly or indirectly, knows and trusts everyone else due to the social setting. Online implementations for trading in this style include the Listia™ system, the Paperback Swap™ system, and the Tradeaway™ system, but these implementations are of limited entertainment value. They also do not scale or work for very large groups.

Online peer-to-peer marketplaces exist (e.g., systems provided by LetGo, OfferUp, and eBay). In an online peer-to-peer marketplace, a company or entity sets up an Internet-connected server or set of servers to create a marketplace platform, which is logical structure. Seller peers connect their computers to the marketplace platform to upload product details for products they wish to sell and buyer peers connect their computers to the marketplace platform to view items for sale and possibly put bids or offers for the items. These online peer-to-peer marketplaces also lack a ludic experience.

Another marketplace platform is a "daily deal" marketplace platform where a seller submits one or a small number of items each day until the items sell out. Sometimes payment is required before the item is known, such as a "mystery items" platform when an item that is selected by the seller or the marketplace platform is selected and shipped to the purchaser.

Some marketplace platforms are programmed to facilitate negotiation on purchase price between the buyer and seller, who are interacting via their buyer computers and seller computers, respectively. Others use auction mechanisms, either with real money or virtual currency to facilitate price discovery. However, the economic transactions in many of these platforms require either the payment of a commission to the platform provider that is tied to the value of the item being purchased or bartered, or demand the attention of users by exposing them to advertisements or surveys.

As described above, there is an opportunity to develop an online marketplace platform for purchasing or bartering activities that improves user satisfaction by incorporating, to good effect, various principles of behavioral economics. These principles can be incorporated into an online marketplace platform through the design of the platform and its interaction rules and metaphors.

REFERENCES

[Ariely] Aridly, D., "Predictably Irrational, Revised and Expanded Edition: The Hidden Forces That Shape Our Decisions." New York, Harper Perennial, 2010.

SUMMARY

A networked computer system interfaces to a plurality of user computer systems, at least some of which are located remote from the networked computer system to coordinate, control and limit user actions to provide a scalable, distributed platform for online trading of goods and services among the users via their user computing devices. The networked computer system comprises a user interface server that generates a first graphical user interface and a second graphical user interface and sends data representing the first graphical user interface and the second graphical user interface to a user computer system or a user, wherein the first graphical user interface is adapted to receive a user give-item commitment from the user, wherein the user give-item commitment represents a commitment from the user to give away, to a second user, a user give-item in exchange for a get-item of a plurality of get-items, wherein the user give-item is an item, product, service, or right owned by the user and wherein the get-item is an item, product, service, or right not owned by the user but desired by the user, and wherein the second graphical user interface is adapted to present a sequence of images of get-items of the plurality of get-items in sequence and adapted to present the user with indications of allowed user actions. The networked computer system might also comprise data storage for a user database and an items database, the items database comprising records of get-items and give-items, the records including data fields for an exchange credit value for each get-item and each give-item, an item selection module of the networked computer system, coupled to allow for access to the items database, that selects give-items to be presented to the user based on a give-item exchange credit value of the user give-item and get-item exchange credit values of get-items in the items database, a user presentation module, coupled to the user interface server, that provides the user interface server with item presentation data for the second graphical user interface and receives indications, from the user interface server, of user interactions with the second graphical user interface, and wherein the item presentation data depends on the user interactions with the second graphical user interface in that a user is presented with a current get-item and if the user selects, using the second graphical user interface, the current get-item during a current selection period, the current get-item is flagged as a taken get-item and if the user does not select the current get-item during a current selection period or declines the current get-item, the current get-item becomes a past get-item and a next get-item in the sequence of the plurality of get-items becomes the current get-item for user selection, a clock module, accessible by the user presentation module, for providing timing constraints on when the user interactions can occur, including a constraint that ensures that the user selects or is assigned a get-item within a predetermined period, and an image management module, coupled to the user presentation module and the items database for serving one or more images of the current get-item.

In one implementation, the network is the Internet or other network, with computers intermediating to present information, obtain selections and user commitments, and to enforce a set of rules or constraints on a trading process. The networked computer system might be programmed using rules that incorporate a commit process wherein users first commit to pay or barter for an unknown item from among a group of items that are labeled with a value range. Other rules might encode for aspects of behavioral economics, such as improved versions of the Decision Paralysis Principle, the Scarcity Principle, and the Endowment Effect, where the user views items of the group sequentially, and may either choose to acquire a presented item or reject the presented item before being allowed to see the next item in the sequence. The number of items that the user can view before committing to choose some item may be constrained by a limit on the number of views or by a time limit enforced by a countdown clock.

Another rule may incorporate processes such as a Customization Principle where artificial intelligence ("AI") techniques are used to customize the items offered to a user in a purchase or barter context based on their preferences, non-preferences, demographic data, and past behaviors on the platform.

Additional rules may apply, such as that would allow a user certain privileges not otherwise offered, such as being able to revisit items, reserve items, look ahead, and other variations. These rules are crafted to incorporate in various ways the Avoidance of Regret Principle. Additional rules can incorporate other principles such as the Power of Free Principle and the Mental Accounting Principle by allowing users to use the platform without payment of subscription fees or commission fees, but by giving them the option of purchasing said privileges not otherwise offered.

In one implementation, a mobile smartphone application ("app") is provided that connects multiple peer users who trade items of similar value amongst each other, viewing each item in succession until they choose an item. Succession means that each item may be shown one after another without the previous item being show again, which also may be described as being "unidirectional."

In another implementation, an online website is provided that connects multiple peer users who trade items of similar value amongst each other, viewing each item unidirectionally in succession until they choose an item.

In another implementation, a mobile smartphone application is provided that connects users to an online marketplace, viewing each item provided by established vendors unidirectionally in succession until they choose an item.

In another implementation, an online website, servers, and database are provided that connects users to an online marketplace, retrieving each item from a database provided by vendors and viewed unidirectionally in succession until they choose an item.

This Summary is provided to introduce a selection of concepts in a simplified form that are further described below in the Detailed Description. This Summary is not intended to identify key features or essential features of the claimed subject matter, nor is it intended to limit the scope of the claimed subject matter. A more extensive presentation of features, details, utilities, and advantages of methods and apparatus, as defined in the claims, is provided in the following written description of various embodiments of the disclosure and illustrated in the accompanying drawings.

BRIEF DESCRIPTION OF THE DRAWINGS

Various embodiments in accordance with the present disclosure will be described with reference to the drawings, in which:

FIGS. 3A-3B illustrates a process for uploading a give-item to the pool of items available for other users to choose from.

DETAILED DESCRIPTION

Figure 1A:
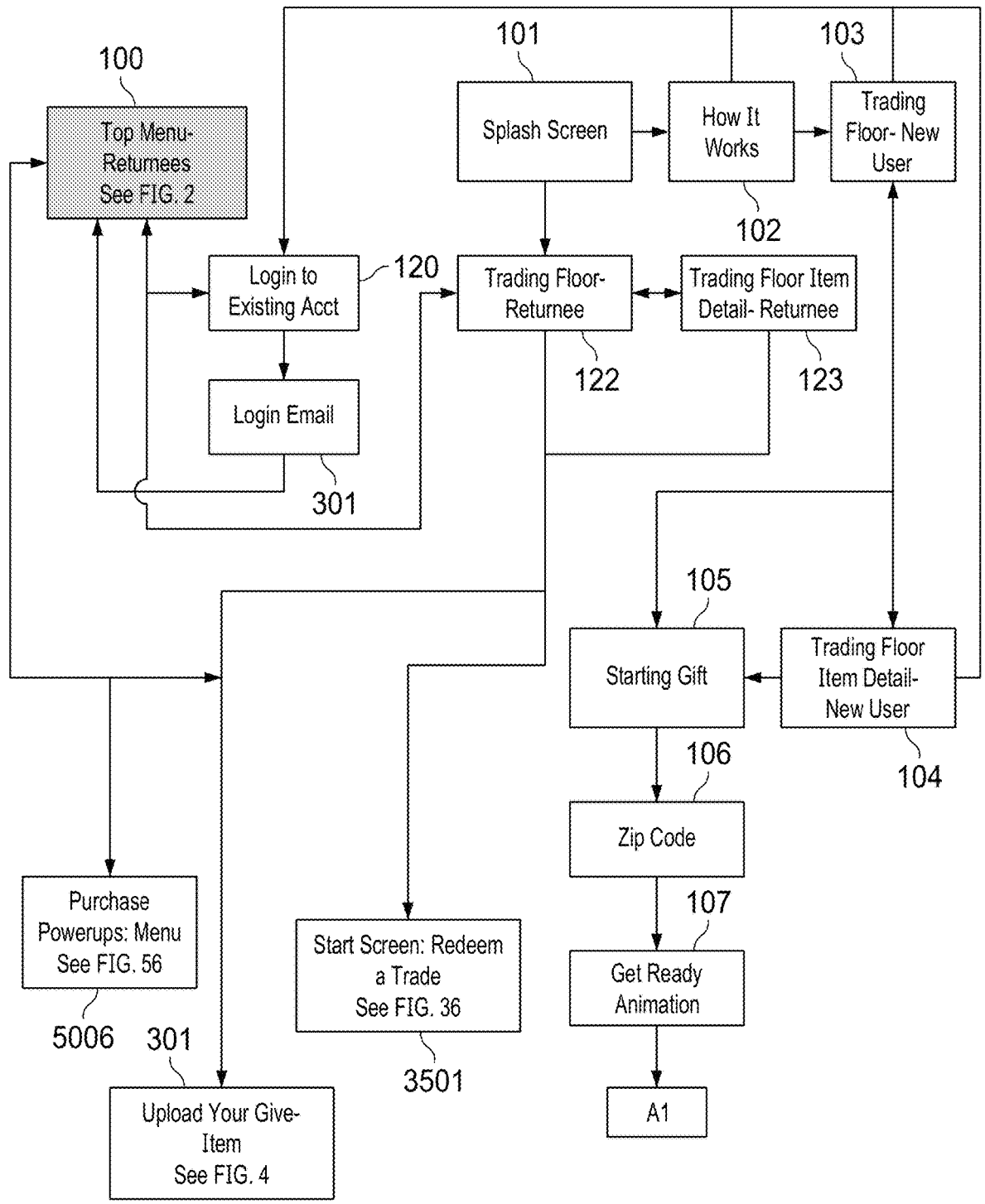
FIGS. 1A-1B comprise flowcharts showing an onboarding process for creating a new user account and explaining an embodiment.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Implementations include an online marketplace platform facilitating e-commerce amongst multiple third parties that incorporates various principles of behavioral economics. A marketplace platform operator processes the e-commerce transactions. An entertaining transaction mechanic is used to determine which users obtain which products or services in the marketplace, subject to various rules informed by behavioral economics principles.

Purchase and barter activities can be made more satisfying by incorporating principles of behavioral economics into those activities. Gamification is one principle of behavioral economics: people enjoy playing well-designed games, even to an irrational degree. By adding ludic elements to purchasing or bartering activities, a successful purchaser, bidder, or trader can enjoy having won a competition or having exercised skill in the purchase or barter process. While this can be done in small groups, there are advantages to doing this over larger groups, in that more products and options might be available. However, this can be complicated to get large groups of people together. In a computer system described herein, a networked computer coupled to user computer systems, such as desktop computers or smartphones, allows many people, even those who do not know each other, to coordinate using the networked computer system, with the networked computer system enforcing a set of system rules that direct and/or constrain trading.

In an online peer-to-peer marketplace, a company or entity sets up an Internet-connected server or set of servers to create a marketplace platform, which is logical structure. These online peer-to-peer marketplaces also lack a ludic experience.

Another marketplace platform is a "daily deal" marketplace platform where a seller submits one or a small number of items each day until the items sell out. The ludic element in this case is limited to only a "reveal" when the mystery item is received. There is therefore an opportunity to develop an online marketplace platform for purchasing or bartering activities that takes advantage of the Gamification Principle by adding ludic elements to the activity.

Power of Free is another principle of behavioral economics: a price of zero is much more attractive than any other price, no matter how low. Another example of the Power of Free involves attention: purchase and barter activities that require people to view advertisements or answer surveys are inferior to those that demand no attention giving. Mental Accounting is also another principle of behavioral economics: people categorize and treat money differently depending on where it comes from and where it is going. Some existing marketplace platforms are programmed to work on a like-for-like bartering basis, whereas other existing marketplace platforms work on a payment by currency (e.g., cash, credit card, etc.) basis.

Economic transactions in many platforms require either the payment of a commission to the platform provider or demand the attention of users. An online marketplace platform for purchasing or bartering activities that takes advantage of the Power of Free Principle and the Mental Accounting Principle would be improvements.

Three additional principles of behavioral economics are Scarcity, Decision Paralysis, and the Endowment Effect. The Scarcity Principle asserts that people are motivated by shortage. The Decision Paralysis Principle states that too many simultaneously available options can cause people to make sub-optimal decisions. The Endowment Effect derives from the fact that people tend to overvalue what they own or what they perceive they own.

From a different domain altogether, that of applied probability, comes the "Secretary Problem," a problem conceptualized by the mathematician Merrill Flood. In the Secretary Problem, an administrator is faced with hiring decisions and wants to hire the best secretary out of N rankable applicants for the position. If this math problem were "made real," the constraints would embody the Scarcity Principle, the Decision Paralysis Principle, and the Endowment Effect: the applicants are interviewed one by one in random order, a decision about each particular applicant has to be made immediately after the interview, and once rejected an applicant cannot be recalled. Thus, in each interview, the administrator can rank the present applicant relative to all prior applicants but is unaware of the quality of the upcoming applicants. Thus, the optimal strategy to maximize the probability of selecting the best applicant has to deal with the fact that decisions (e.g., to accept the present applicant or move on) have to be made without having complete information. If the administrator is constrained to make decisions on the fly, it can be shown that under some conditions the highest probability of an optimal selection from N secretaries occurs if the administrator has the strategy of looking at the first 0.37*N candidates without selecting one, then selecting the first secretary thereafter who is rated above all the prior candidates that the administrator has seen.

The Secretary Problem is a purely abstract game theoretic puzzle. The practical implementation of the Secretary Problem would require specifying even the most basic elements: Where do the secretaries come from? How do they add themselves to the interview queue? How are the secretaries' qualifications described? What is an appropriate set of secretaries to show the administrator (based on location, job description/needs, salary/value, etc.)? How are the secretaries presented for evaluation to the administrator? How does the administrator evaluate the secretaries? How will the administrator select the chosen secretary? What prompts the administrator to actually make a decision? How will the secretary be notified of his or her selection? How will the secretary be contracted with? What keeps the administrator from reneging on the deal? In the puzzle, none of these practical elements are dealt with, or even relevant and there is a gap between what is theoretical and what can be implemented and scales well.

Four other principles of behavioral economics are Pre-Commitment, Anchoring, the Avoidance of Regret, and Customization. Under the Pre-Commitment Principle, people follow through on decision or activities once they have committed to them in a material way, e.g., by paying upfront for something. The Anchoring Principle states that a person's initial perception of value can be influenced by the presentation of related data. The Avoidance of Regret Principle asserts that people will be happier if they have mechanisms for postponing, extending, or undoing a purchase or barter act, e.g., by returning a bought item to a retailer, even if they do not always take advantage of these mechanisms. The Customization Principle states that users respond positively to offerings that appear to be tailored to their likes and dislikes.

In one implementation, marketplace trades may be performed via a pre-commitment mechanic whereby a first user earns a trade credit by giving an item, money, or other exchange token to another user before knowing what item she may get in exchange. Then, the first user redeems this trade credit by getting an item or money from yet another user. Thus, a given user alternates between being a "giver" and a "getter," making pairs of asynchronous trades with other users. Items have a simultaneous identity as both a "give-item" (from the giver's perspective) and a "get-item" (from the getter's perspective).

In some embodiments, items in the marketplace are sorted into groups of ostensibly similar worth within a range of value, such as $1-$4, $10-$20, $60-$100, etc. It should be understood that other ranges of value may work equally well. Trades may then be conducted within a level to ensure the approximate equal value of a give-item and a get-item associated via a trade credit. Value may also be determined not necessarily on the market value, but on other factors such as rarity, personal effect, scarcity, meaning, etc. For example, a feather of an eagle may not be valuable to one person, but may be extremely important to another person due to other factors such as personal meaning, religion, etc.

In some embodiments, an AI technique of machine learning is used to generate and adjust a process for recommending get-items for each individual user using factors such as historical data about each user's viewing patterns, get-item selections, stated category preferences, stated keyword preferences, geographical location (i.e., geo-location), demographics, social media profile, and other such data.

In some embodiments, the user views a succession of get-items in a non-replacement process where each item is only presented once unless other criteria are met. For example, a unidirectional selection queue may be employed where one at time each item may be presented using a process, such as a random process, pseudo-random process, or using an AI driven selection process, with the option of selecting or declining each get-item viewed. In order to convey urgency, excitement, and the like, to the user viewing the presented image of the get-item, the number of get-items viewed for each trade credit may be constrained by a counter, or other constraining process such as a countdown clock, that may be configured to drive user selection using rules and processes described herein informed, for example, by behavioral economics principles.

In some embodiments, the number of views required for a get-item to be selected from the unidirectional selection queue informs the value of the get-item and the reputation of the person who submitted this get-item as a give-item. For example, items for a user with a high reputation may be presented before items for users with a lower reputation. An item selection module of a networked computer system might access user information from a user database and item information from an items database, and select the give-items to be presented to a specific user and that selection could vary from user to user. The selection can depend on a give-item exchange credit value of the user's give-item, get-item exchange credit values of get-items in the items database, and information about the user's reputation and use of the system.

In some embodiments, the basic get-item selection mechanic of the item selection module may be modified by other modification processes such as powerups, tokens, and the like, which may be rules or processes that change how get-items are presented, how get-item selections are made, etc.

Examples of operation of the mobile application and variants are illustrated by the screenshot figures described herein. It will be apparent from these illustrations that one or more servers and databases interact with a population of users who have computer systems or devices, such as smartphones, executing the application and interacting with the servers, and that the servers may be programmed to enforce various rules onto the users by the constraints imposed in interactions between the mobile application and the servers. For example, a rule that a user cannot see all of the items in a group of items before selecting one, a rule that the user cannot back out once the process has begun, and a rule that the user cannot spend unlimited time making a particular selection are all rules that may be imposed on the user by having the servers appropriately programmed and the application appropriately designed. The rules might be represented by one or more data structures specifying what is allowed and what should not be allowed, and/or program code that uses the data structures in the operation of server-side programs and/or client-side programs.

Figure 1B:
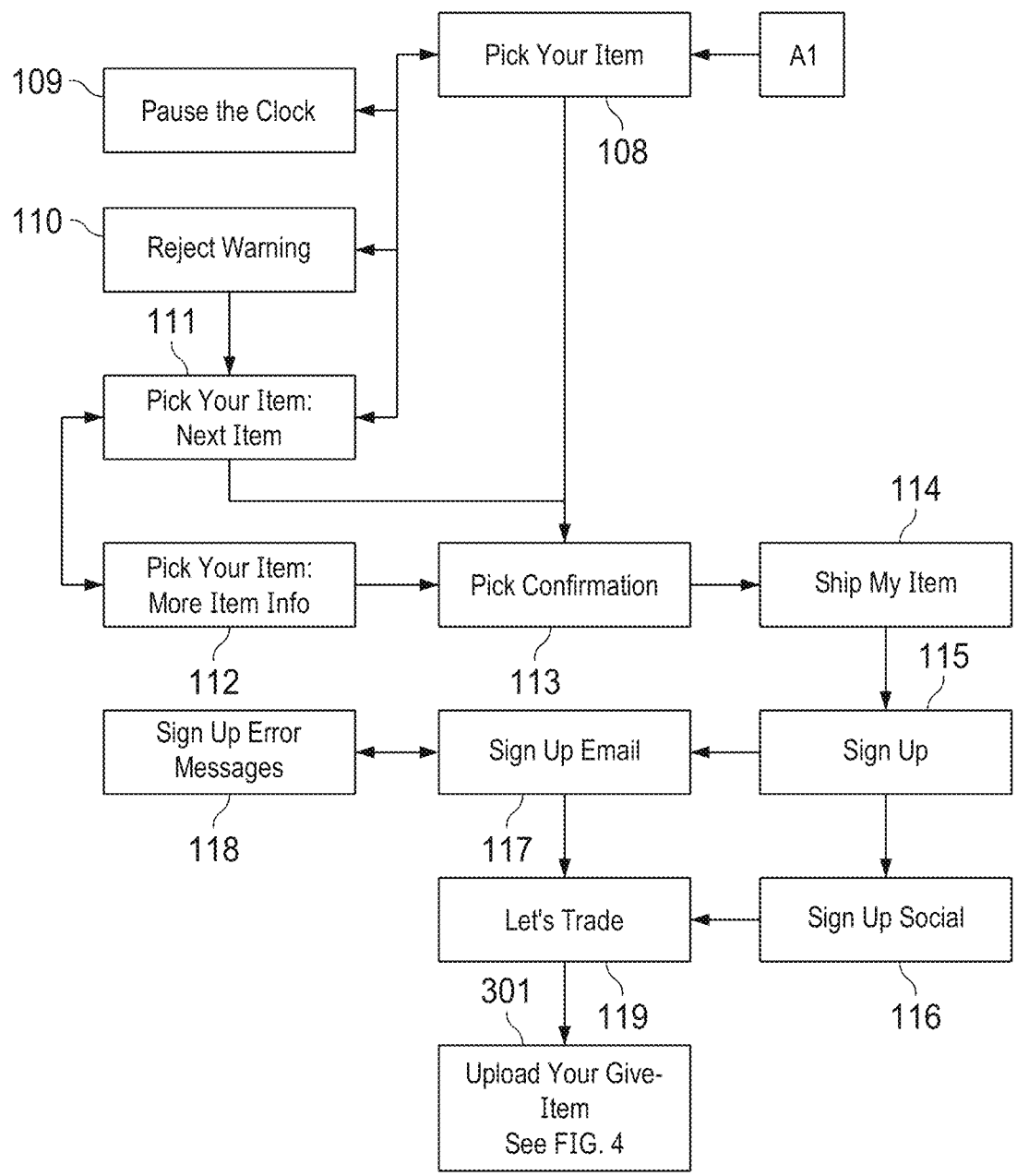
Figure 3A:
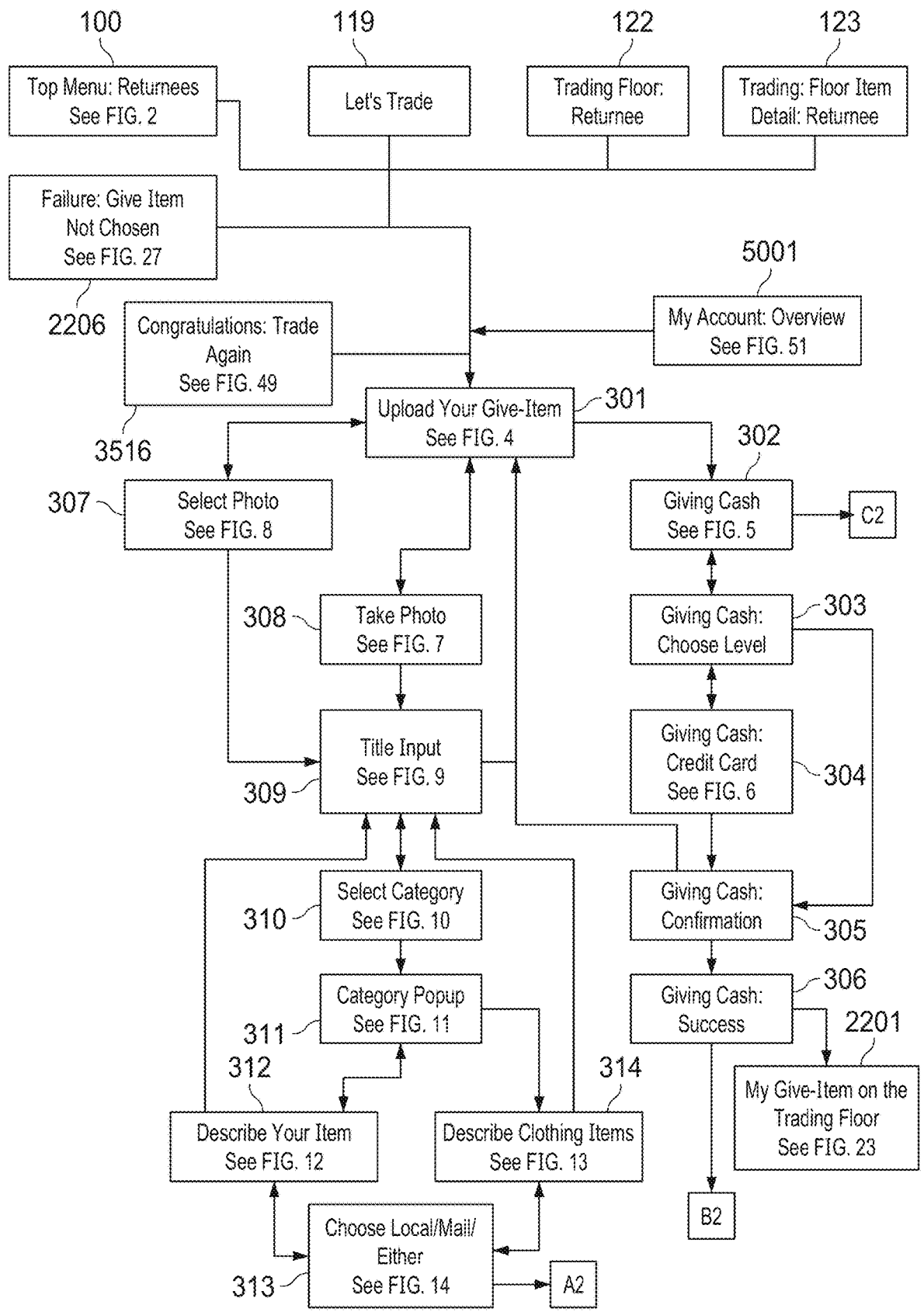
Figure 3B:
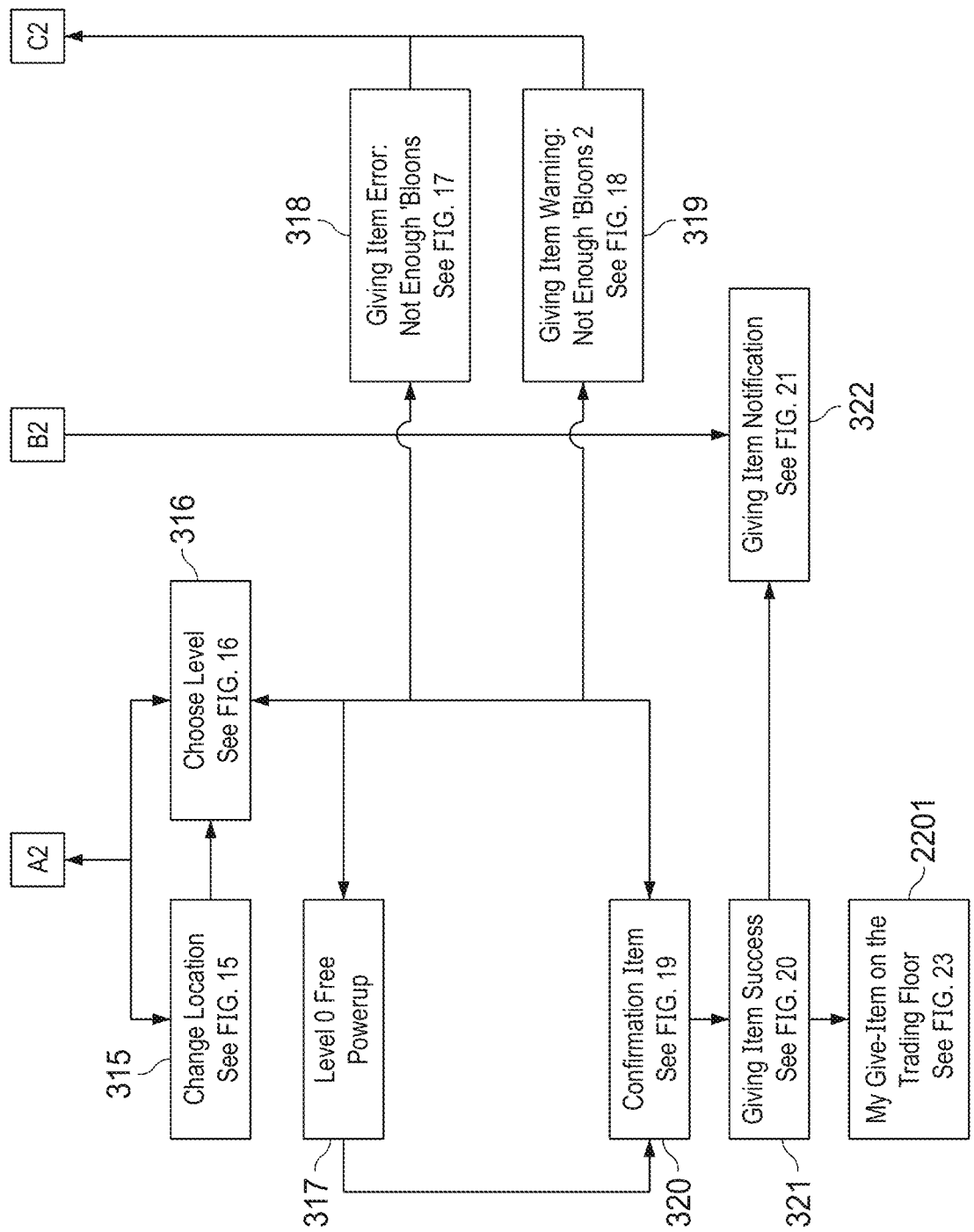
Figure 22:
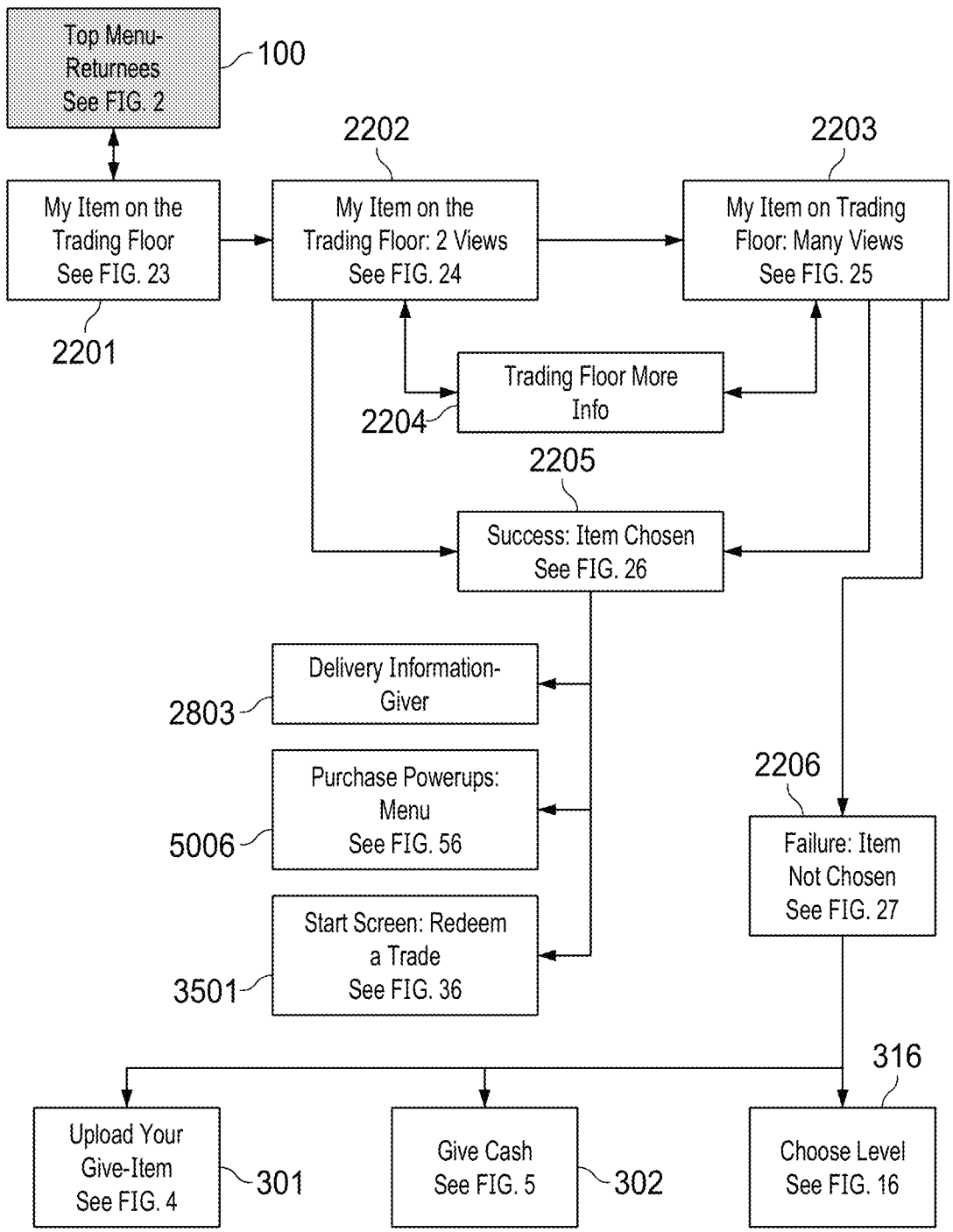
FIG. 22 describes elements of an application where a user watches her give-item be selected or rejected.
Figure 28:
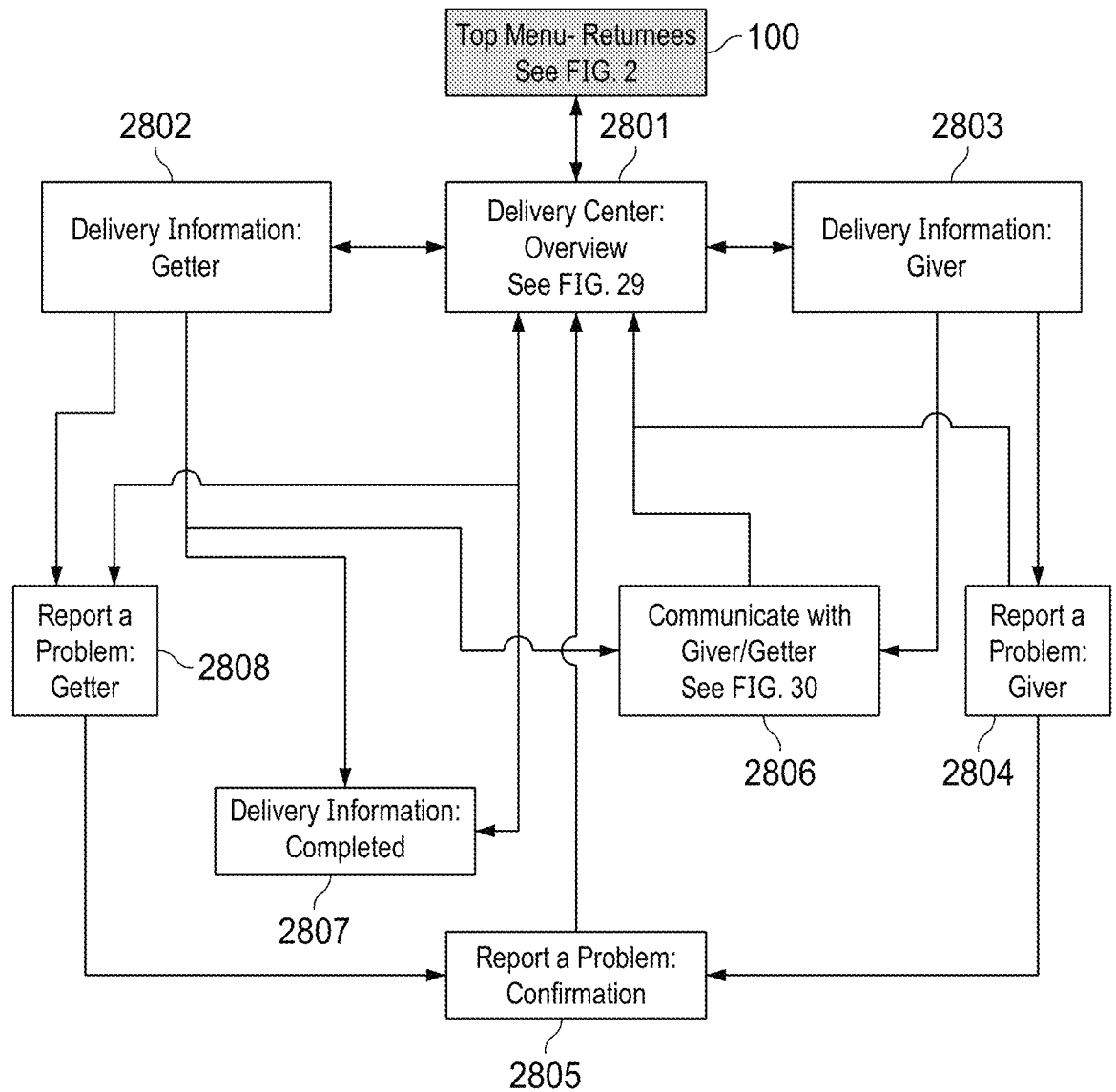
FIG. 28 describes a process for communicating about delivering and receiving items.
Figure 31:
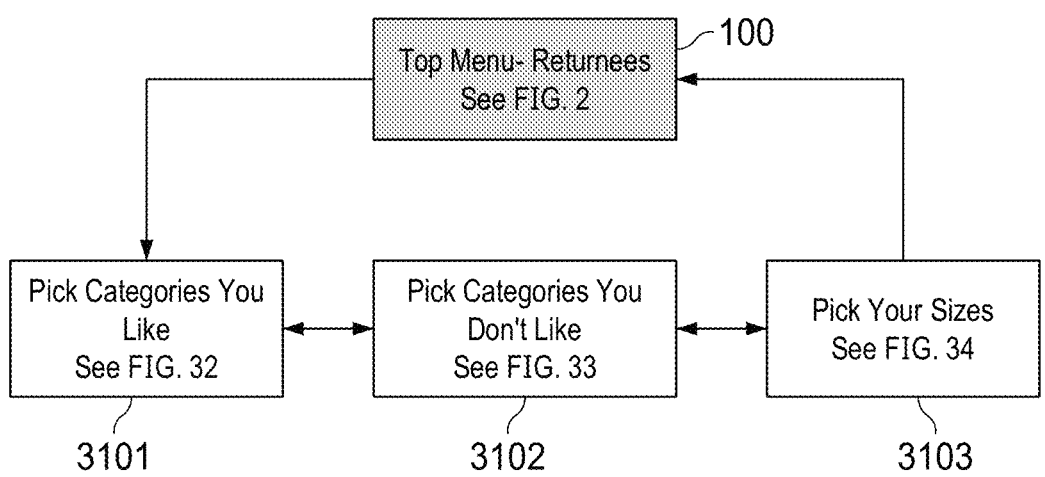
FIG. 31 describes a customization feature for communicating preferences to the application and subsequently improving selection of items for a user.
Figure 35A:
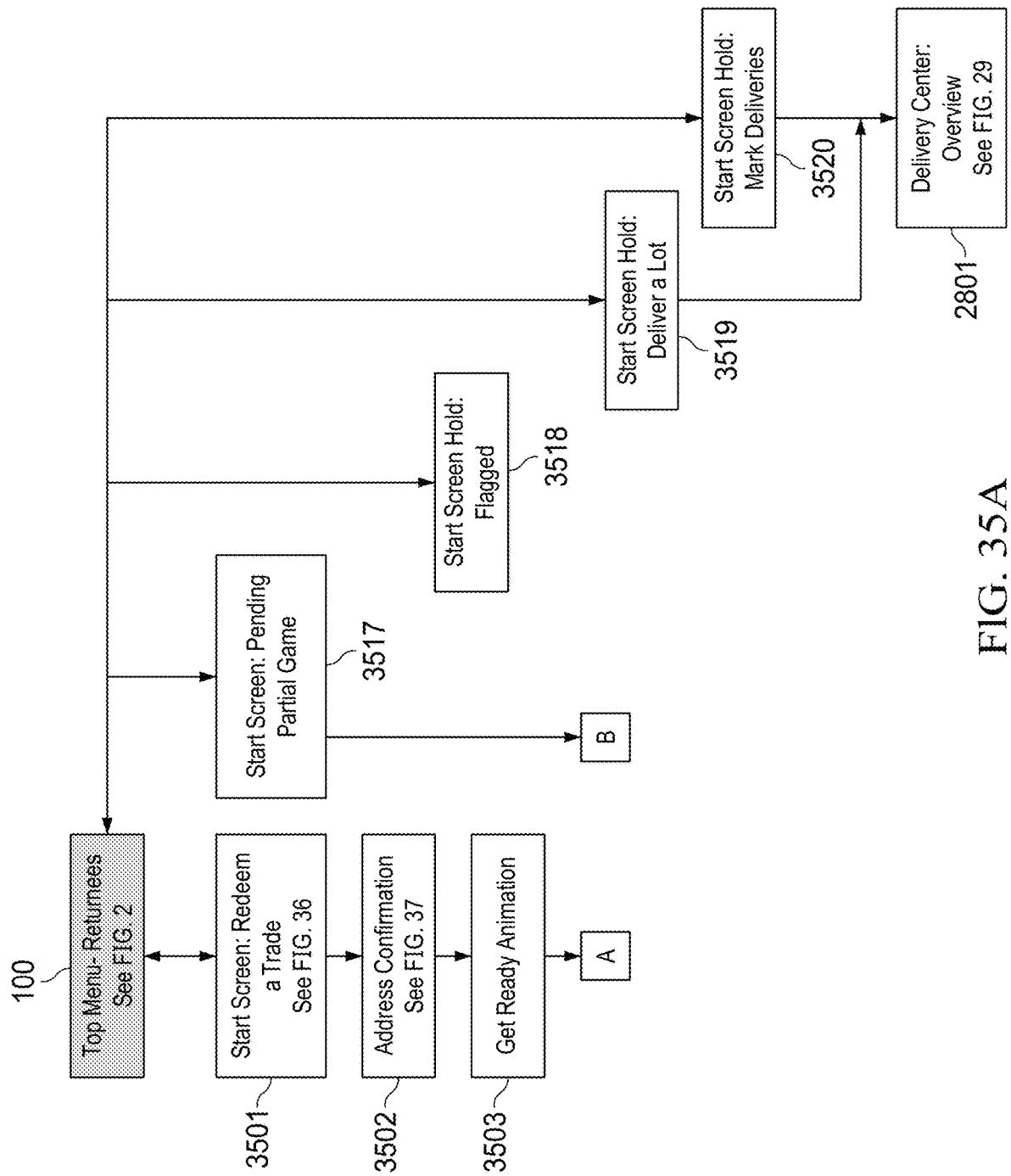
FIGS. 35A-35B describes a process for selecting a get-item.
Figure 35B:
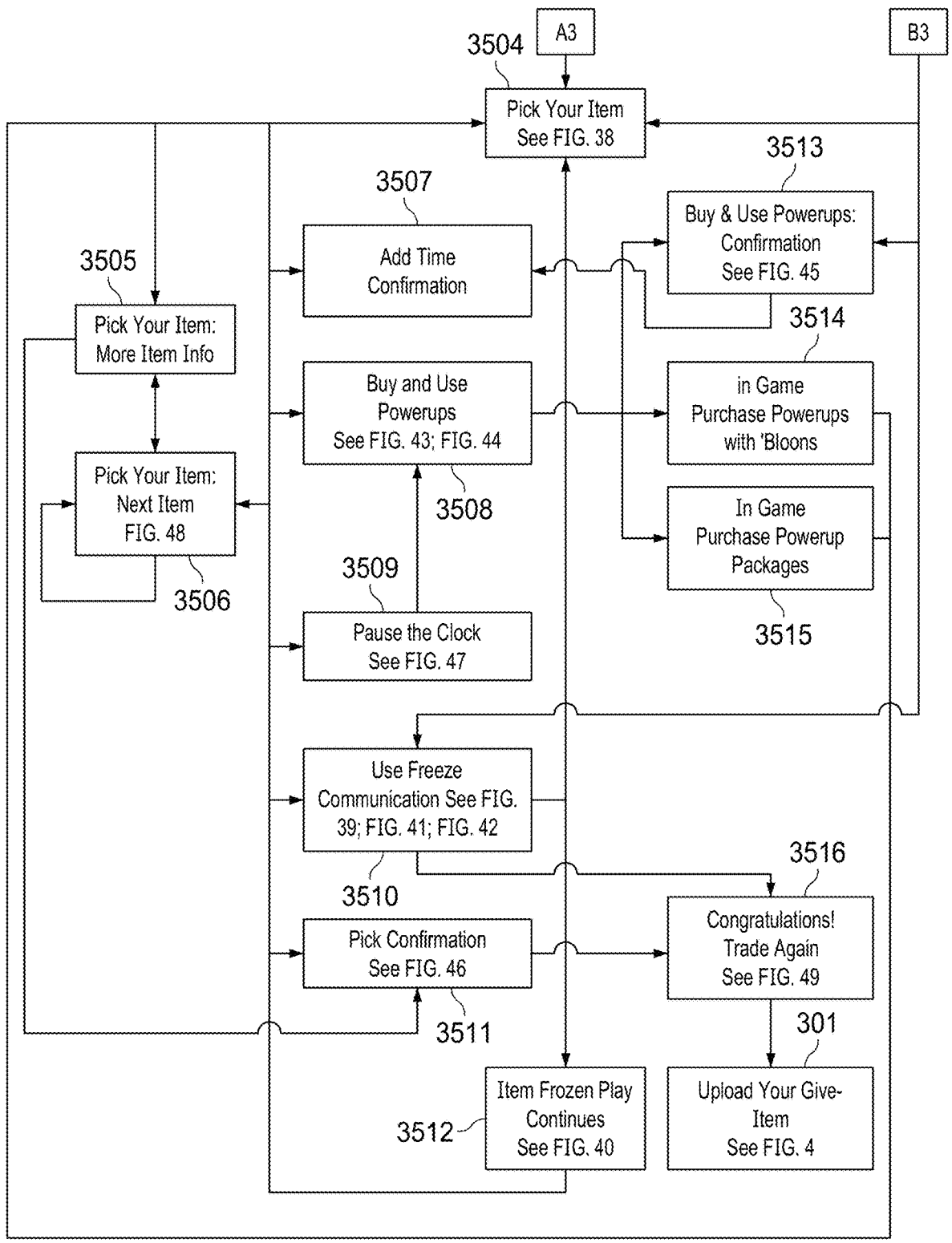
Figure 50:
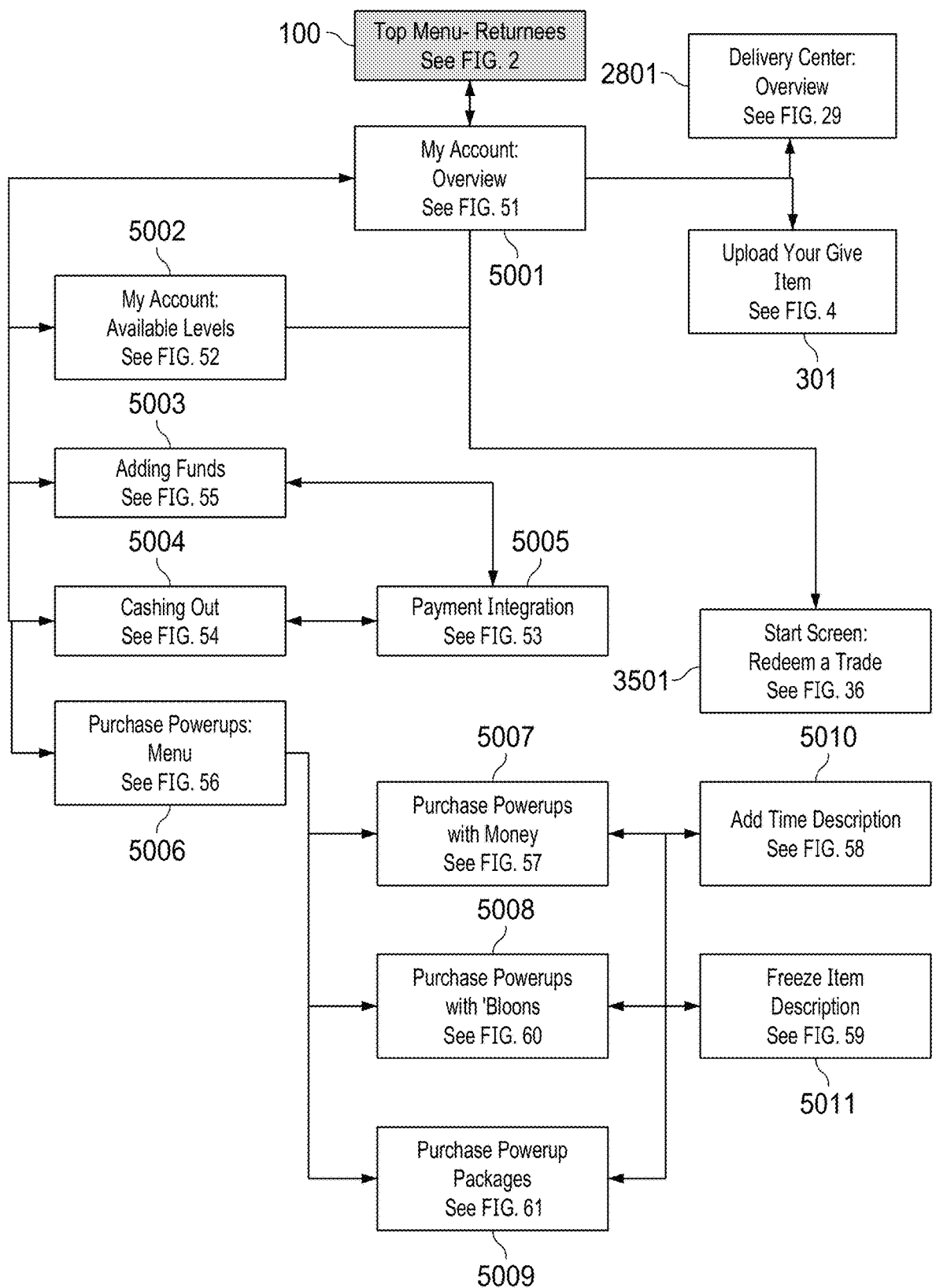
FIG. 50 describes a process for the user to learn about and update elements of a user's account.
Figure 62:
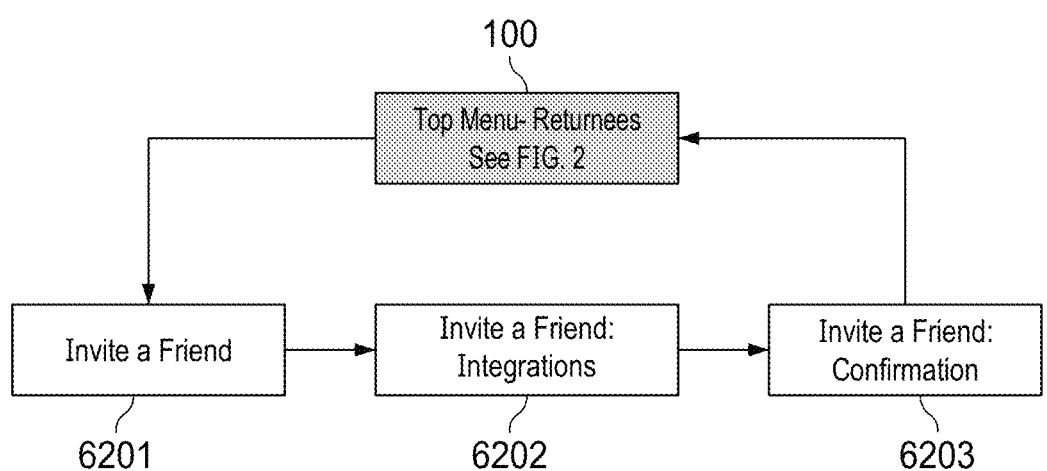
FIG. 62 describes an invitation mechanism for inviting friends to an application.
Figure 63:
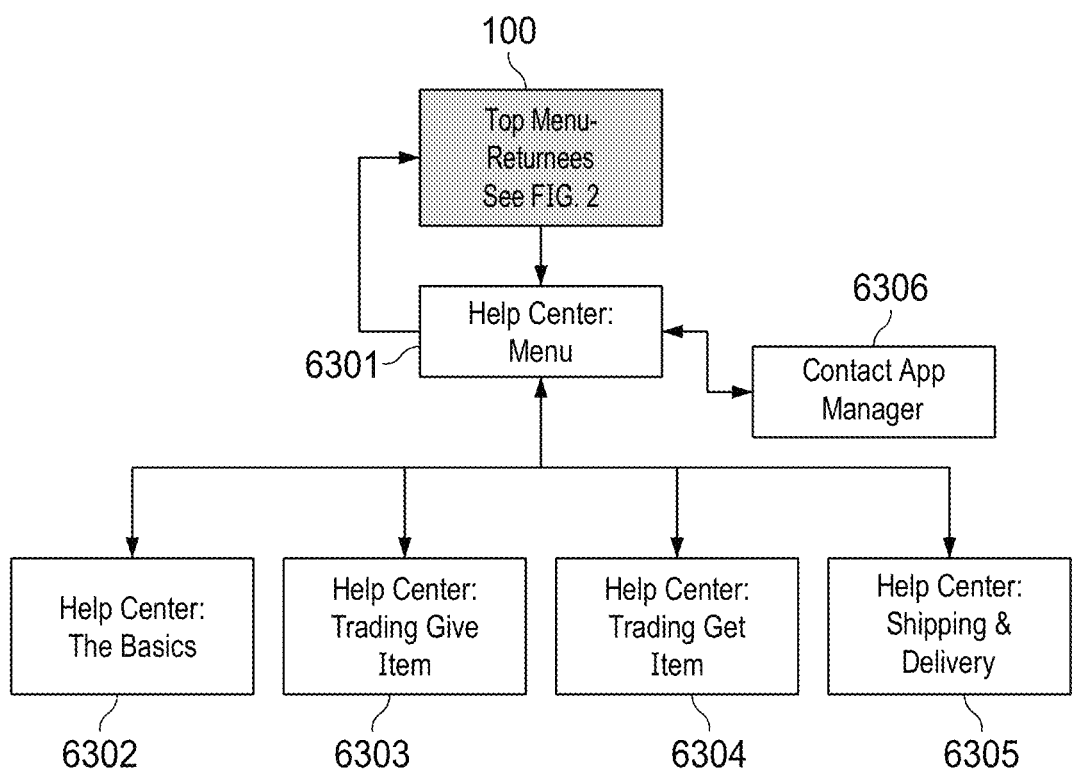
FIG. 63 describes help features of an application.

One implementation comprises a mobile application designed to run on a mobile device, such as a smartphone or tablet computer, to link multiple users who are likely to be in remote locations from one another, a game engine such as trade engine 12816 described herein, where the game engine may include software with core functionality of a renderer, sound, scripting, animation, networking, streaming, memory management, threading and localization support, a recommendation engine, a database, security and authentication protocols to ensure appropriate data is accessed by particular authorized users at appropriate times, a process to add new user accounts as described in FIGS. 1A-1B, a process for listing an item owned by the user to be given away to another user (referred here to as a "give-item"), as shown in FIGS. 3A-3B, and watching a succession of users select or reject this give-item as shown in FIG. 22, a process for selecting an item to receive from another user (referred here to as a "get-item") as illustrated in FIGS. 35A-35B, a process for communicating with other users in the transaction (giving and receiving an item) as illustrated in FIG. 28, a process for a user to inform the recommendation engine about item preferences, as shown in FIG. 31, a process for the user to invite members of her social network to the application as shown in FIG. 62, a process for the user to add currency and withdraw currency from the application and update elements of her account as illustrated in FIG. 50, and a process for learning more about the application and getting assistance as illustrated in FIG. 63.

A recommendation engine might filter items by predicting how a user might respond to them.

Onboarding

As illustrated by the flowchart in FIGS. 1A-1B, at 101, upon installation and launch of the application, a system, such as system 12800 described below with respect to FIG. 92, identifies whether a user is logged into, account using the application, such as trade engine 12816, or not by using validation criteria, such as cookies, while showing the user the splash screen, such as splash screen 201 illustrated in FIG. 2. If the user is logged in, at 122 the user may be shown a global trading floor of current items being traded, and at 123, may be shown their details. These recognized users are invited to redeem a trade credit, for example, as illustrated at 3501 in FIGS. 3A-3B, or at 301 to give a give-item 702 as described herein, in order to obtain a trade credit. If the user is not logged in, at 102, the system may begin the account creation process, potentially educating the user about the system. At 102, if the user is not logged in, but has an existing account, the user at 121 may initiate a login process, and at 100 may be presented with menu options via menu interface 202, illustrated in FIG. 2. At 100, the user may return to this menu 202 while using application 203 in many contexts to navigate from one part of the application 203 to another.

To familiarize the new user with the process, at 103, the system may also show the new user a trading floor of current get-items being traded and their details at 104. For example, a trading floor may be a global trading floor, where many users can see what is being traded, including their own item, or an individual trading floor, such as trading floor 2301 illustrated in FIG. 23. A get-item is an item (e.g., goods, services, right, etc.) that a user receives, either from another user or from another source such as the application manager. At 105, the user may be told that they will receive a starting gift, which could be a free item, for example. At 106, after prompting for a location code, such as a zip code, the system may create an item selection queue of get-items for that user that may be either nearby geographically or may be transported to the user via a mail service, etc. At 107, the user may be given a set of instructions in the form of, for example, a video or animation, to prepare the user to select a get-item in a get-item session.

Figure 38:
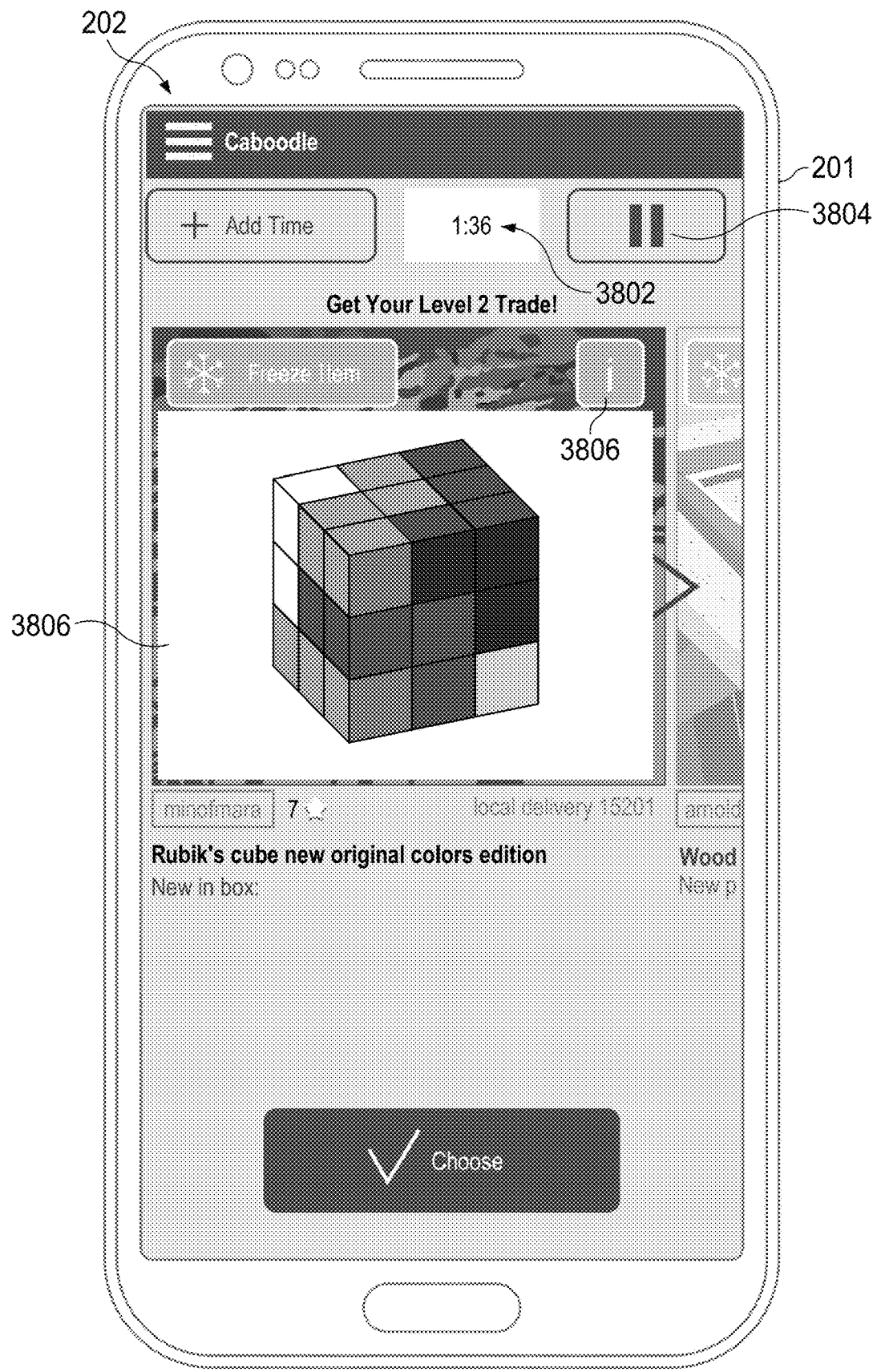
FIG. 38 shows a screenshot of an aspect of an embodiment.
Figure 39:
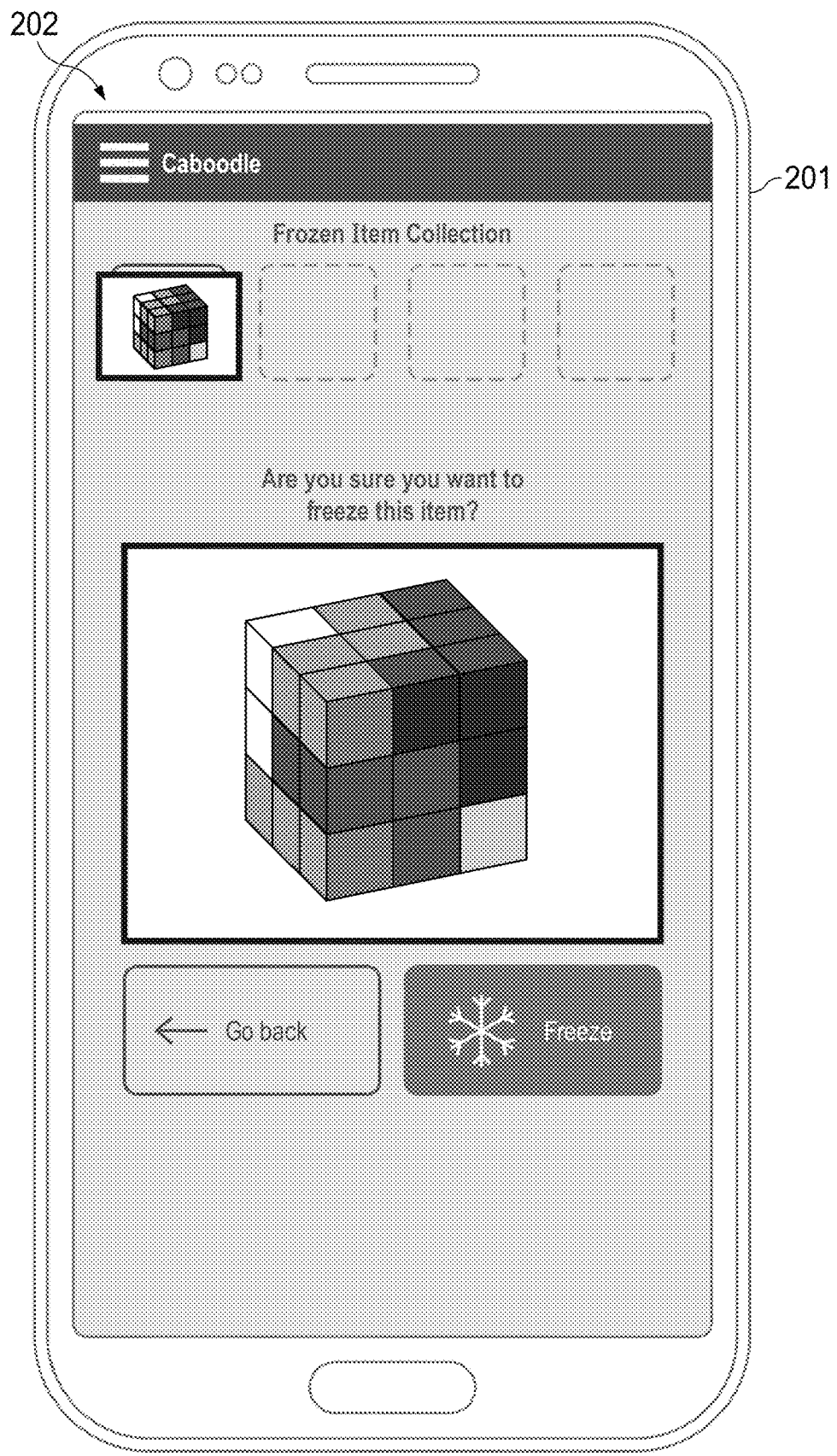
FIG. 39 shows a screenshot of an aspect of an embodiment.
Figure 40:
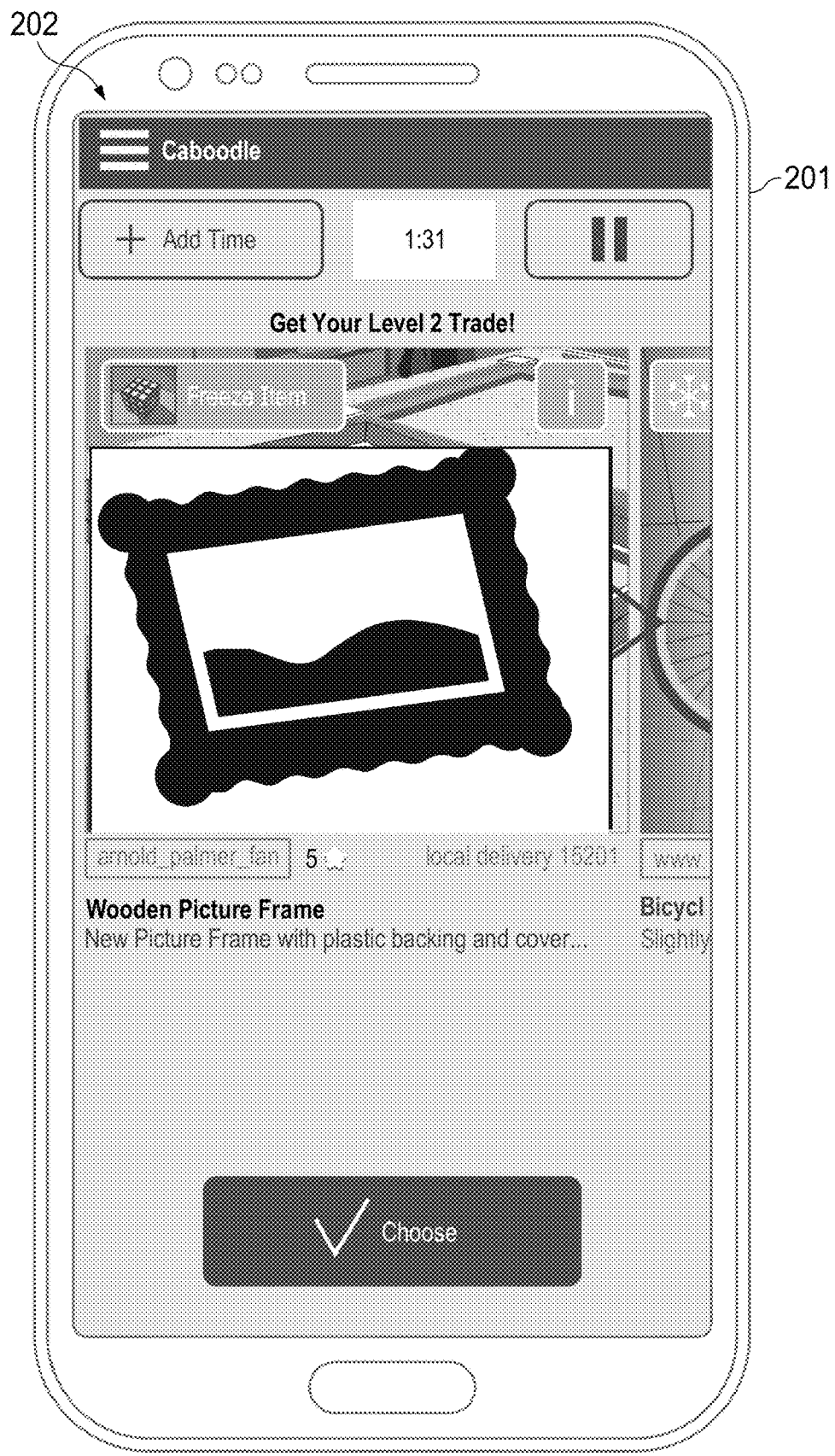
FIG. 40 shows a screenshot of an aspect of an embodiment.
Figure 41:
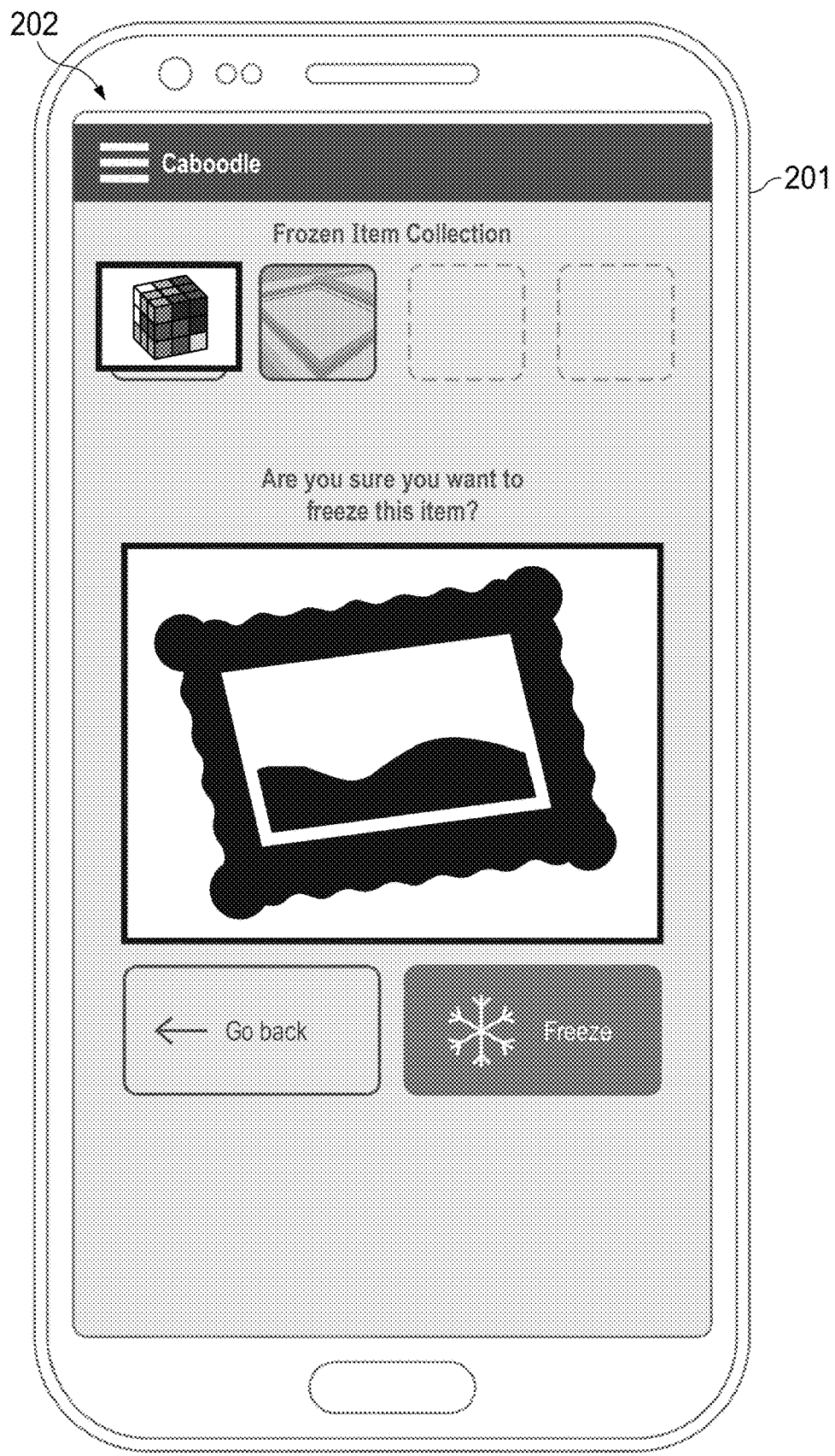
FIG. 41 shows a screenshot of an aspect of an embodiment.
Figure 42:
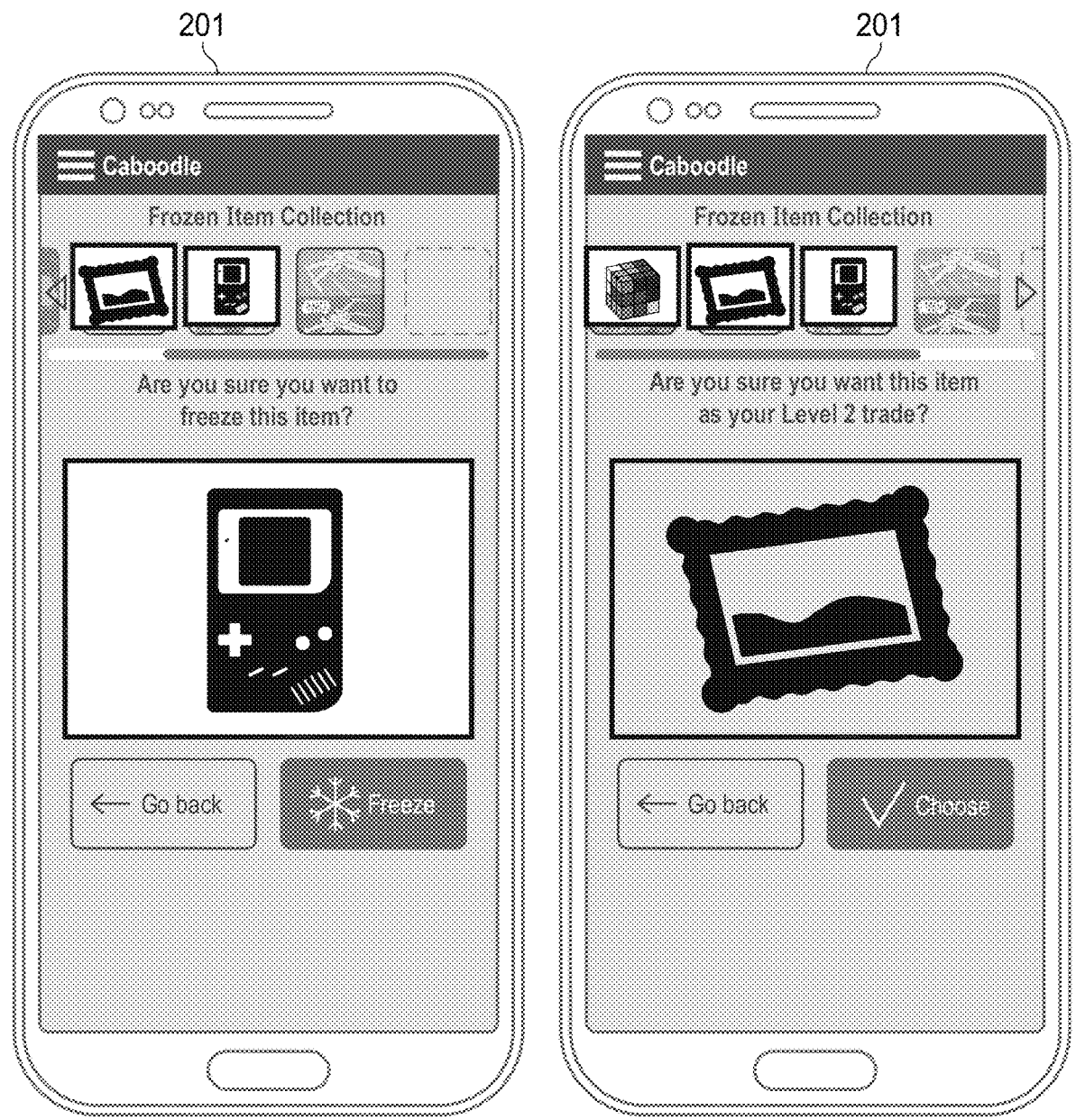
FIG. 42 shows a screenshot of an aspect of an embodiment.

At 108, the new user may be presented with the first get-item in the item selection queue, such as shown in FIG. 38. A clock, such as a timer, counter, and the like, used to measure time, periods, cycles, and the like and may be set to count down a certain duration, such as selection time, period, cycles, etc. For example, a clock such as clock 3802, may be set to a selection duration, e.g., time of 100 seconds. Selection duration may be the amount of time, periods, cycles, etc., the user has to choose a get-item to receive from the item selection queue.

At 109, the user may pause the clock if for example, she needs to understand more about the selection process, is interrupted, etc. In some implementations, the user may pause the clock for an indefinite time or for one or more predetermined times using, for example, a pause interface such as pause button 3804, as illustrated in FIG. 38. At 111, she may transition to the next get-item. At 112, the user can get more information about the get-item by pressing, for example, an information button "i", such as information interface 3806. If the user has not chosen a get-item when the clock reaches a particular point in time, e.g., 0:00, then at 111, the user may receive the most recently viewed item in the item selection queue. While time remains on the clock, the user can gesture to reject the get-items, such as using a swipe or other gesture, and the system at 111 may present to the user the next get-item in the item selection queue. At 112, a user may obtain more information about the next get-item using for example information interface 3806.

In some implementations, the item selection queue is considered unidirectional, meaning that once a user rejects a first item by using a gesture such as swiping, touching, and the like, a second get-item is then presented, and the first item is removed and may not be seen again unless other criteria is meet such as the user has a token such as a powerups or other credits to bring back the rejected item as described herein. Similarly, once a user rejects a second get-item, the user may be presented with a third get-item, and may no longer select the first get-item or second get-item unless the user obtains and uses a token such as a powerups or other credits to bring back the first and/or second get-item as described herein. This procedure continues until a user selects a get-item or the duration runs out and the system selects a get-item for the user.

In other implementations, a reject warning 110 may be used to warn a user that they are rejecting an item and that they cannot go back unless, for example, they have a means such as powerups or other credits that may be used to bring back a rejected item. In implementations, reject warning 110 may be presented in any manner that conveys the urgency, excitement, and the like, that the user make a selection or the item being viewed will be selected for them unless they take some action. For example, reject warning 110 may be an animation of the get-item being viewed moving toward or converging with a trade confirmation interface, such as a shopping cart, and the like, wherein once the get-item and trade confirmation interface converge, the get-item is automatically selected for the user. In other implementations, reject warning 110 may be other types of animation or presentations utilizing behavioral economic principles described herein to convey urgency, excitement, and the like and/or train user trading behaviors. For example reject warning may be animations, presentations, and the like, used to convey rejection or selection urgency, excitement, and the like, such as a trade net being lowered onto the get-item being viewed letting the user know that the get-item will be "captured" unless they take action, the get-item is shown spiraling toward a trade pit, and the like.

In other implementations, the system may use user behavior and responses to determine which type of reject warning 110 to use. For example, based on user response the system may provide animations that convey more or less urgency, excitement, and the like, or vary the presentation to make a selection more or less attractive, less exciting, and the like, for selection. In another scenario, a user providing a give-item may use credits to enhance the display to convey a greater or lesser urgency to a get-item. As such, get-item presentations provided by reject warning 110 may vary as a function of either user response to the presentation, a trade credit, or combinations thereof.

At 113, when a user chooses a get-item, she may receive a confirmation that this is the get-item she will be receiving. At 114, the user may then input her shipping address and other shipping data. In some implementations, shipping codes such as a ZIP or country code may be pre-populated and fixed from what the user inputted at 106. At 115, the new user may complete registration using, for example, social sign-in at 116, email at 117, etc. At 118, a user may receive error messages to inform correct sign-up. At 119, a user can initiate a trading session as described herein by uploading a give-item for someone else, for example using a process such as described at 301 of FIG. 3.

Figure 2:
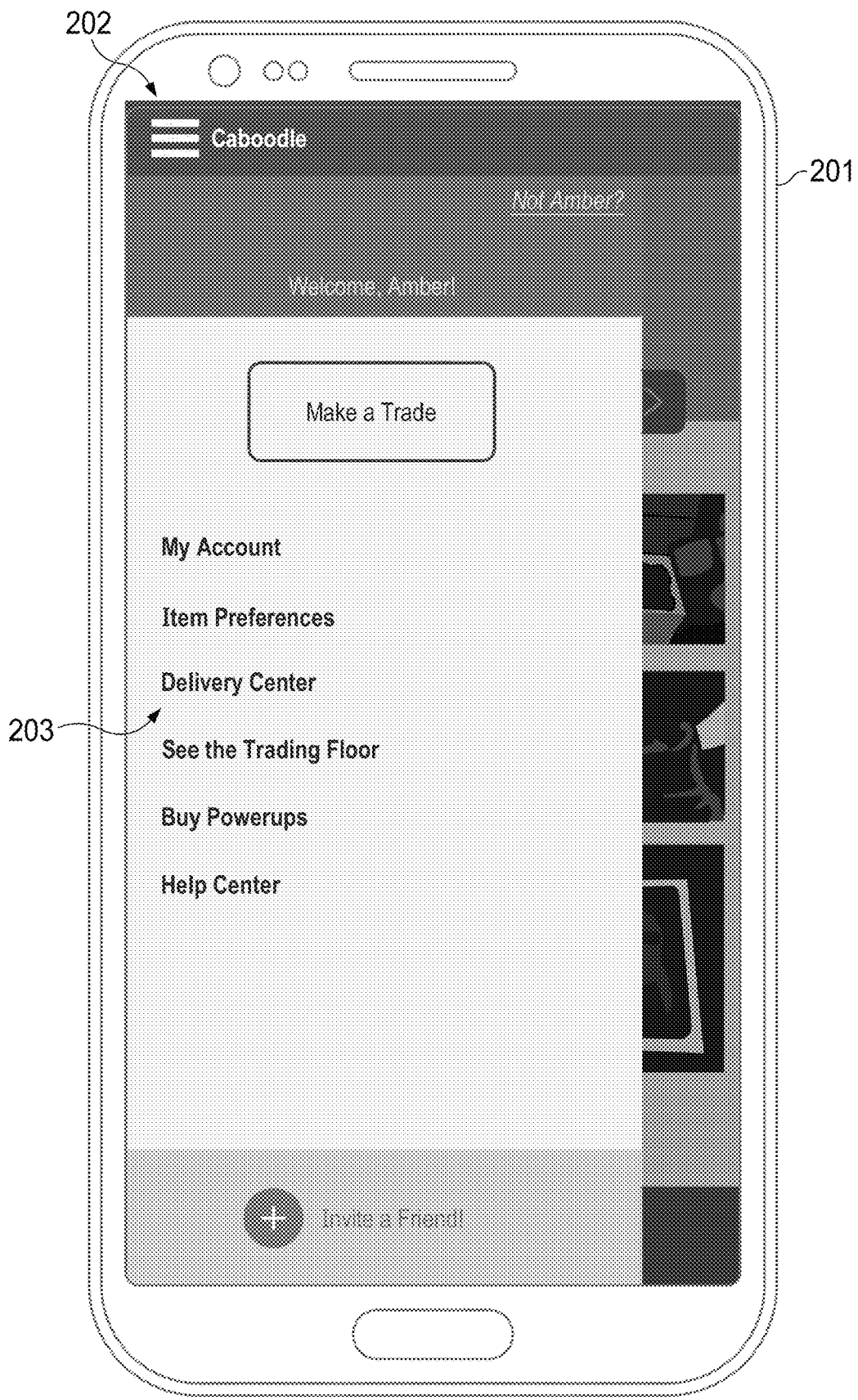
FIG. 2 shows a screenshot of an aspect of an embodiment, wherein a screenshot is a static view of what a user computing device might show to a user using the user computing device as described herein at various points in a process for which the computing device is programmed to support.

FIG. 2 illustrates the screen shot of mobile device 201 encountered, for example, at step 100. A returning user who already has an account may tap on the top hamburger menu 202 to see different menu navigation options. FIG. 2 illustrates an implementation on a mobile device 201, but implementation on other devices and platforms is contemplated. A user may utilize a selection menu, such as menu 203, to navigate within the application.

Give-Item Process

In some implementations, a trade credit may be considered a promise of obtaining a future get-item at, for example, roughly the same monetary value as the give-item given by the user. The user that does not have a trade credit may first earn one by successfully giving a give-item to another user, or in the case of initial launch, a third party, such as a market-maker, who accepts most eligible items.

As illustrated by the flowchart in FIGS. 3A-3B, the user may be requested to give a give-item from various points in the application such as at 100, 119, 122, 123, 2206, 3516, and 5001.

Figure 4:
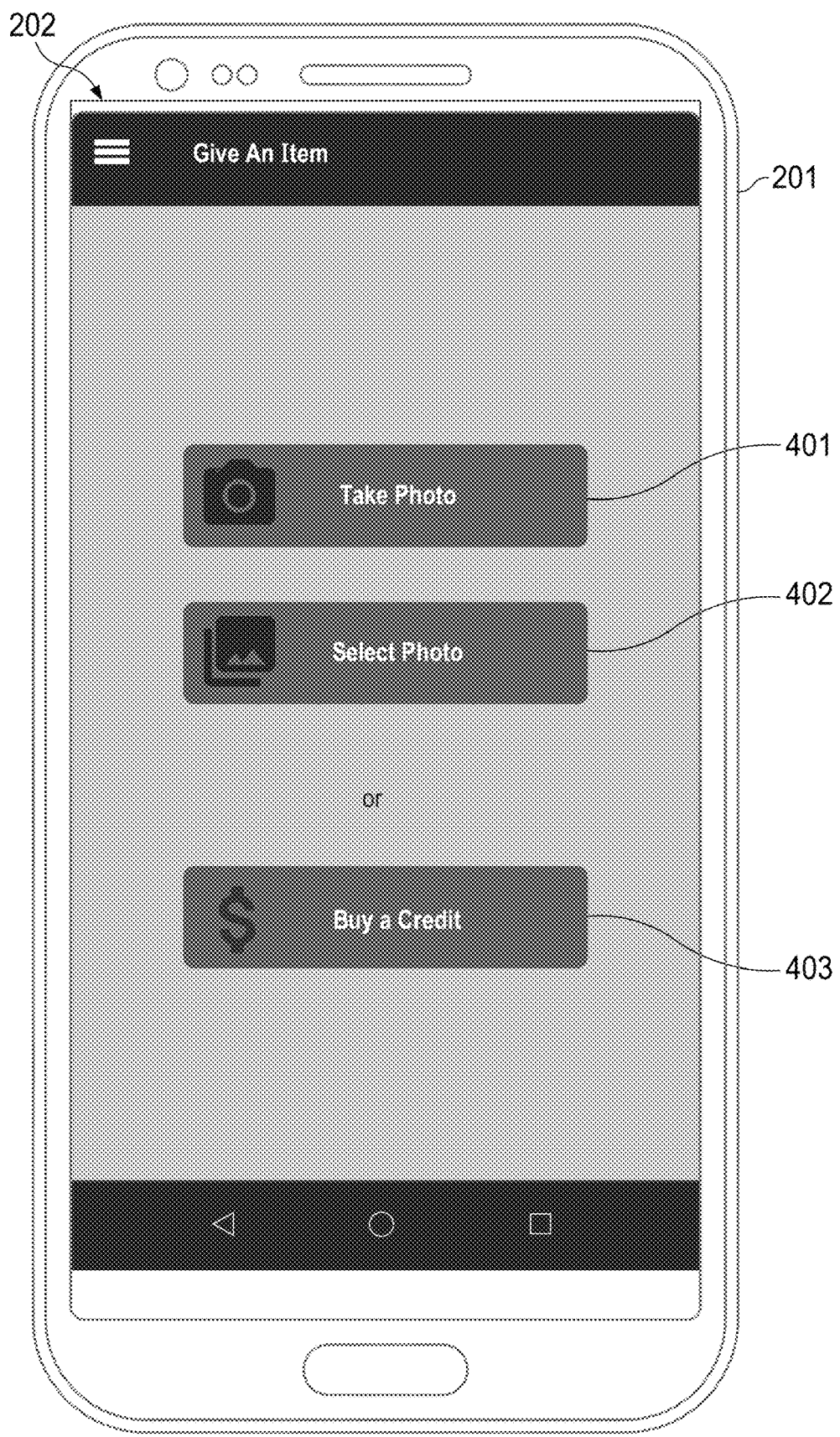
FIG. 4 shows a screenshot of an aspect of an embodiment.

At 301, the user may choose to earn a trade credit either by giving a give-item or giving cash as illustrated in screen shot of FIG. 4. As described herein, using an input screen a user may use photo process and/or photo libraries, and or buy a credit to use for a give item. For example, a give item may be entered using a photo process 401, select photo process 402, and/or buy a credit process 403.

Figure 5:
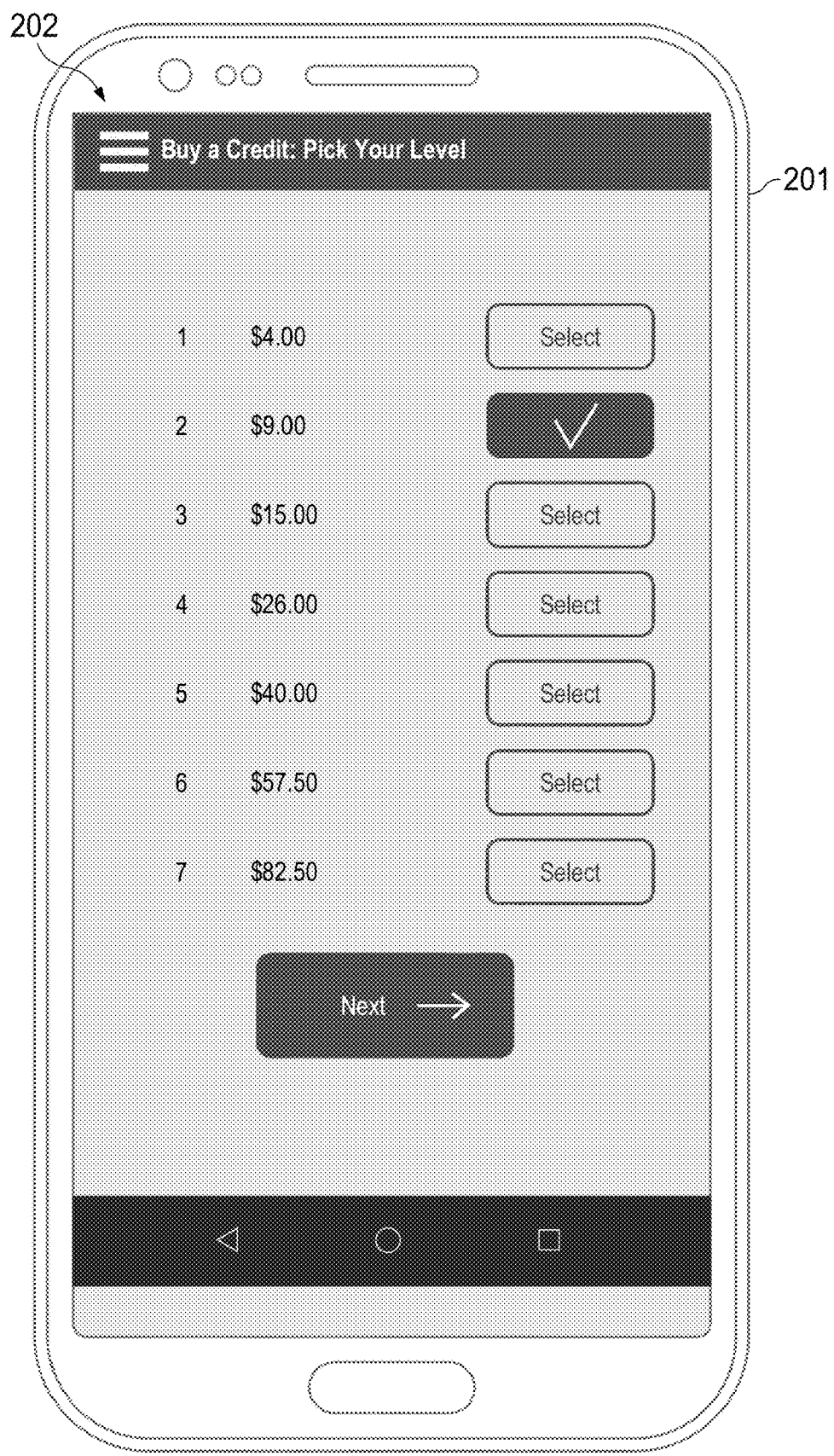
FIG. 5 shows a screenshot of an aspect of an embodiment.

At 302, if the user has chosen cash, she selects the amount of cash that she would like to give as illustrated in the screen shot of FIG. 5. The cash amount may be used to determine the level of the trade credit obtained. At 303, different levels of trade credit may reflect the different values of the items traded at those levels.

Figure 6:
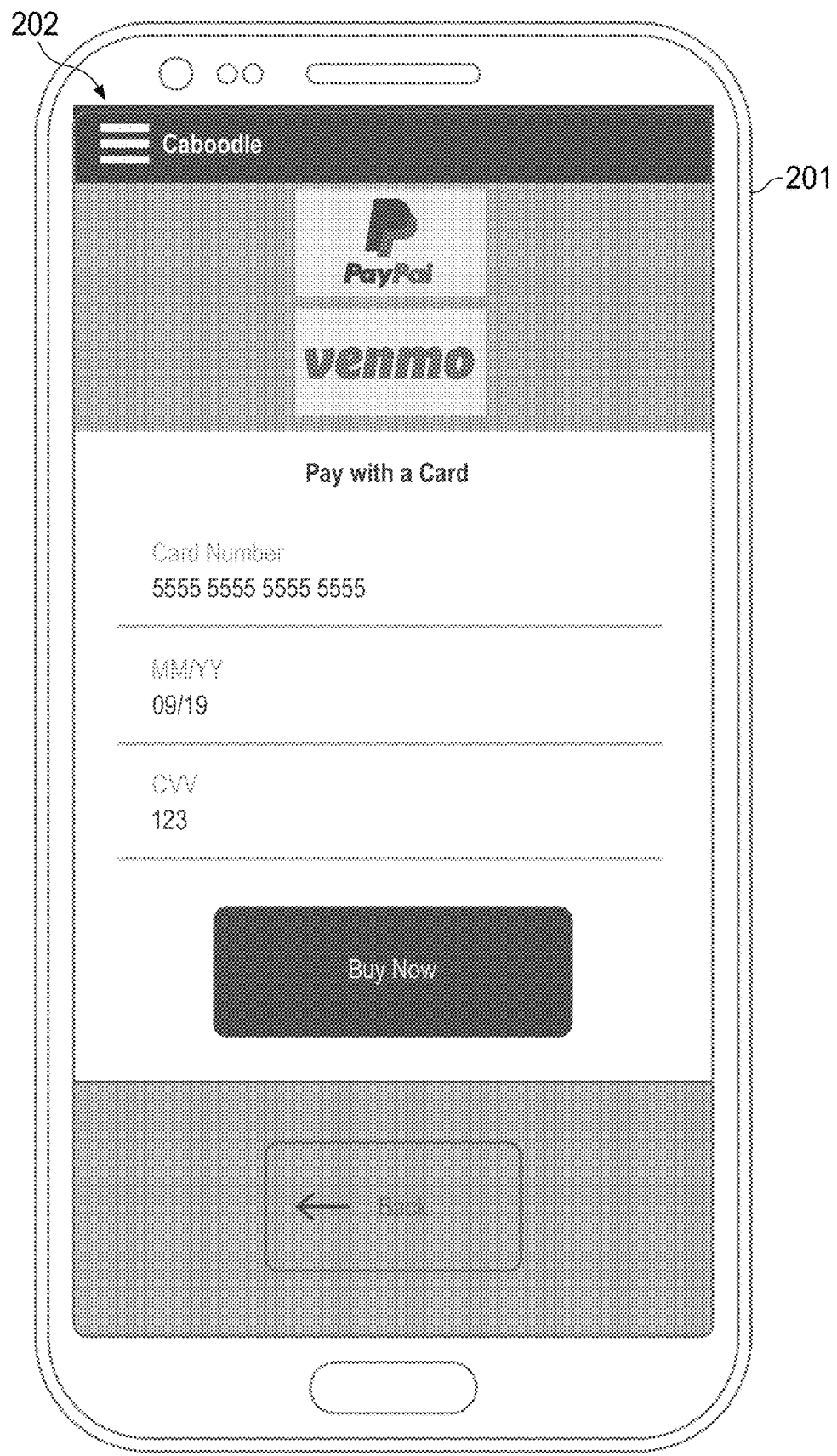
FIG. 6 shows a screenshot of an aspect of an embodiment.
Figure 21:
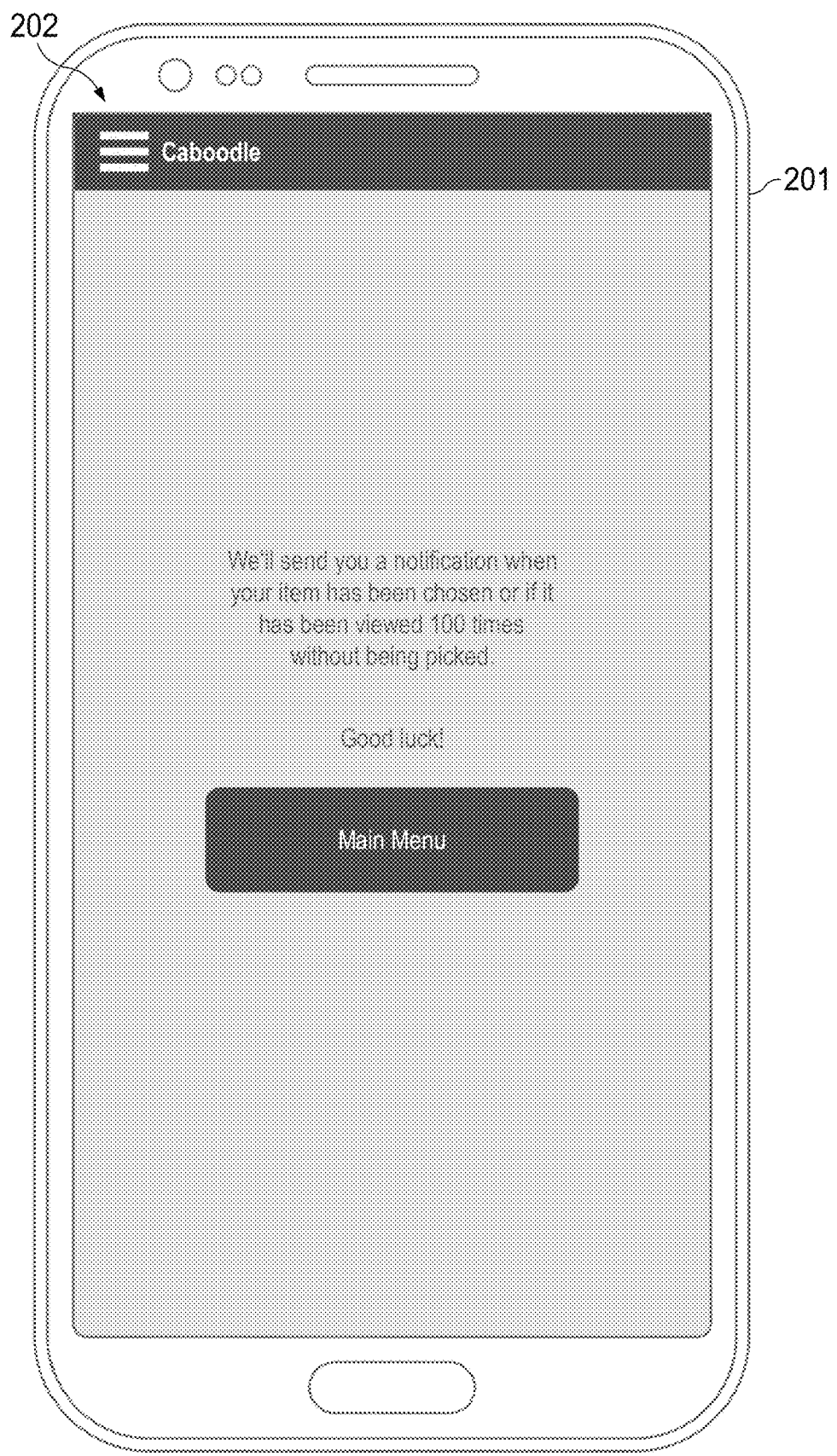
FIG. 21 shows a screenshot of an aspect of an embodiment.

At 304, the user creates or selects a payment method (e.g., credit card, electronic currency, cryptocurrency, etc.) as illustrated in the screen shot of FIG. 6. Payment methods may be stored for future use. Payment methods may allow the user to, for example, buy trade credits with cash and buy powerups. At 305, once the trade credit has been purchased, the user may confirm at 306 that the cash as a give-item should be launched. At 2201, illustrated in FIG. 22, the user can monitor the launched give-item on the trading floor as illustrated in the screen shot of FIG. 23, or by receiving notifications 322 as illustrated in screen shot of FIG. 21.

Figure 7:
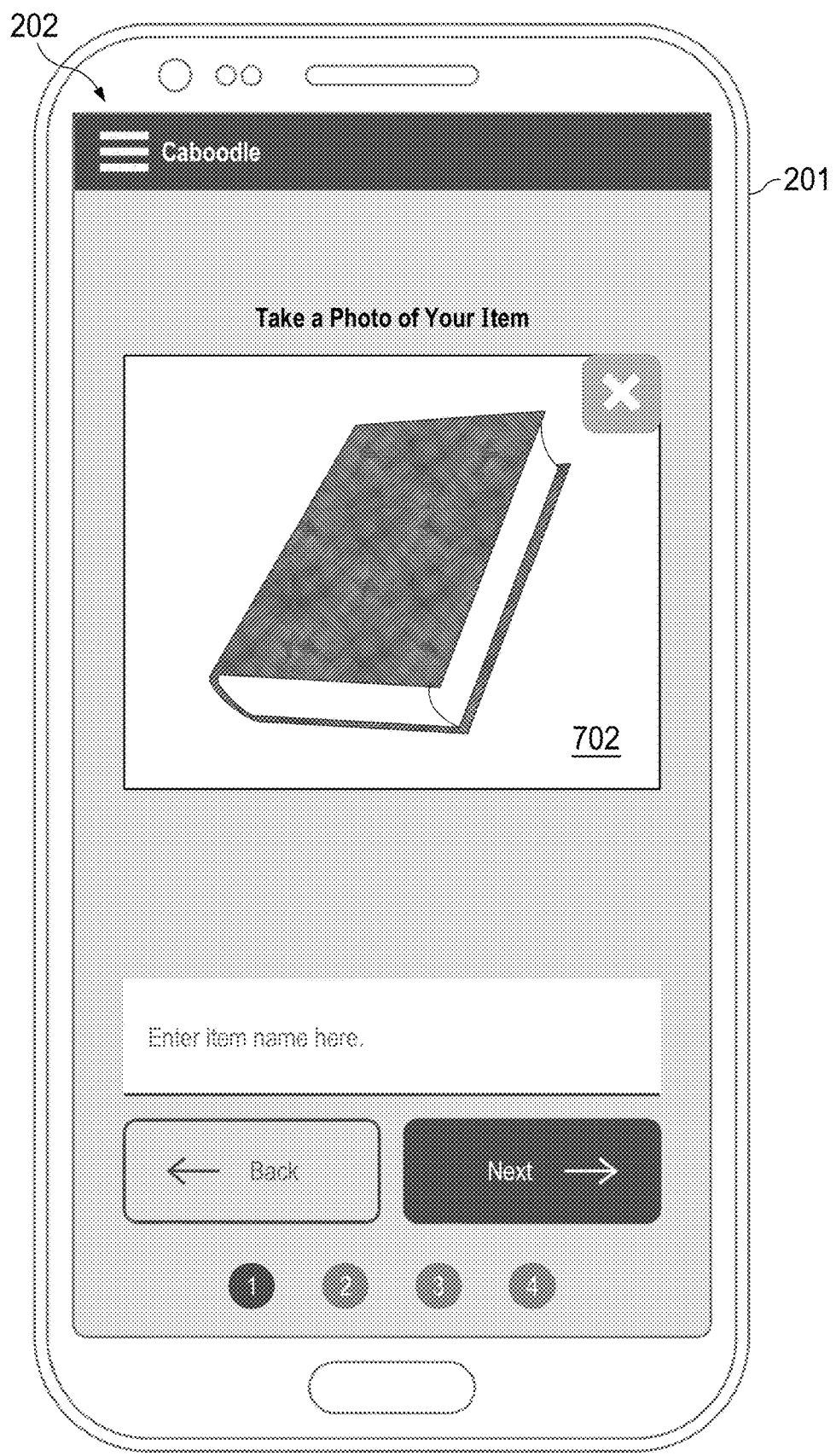
FIG. 7 shows a screenshot of an aspect of an embodiment.

In one implementation, a user offering a give-item may earn trade credits. If the user is giving a give-item, she typically selects whether she wants to take a new photo with for example, her smartphone 201 or at 308, to choose a photo from, for example, a photo library located on her mobile device, the cloud, etc. At 307, the user may take a photo of the give-item she wishes to give. For example, FIG. 7 illustrates a screen shot of a give-item 702 being displayed on a display of mobile device 201.

Figure 8:
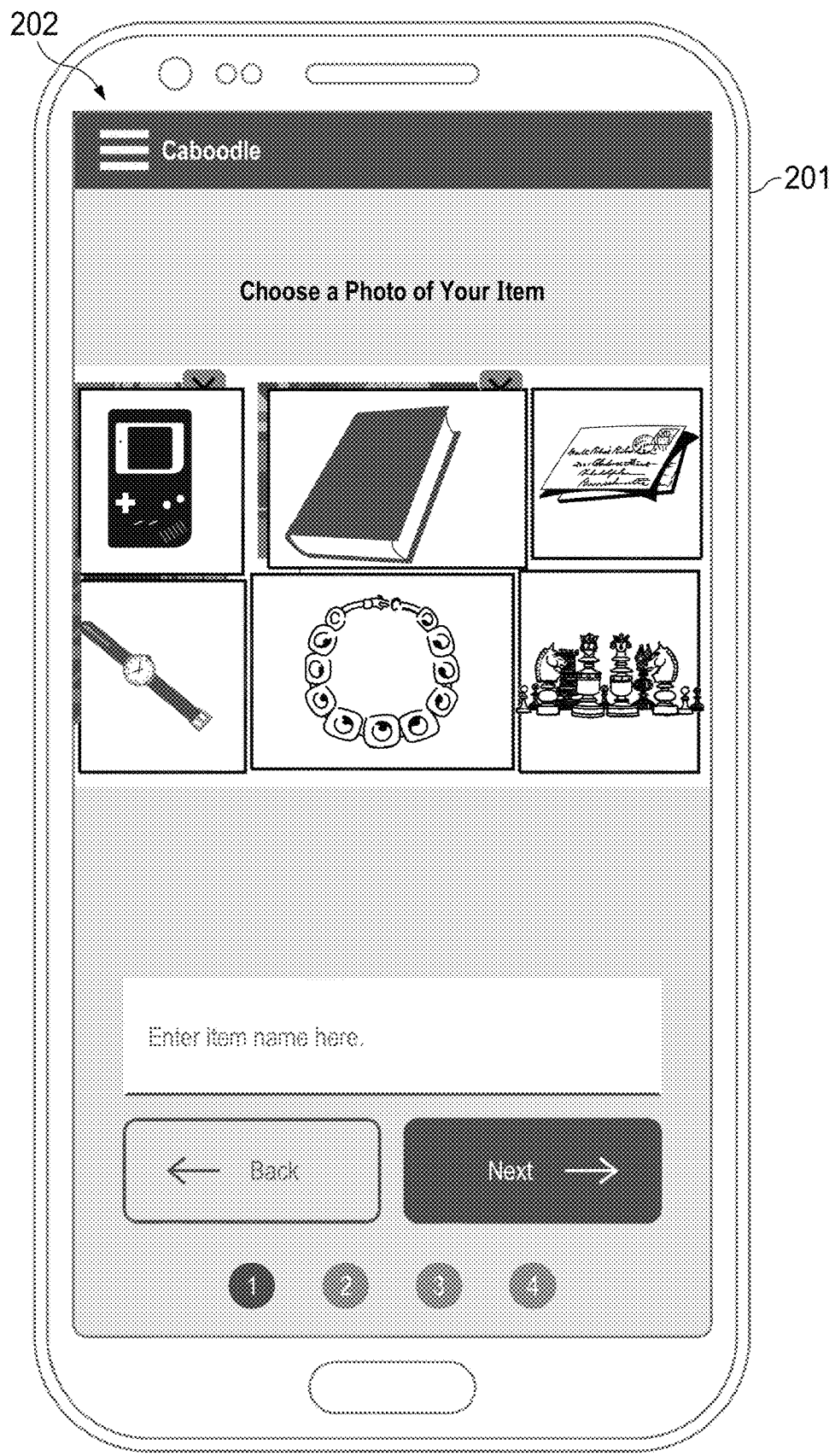
FIG. 8 shows a screenshot of an aspect of an embodiment.

At 307, the user selects a photo from the photo library (e.g., on her mobile phone) of the give-item that she wants to give as illustrated in the screen shot of FIG. 8. At 309, the user may begin inputting attributes, such as the title, of the give-item.

Figure 9:
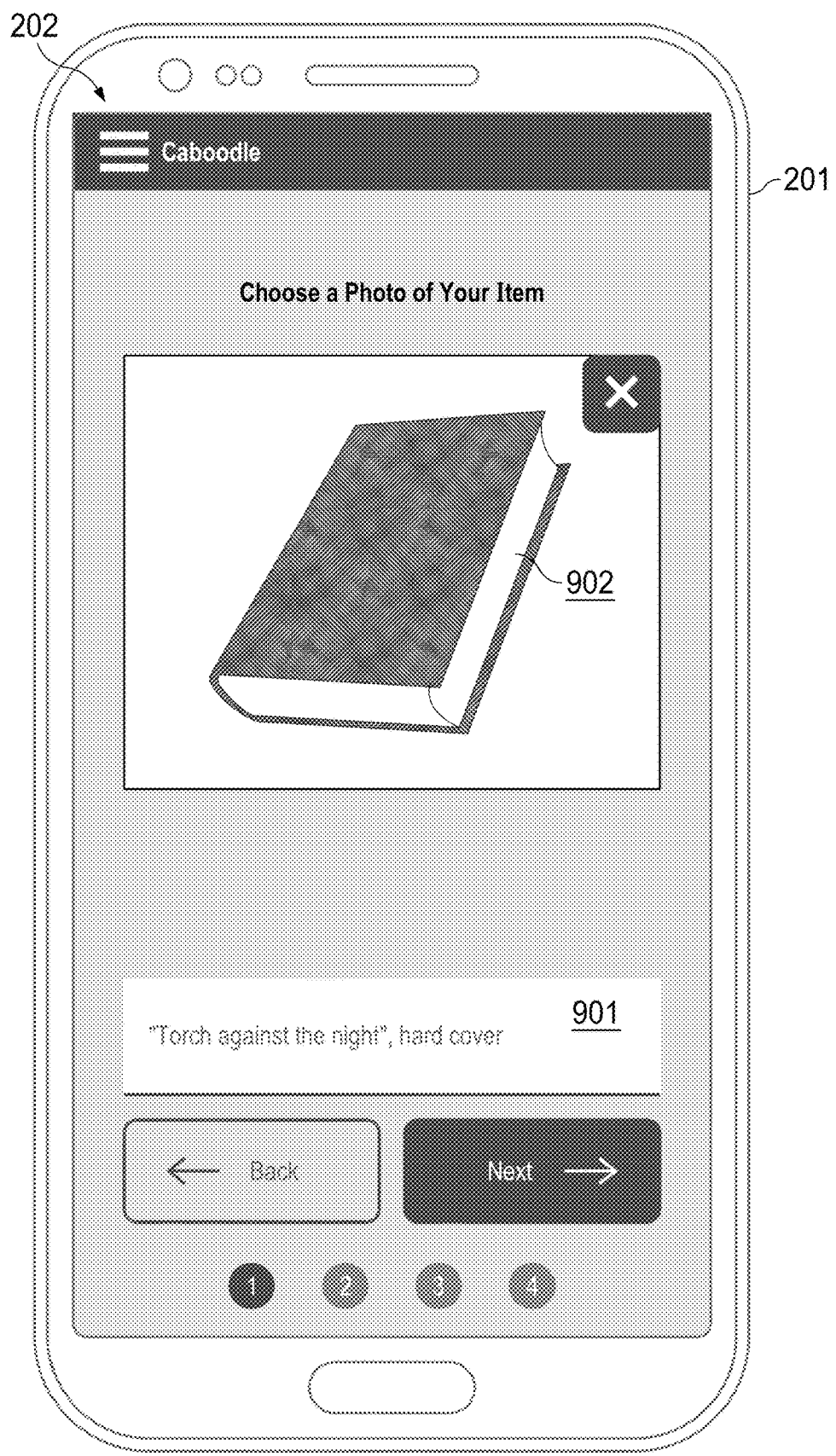
FIG. 9 shows a screenshot of an aspect of an embodiment.

At 309, a user may type the title of her give-item as illustrated in the screen shot of FIG. 9. For example, as illustrated in FIG. 9, a user may enter information pertaining to a give-item into a user interface 901. In this example, a user has uploaded an image of her give-item, a book 902, and has entered information pertaining to the book 902 into interface 901, as text "Touch against the night," hard cover, as a description of book 902.

Figure 10:
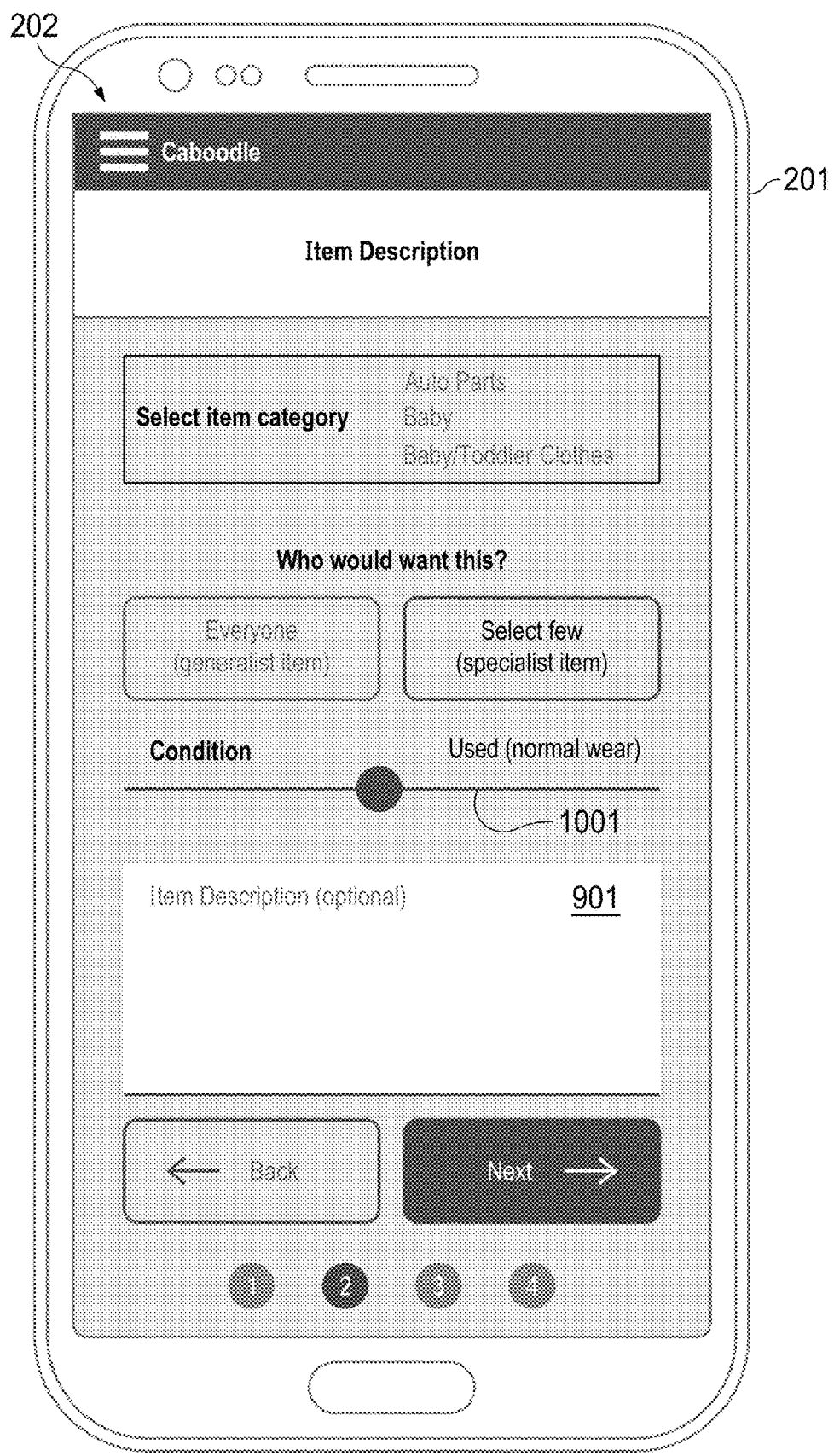
FIG. 10 shows a screenshot of an aspect of an embodiment.

At 302, the user describes elements of her give-item as illustrated in the screen shot of FIGS. 1A-1B. In some implementations, elements of a give-item may include attributes of the give-item such as a category, description, condition, whether the give-item is a specialist item or a give-item with broad general appeal, and the like. These selections may determine which users will see her give-item in their selection queues. In other implementations a condition widget such as a slider 1001, as illustrated in screen shot of FIG. 10, may be used to give the user the ability to quickly enter a condition of the give-item.

Figure 11:
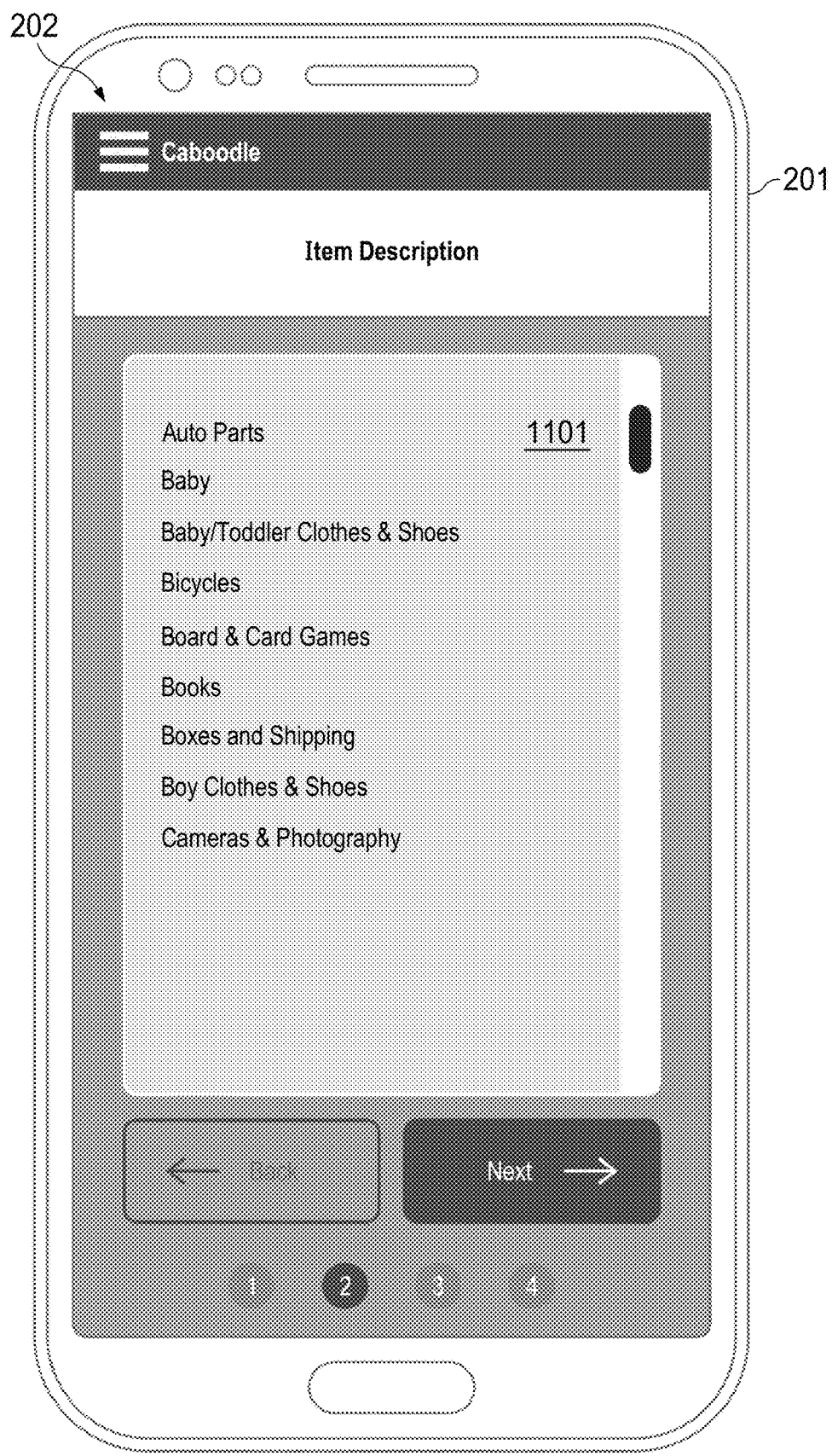
FIG. 11 shows a screenshot of an aspect of an embodiment.
Figure 12:
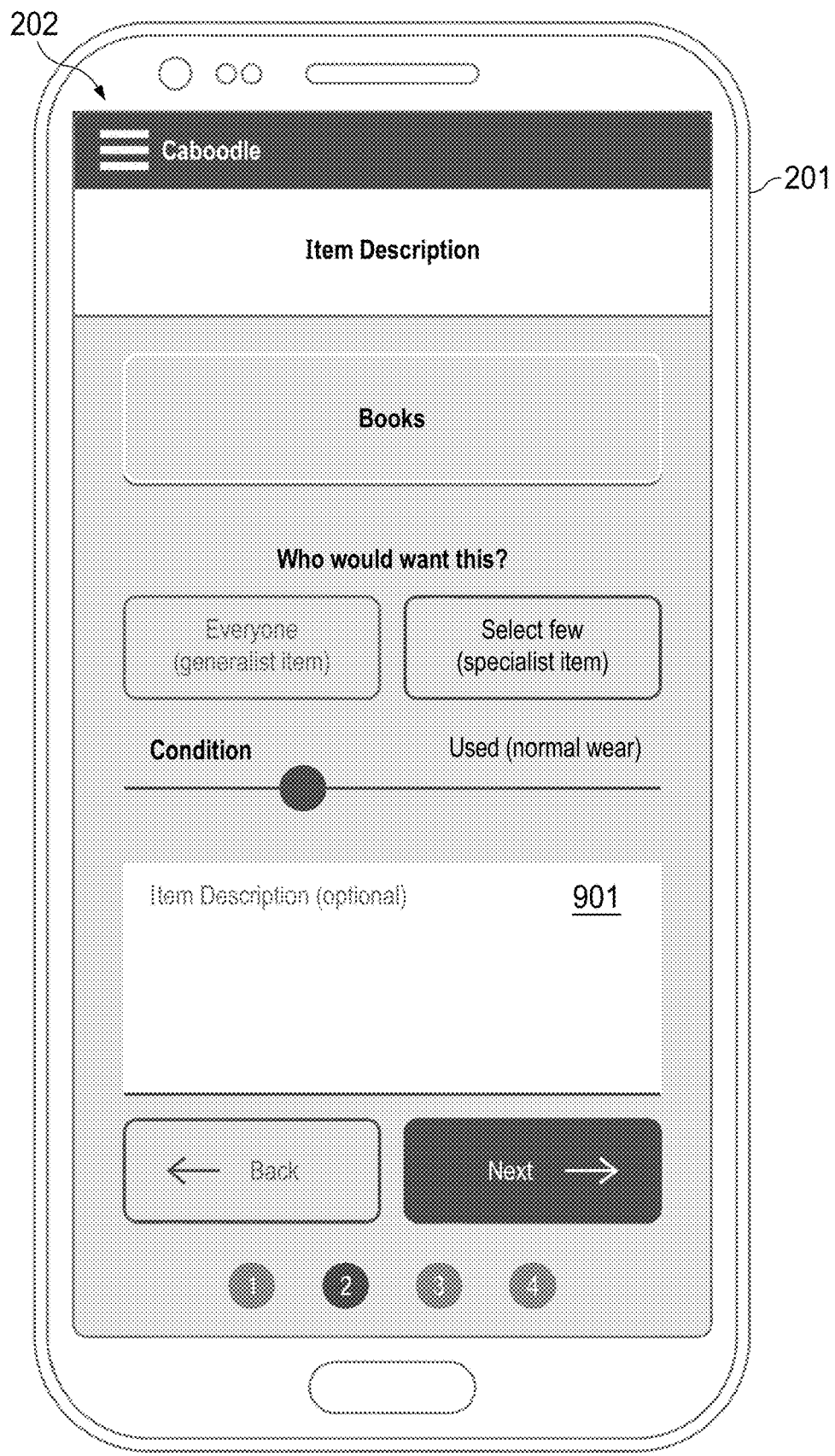
FIG. 12 shows a screenshot of an aspect of an embodiment.

At 311, the user may choose an item category from a menu, such as illustrated in the screen shot of FIG. 11. For example, as illustrated in FIG. 11, a scrolling menu 1101 may be used to allow a user to select categories to attach to the give-item.

At 312, the user may give a description of her give-item. For example, as illustrated in the screen shot of FIG. 312, a user may enter a description of the get-item using, for example, user interface 901. In some implementations, such description entered may be shown when a "getter" taps, for example, "more info" on the picture for that give-item, when viewed in the getter's selection queue.

Figure 13:
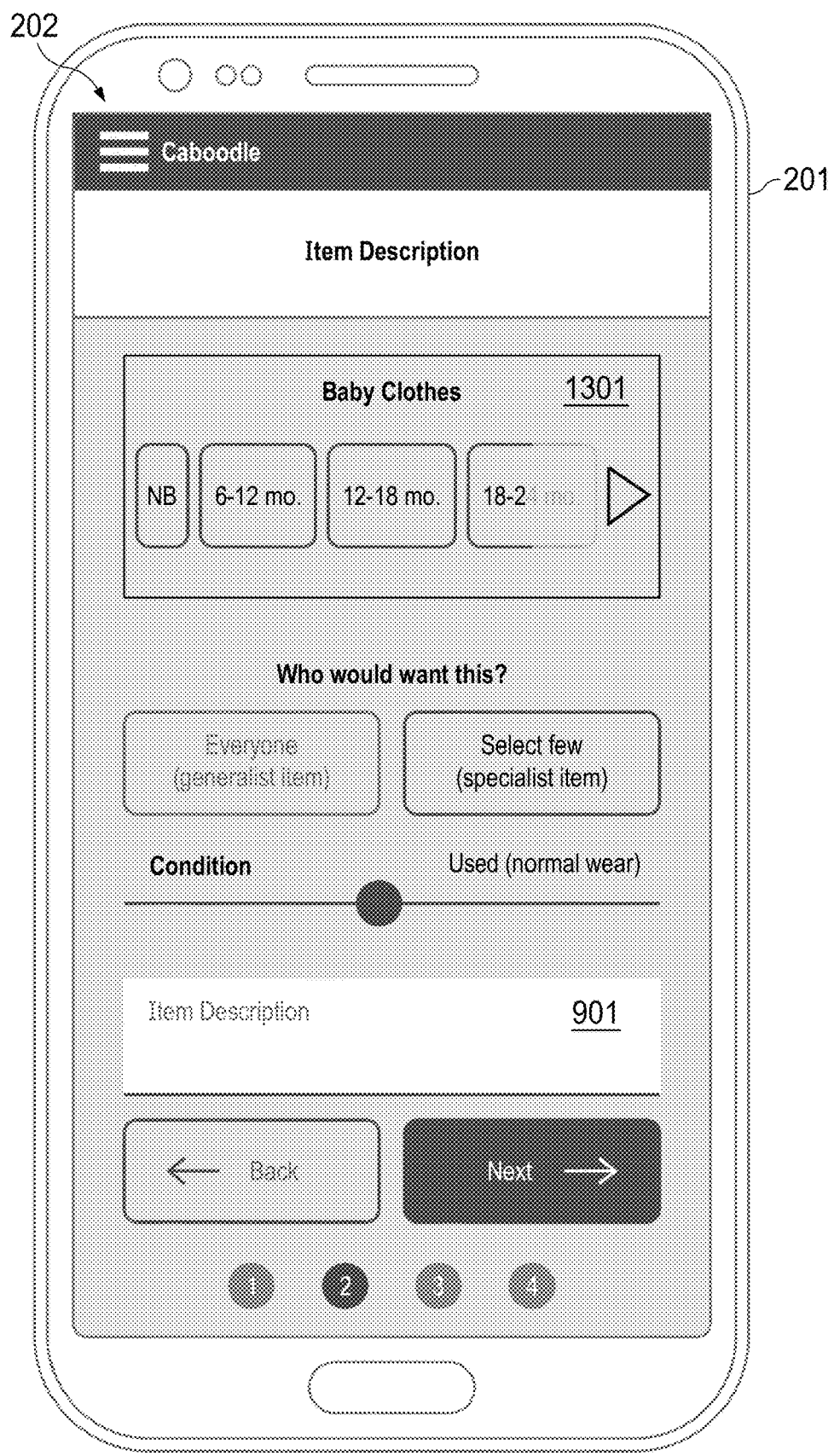
FIG. 13 shows a screenshot of an aspect of an embodiment.

At 314, if a clothing category is selected for the give-item, the giver may specify the size of the clothing as illustrated in the screen shot of FIG. 13, using for example a clothing size interface 1301. These sizes may be matched with a user's preferences and help determine which clothing items are placed in the user's get-item selection queue.

Figure 14:
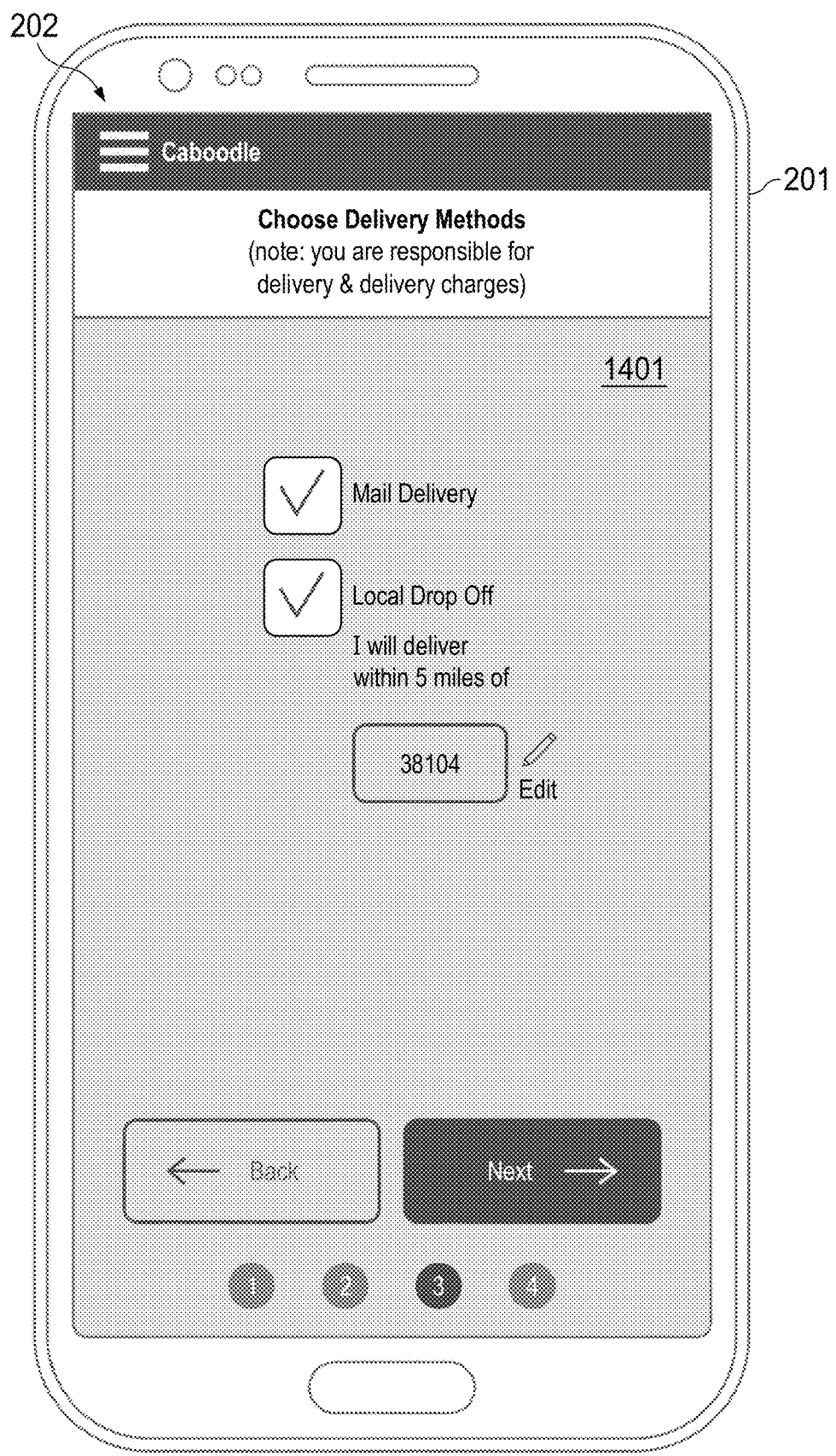
FIG. 14 shows a screenshot of an aspect of an embodiment.

At 313, the user may choose whether the give-item is available for local delivery only, mail delivery only, or either as illustrated in the screen shot of FIG. 14. The giver may be responsible for delivery of the give-item. If the user chooses local drop off or either, she may confirm a zip code, or other delivery information. For example, a delivery interface 1401 may be used to allow the user to select delivery methods such as "mail delivery," "local drop off," and the like.

Figure 15:
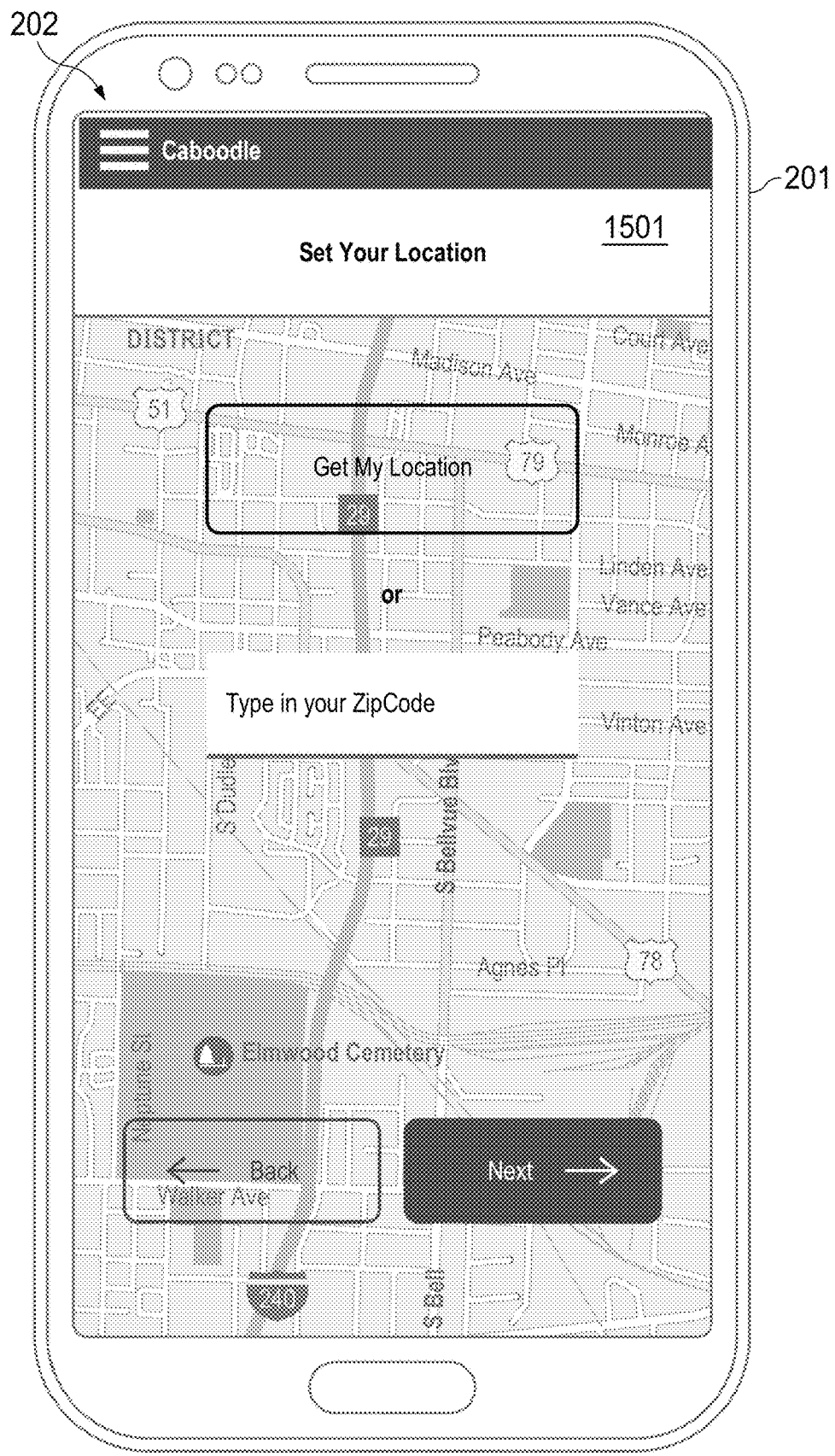
FIG. 15 shows a screenshot of an aspect of an embodiment.

At step 315, an initial delivery code, such as a zip code or other location information, may be populated based on, for example, a free item mailing address illustrated in the screen shot of FIG. 15. If the user wants to change the giving location, she can change it here, for example, using a change location interface 1501.

Figure 16:
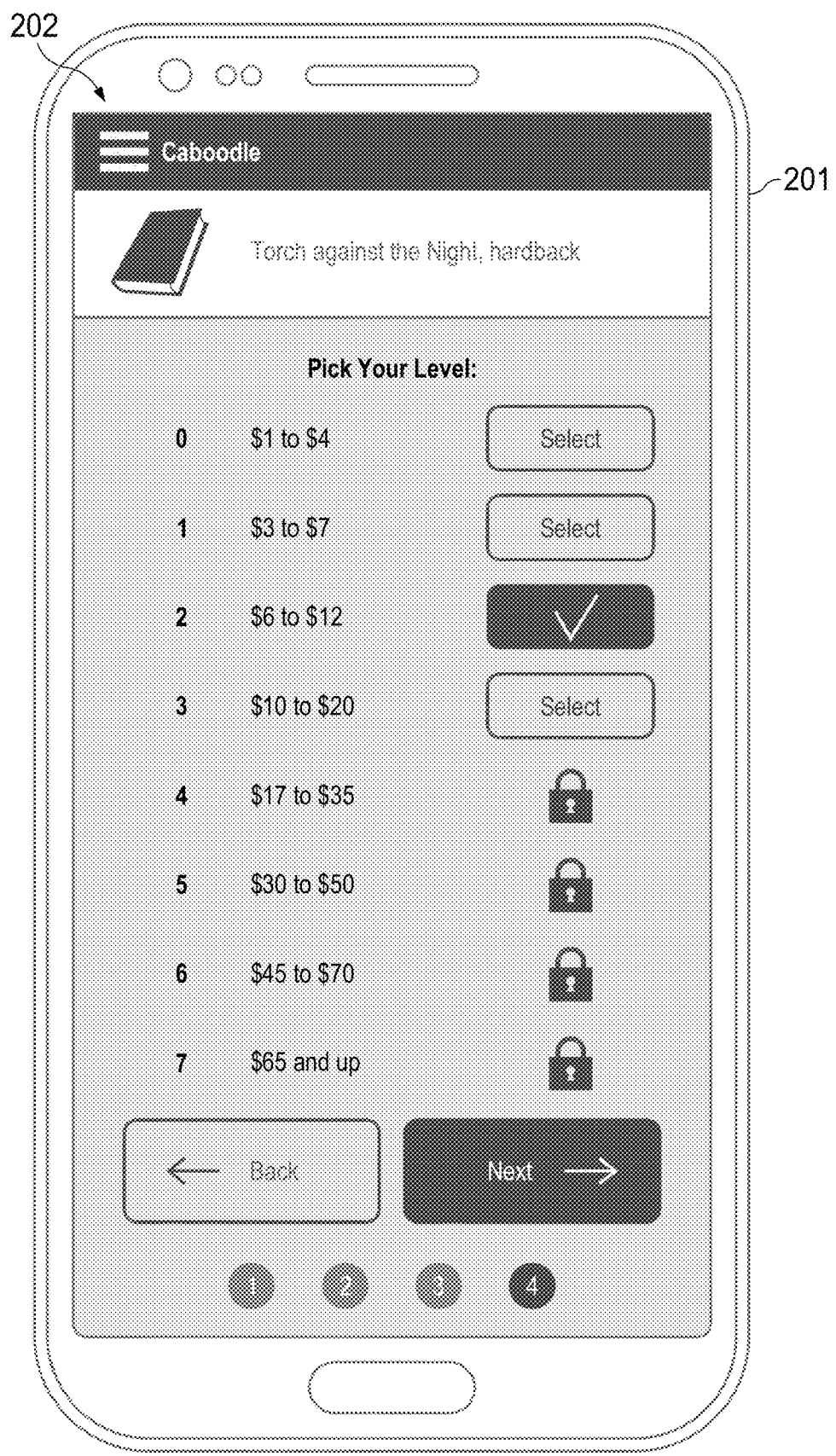
FIG. 16 shows a screenshot of an aspect of an embodiment.

At 316, the user may pick the level at which she wants to list the give-item as illustrated in the screen shot of FIG. 16. As a way of managing reputation and reducing fraud, the system may restrict which users can trade at which levels. Users may earn the ability to trade at higher levels by, for example, successfully trading at lower levels. New users or users who have previously traded a number of items unsuccessfully may be prohibited from trading at higher levels. In some implementations, the system may manage this through the creation and implementation of a virtual currency (e.g., "bloons" or "'bloons'"): digital money, issued and controlled by the system managers, and used and accepted among the users of the invention. According to some rule sets, the user might be required to have a sufficient virtual currency balance in their account to give an item at a high level. If she does not have enough currency, she may receive an error message at 318 or 319 depending on whether the user has enough currency to trade at even the lowest level or not. In an implementation, the user who does not have enough virtual currency may give other currency, such as US dollars, and the like, as her give-item.

At 316, the user picks the level at which she wants to list the give-item from the unlocked trading levels available to her as illustrated, for example, in the screen shot of FIG. 16. This may be the level at which the same item is seen as a potential get-item by another user. In some implementations, there are seven levels that correspond to overlapping value ranges. In some embodiments, the user may start out with low value levels unlocked and available for trading. In one implementation, by successful completion of trades, she can unlock higher levels for trading.

In some implementations, a user may incur a listing cost of her in-app currency to list a give-item. When the give-item is selected, she may earn her in-app currency back plus a bonus depending on how fast her give-item was selected by other users. This process trains and encourages the user to provide high-quality, appropriate give-items at each level. The listing cost for a give-item may depend on the level that the give-item is placed at and, depending upon the non-success of prior trades, she may not have enough in-app currency to list at all levels. In some implementations, at 317 if the user indicates that the give-item has a low value, the system may ask if the user would prefer to get powerups instead of a trade credit 317.

Figure 17:
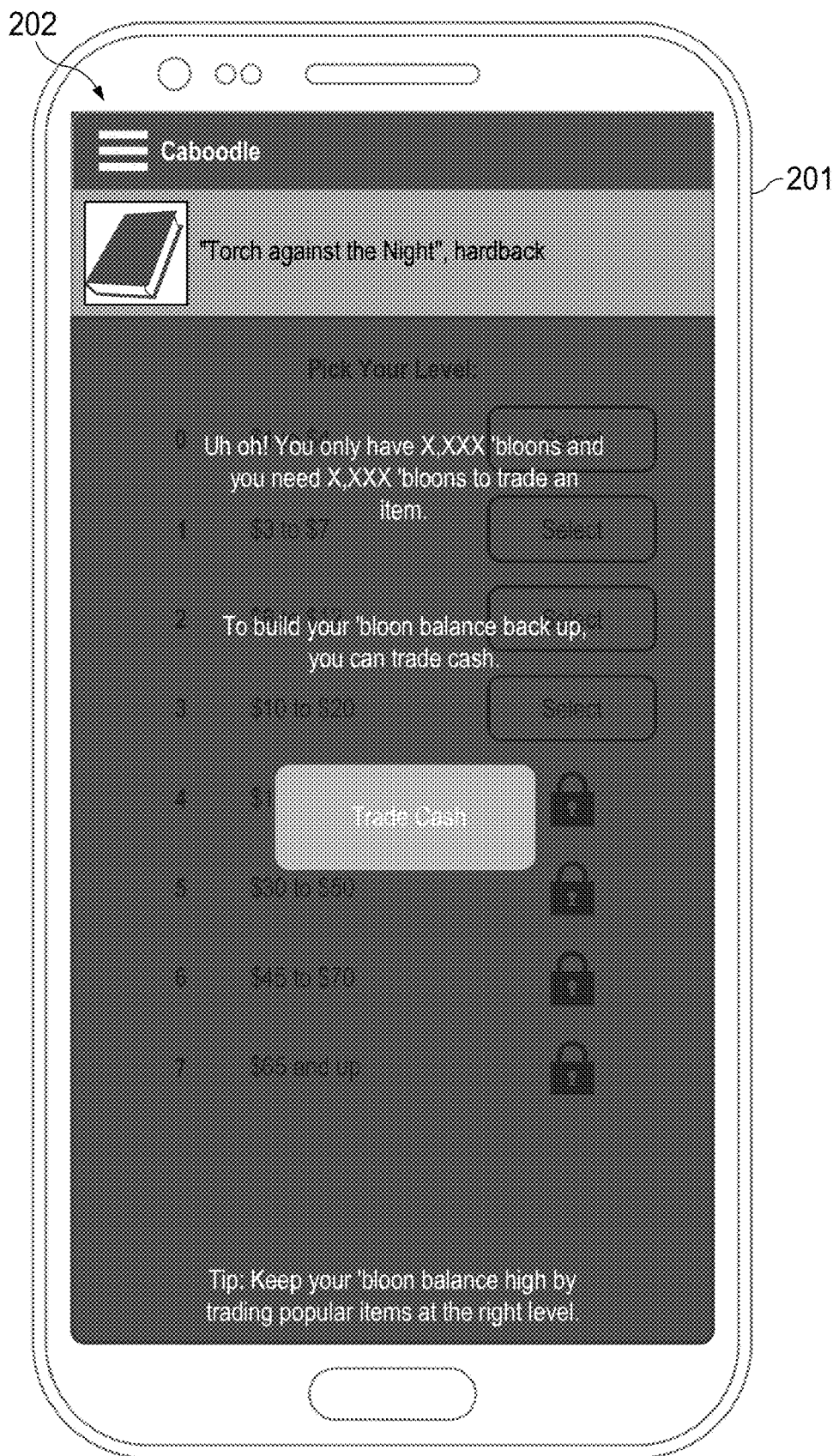
FIG. 17 shows a screenshot of an aspect of an embodiment.

At 318, the system may check that the user has enough in-app currency to post an item on any level as illustrated a screen shot of FIG. 17. If she doesn't, she may get an error. For example, the user may be given a message stating "that you only have "X" Bloons and you need "Y" Bloons," that she doesn't have enough in-app currency to trade another item until her give-items are chosen. Alternatively, she can pay cash to earn a trade credit, as described herein.

Figure 18:
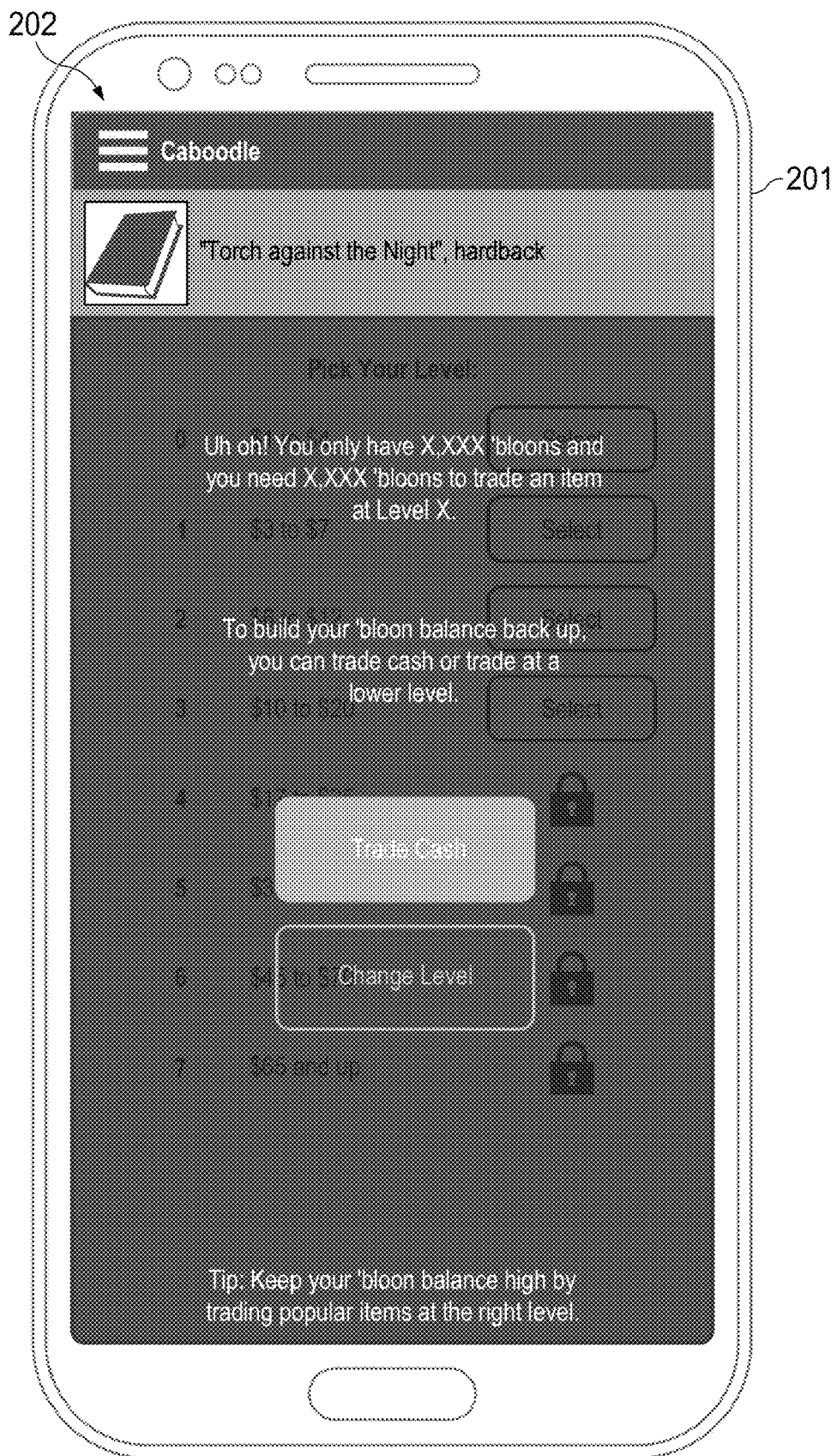
FIG. 18 shows a screenshot of an aspect of an embodiment.

At 319, the system checks that the user has enough in-app currency to post give-item on this level illustrates in the screen shot of FIG. 18. In some implementations, if she taps a grayed-out button, she may get a warning. The user may be told that she doesn't have enough in-app currency to trade another give-item until her give-items are chosen. Alternatively, she can trade cash to earn a trade credit, as described herein.

Figure 19:
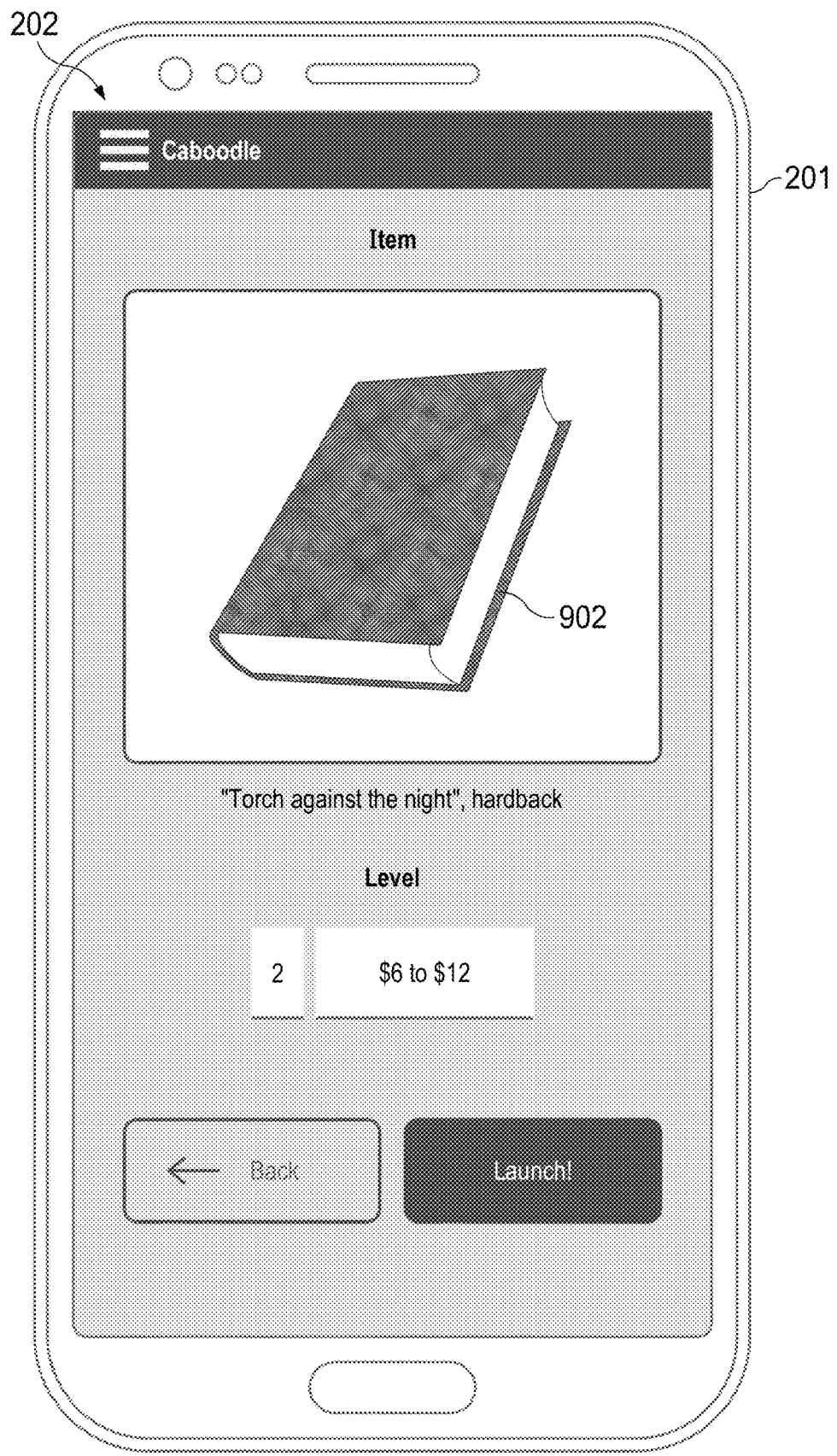
FIG. 19 shows a screenshot of an aspect of an embodiment.
Figure 20:
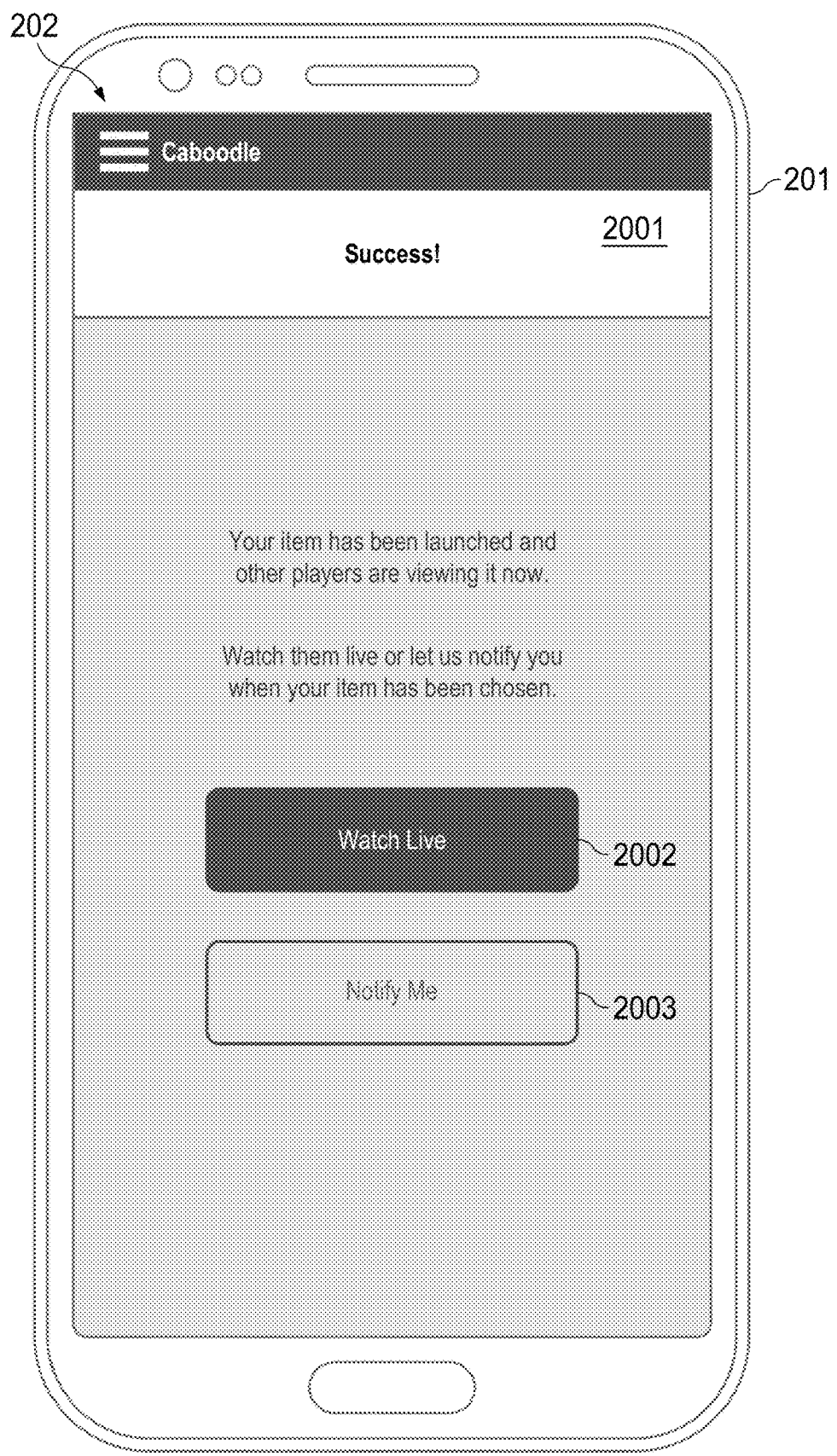
FIG. 20 shows a screenshot of an aspect of an embodiment.

At 320, successful introduction of a give-item into the pool of give-items from which get-item selection queues are created may result in a confirmation prompt for the user as illustrated in the screen shot of FIG. 19. For example, as illustrated, book 902 is shown at level "2" having a value of $6 to $12. In some implementations, as illustrated in FIG. 20, a selection interface 2001 may be configured to, for example, have the user watch live the trading of the give-item, receive notifications, etc. For example, at 321, the system may confirm that the give-item has launched, and the user may select how she will receive notifications using notify interface 2003. At 322, the system may send a notification to the giver's device e.g., smartphone, when the give-item has been chosen by another user or fails to be chosen as illustrated, for example, in the screenshot of FIG. 21. At 2201 the user may choose to watch her give-item be viewed by other players on the trading floor using, for example, by initiating watch-live interface using interface 2002.

Monitoring Give-Items

In implementations, the system credits the giver's account with virtual currency (e.g., Bloons, bitcoin, etc.) in proportion to the speed at which her give-item is selected. Faster selection results in greater earning of virtual currency. This process generally incentivizes givers to increase the quality of their give-items. The virtual currency additionally serves as reputation management for the system as each user begins with only low level access (give- and get-items under $5 in value) and generally should successfully trade items to unlock higher value levels.

As illustrated by the flowchart in FIG. 22, the giver can monitor the selection status of her give-item. At step 2201, the user has launched her give-item, which becomes a potential get-item for other users as illustrated by screen shot of FIG. 23. There may be a fixed or variable number of times where potential getters can view her give-item in their get-item selection queues before her give-item is removed from the get-items on offer to the potential getters. As other potential getters view and reject her give-item, the in-app currency bonus associated with her give-item decrements and the item slot fills with the choice of get-item that each rejecting viewer selected instead of her give-item.

Figure 23:
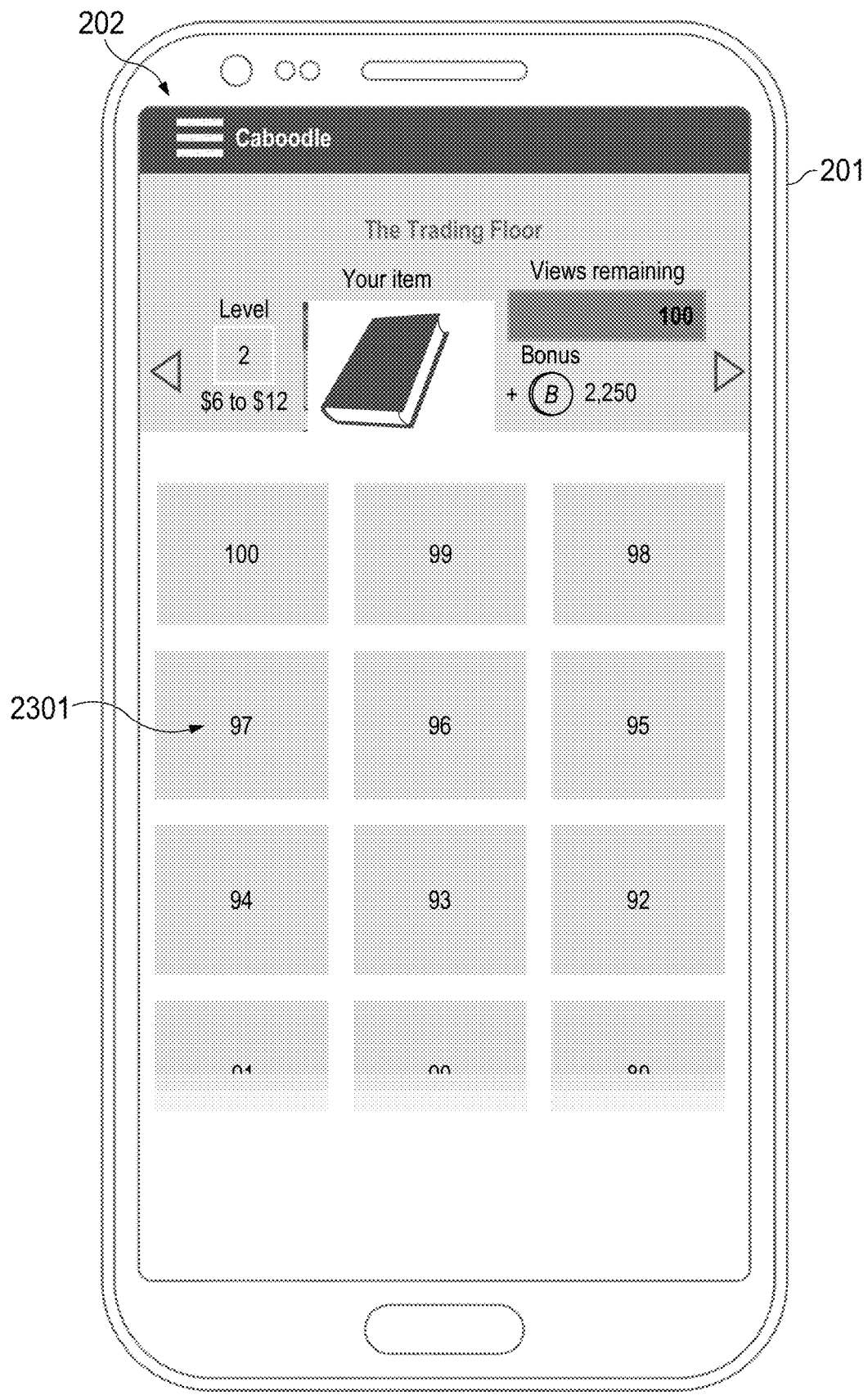
FIG. 23 shows a screenshot of an aspect of an embodiment.
Figure 24:
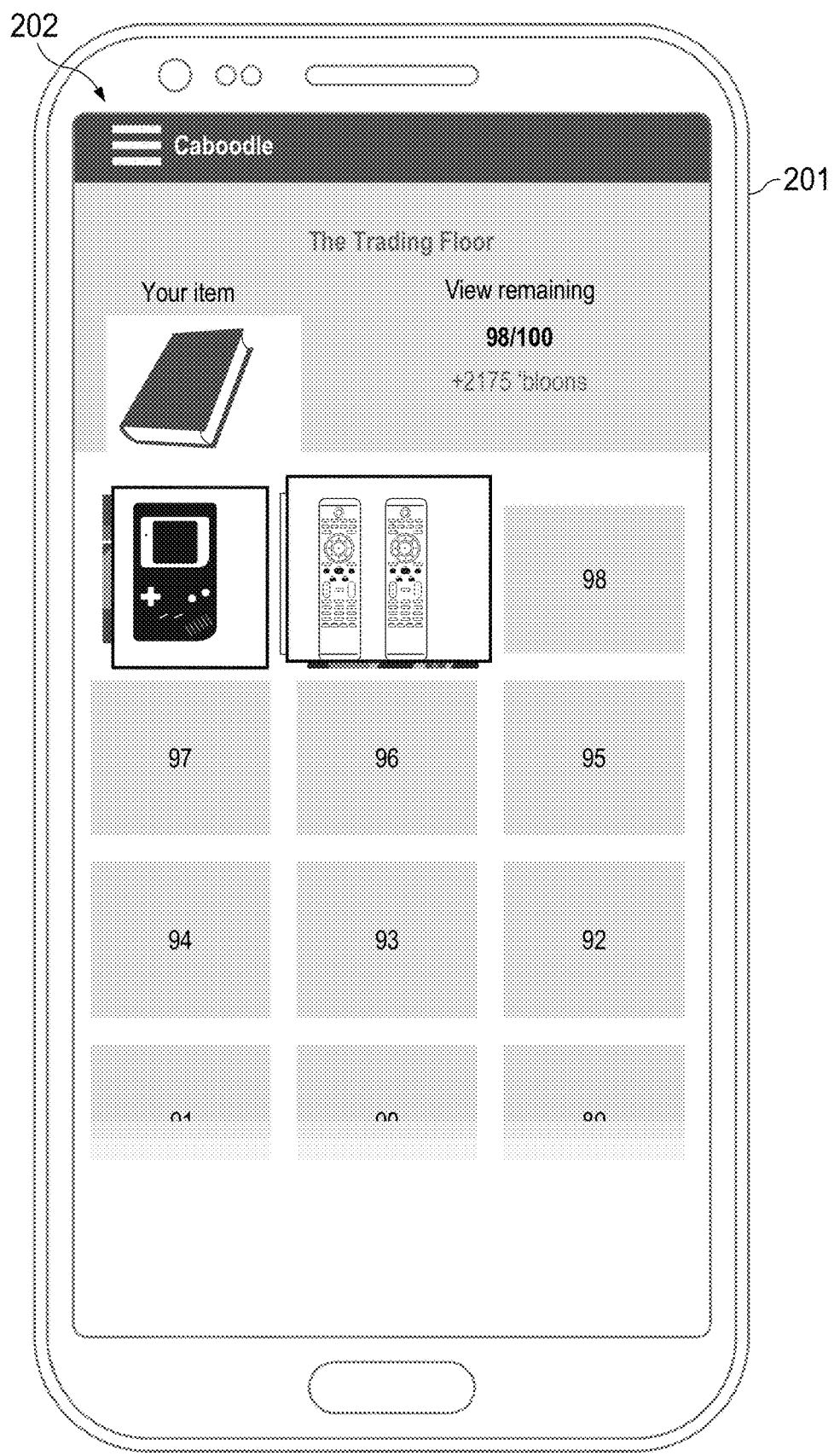
FIG. 24 shows a screenshot of an aspect of an embodiment.
Figure 25:
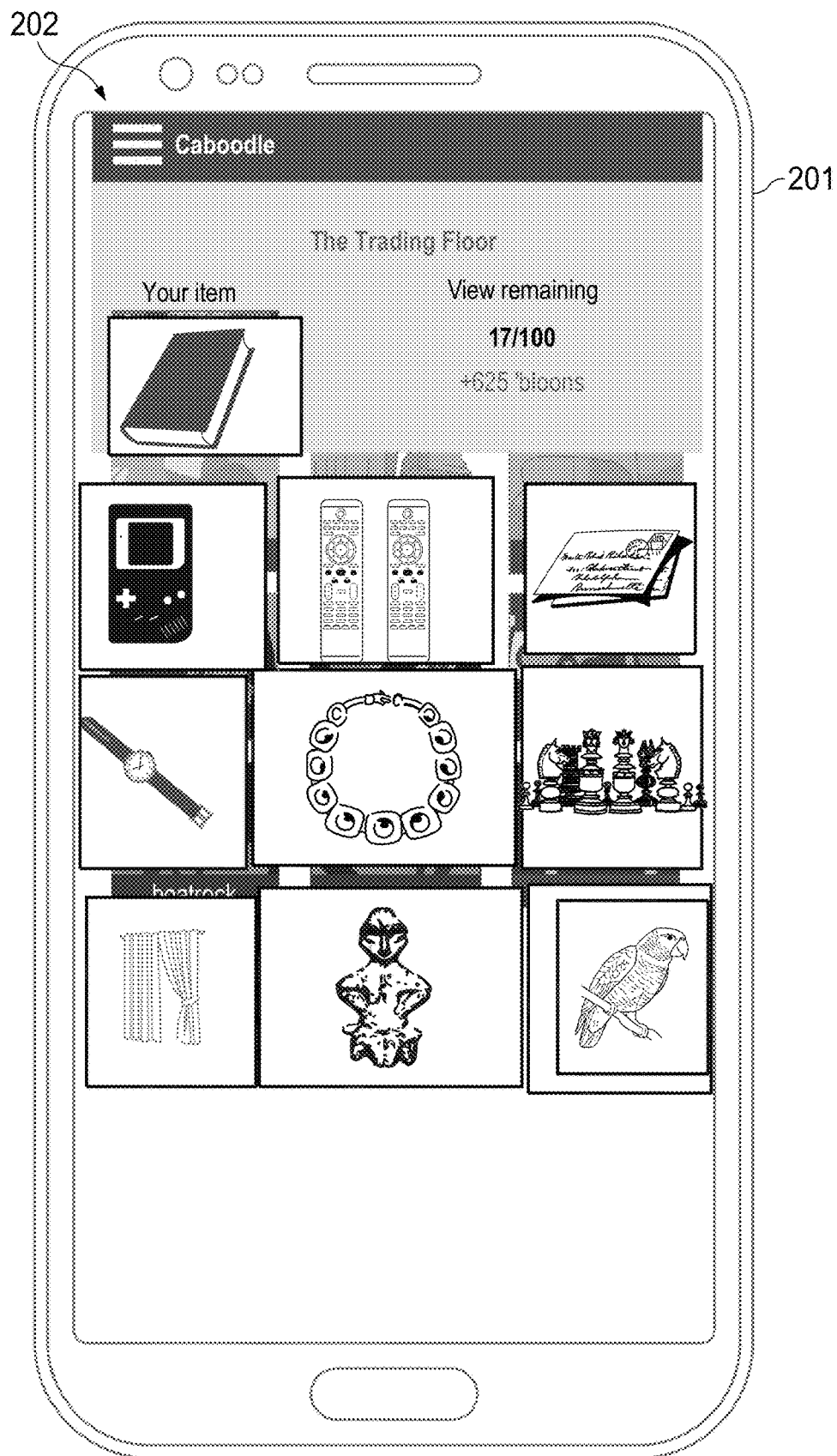
FIG. 25 shows a screenshot of an aspect of an embodiment.

At 2202, the point at which two views and rejections of the user's give-item have been made as illustrated in the screen shot of FIG. 24. Referring to FIG. 23, at 2203, the giver watches her give-item being rejected by a succession of item viewers as illustrated in the screen shot of FIG. 25. Either the give-item is selected by a getter or the give-item reaches the maximum number of getter views and is removed from the getters' selection queues. In some implementations a give-item can be viewed and rejected by potential getters before the give-item is removed from the pool of get-items. The giver sees her give-item, the numerical count of the number of times her give-item has been rejected, the in-app currency bonus she will get for the give-item if a getter chooses her give-item at any given point, the number of remaining views before her give-item is removed from the getters' selection queues, a running list of get-items (other people's or the system's give-items) that were selected by the getters instead of the giver's give-item, the user names of the getters who rejected her give-item along with the get-item she picked, more info about those preferred get-items.

Figure 26:
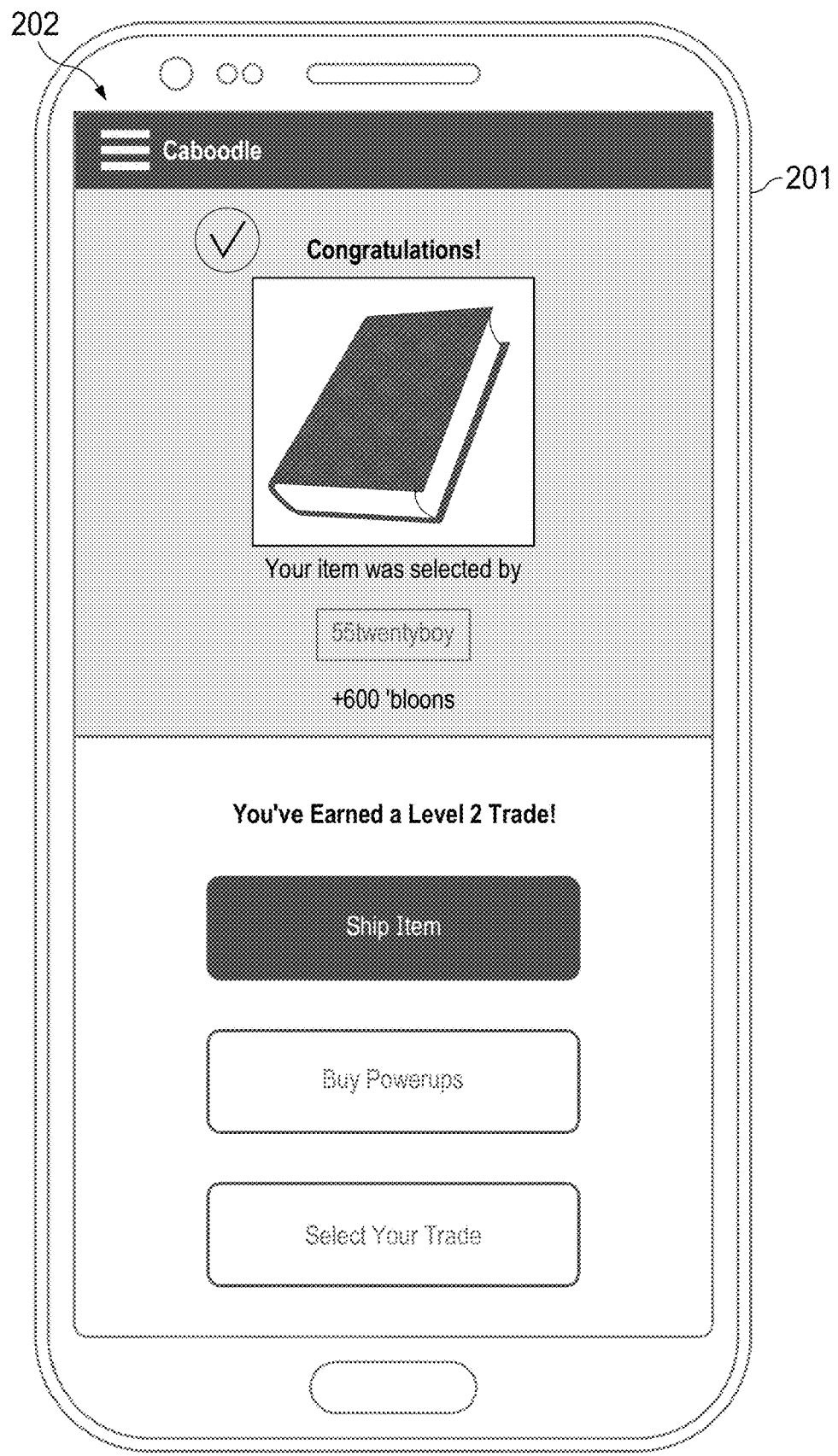
FIG. 26 shows a screenshot of an aspect of an embodiment.

At 2204, the user can look at more information about the get-items that was chosen by a viewer instead of her give-item that was rejected by that viewer. At 2205, the user gets confirmation that her give-item has been selected by a getter as illustrated by the screen shot of FIG. 26. This process entitles the user to now get a get-item valued at that level, or within a range of the get-item value. Referring to FIG. 35, at 3501, she may now proceed to selecting that get-item, may buy powerups at 5006, or can view the shipping information for the give-item she gave to the getter at 2803.

Figure 27:
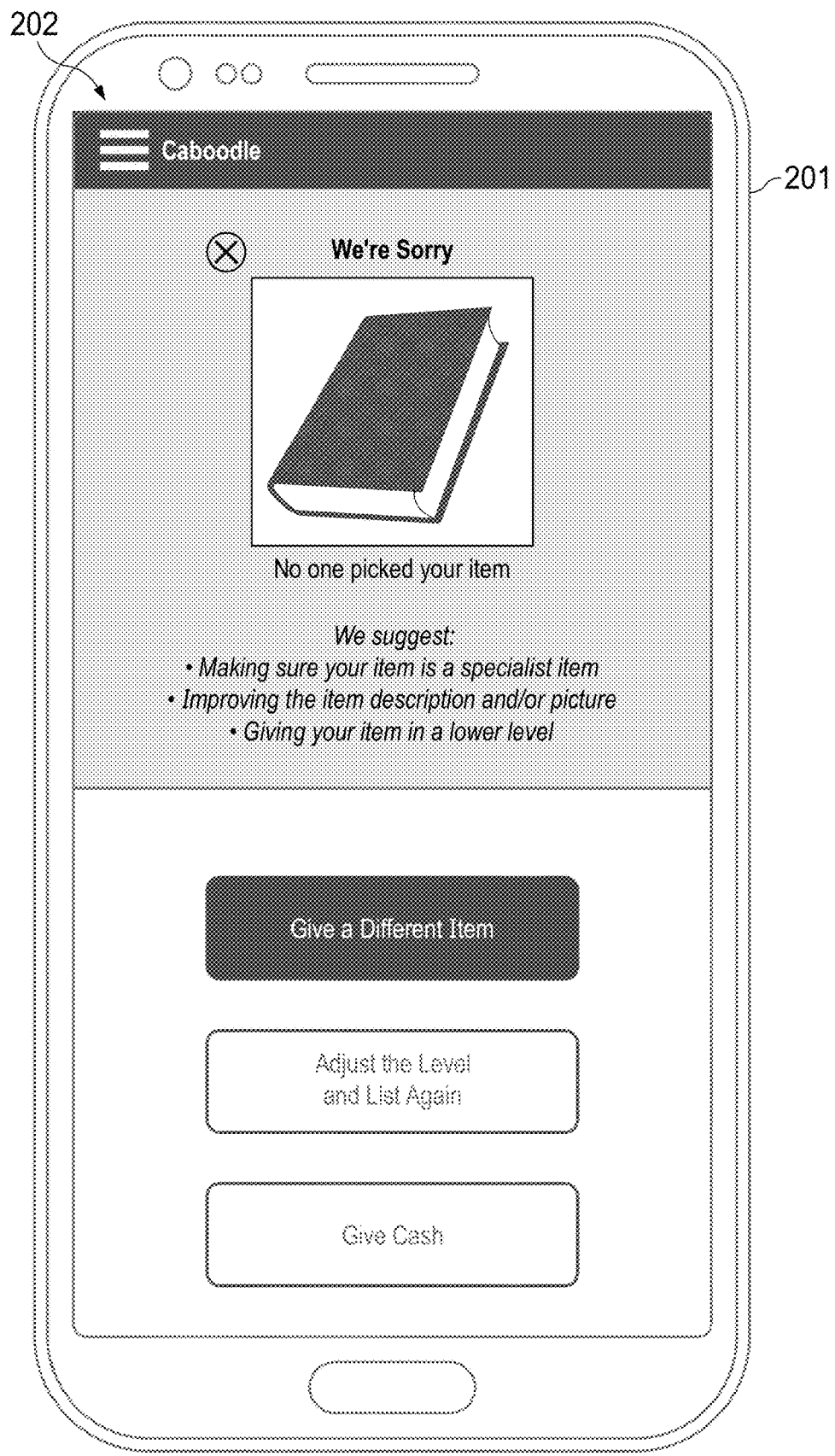
FIG. 27 shows a screenshot of an aspect of an embodiment.

At 2206, after a plurality of views, the give-item may not have been picked as illustrated by the screen shot of FIG. 27 with, for example, a "We're sorry" message. At this juncture, the user has various options: for example, the user may at 301 give a different give-item, at 316, give the same give-item in a lower level, give cash at 302, etc. Multiple failures to successfully give a give-item will deplete the user's in-app currency and she may not be able to give-items at higher levels. This may be feedback indicating that she is listing inferior, undesired get-items on that level.

Delivering Give-Items and Receiving Get-Items

As illustrated by the flowchart in FIG. 28, the user can access information about the give-items she has to deliver and the get-items she is expecting to receive. If the give-item was a physical item, the giver now has an obligation to deliver the give-item to the getter. If the give-item was money, the system automatically places the money in the getter's account.

Figure 29:
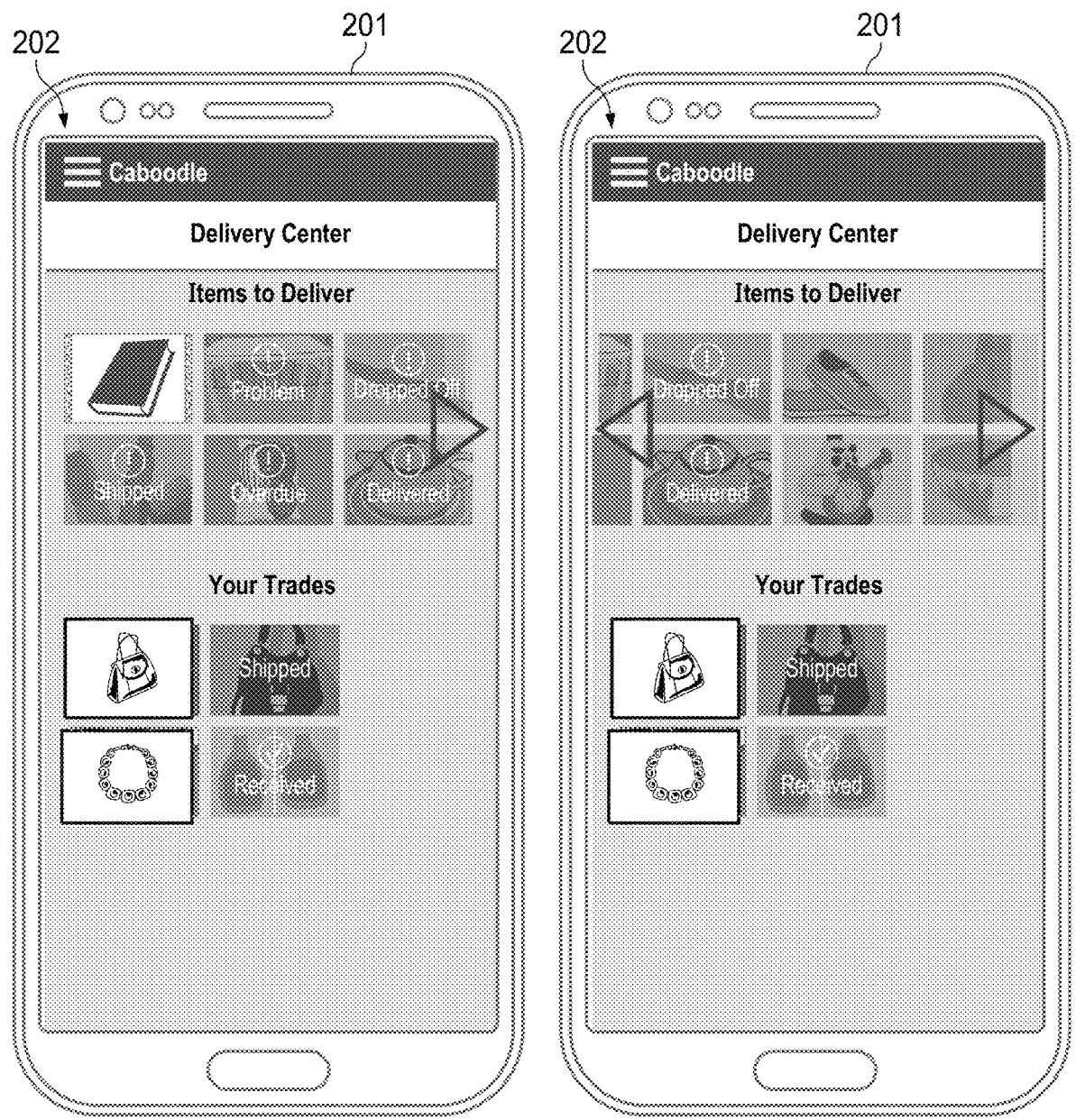
FIG. 29 shows a screenshot of an aspect of an embodiment.

At 2801, the user can see the give-item(s) she is obligated to deliver and the item status as illustrated in the screen shot of FIG. 29. She also can see the get-items she is expecting to be delivered to her from givers.

At 2803, to fulfill the delivery, the giver gets information on where to deliver the give-item. The give-item may be locally delivered or sent through another method such as a postal system. At 2804, if there is a problem for the giver to successfully deliver the give-item, she may report the problem. At 2805, the problem may be confirmed and sent to a third party such as the application administrator, and the getter for resolution.

Figure 30:
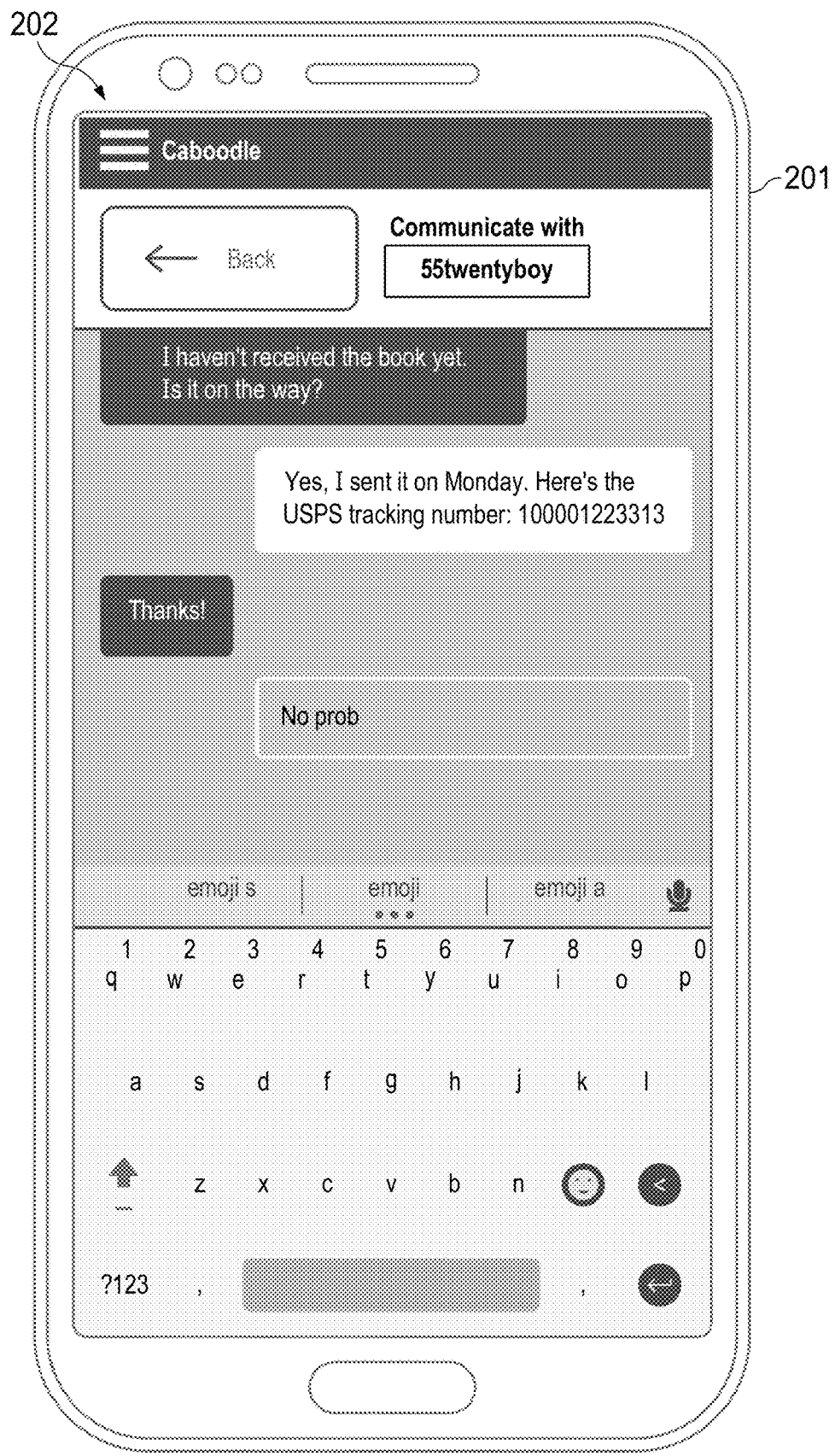
FIG. 30 shows a screenshot of an aspect of an embodiment.

At 2806, the user can message with the other party involved in her transactions to facilitate delivery as illustrated in the screen shot of FIG. 30. At 2808, the getter can get information about the delivery of a get-item. At 2808, the getter can also report a problem and at 2805, get confirmation. At 2807, when the transaction is completed with get-item delivery, the getter may mark this completion and both parties may then see that the transaction is complete.

Item Preferences

Figure 32:
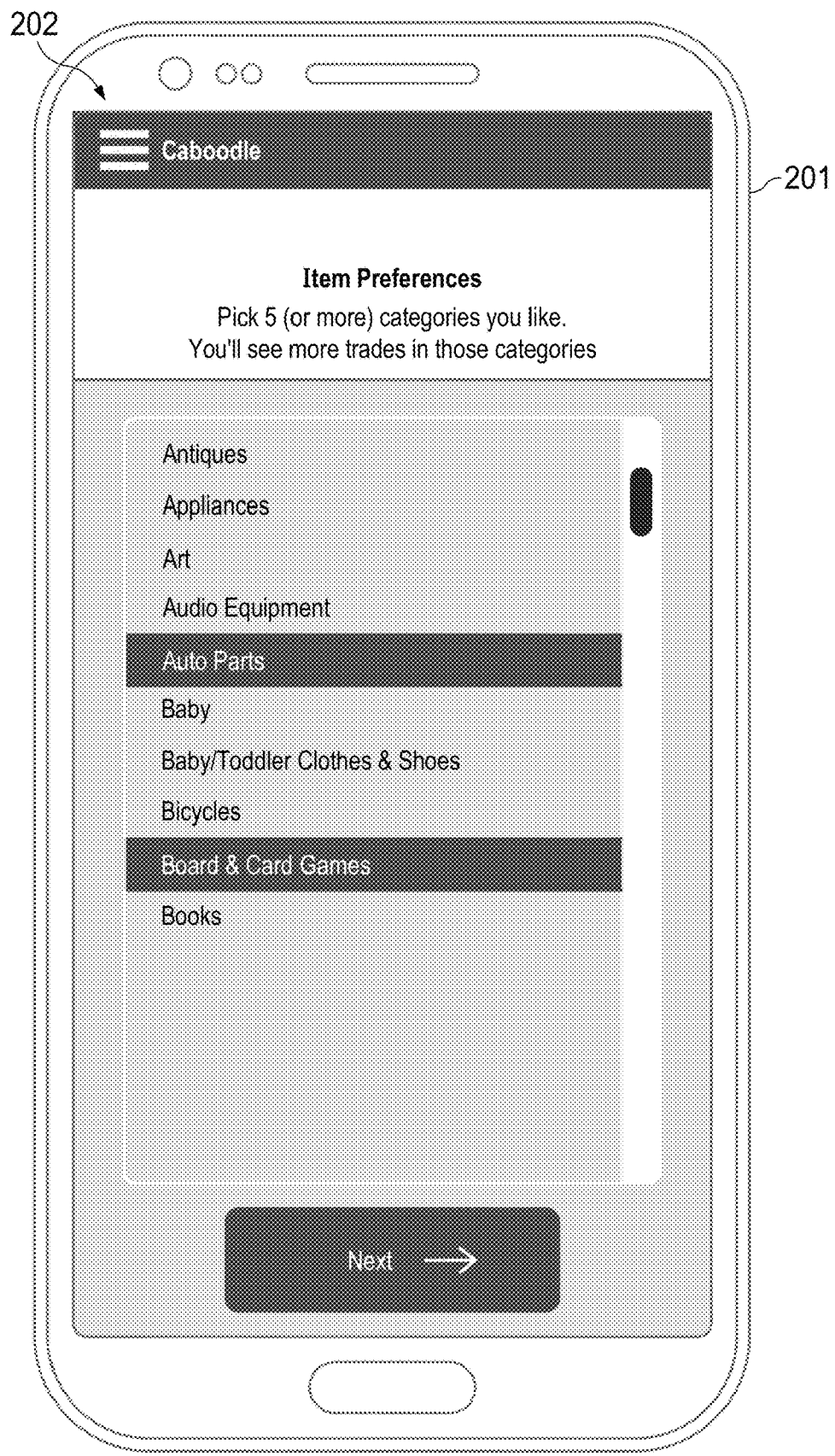
FIG. 32 shows a screenshot of an aspect of an embodiment.

As illustrated by the flowchart in FIG. 31, a user may indicate preferences for get-item categories. At 3101, FIG. 32 the user may choose five or more categories that she likes as illustrated in the screen shot of FIG. 32. The system may weight the get-items in her get-item selection queue toward these categories. The system may modify a profile of the user based on these stated preferences. In other implementations, a user profile may be adjusted according to the user's desirability information, determined from, for example, user feedback.

Figure 33:
FIG. 33 shows a screenshot of an aspect of an embodiment.

At 3102, the user may choose up to 10 categories that she doesn't like as illustrated in the screen shot of FIG. 33. The system may weight the get-items in her get-item selection queue away from these categories. The system may modify a profile of the user based on these stated non-preferences.

Figure 34:
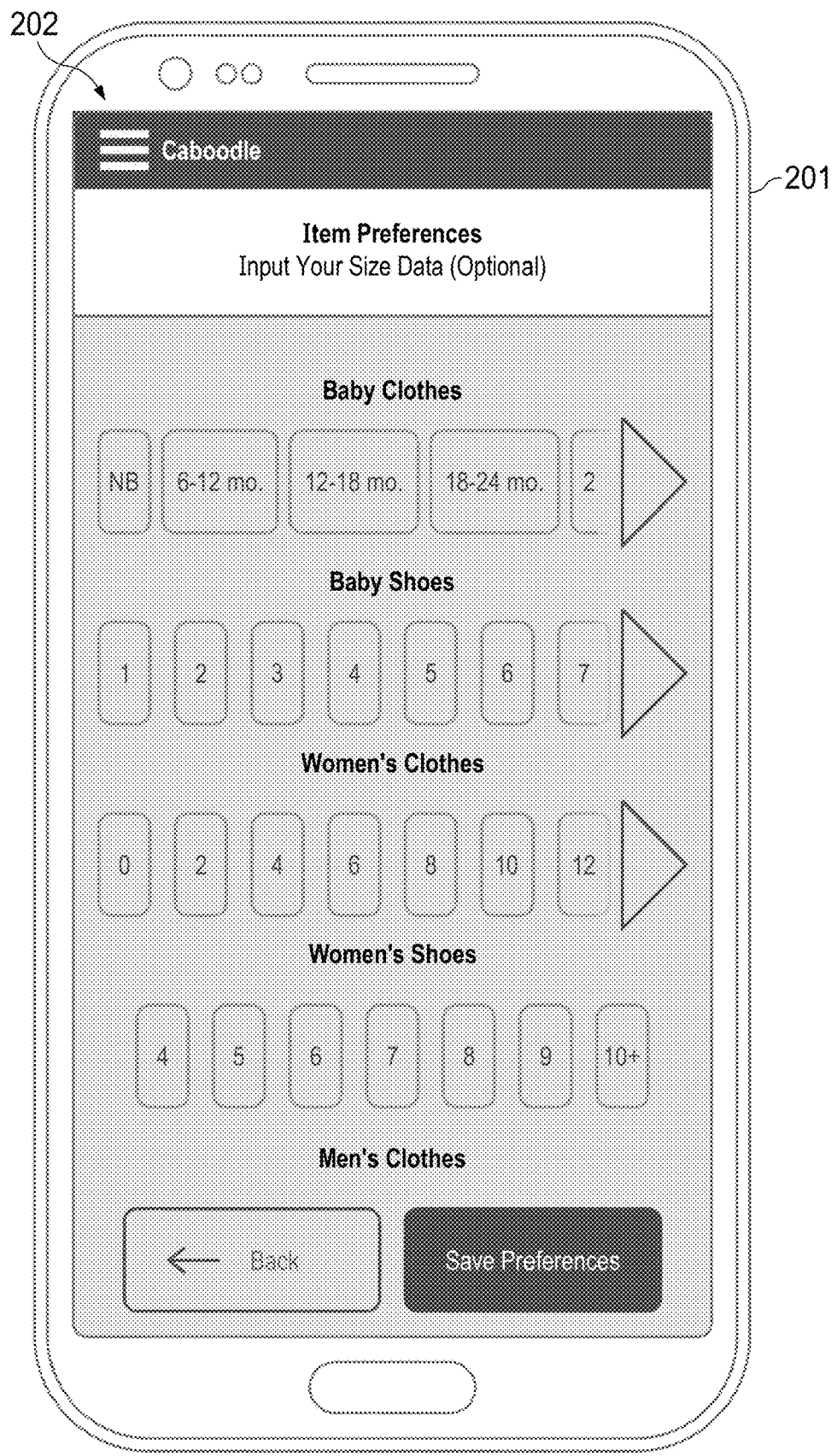
FIG. 34 shows a screenshot of an aspect of an embodiment.

At 3103, the user may choose to input sizes for clothing and shoe get-items as illustrated in the screen shot of FIG. 34. More than one size can be selected. The system may be configured to present clothing in the desired size to the user.

Get-Item Process

Figure 36:
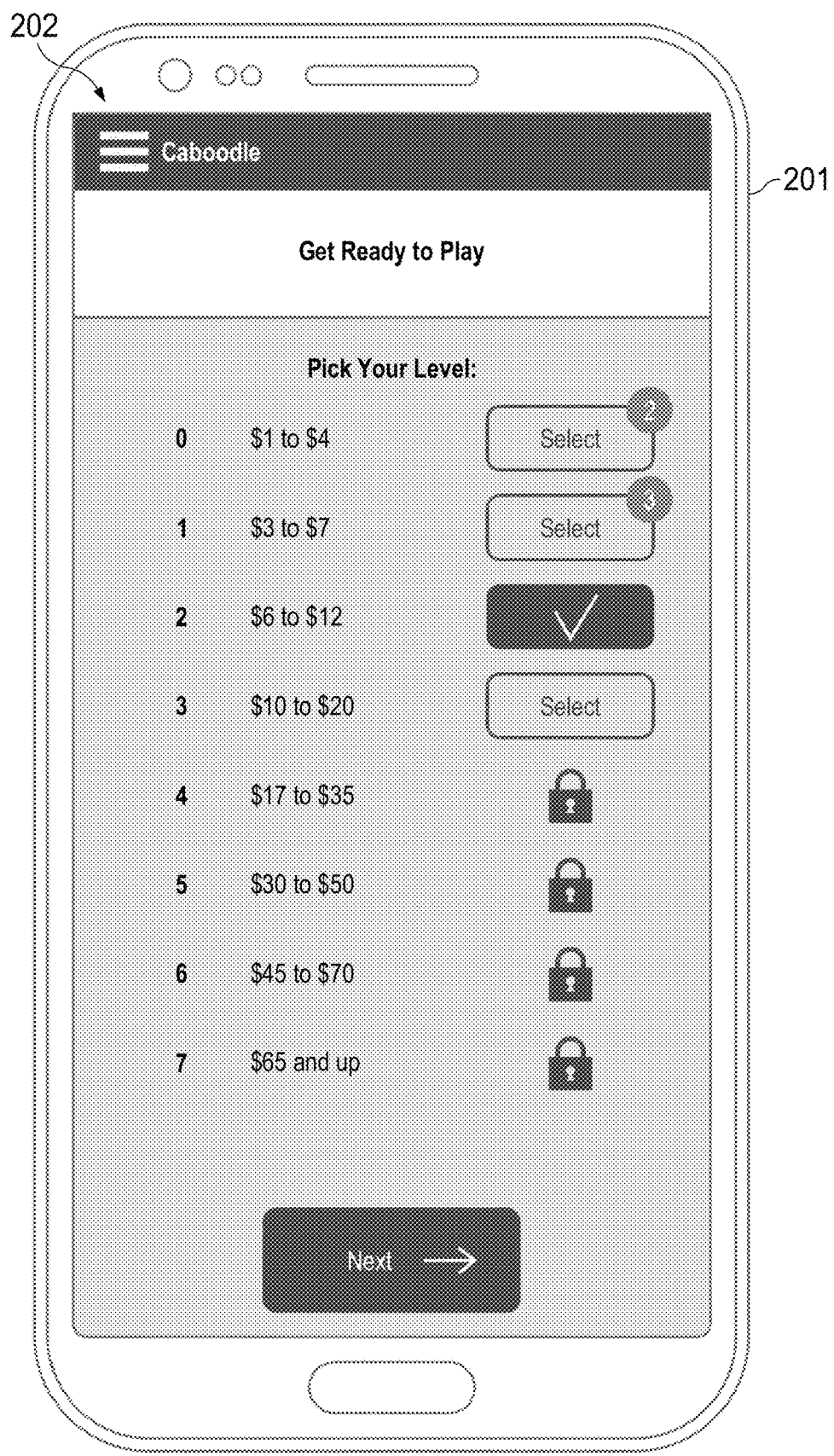
FIG. 36 shows a screenshot of an aspect of an embodiment.

As illustrated by the flowchart in FIG. 35, once a user has earned a trade credit at a particular level, she has the opportunity to select a get-item at that level. At 3501, the user sees her available trade credits and can select from which level she would like to receive her get-item as illustrated in the screen shot of FIG. 36. A user may have more than one trade credit at a given level.

Figure 37:
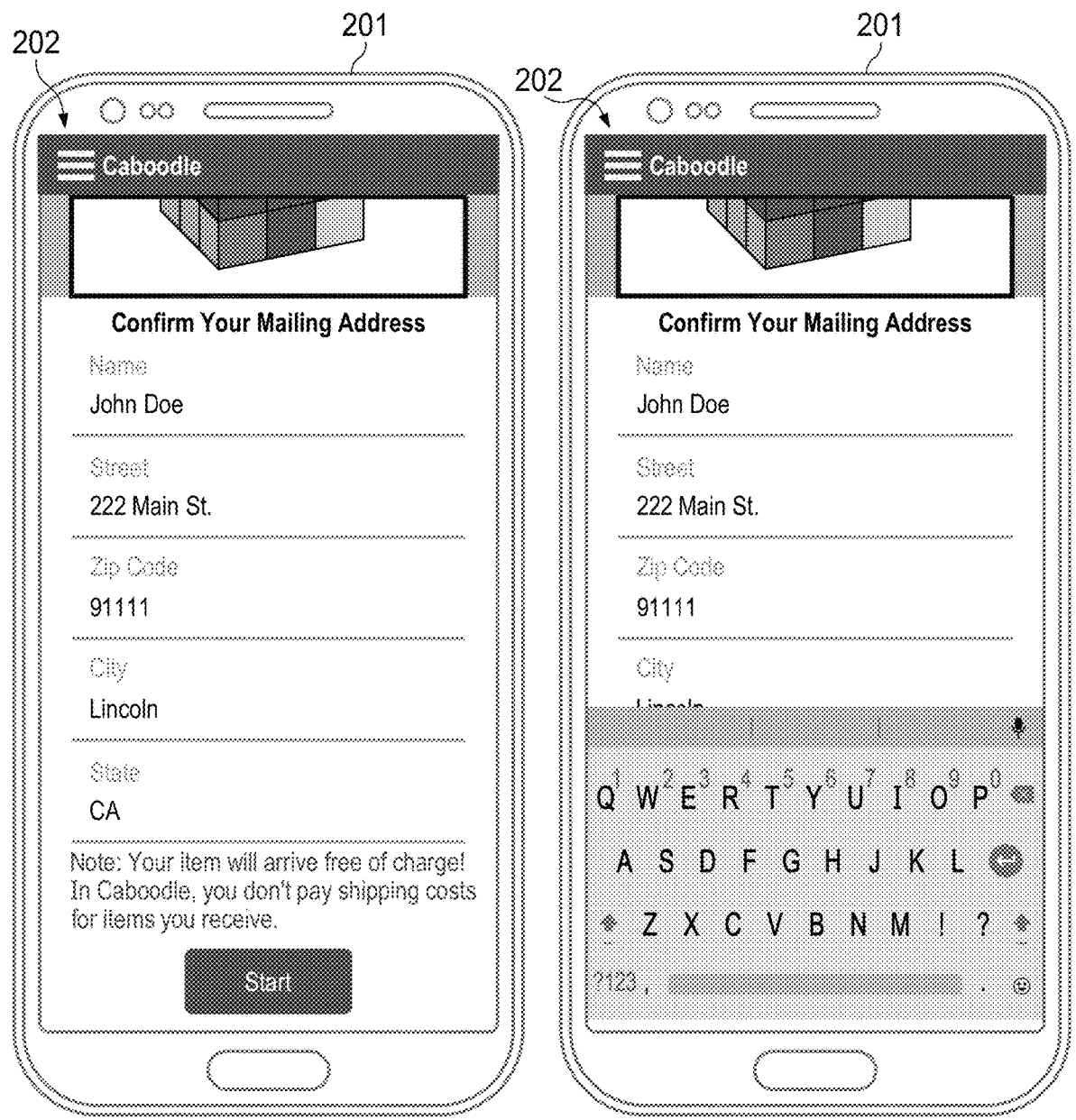
FIG. 37 shows a screenshot of an aspect of an embodiment.

At 3502, the user confirms her address. The cells may be pre-populated with data collected earlier by the system, but can be overwritten FIG. 37 as illustrated in the screen shot of FIG. 37. At 3503, once the address is confirmed, an animation prepares the user to select her get-item. In some implementations, the animation may include an advertisement, or other message designed to enhance the user's willingness to trade.

In some implementations, the user may have trade credits, but the system may prevent her from redeeming them for other reasons. At 3520, she may have received her get-items but not indicated their receipt; at 3518 she may have displayed inappropriate behavior; at 3519 she may not have delivered give-items. At 3517, in some implementations, the user may have partially played and abandoned a get-item session. The user gets the same amount on the clock that she had when she left the application.

FIG. 38 illustrates a screen shot of 3504: On this screen the user can take several actions. In some implementations, she can swipe through the selection queue to view and reject successive get-items. She can pause the countdown clock before she runs out of time to select a get-item. She can tap the "i" button for information to find out more about a get-item. She can select the get-item on the screen as the item she will receive from the giver. She can use a powerup to modify the trading rules, e.g., an Add Time or Freeze powerup, buying it if she does not have an applicable powerup for the current trading level.

FIG. 39, FIG. 40, FIG. 41, and FIG. 42 illustrate screen shots of 3510 and 3512. At 3510, the user may confirm that she wants to use a powerup to freeze a get-item. By freezing a get-item, the user can decide later (before or when the countdown clock reaches zero) to choose the frozen get-item as the get-item she receives in this trade. The user has frozen a get-item and continues to view successive get-items in the selection queue. The user can add more get-items to her frozen get-item collection. At 3512, the user can decide later (before or when the countdown clock reaches zero) to choose any of these frozen get-items as the get-item she receives in this trade.

Figure 43:
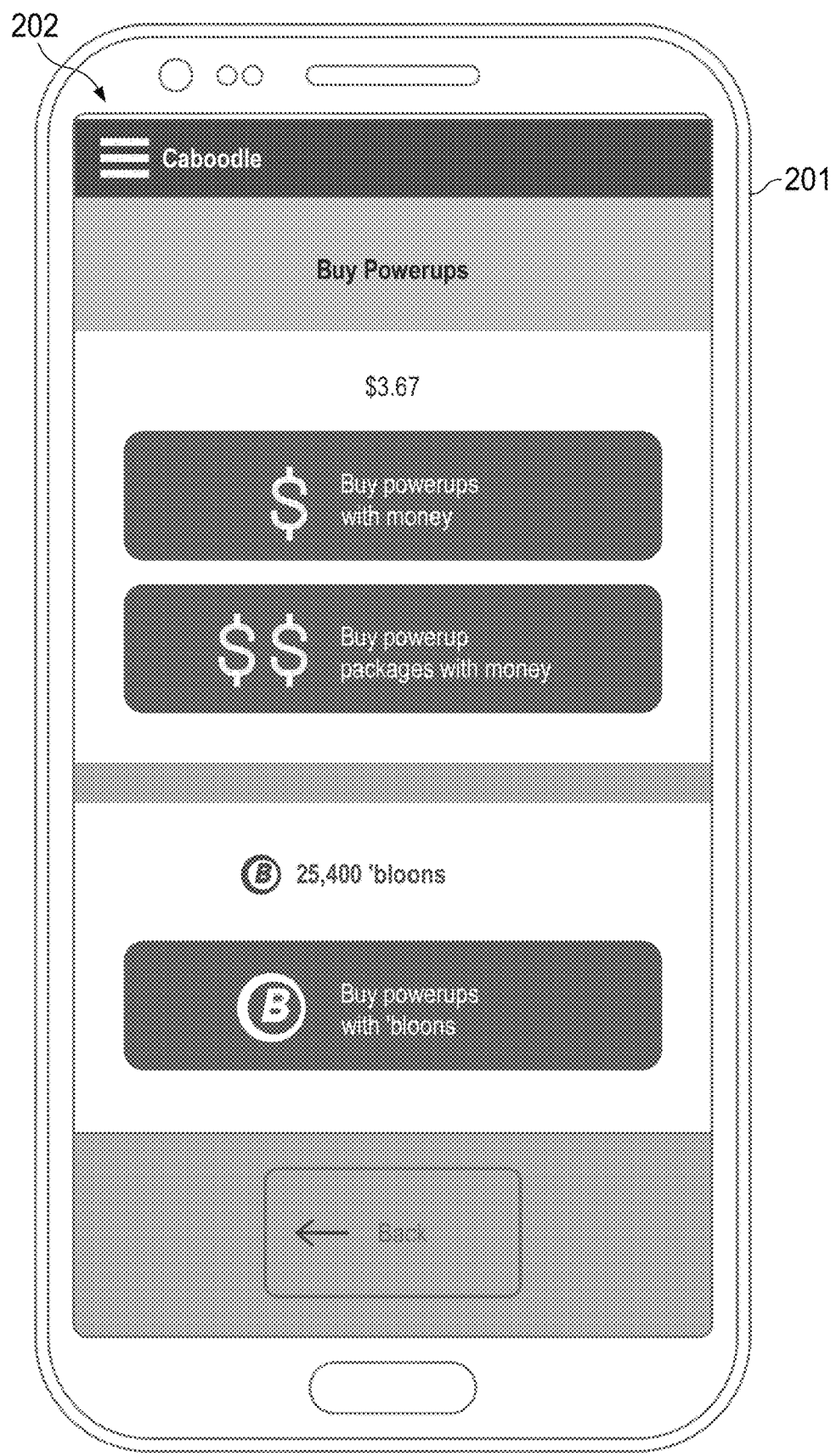
FIG. 43 shows a screenshot of an aspect of an embodiment.
Figure 44:
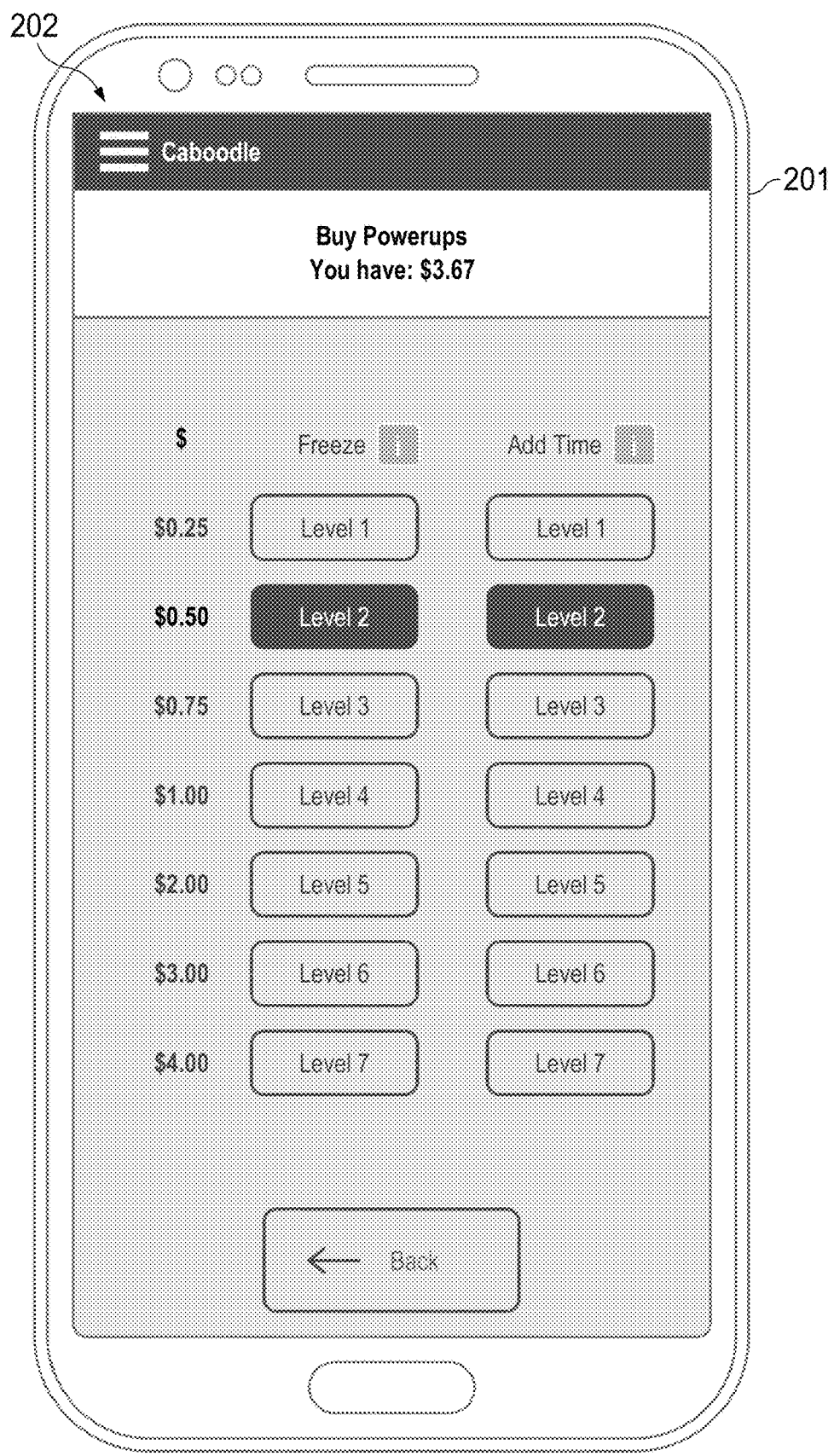
FIG. 44 shows a screenshot of an aspect of an embodiment.

FIG. 43 and FIG. 44 illustrate screen shots of step 3508. As illustrated in FIG. 43 and FIG. 44, the user can initiate the purchase of a powerup with various currencies during a trade. The user can complete the purchase of a powerup for use in the current trade.

Figure 45:
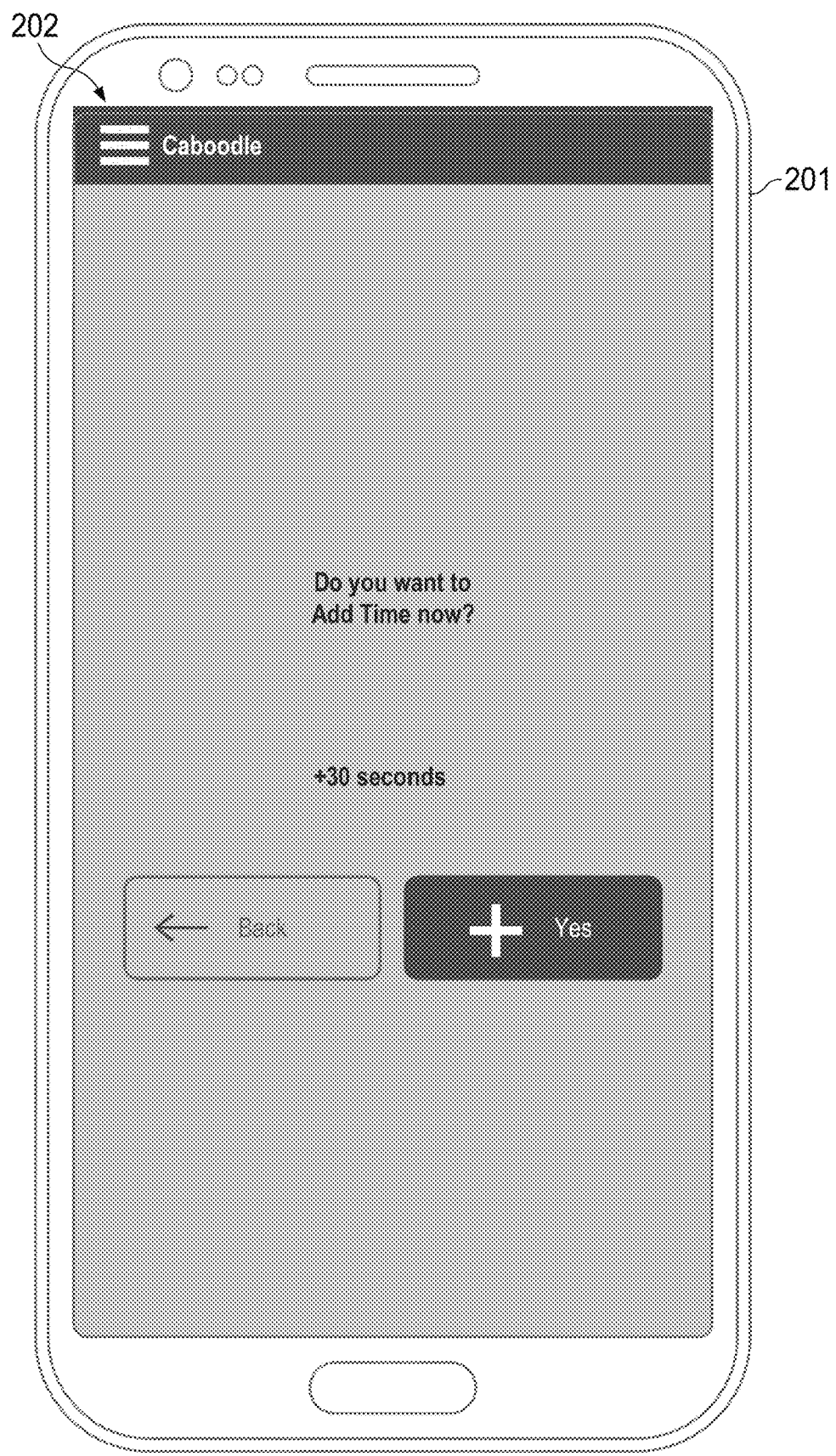
FIG. 45 shows a screenshot of an aspect of an embodiment.
Figure 46:
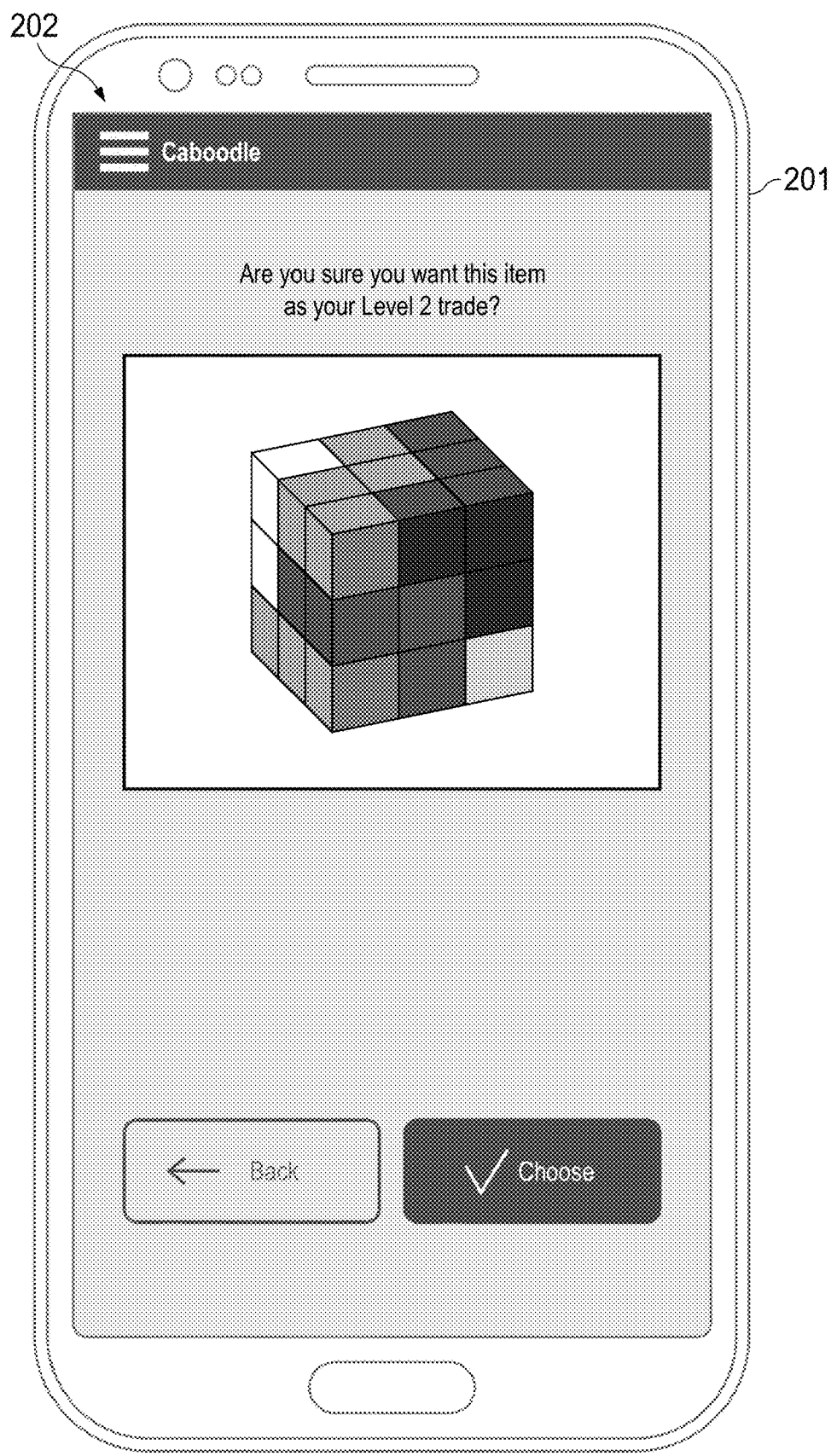
FIG. 46 shows a screenshot of an aspect of an embodiment.

FIG. 45 illustrates a screen shot of step 3513: The user confirms the purchase and usage 3507 of an Add Time powerup for this trade. At 3511, the user has picked a get-item and she confirms that this is the get-item she wants to receive as illustrated in the screen shot of FIG. 46. If the get-item is cash, the money may be deposited into her account.

Figure 47:
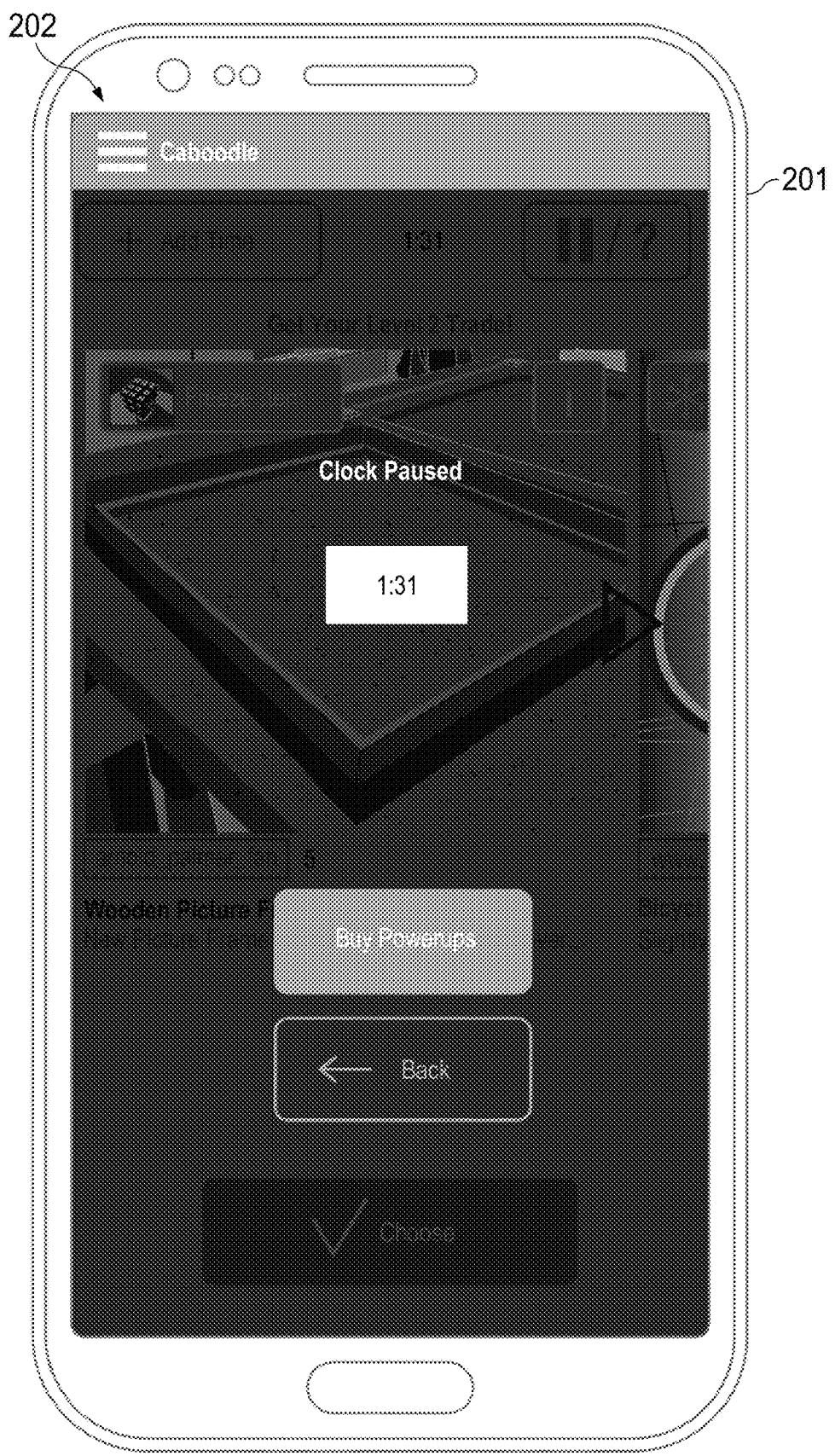
FIG. 47 shows a screenshot of an aspect of an embodiment.
Figure 48:
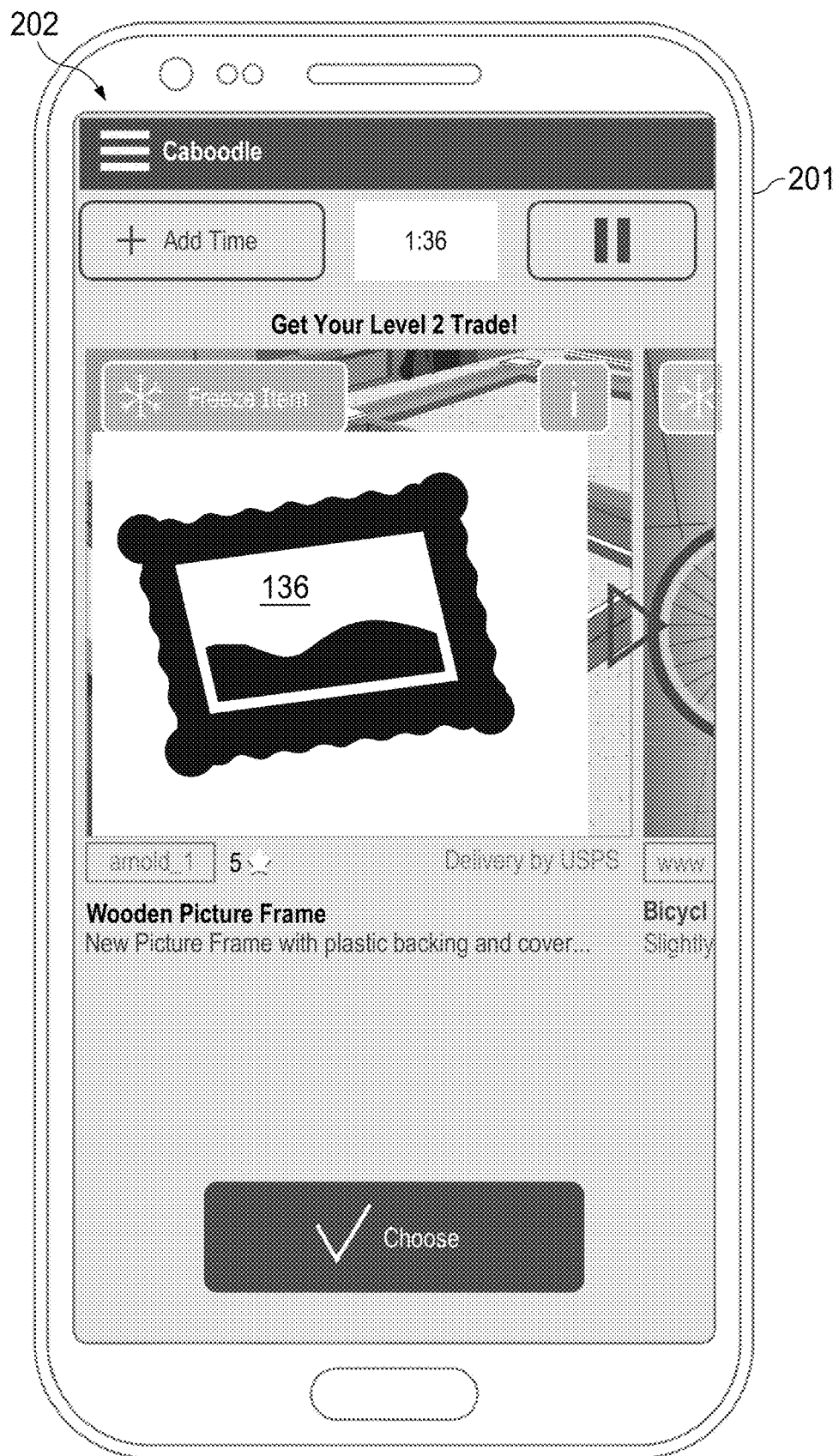
FIG. 48 shows a screenshot of an aspect of an embodiment.

At 3509, the user may have stopped the countdown clock and paused the trading session as illustrated in the screen shot of FIG. 47. At 3506, this user has swiped to the second get-item available in her get-item selection queue illustrated in a screen shot of FIG. 48. At 3505, she can choose this get-item as her get-item, swipe to the next get-item in the get-item selection queue, or press "i" for more information about the get-item. She may continue to swipe forward in her selection queue until she selects the get-item on the screen, or she selects a get-item reserved via the Freeze powerup, or she may be forced to select the get-item on the screen when the countdown clock reaches zero.

Figure 49:
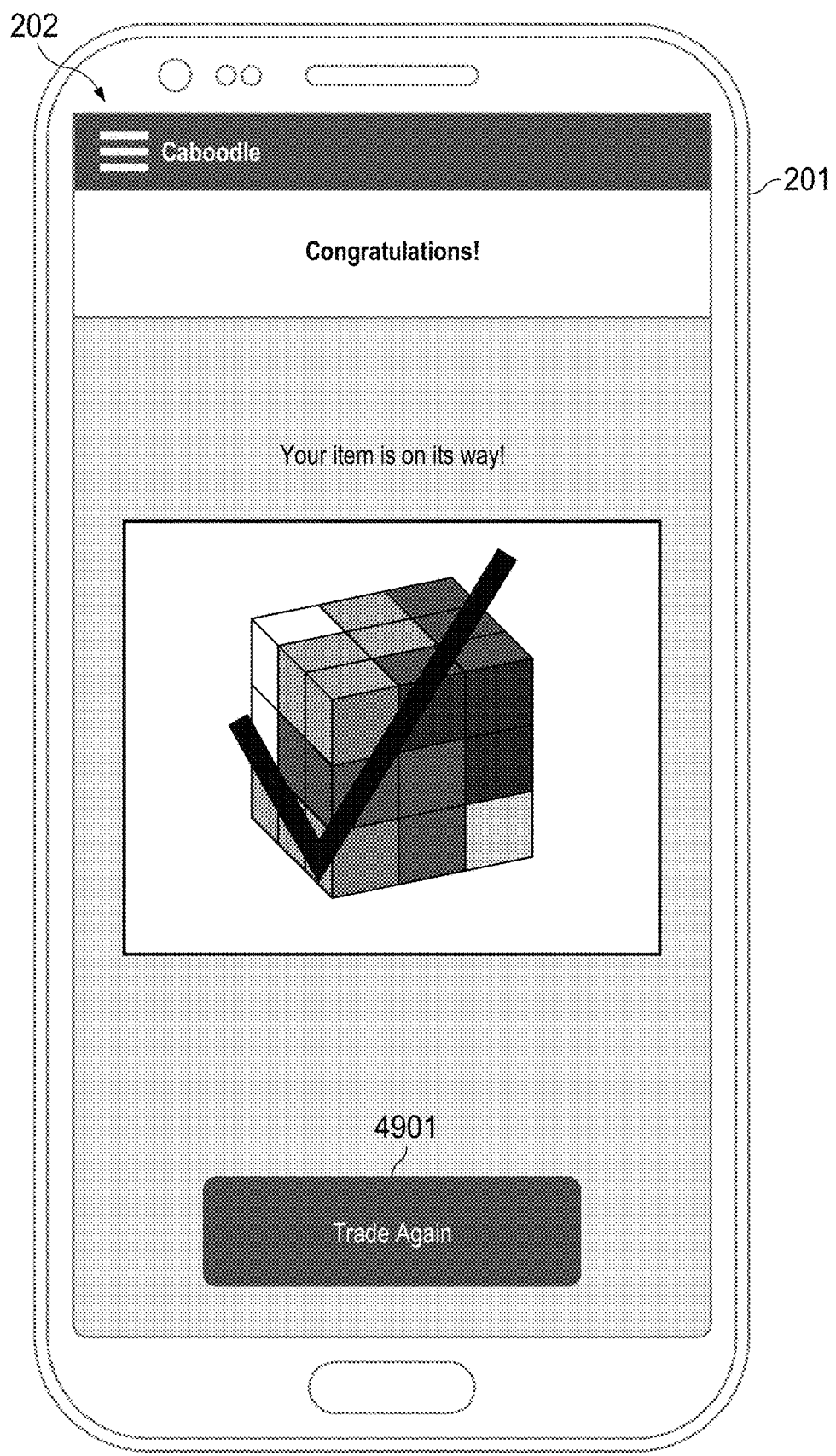
FIG. 49 shows a screenshot of an aspect of an embodiment.

At 3516, the user has selected her get-item and is invited to earn another trade credit by listing a give-item using trade button 4901 as illustrated in the screen shot of FIG. 49. In one embodiment, the get-items in a given user's get-item selection queue are chosen by the system to be especially appealing to that user. For example, as shown in FIGS. 35A-B the get-items chosen by the system to present to a given user might reflect the category preferences indicated by that user as discussed with regard to FIG. 31, the user's prior application interactions, and the categories to which give items are assigned when they are uploaded as illustrated in FIGS. 3A-3B.

Figure 78A:
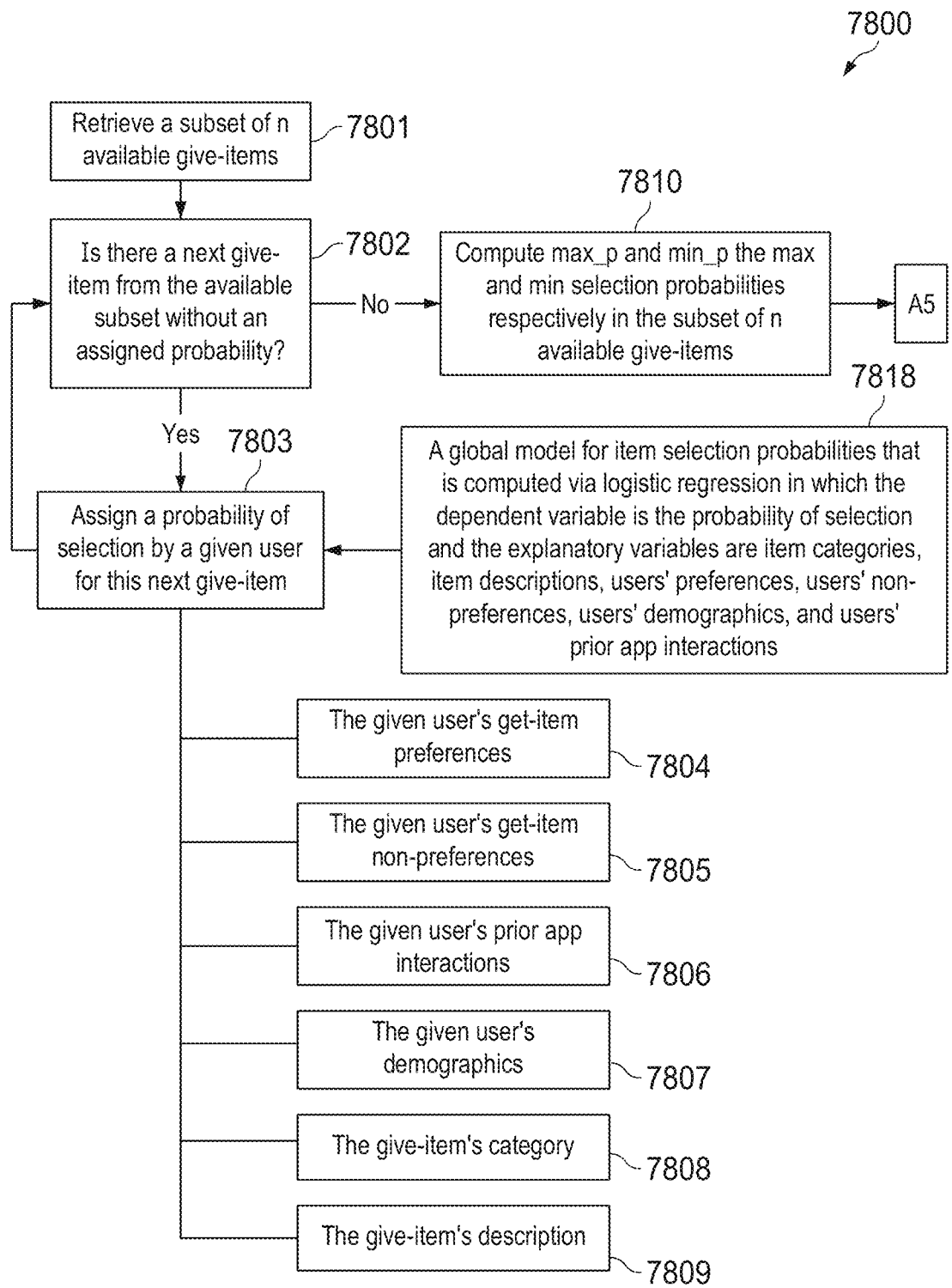
FIGS. 78A-78B is a high-level flow diagram of an exemplary machine learning process.
Figure 78B:
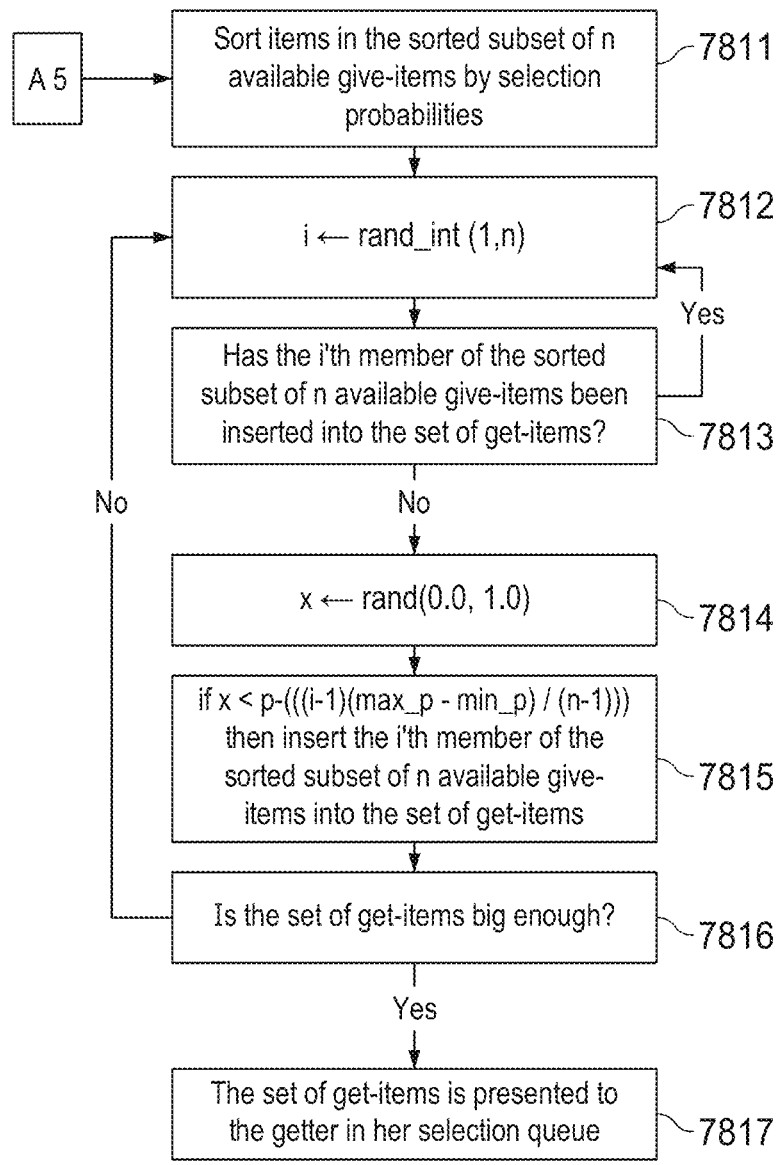

The generation of an appealing list of get-items for a given user is illustrated by the flowchart 7800 illustrated in FIGS. 78A-78B. At 7801, a subset of n available give-items is retrieved by the system. In one embodiment, the subset of n available give-items comprises the n give-items least recently viewed by any potential getter. In another embodiment, the subset of n available give-items comprises items that meet minimum diversity requirements in terms of the number of item categories represented. At 7802 and 7803 each item in the subset of n available give-items is then assigned a probability of selection by a given user. The probability assignment may be accomplished by analyzing the historical data of item consideration and selection for all users using for example, statistical or machine learning methods.

For example, in one implementation, logistic regression is used to compute the probability of selection of an item (the binary dependent variable) as a function of the following explanatory variables: the item's category, words used in the item's title and/or description, the category preferences of a selecting user, the category non-preferences of a selecting user, the application interactions of a selecting user (e.g., the use of powerups for items of a given category, the viewing dwell time for items of a given category, etc.), and the demographic data for a selecting user (e.g., data relating to location, gender, age, ethnicity, application usage, social media usage, etc.) 7818. Using this model 7818 the selection probability of an item can be computed 7803 as a function of the given user's get-item preferences 7804, the given user's get-item non-preferences 7805, the given user's prior application interactions (e.g., powerup selection for items of a given category, and viewing dwell times for items of a given category) 7806, the given user's demographic data (e.g., data relating to location, gender, age, ethnicity, application usage, social media usage, etc.) 7807, the give-item's category 7808, and the words used in the give-item's title and/or description 7809. As will be appreciated by those skilled in the art, the probability assignment 7803 could also be done using other machine learning methods that use other mathematical models 7818.

In one implementation as shown in FIG. 78, in choosing a set of get-items for a given user, two competing criteria are balanced: item appeal and diversity. In one aspect, balance may be achieved via steps 7810 through 7817. Once the selection probabilities of a subset of n available give-items have been computed for a given user at 7801, the give-items may be sorted in order of their associated selection probabilities and at 7810 the maximum probability max_p and the minimum probability min_p are computed.

The following may be executed at 7816 until a sufficient set of get-items for the given user has been generated: at 7812, a random index i into the sorted subset of available give-items may be generated using a random integer number generator rand_int( ) at 7813, the i-th give-item in the sorted subset of available give-items is tested for prior inclusion in the nascent set of get-items, and if necessary at 7812 another random integer may be generated until a give-item in the sorted subset of available give-items that is not already in the nascent set of get-items is chosen; at 7814 another random number x is generated using a random number generator rand( ) at 7815m if the value of x is less than the value $p-(((i-1)(max\_p-min\_p)/(n-1))$, then the i-th item from the sorted subset of available give-items is included in the nascent set of get-items for the given user. In one aspect, this formula is designed to favor items earlier in the sorted subset of available give-items, which have higher predicted probability of being selected by the given user, without certain rejection of any item; at 7816, once the set of get-items for a given user is sufficiently large, at 7817, the set of get-items is presented to the getter in her get-item selection queue.

In some implementations, the selection probabilities may be adjusted in response to user input. For example, the system may measure when during the duration the user makes a rejection or selection of a get-item as an input to calculate selection probabilities. In this scenario, a user who rejects a get-item more or less quickly may inform the system of the user's propensity to select or reject get-items. As such, items that are rejected more quickly may indicate the user disfavors such items. In response to such input as feedback, the system, then may adjust the sequence of items. For example, the system may add or remove get-items from the sequence, re-sequence the list of get-items to be presented, etc., and may take other actions such as change images of the get item to different views, vary the visual attributes of the image of the get-item being presented, e.g. lower or raise contrast, color, sharpness, etc., and/or add other information such as "Limited time only," "Only one left," "Five have sold a few minutes ago," and the like, to convey aspects of get-item such as the value of the item, rarity, and the like.

In implementations, a give-item user may use trade credits to inform the selection and presentation process in order to enhance their chances that their give-item may be selected. For example, a give-item user may pay using credits, currency, and the like, to add enhancements, location in the list of get-items presented to the user, extra duration for their item, etc. As such, a give-item user may be trained on how to present an item and/or enhance its chances of being selected. As discussed herein, such presentation may train the give-item user for example, to provide better quality items, learn how to better present a give-item, what length of time works better for presenting their type of item, etc.

User Account and Powerups

Figure 51:
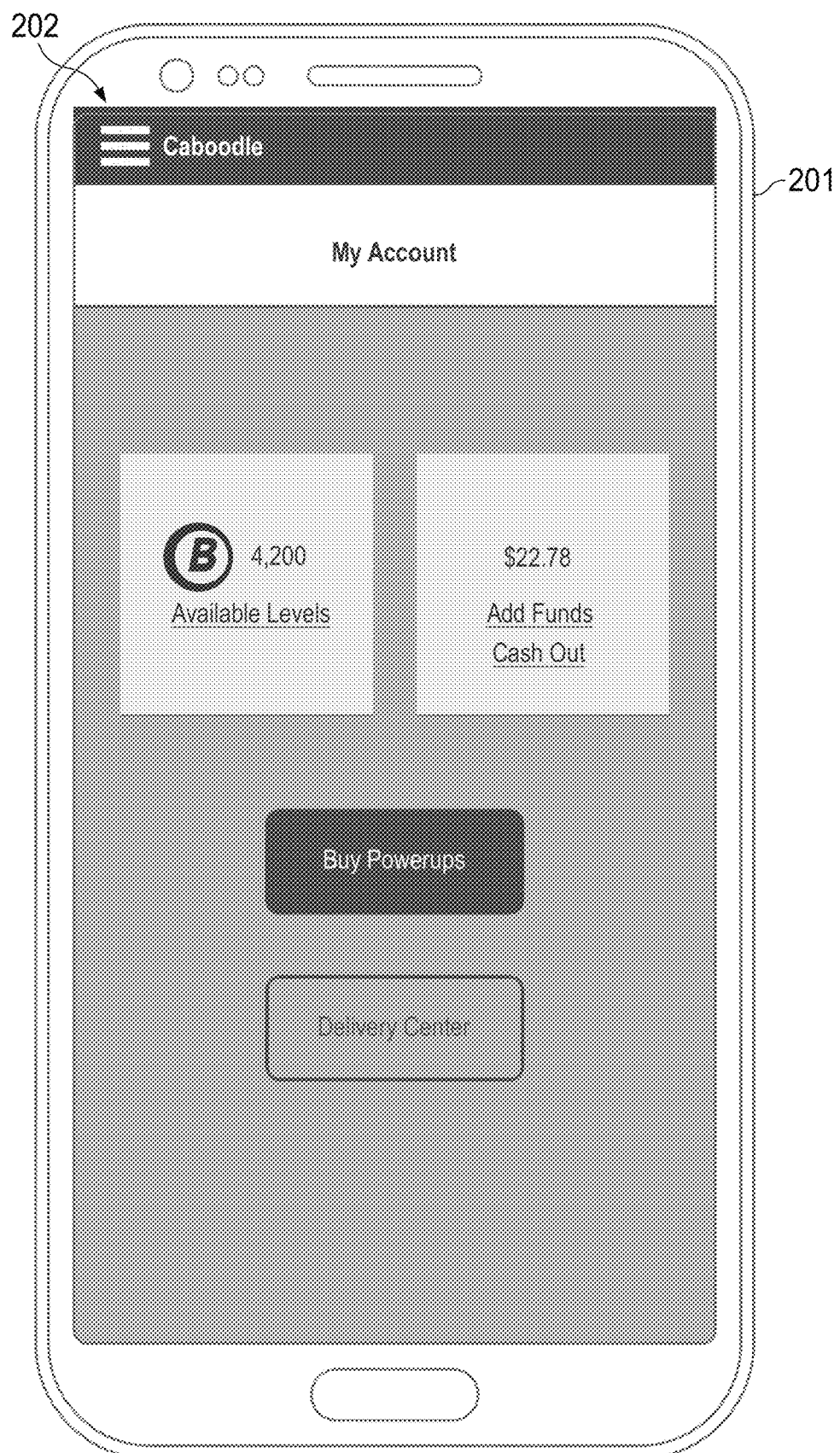
FIG. 51 shows a screenshot of an aspect of an embodiment.
Figure 52:
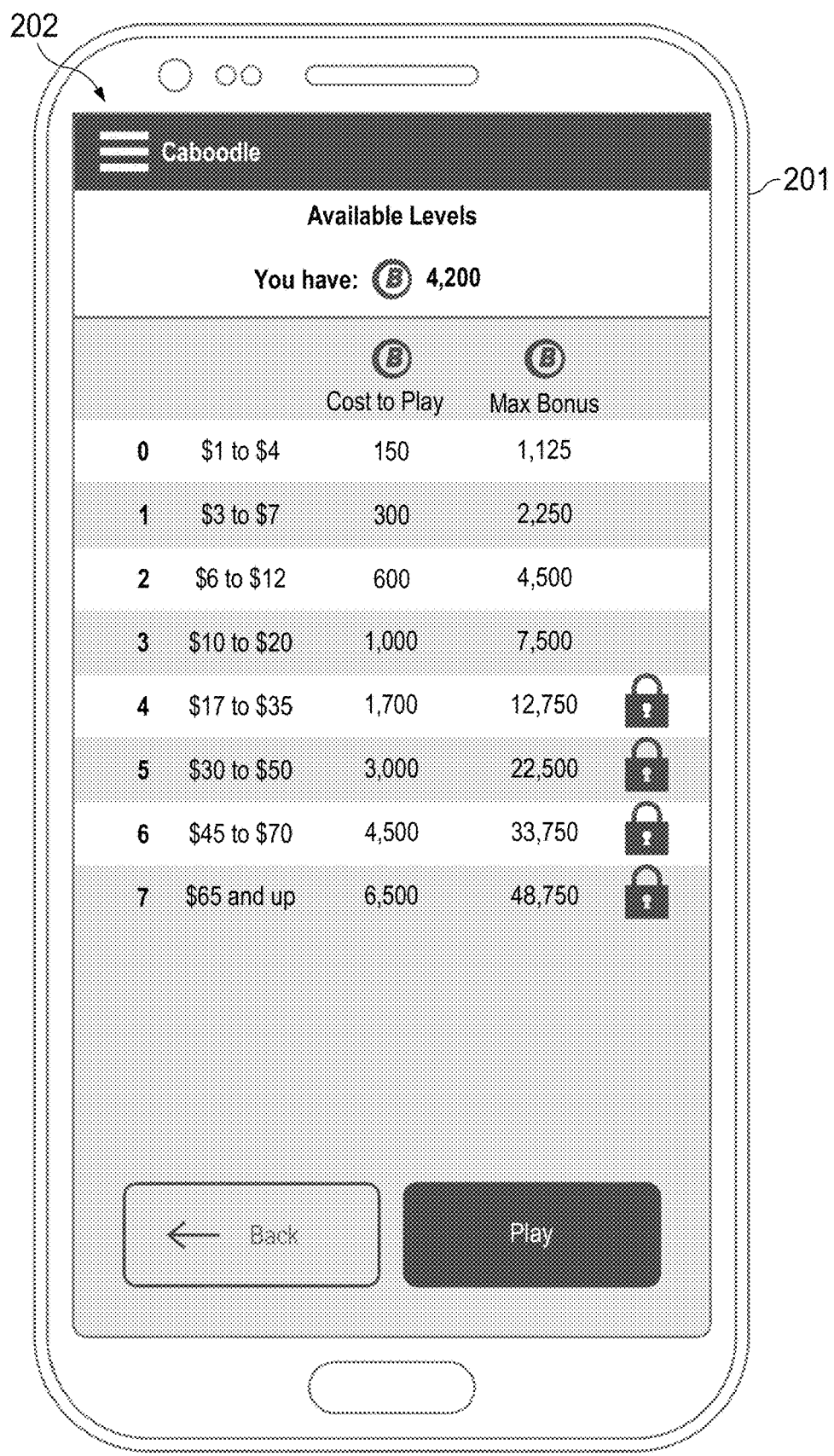
FIG. 52 shows a screenshot of an aspect of an embodiment.

As illustrated by the flowchart in FIG. 50, the user can manage her user account in the application. At 5001, the user sees information about her account as illustrated in the screen shot shown in FIG. 51. At 5002, the user may see her current amount of in-app currency, which levels are unlocked, how much in-app currency she needs in order to unlock the next level, the cost in in-app currency to post an item, and the maximum in-app currency bonus she can receive if her give-item is selected at each level as illustrated in the screen shot of FIG. 52.

Figure 53:
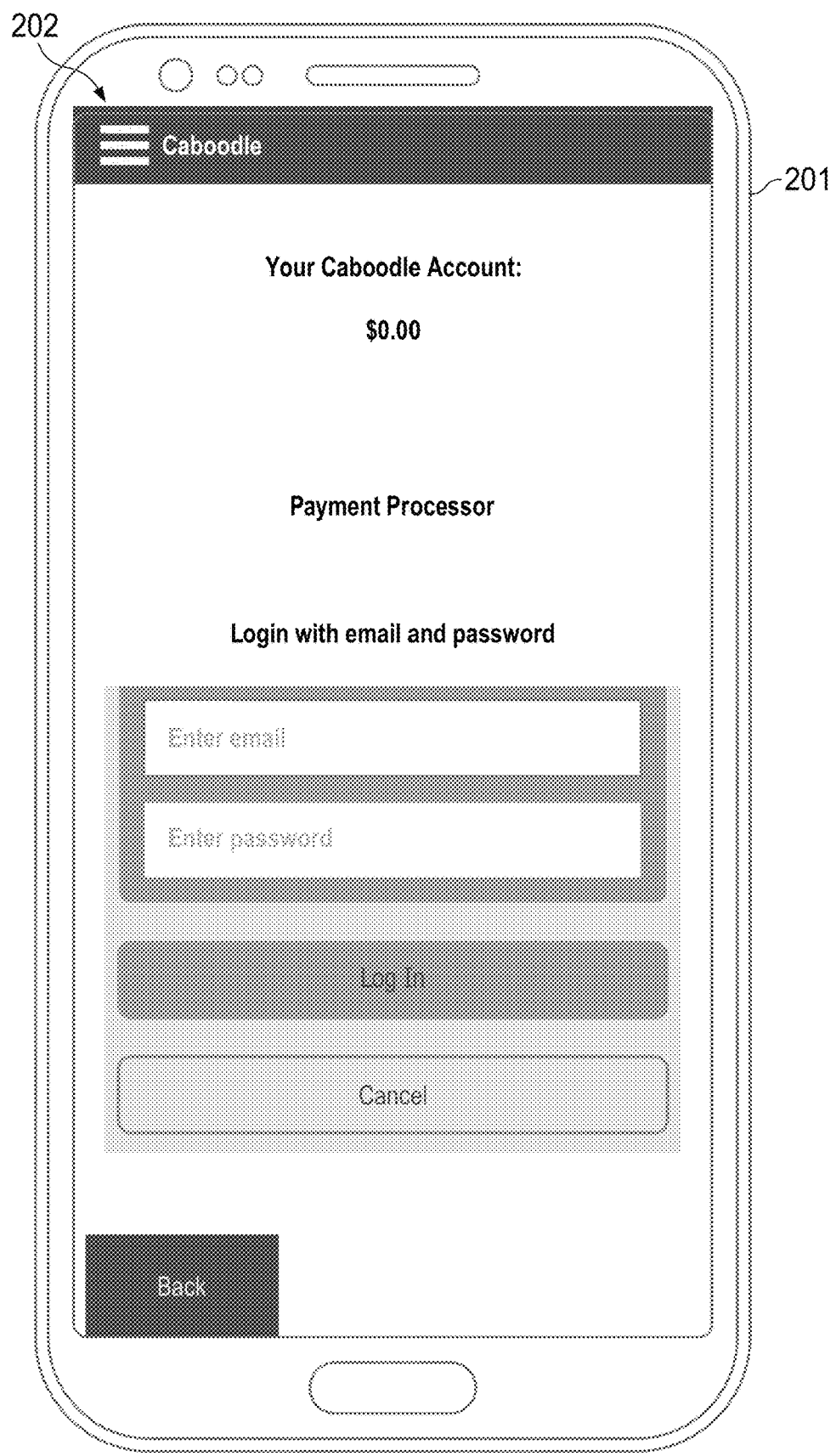
FIG. 53 shows a screenshot of an aspect of an embodiment.
Figure 54:
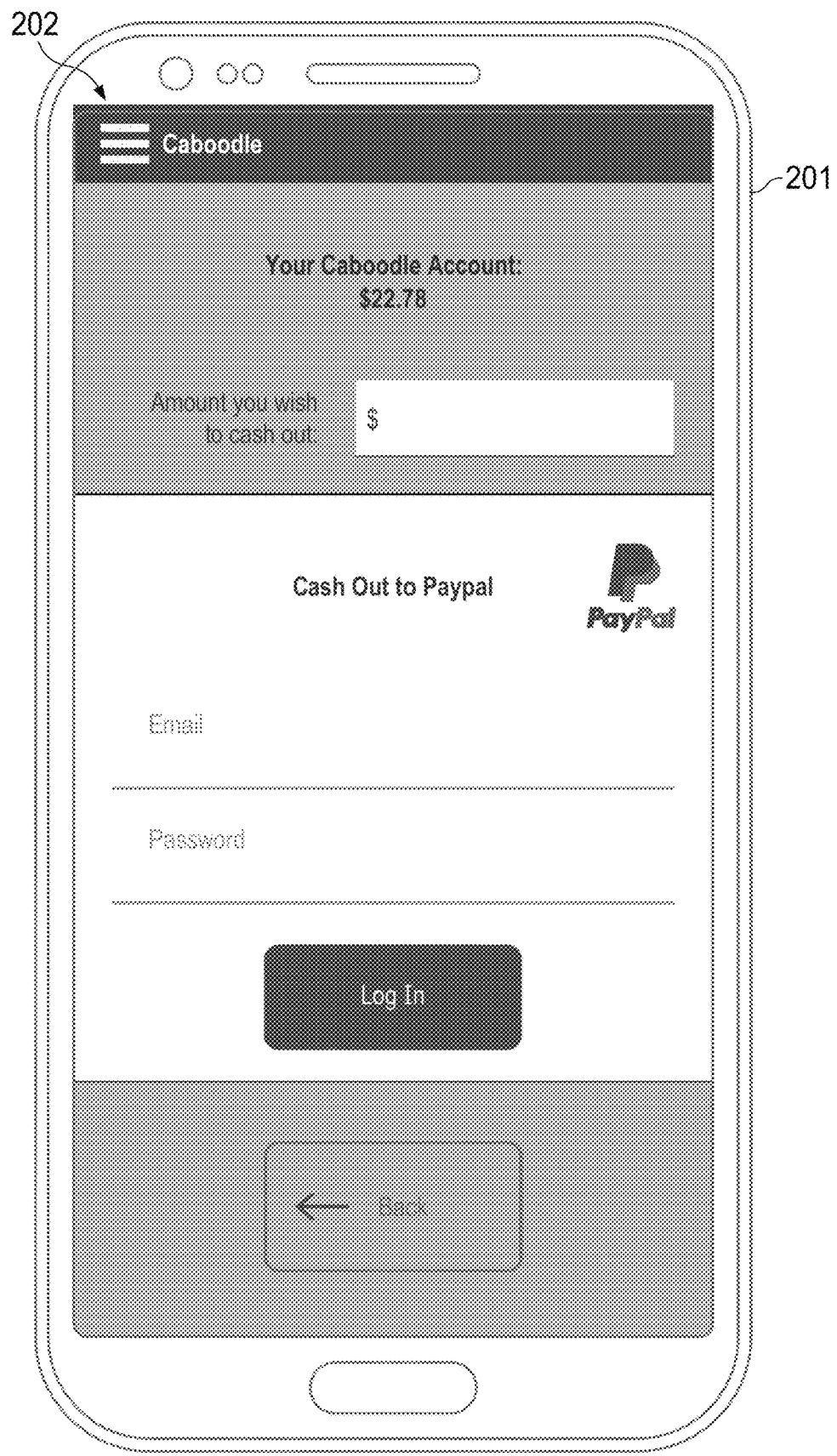
FIG. 54 shows a screenshot of an aspect of an embodiment.
Figure 55:
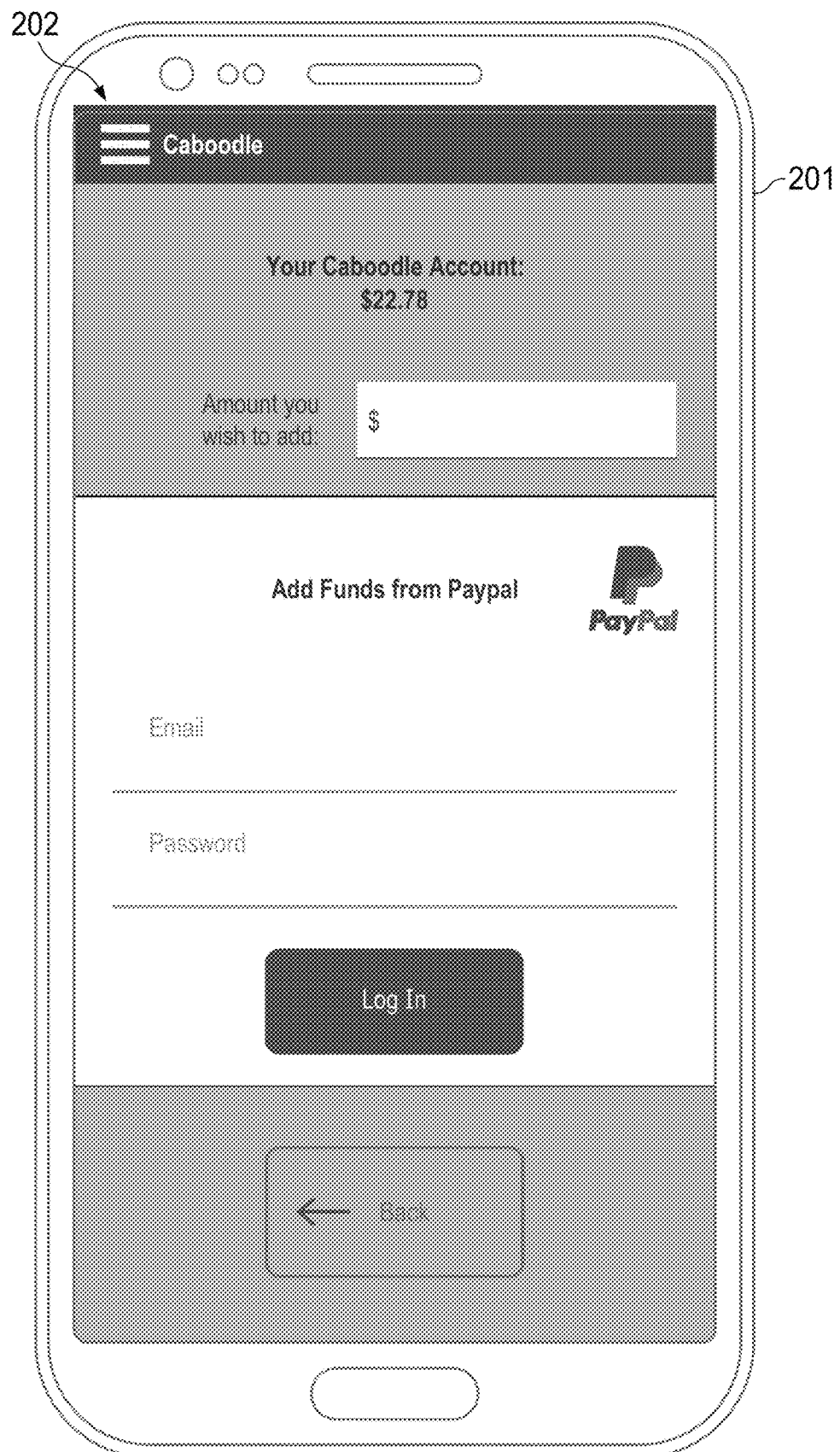
FIG. 55 shows a screenshot of an aspect of an embodiment.

At 5005, the user may link her in-app account with a payment processor in order to be able to get items with cash payments, cash out payments for her give-items, and buy powerups as illustrated in the screen shot of FIG. 53. At 5004, the user chooses to cash out funds in her in-app account to a bank account via a payment processor as illustrated in the screen shot of step FIG. 54. At 5003, FIG. 55 the user can add funds to her in-app account via a payment processor illustrated in the screen shot of FIG. 55.

In some implementations, users can earn, purchase, and use powerups that influence elements of the trading mechanic, such as the item selection queue and the get-item session. For example, at 5007 and 5008, individual powerups can be purchased with money or in-game currency. At 5009, Powerups may also be purchased in bulk. At 5010, the Add Time powerup adds time to the countdown clock in incremental amounts, e.g., thirty second increments, extending the length of the get-item session, thus allowing the user to view more get-items in the item selection queue. At 5011, the Freeze powerup allows a get-item to be held in reserve while viewing other get-items in the item selection queue. The user may then choose the reserved item (a "frozen" get-item) at any point as the get-item while continuing to progress through the item selection queue. In some implementations, multiple powerups of each type can be used in a get-item session.

Figure 56:
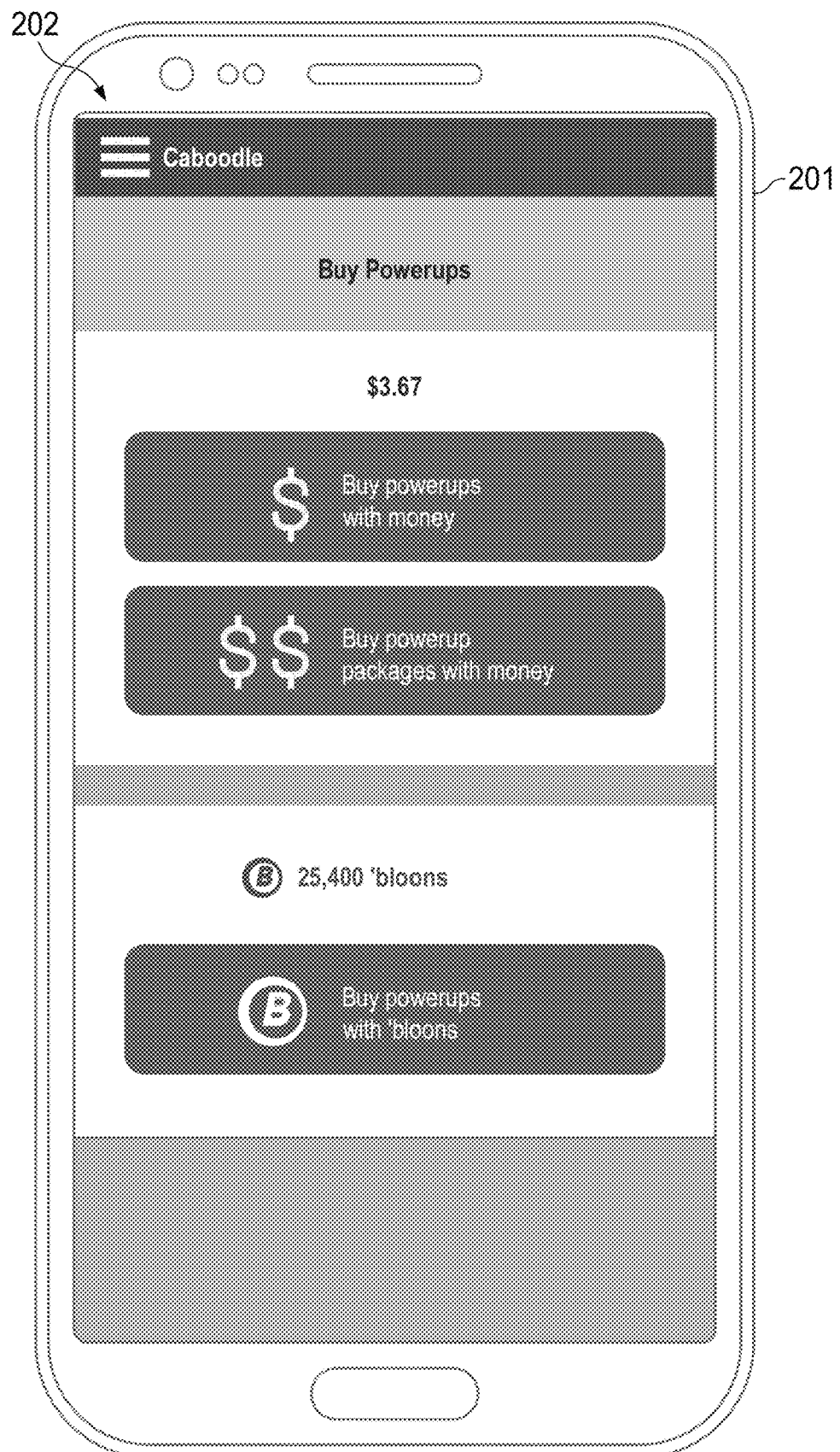
FIG. 56 shows a screenshot of an aspect of an embodiment.
Figure 57:
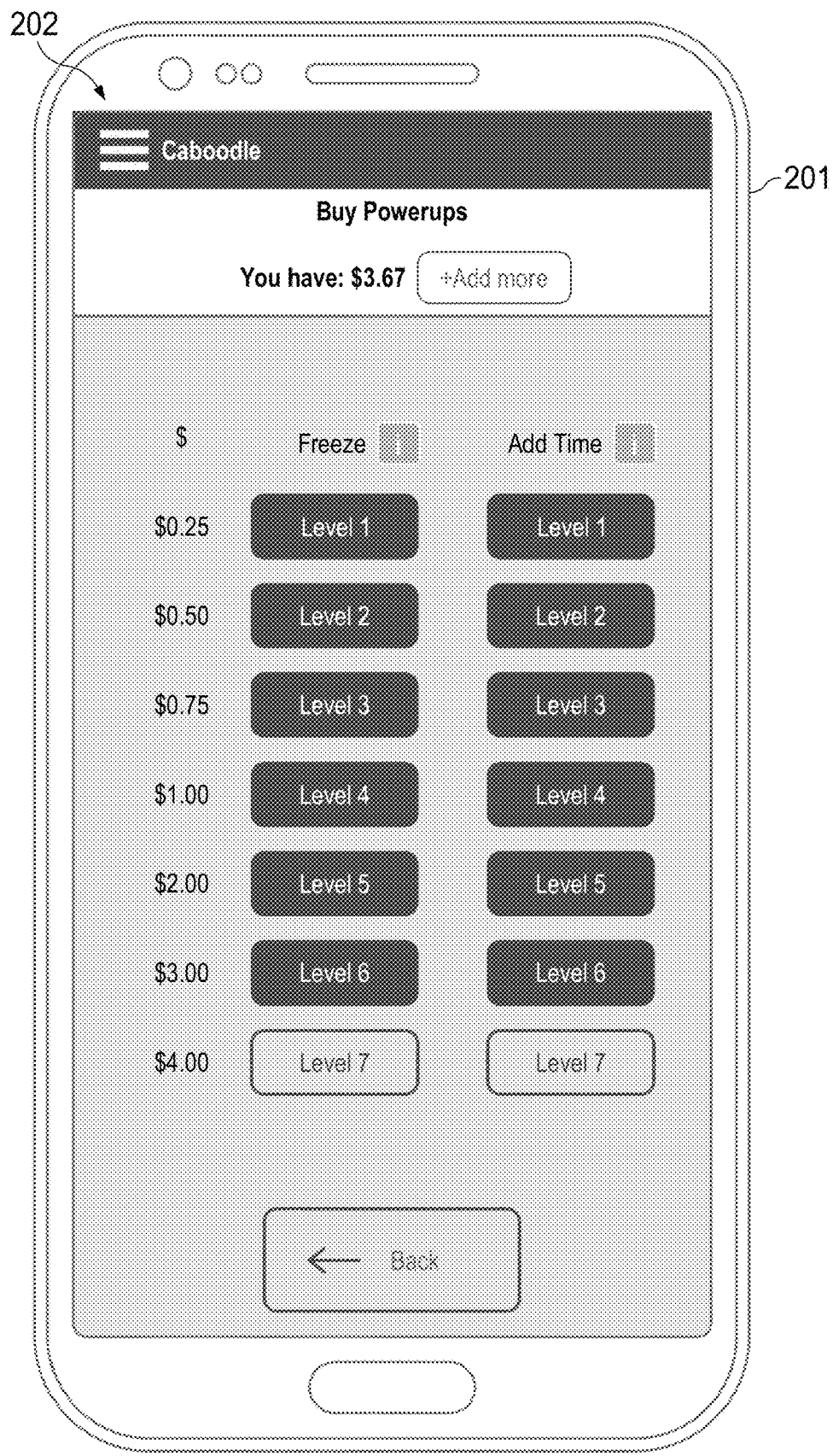
FIG. 57 shows a screenshot of an aspect of an embodiment.
Figure 58:
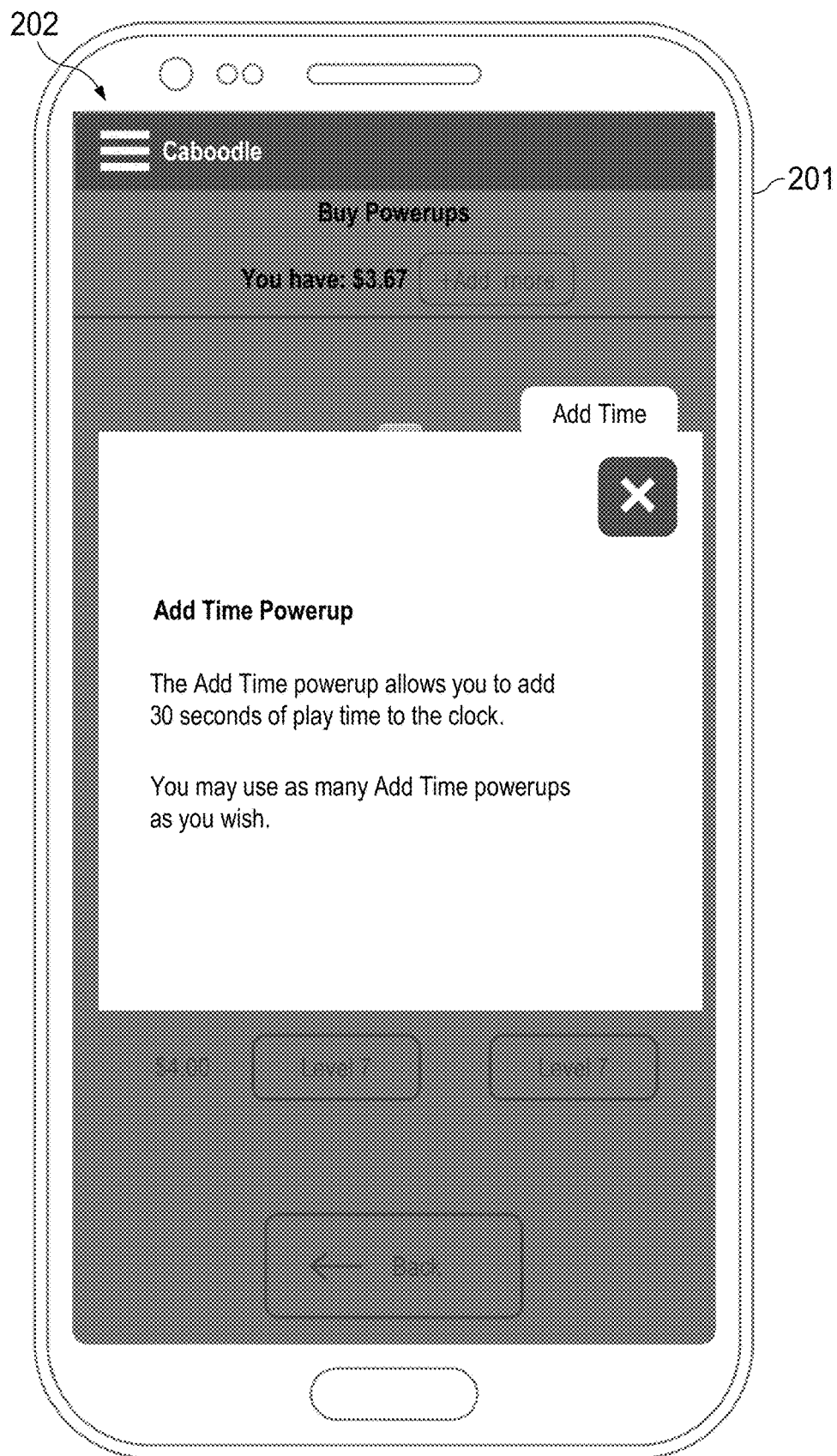
FIG. 58 shows a screenshot of an aspect of an embodiment.
Figure 59:
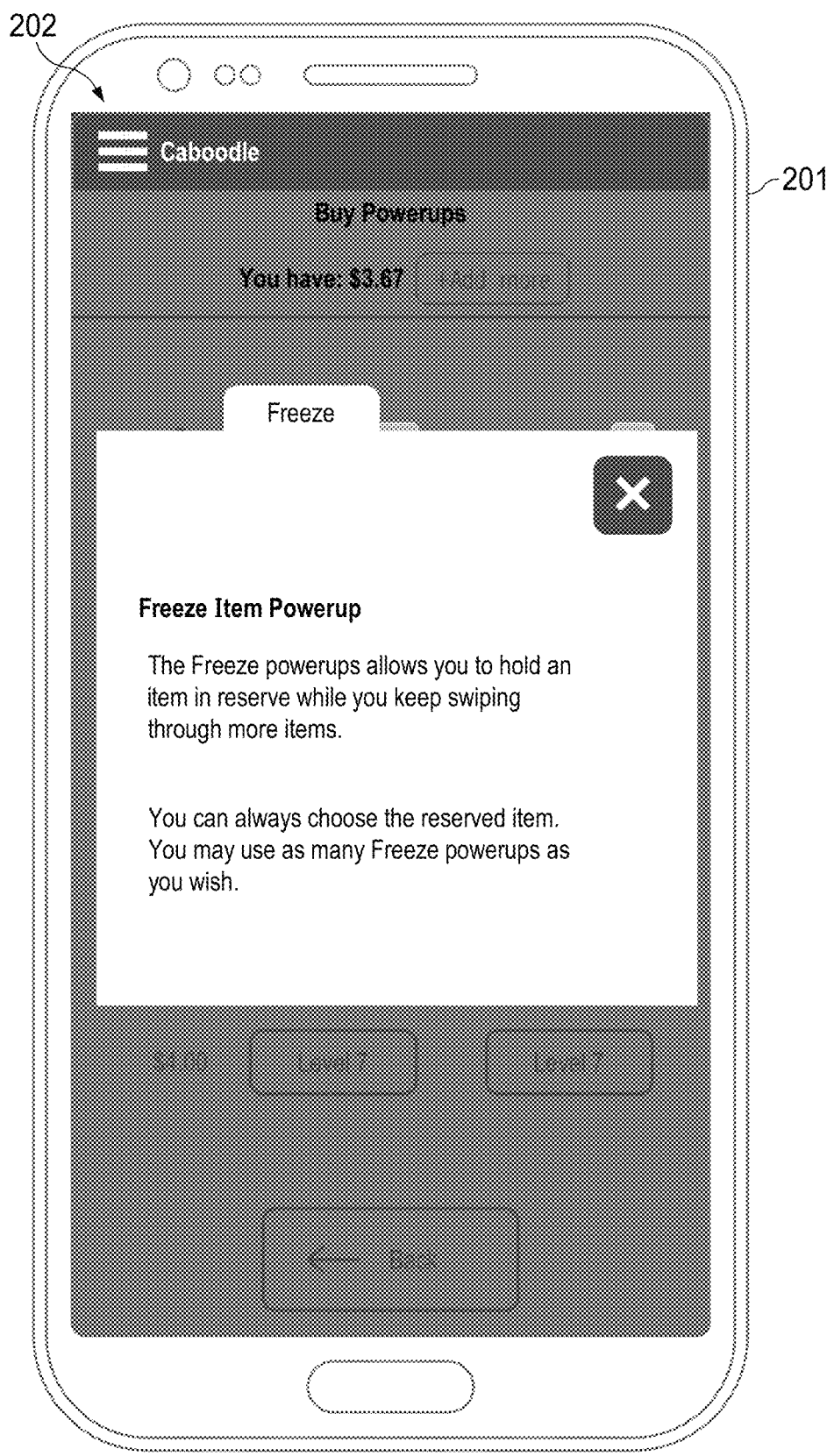
FIG. 59 shows a screenshot of an aspect of an embodiment.
Figure 60:
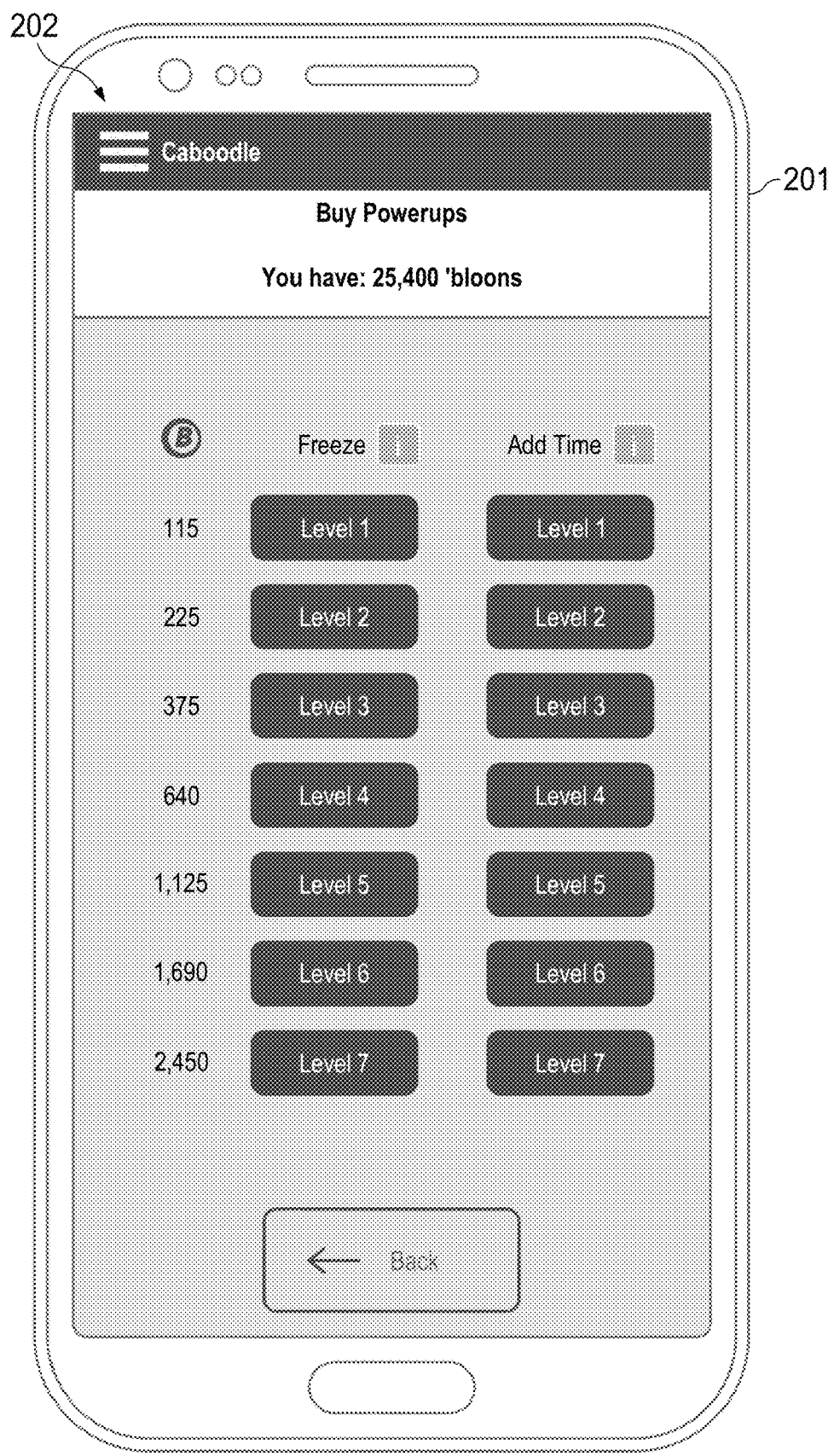
FIG. 60 shows a screenshot of an aspect of an embodiment.
Figure 61:
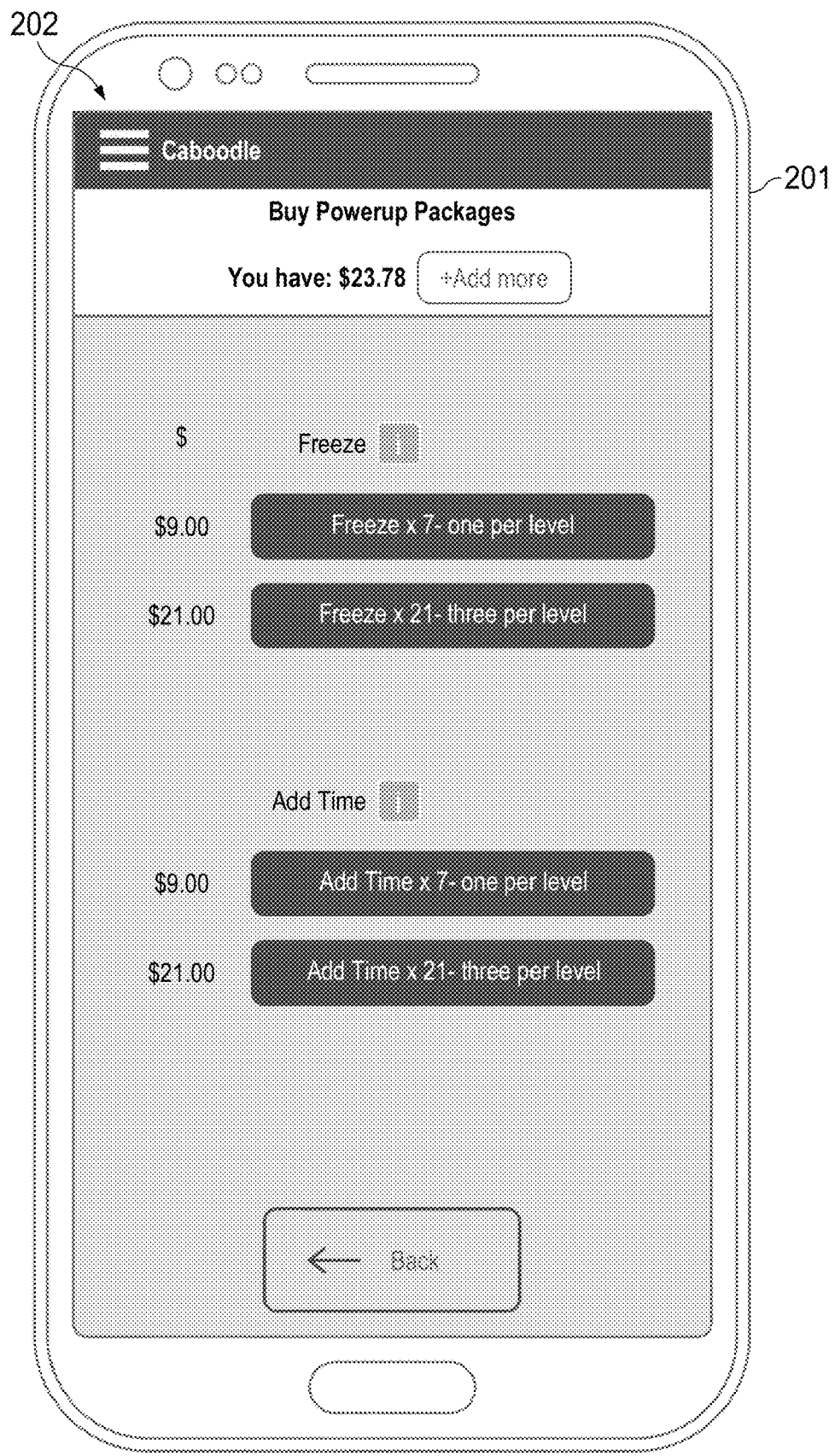
FIG. 61 shows a screenshot of an aspect of an embodiment.

At 5006, the user may purchase powerups with cash in her account or in-app currency earned by making trades FIG. 56 as illustrated in the screen shot of FIG. 56. At 5007, the user may purchase powerups with money in her in-app account as illustrated in the screen shot of FIG. 57. In some aspects, powerups cost more or less depending on the level. To show a lack of funds, buttons may be notated such as being grayed out if there are not enough funds in her account to purchase a powerup. In other implementations, at 5007, the "Freeze" and "Add Time" powerups may be purchased. In some aspects, if the user taps the "i," button the explanation of the powerup behavior may be provided. Any number of different types of powerups may be used to advantage. At 5010, a pop-over box explains to the user what the Add Time powerup does to influence the purchase experience as illustrated in the screen shot of FIG. 58. At 5011, a pop-over box that explain to the user what the Freeze powerup does to influence the purchase experience as illustrated in the screen shot of FIG. 59. At 5008, the user may purchase powerups with in-app currency FIG. 60 as illustrated in the screen shot of FIG. 60. At 5009, in some implementations, users may buy packages of powerups and save currency as illustrated in the screen shot of FIG. 61.

Inviting a Friend Process

As illustrated by the flowchart in FIG. 62, at 6201, a user may invite friends at to the application using at 6202 at virtually any communication platforms such as email or social networking platform integrations. The system as described herein may give reward to the user when she successfully invites a friend to join the application. When her friend makes his first trade (successfully gives away an item), the user who issued the invitation may get a package of benefits such as powerups. At 6203, the system confirms that the friend invitation has been issued.

Providing App Help

As illustrated by the flowchart in FIG. 63, at 6304 a user can obtain help about how to use the application at 6301 for example, by reading frequently asked questions on how the applications works 6302, at 6303, how to give a give-item, at 6304, how to get a get-item and at 6305 how to deliver and receive an item. At 6306, a user can contact a third-party such as the application manager for more assistance.

Example of Trades from a System Management Perspective

Users earn credits by giving items or money to other users. Then, they redeem these credits by getting items or money from other users. Thus, a given user alternates between being a "giver" and a "getter," making pairs of asynchronous trades with, for example, two other users. A third-party such as a market maker may facilitate some transactions on either the giver or the getter side.

Figure 64A:
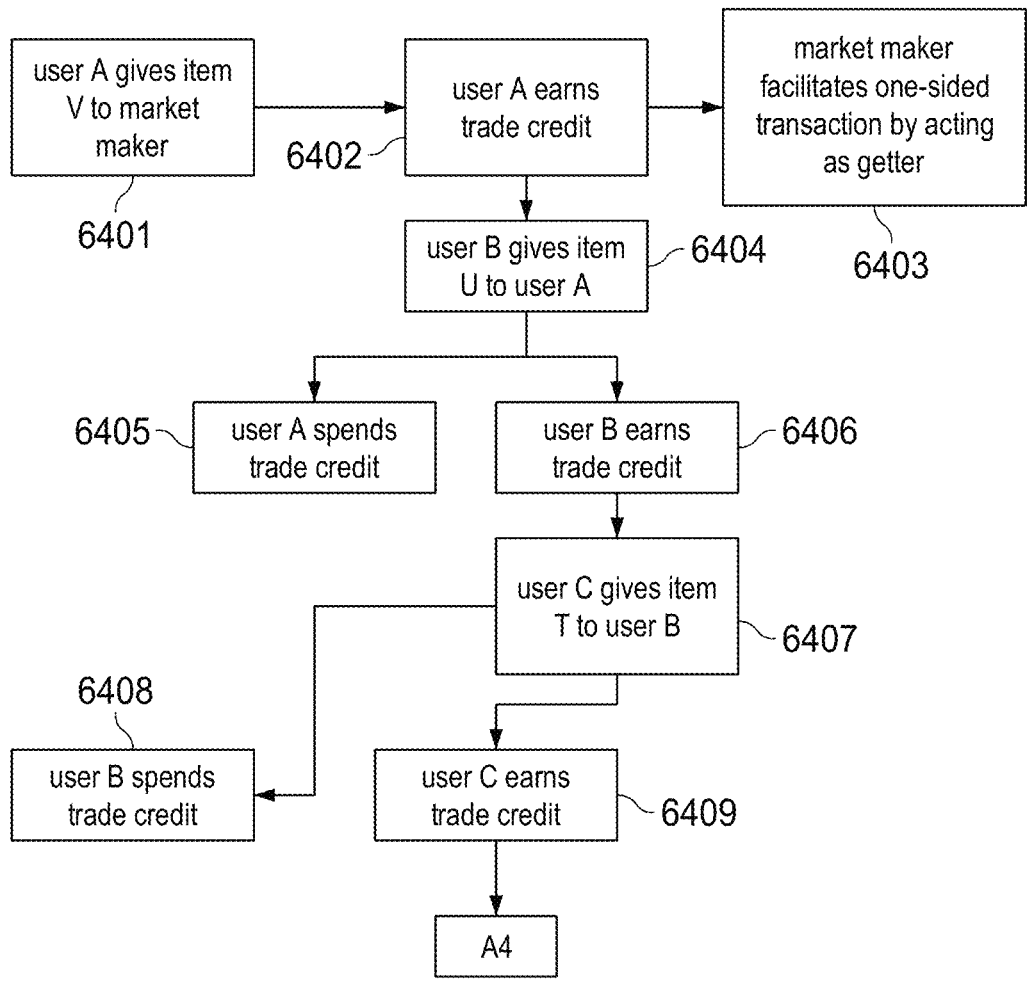
FIGS. 64A-64B shows a method illustrating how a collection of users earn trade credits by giving items to other users or a market maker and spend those trade credits by receiving items from other users or a market maker.
Figure 64B:
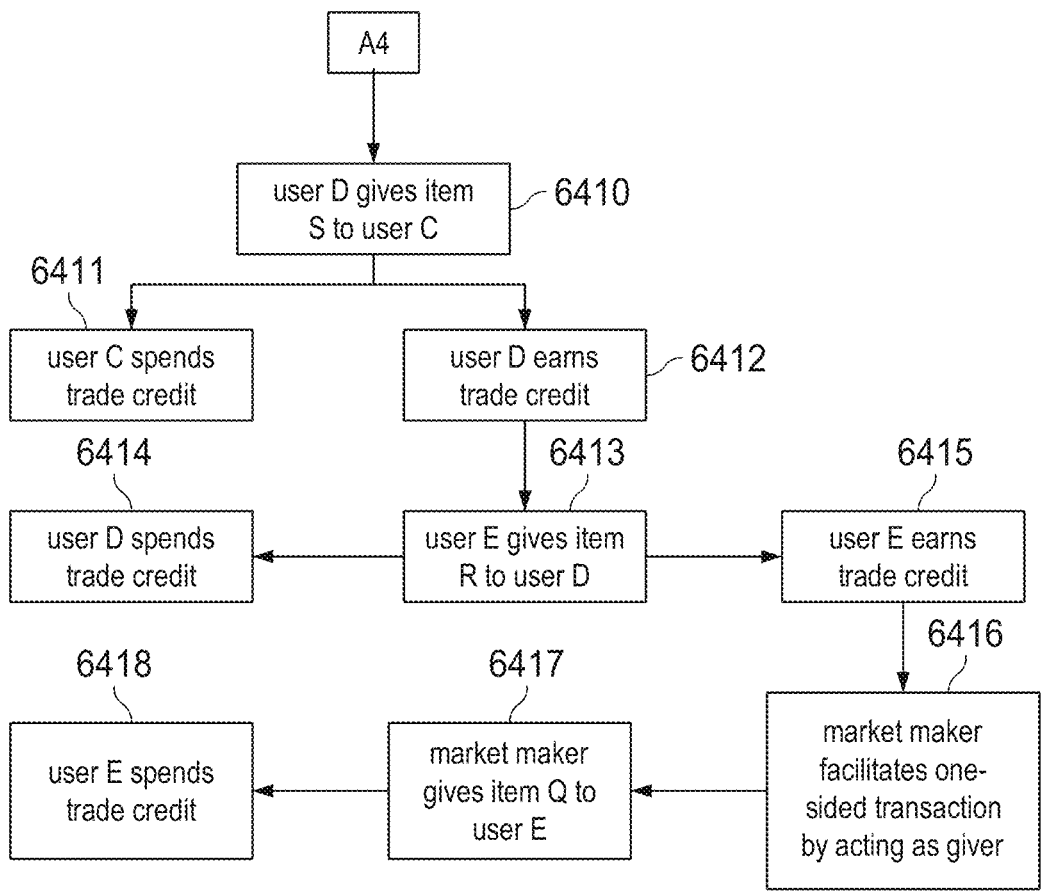

As illustrated by the flowchart in FIG. 64, a user A gives a give-item V to an online marketplace system serving as the market maker at 6401. At 6402, the method calculates the trade credit based on information received about the item V and proceeds to either 6403 or 6404. At 6403, the system facilitates a one-sided transaction by acting as a "getter." In one embodiment, the system uses artificial intelligence to decide when to act as the getter. For example, the system may be configured to analyze a player's profile, trading actions, item description, and other information in order to assume the identity of a particular or representative player and/or the quality of the item being traded. At 6404, user A progress to various get-items using a unidirectional process as described herein to receive an item from user B. At 6405, user A spends a trade credit to receive the item U and at 6406, user B earns a trade credit for supplying item U to user A. At 6408, user B spends a trade credit to receive the item T and at 6409, user C earns a trade credit for supplying an item to user B 6407. In one implementation, the trade credit is adjusted according to the quality of the item traded, the desirability of the item, the speed of the trade, and the like. At 6410, user D gives a get-item to user C who has picked get-item using the unidirectional trade process described herein. At 6411, user C spends a trade credit to receive the get-item S, and at 6412 user D earns a trade credit for supplying a get-item to user C. At 6412, user E gives a get-item to user D who has picked a get-item using the unidirectional trade process described herein. At 6414, user D spends a trade credit to receive item R. At 6413, user E gives the item R to user D and earns a trade credit 6415. At 6416, the system is configured to act as a "giver," and at 6417 gives an item Q to user E who has picked item using the unidirectional trade process described herein. At 6418, user E spends a trade credit to receive item Q.

To add to the excitement of the trading process, an automated process, such as a market maker may be configured to act as a getter seeming to compete for get-items with the user. The user may see this other trading activity on the trading floor. In this scenario, a getter may see different get-items offered by both other users and the market maker.

Figure 65:
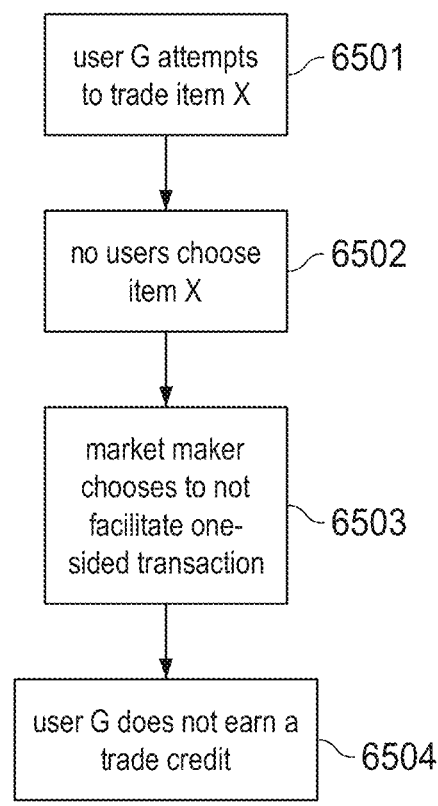
FIG. 65 shows a method illustrating how a user does not earn a trade credit when an item fails to be selected by another user and the market maker declines to facilitate the transaction.

Referring now to the flowchart in FIG. 65, at 6501, the system receives item X to trade from a user G. At 6502, after no users select item X, the system at 6503 is configured to not facilitate a one-sided transaction and at 6504, the user does not earn a trade credit.

Figure 66:
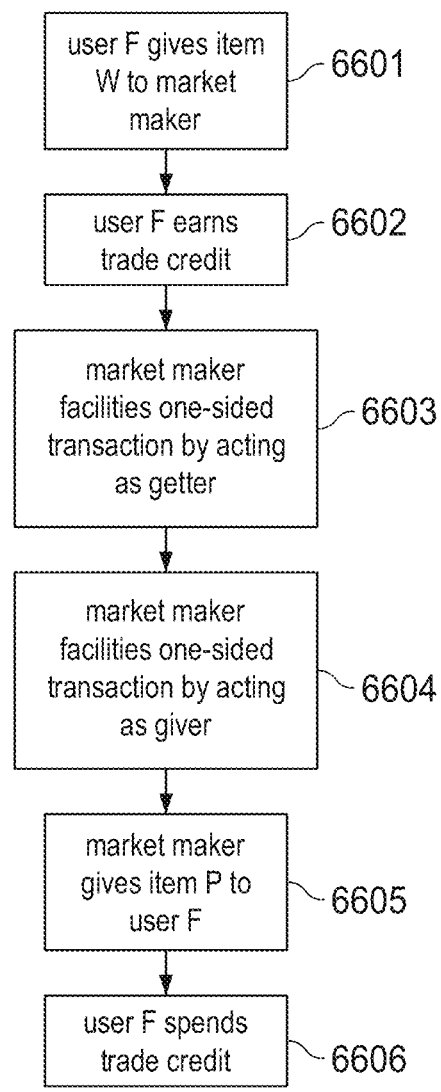
FIG. 66 shows a method illustrating how a user earns a trade credit by giving an item to the market maker and spends the trade credit by selecting a different item from the market maker.

Referring now to the flowchart in FIG. 66, a user F gives item W to the market maker at 6601 and earns a trade credit at 6602. At 6603, the system facilitates a one-sided transaction by acting as a getter. At 6604, the system is configured to facilitate a one-sided transaction by acting as a giver and at 6605 gives item P to user F who receives the item by spending a trade credit at 6606.

In one implementation, the user selecting a get-item may only have partial information about the get-item. For instance, the user might only know the category of a "mystery" get-item, might only know the location of a store supplying a gift certificate (e.g., in a mall), might only see a corner of a picture of the get-item or might only be informed about the popularity of a get-item. In another implementation, the user might be able to immediately trade away (or "flip") a get-item they had just traded for or received. In another implementation, a user might be able to acquire a group of get-items at once (either many of the same get-item, or a mixed lot of get-items.) In other implementations, other reputation and security mechanisms might be used including: social media profile, credit score, number of successful transactions, recommendations from other users, earnest money, credit card holds, escrow, storage and security lockers, tipping, and additional transfer or earning of in game currency. In another implementation, a user can give choose a charitable donation as her get-item, in effect donating her trade credit to the charity.

In another implementation, the user can change the address of the recipient after selecting the get-item such that it will be delivered as a gift to someone else. In other implementations, the user can give her trade credits or powerups to a friend. In another implementation, community is built within the application to discuss strategies, category interests and build local relationships with neighbors. In another embodiment, the swiping interaction to advance sequentially through the item selection queue is replaced with a mouse or trackpad click. In another embodiment, the swiping, powerup and item selection interactions are replaced with voice commands, such as "next", "freeze", "choose", and "confirm." In other embodiments, the user interface for advancing to the next item uses moving animations, automatic disappearance or interactive elements such as catching the item on the screen. In other embodiments, more than one get-item is presented at the same time for selection, but a process of removal from the selection options and/or timed bounded interactions creates exclusivity of the item(s) to be selected.

Other powerups or trading modifications may include: "Notify" where a user tells the system a search term and the application will reserve any relevant get-items for a user's selection queue if the user responds immediately to a notification; "Blast" where a user's social network is notified that the give-item has been listed and is placed into those friends' user selection queues; "Level Up" where the user can select a get-item from the next higher level than the credit that they earned; "Search" where the user can designate a search term while playing, immediately modifying her get-item selection queue to optimize showing get-items containing that search term; "Ideal" where the user can place their give-item in the ideal spot for maximal likelihood of selection by the getter; "Double Dip" where the user can receive two or more get-items from one game session; "Double Up" where the user can combine two lower level trade credits to get a higher level get-item; "Double or Nothing" where the user can buy a multiplier on the in-app currency bonus for a give-item, meaning the faster the give-item is selected, the user earns even more in-app currency; "More Views" where the user can buy more views by potential getters before the give-item is rejected from a level; and "Elite Item" where the user can buy views by only the potential getters who are most likely to pick the give-item or have specified the search term; "On Hold" where the user can reserve a get-item in the item selection queue for an especially extended length of time; "Focus" where the user can restrict get-items in her item selection queue to get-items from only one category; "Do Over" where the user can give up her recently won get-item and replay the game session, either with the same get-item selection queue or a different one; "Pause" where suspension of game play is an optional powerup, rather than part of the core game play experience and the user can suspend the game play indefinitely or for some length of time, either holding or not holding frozen items or the item selection queue; and "Rewind" where the user can view the game session without altering the outcome.

In other embodiments, advertisements, coupons, or links to products for sale could be introduced before, during or after the game session. These advertisements or links could be for the same or related items to those in the game session, could be suggested as related by a machine learning/recommendation system, and/or could be sold as advertisement space to the highest bidding company.

Local Services

In another embodiment, local services could be offered (e.g., hairdressing appointments, golf tee-times, medical appointments, massage appointments, restaurant reservations, and hotel accommodations) by the user first purchasing a credit at a certain price, then choosing one of multiple get-item services using the same unidirectional viewing selection process described herein. Appointment or reservation times could be specified before, during, or after the game session. Levels would group service get-items by similar value, with additional services being added to a core service get-item to bring its value up to a target level. Bidding by vendors, such as restaurant owners, could be used to determine access and placement in user get-item queues. The same powerups described above could be used. Additional powerups could be specific to the kind of services being offered, e.g., a powerup that narrows the get-item selection to a particular type of massage for a spa treatment, or to a particular location for an oil change. As before, a countdown clock turns the selection process into a time-bounded one.

Figure 67:
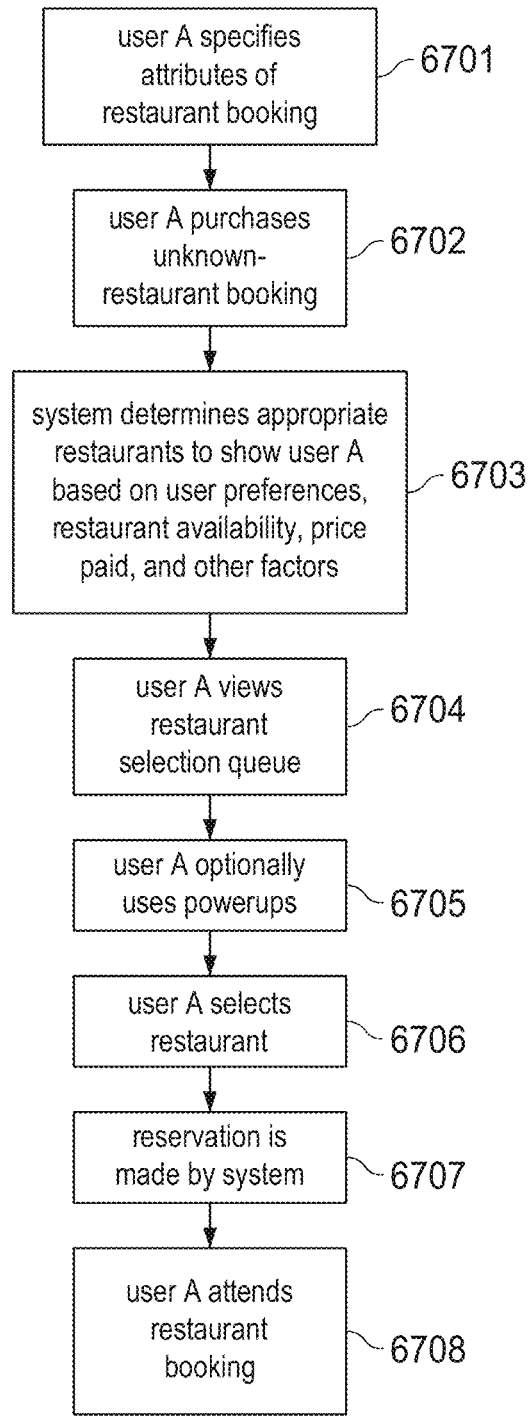
FIG. 67 describes the process for choosing a reservation for an event such as a restaurant reservation.

The flowchart in FIG. 67 illustrates the adaptation of our invention to making restaurant reservations. A user opens an application and first purchases a restaurant voucher for a meal near a certain location on a certain day and time. The user then uses the invention to swipe sequentially through multiple restaurant options before eventually selecting a particular restaurant. Similarly, a user could choose a particular meal at a restaurant or from set of restaurants offered by the marketplace.

Figure 68:
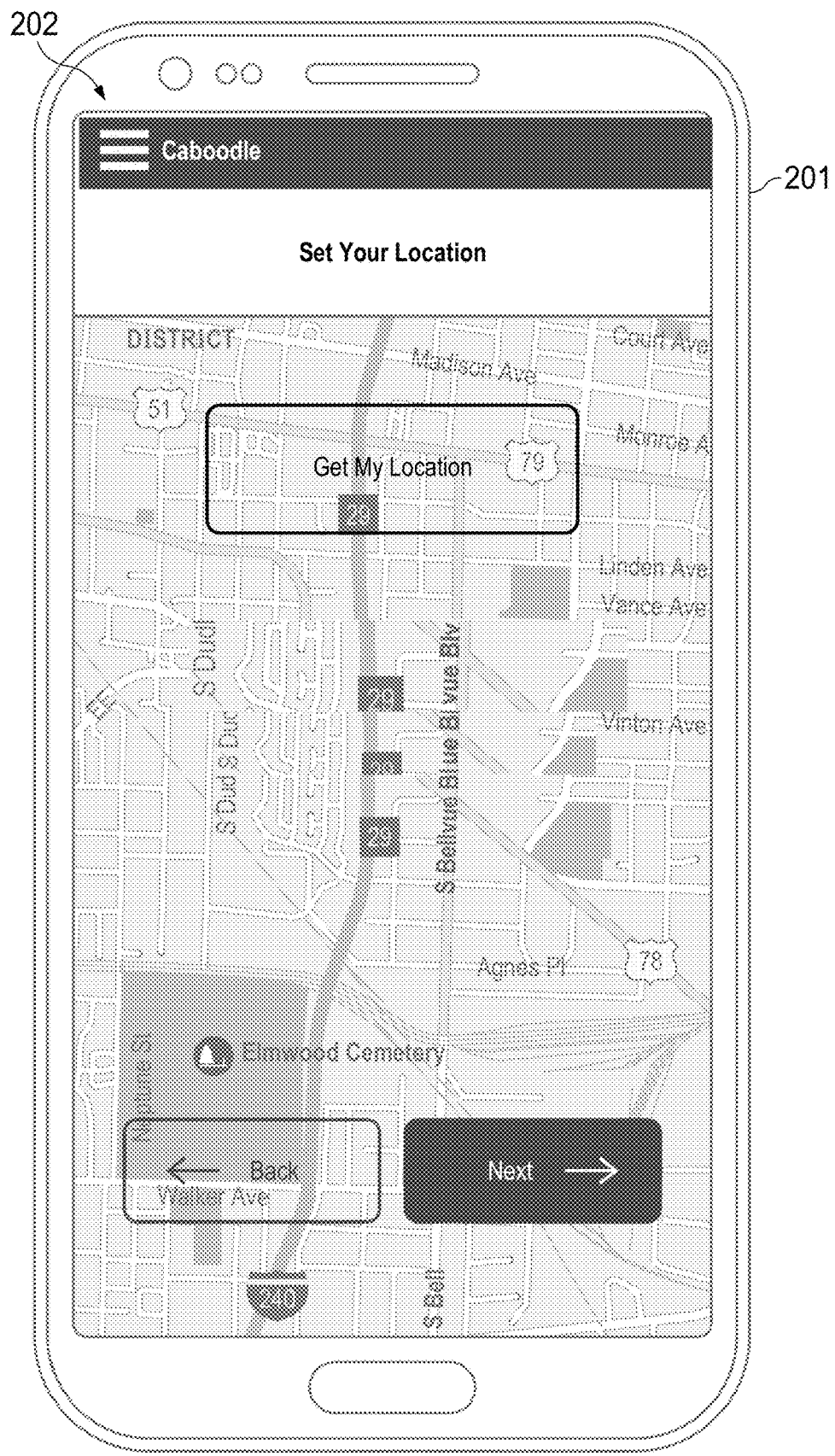
FIG. 68 shows a screenshot of an aspect of an embodiment.
Figure 69:
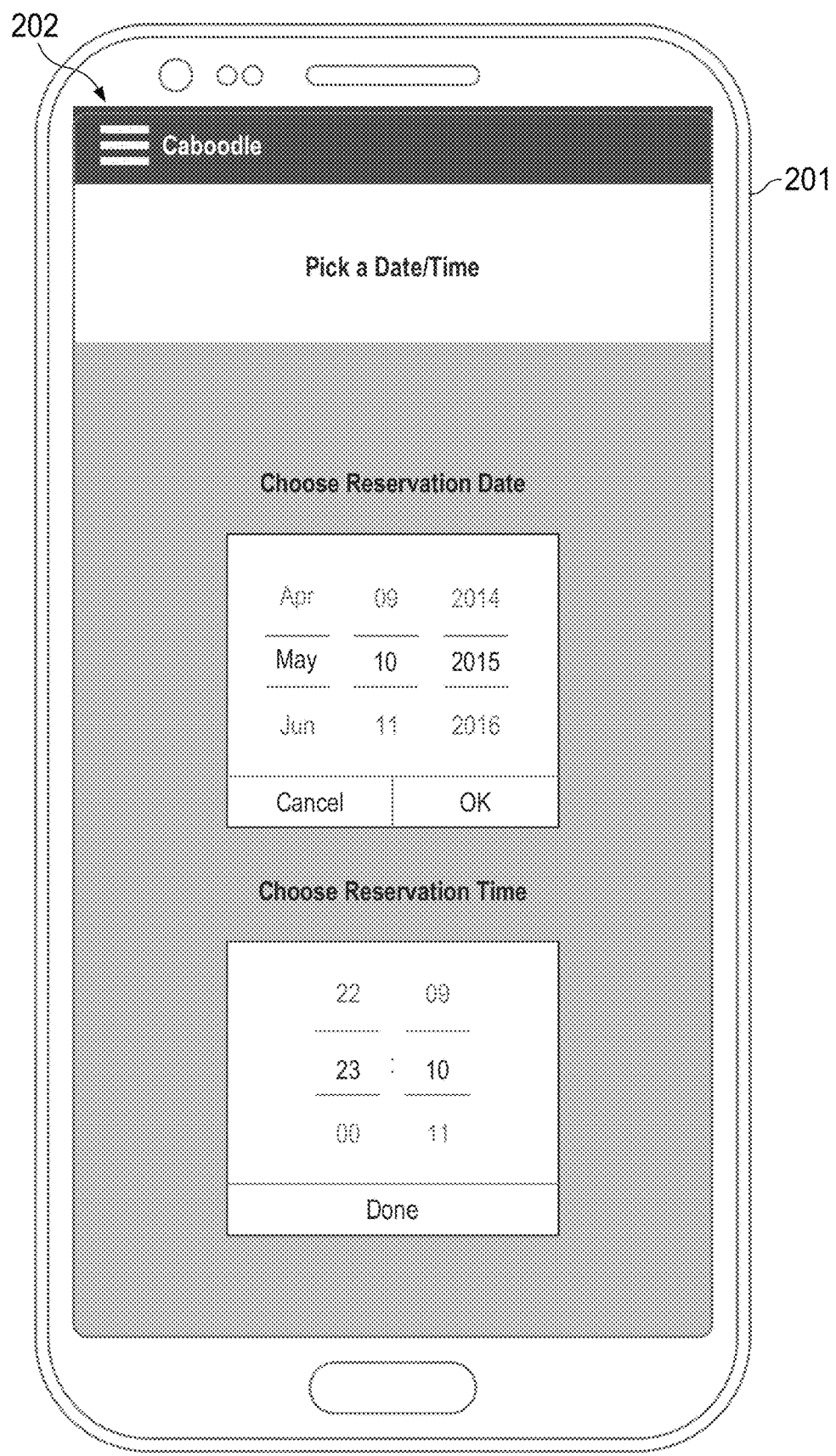
FIG. 69 shows a screenshot of an aspect of an embodiment.
Figure 70:
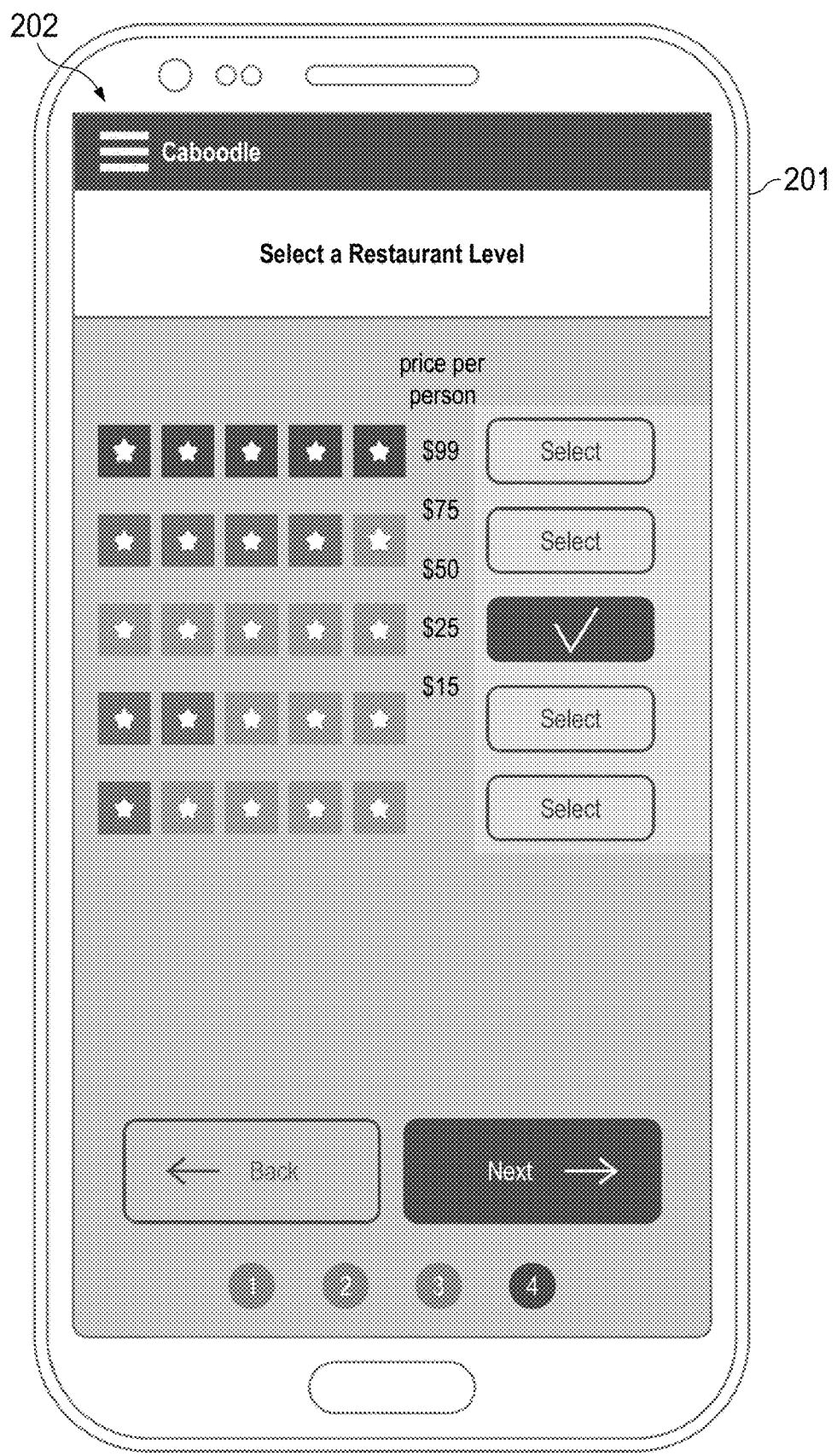
FIG. 70 shows a screenshot of an aspect of an embodiment.

As shown in FIG. 67, at 6701 user A specifies attributes of a restaurant booking which may include, for example, price, quality, and the like. FIG. 68 and FIG. 69 illustrate screen shots of 6701 specifying attributes of a restaurant, such as location and desired time and date. FIG. 70 illustrates a screen shot of 6701 for selecting the attribute of price or level of the restaurant.

Figure 71:
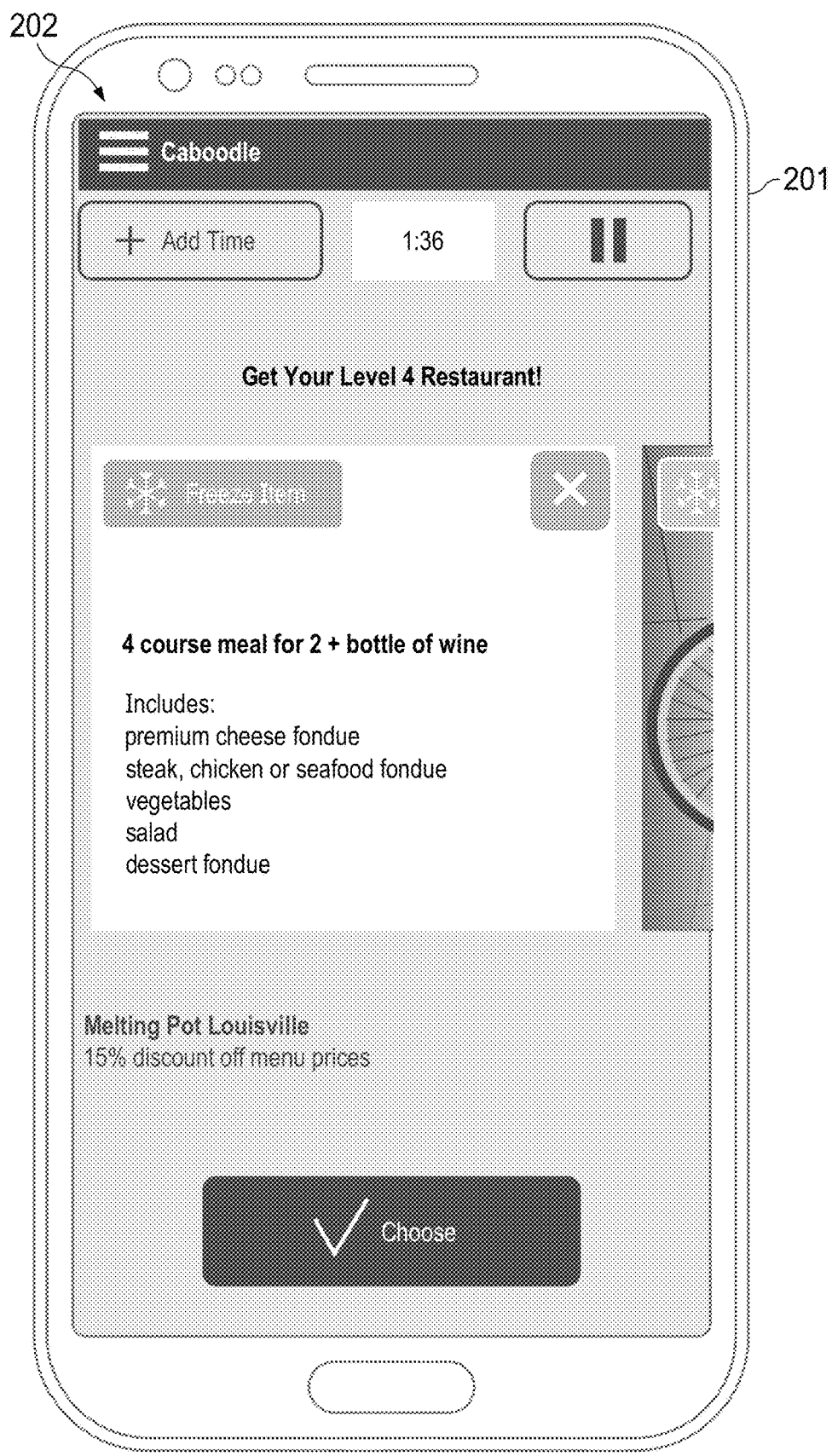
FIG. 71 shows a screenshot of an aspect of an embodiment.

FIG. 71 illustrates a screen shot of step 6706. At 6706, the user may purchase a spot at the unknown restaurant reservation with the selected amenities.

Figure 72:
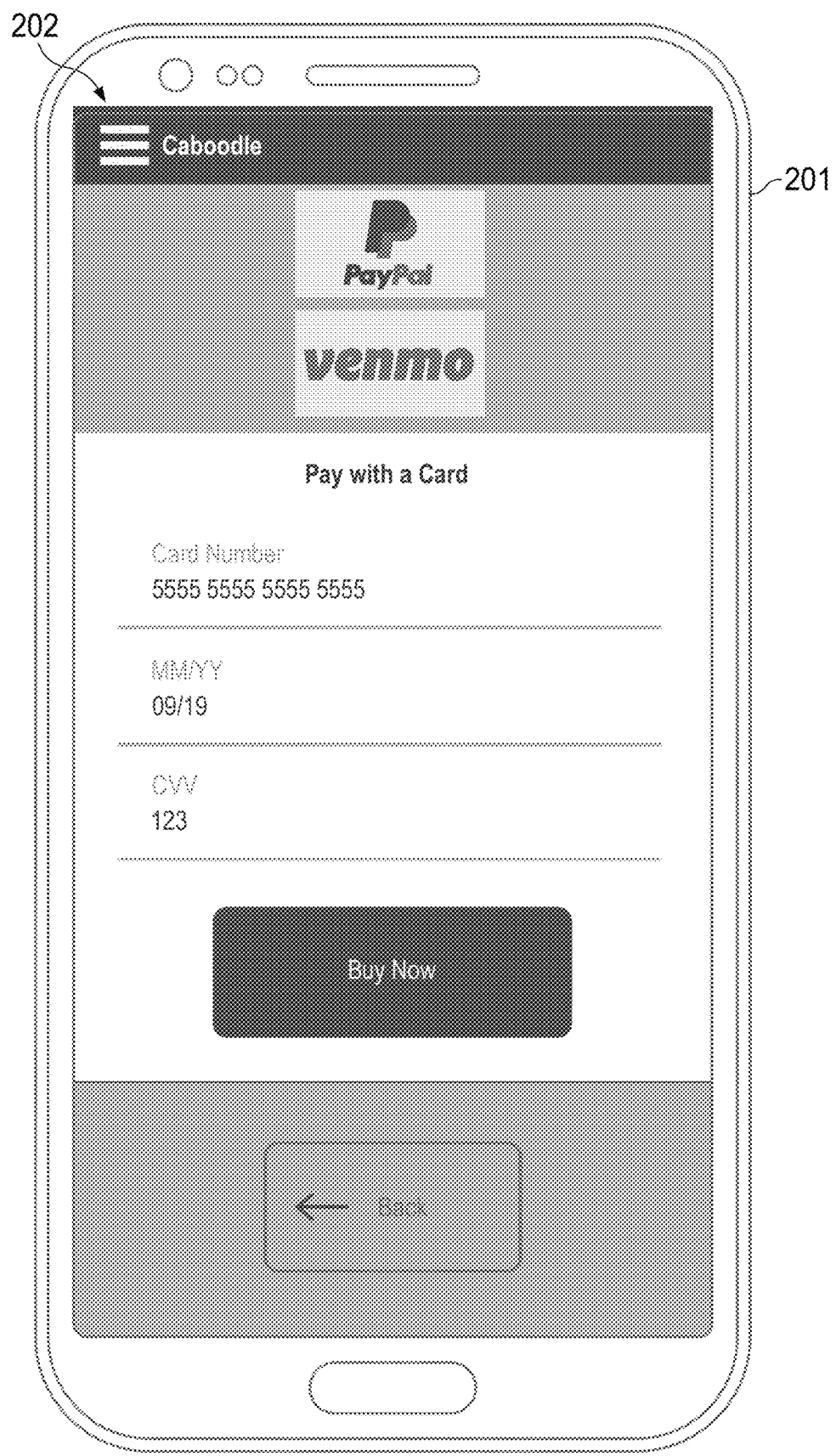
FIG. 72 shows a screenshot of an aspect of an embodiment.
Figure 73:
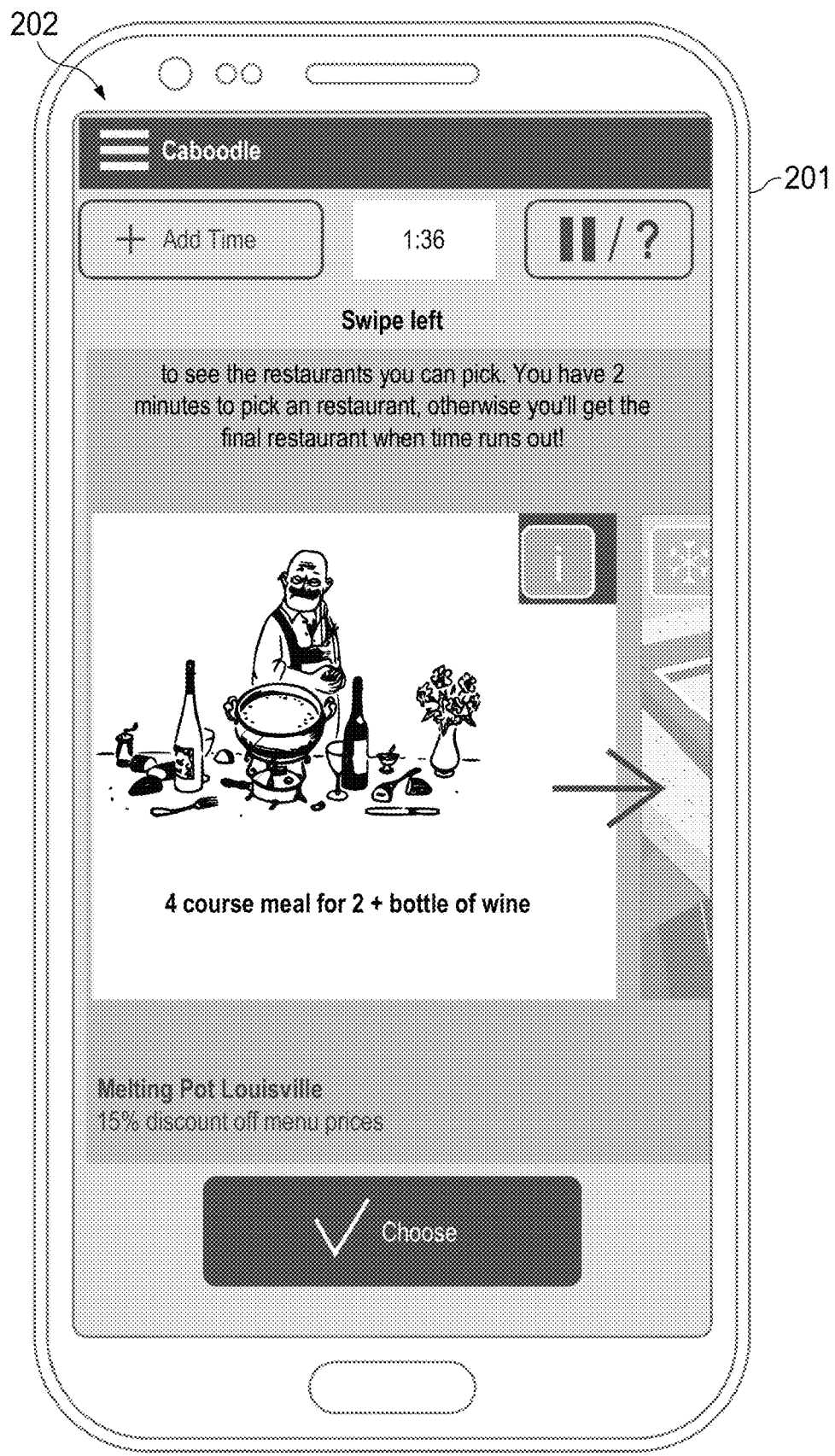
FIG. 73 shows a screenshot of an aspect of an embodiment.

As illustrated in FIG. 72, a payment method of application 6702, may be employed to accept payment. At 6703, a system determines appropriate restaurants to show user A based on user preferences, restaurant availability, price paid, and other factors. At 6704, user A views restaurant selection queue. For example, as illustrated in FIG. 73, the system provides a sequence of restaurants, in a unidirectional flow as described herein, where a clock provides a countdown time limit for selection or to move to the next restaurant selection. In another embodiment, a sequence of meals at various restaurants could be provided, in a unidirectional flow as described herein, where a clock provides a countdown time limit for selection or to move to the next restaurant meal selection.

Figure 74:
FIG. 74 shows a screenshot of an aspect of an embodiment.

At 6705, as described herein with regard to get-items, a user A may use powerups to save the restaurant for future selection, add time, etc. At 6706, the user selects a restaurant and may be given feedback confirmation as show in the screen shot of FIG. 74. At 6707, the user then completes the reservation at 6708 by attending the restaurant.

Figure 75:
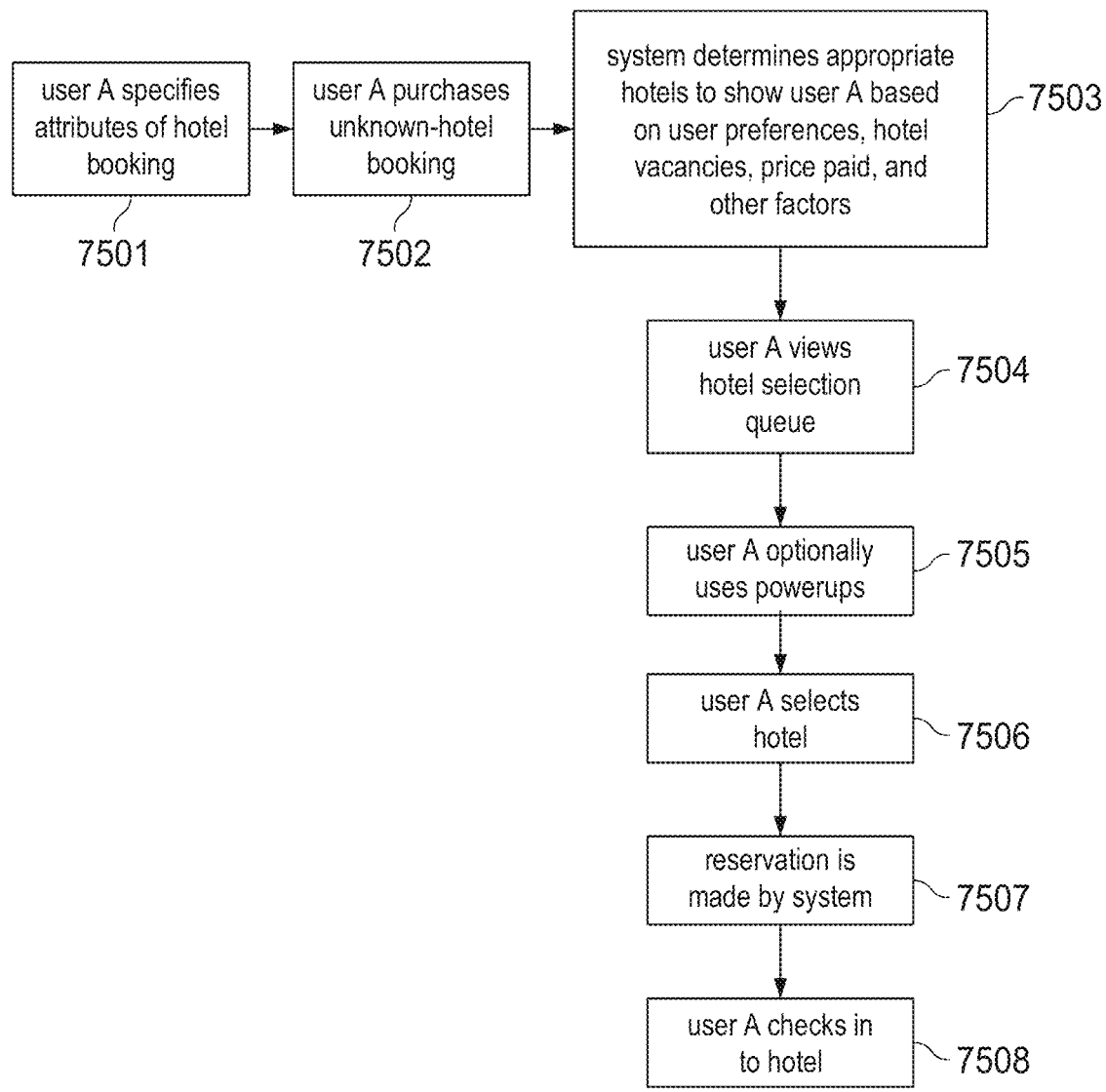
FIG. 75 describes a process for choosing an accommodation, such as a hotel.

The flowchart in FIG. 75 illustrates making hotel reservations using techniques described herein, by inputting location and dates, prepaying, then swiping, for example, unidirectionally until the preferred hotel and room get-item is chosen. Similarly, a vacation package can be purchased where an amount is paid up front, dates are selected, then the system is used to unidirectionally swipe until the preferred vacation location, hotel, and/or airplane package get-item is chosen. Levels could group hotel rooms and vacation packages by similar value. The same powerups described above could be used, with additional powerups specific to hotel accommodations. A countdown clock would turn the hotel or vacation selection process into a time-bounded one.

Figure 76:
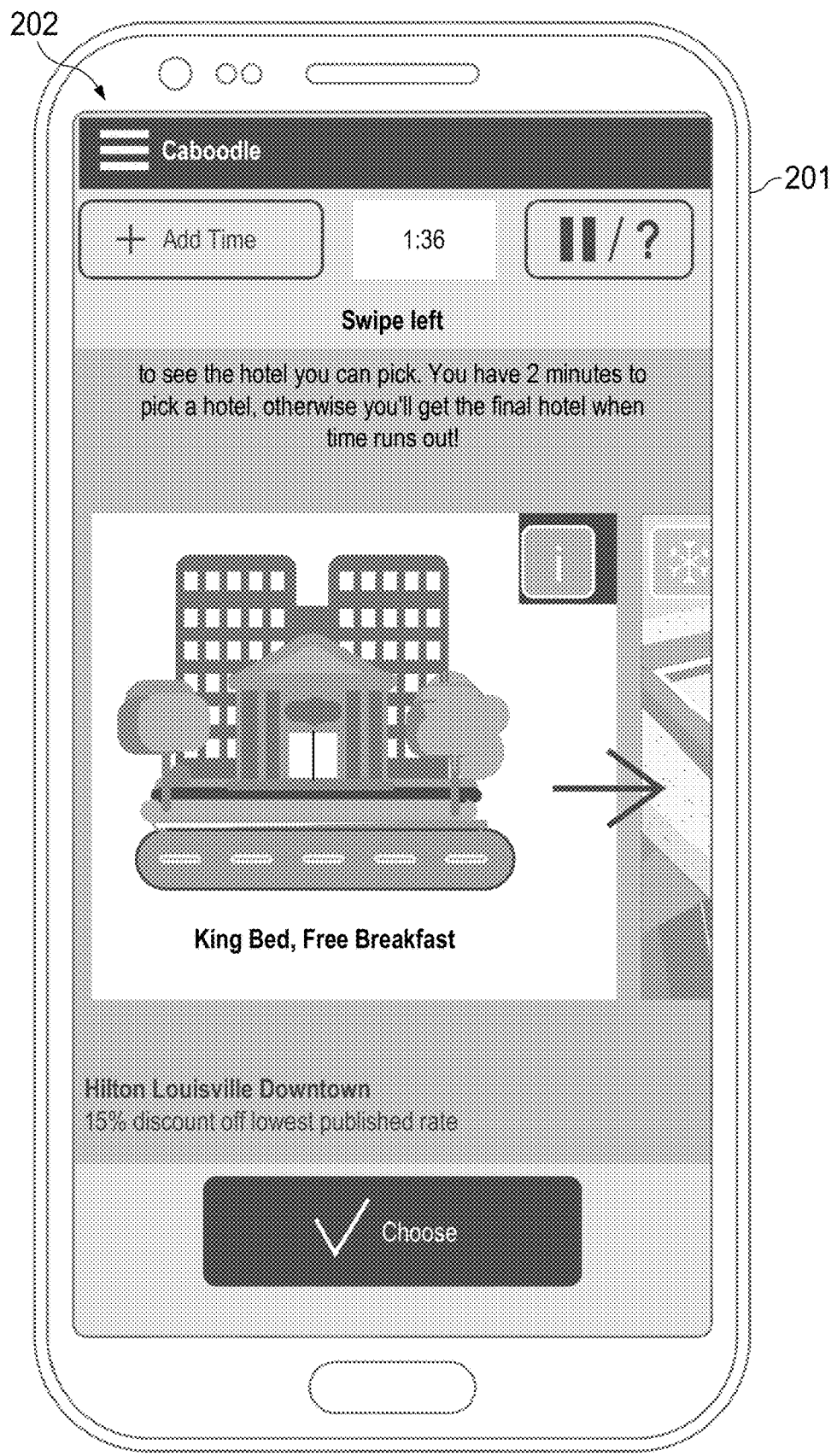
FIG. 76 shows a screenshot of an aspect of an embodiment.

For example, at 7501, user A may set some hotel attributes and at 7502 user A then purchases an unknown hotel booking. At 7503, user A views hotel selection queue. For example, as illustrated in FIG. 76, the system provides a sequence of hotels for example, in a unidirectional flow as described herein, where clock provides a countdown time limit for selection or to move to the next hotel selection. At 7504, as the user looks at each hotel (e.g., accommodation), more information than was provided by the user is shown to the user. The user can either use a powerup 7505 to hold the accommodation or swipe to the next hotel. In some implementations, the next selection may be the same hotel with varied attributes (e.g., more perks), or a new hotel to select from.

Figure 77:
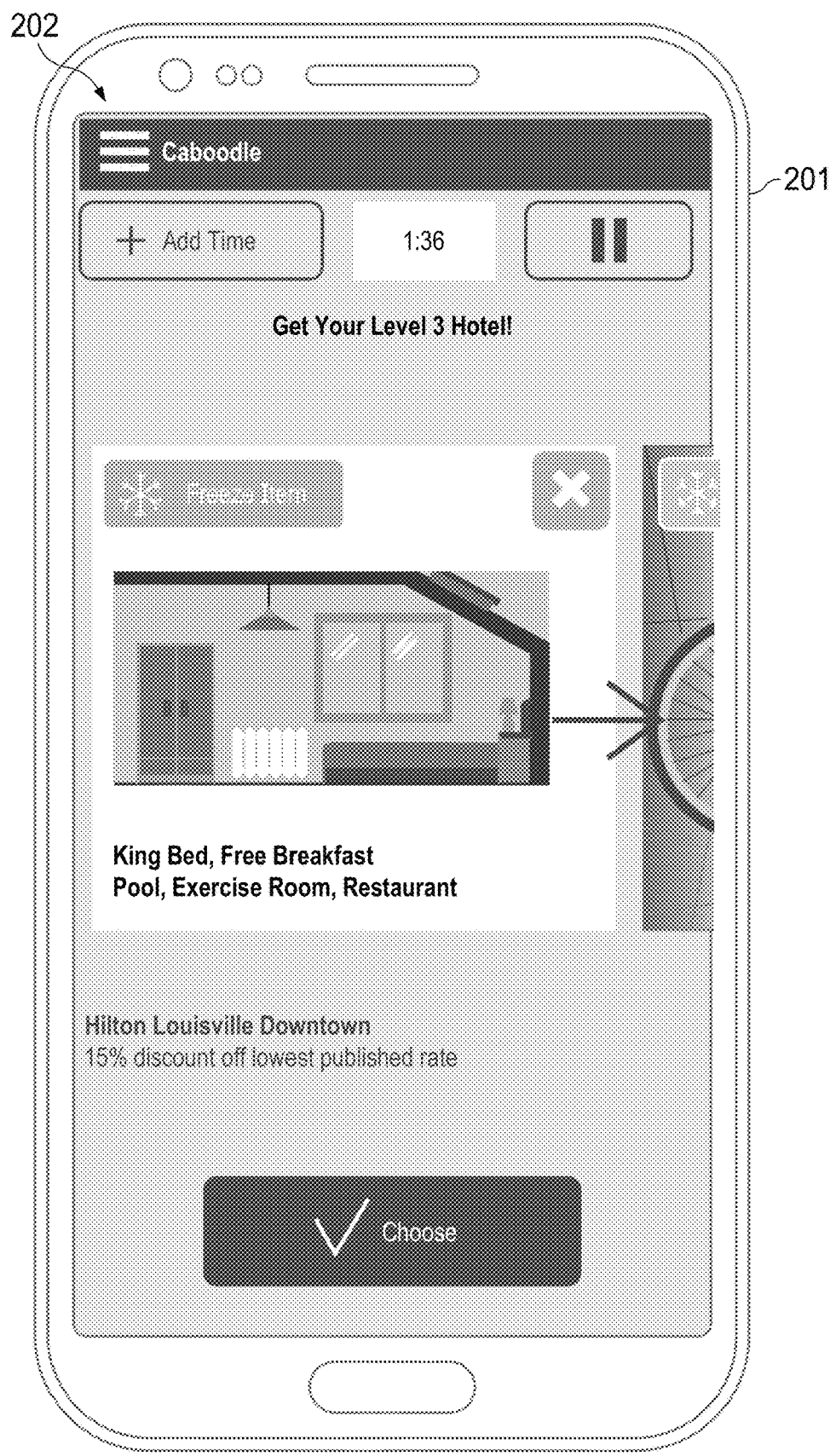
FIG. 77 shows a screenshot of an aspect of an embodiment.

FIG. 77 illustrates how more information about the hotel can inform a user's choice. At 7506, the user selects a hotel. At 7507, the system books the reservation and may provide feedback to confirm the reservation similarly as show in the screen shot of FIG. 74. At 7508, the user then completes the reservation, for example, by checking into the hotel.

Another embodiment of the present disclosure allows a user to perform grocery shopping efficiently and in a cost-efficient manner. In more detail, grocery shopping could be performed by the user first purchasing a credit or subscription at a certain price from a grocer, then repeatedly choosing multiple bundles of grocery items to be home delivered. Bundles are grouped by category. One version of categories could be based on food groups or aisles in the grocery store such as 'proteins', 'fruits', and 'dairy'. Another version of categories could be based on meals or purposes, such as 'breakfasts', 'lunches', 'dinners', 'snacks'. Categories of different types could be presented within the same order. Each bundle contains a set of items. For example, a bundle of fruits might contain apples and oranges. An alternative bundle of fruits might contain bananas and strawberries. In some embodiments, there may be an overlap in certain types of grocery items among the different bundles. For example, a first bundle and a second bundle may both contain apples, even though the remaining items in the rest of the bundles are different. In other embodiments, the grocery items included in each bundle may be mutually exclusive from the grocery items in other bundles.

For each category, different bundles of items are presented using the same unidirectional viewing selection process described herein. Thus, at the end of the shopping experience, the user will have selected one bundle from each category, and the user will have a full 'basket' of weekly groceries. The same powerups described above could be used in this embodiment. Additional powerups could be specific to grocery shopping. For example, a powerup that can be exchanged for a free additional bundle of items could be unlocked by making sufficiently healthy bundle selections. In some embodiments, a countdown clock turns the selection process into a time-bounded one. In other words, the user will have a limited amount of time (e.g., specified by the countdown clock) to select the grocery bundle. Once the limited amount of time expires, the user may end up selecting one of the grocery bundles by default in the manner similar to that discussed above. Thus, the invention has the advantages to the user of price, convenience, time spent, and (optionally) healthy eating.

The bundles are specified by the grocer so that they match the category descriptor assigned to them, are worth a target value, satisfy dietary requirements or preferences, optionally meet certain healthy-eating goals, include items that the grocer is trying to sell quickly (e.g., items approaching their sell-by dates), etc. Because the grocer specifies which items are included in the bundles and because there are a finite set of bundles available for selection by the user, the grocer can attain cost and operational efficiencies that can be optionally passed on to the consumer via lower prices.

Figure 79:
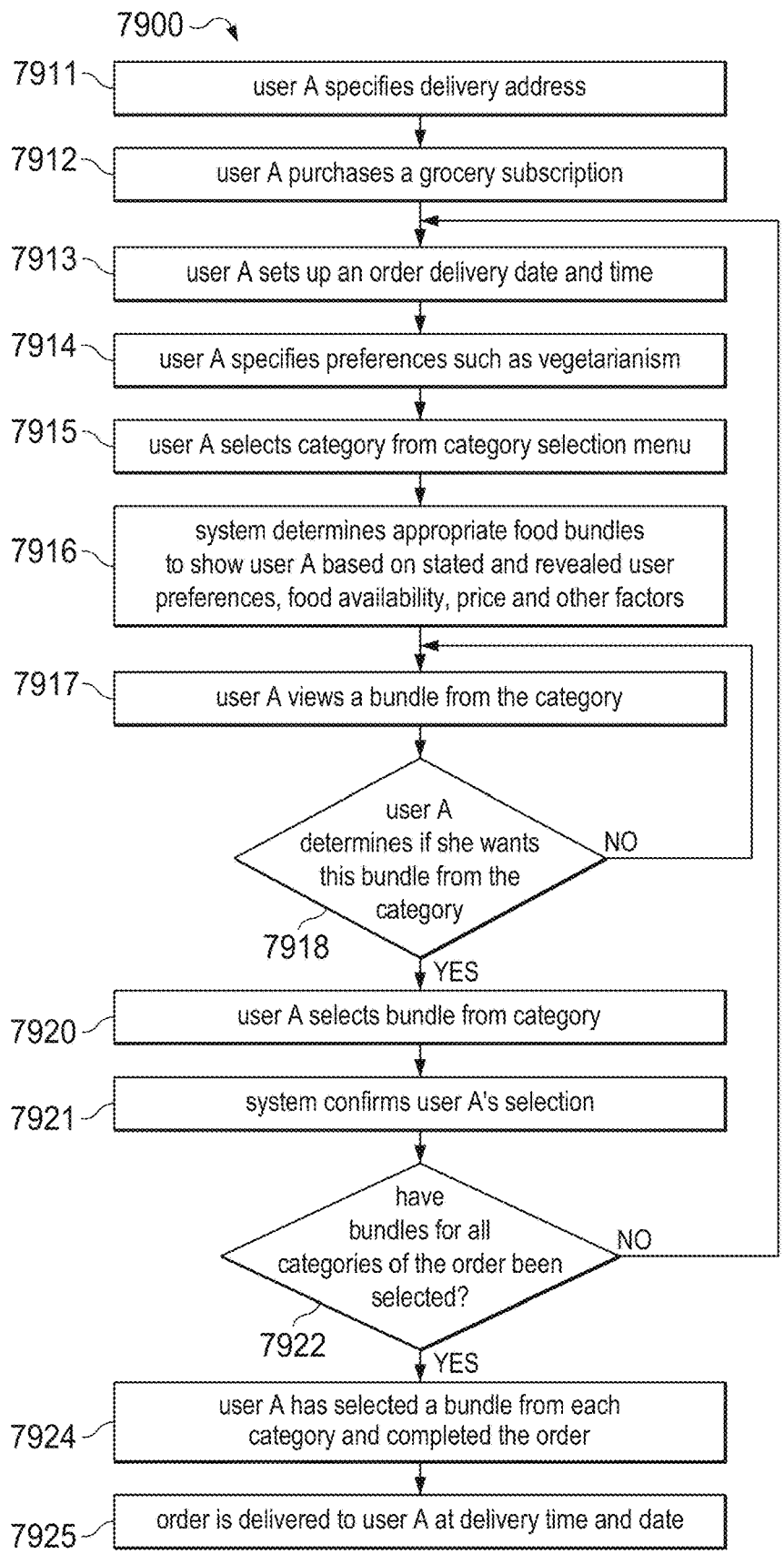
FIG. 79 illustrates a flowchart of a method for performing a bundled grocery shopping process according to embodiments of the present disclosure.
Figure 80:
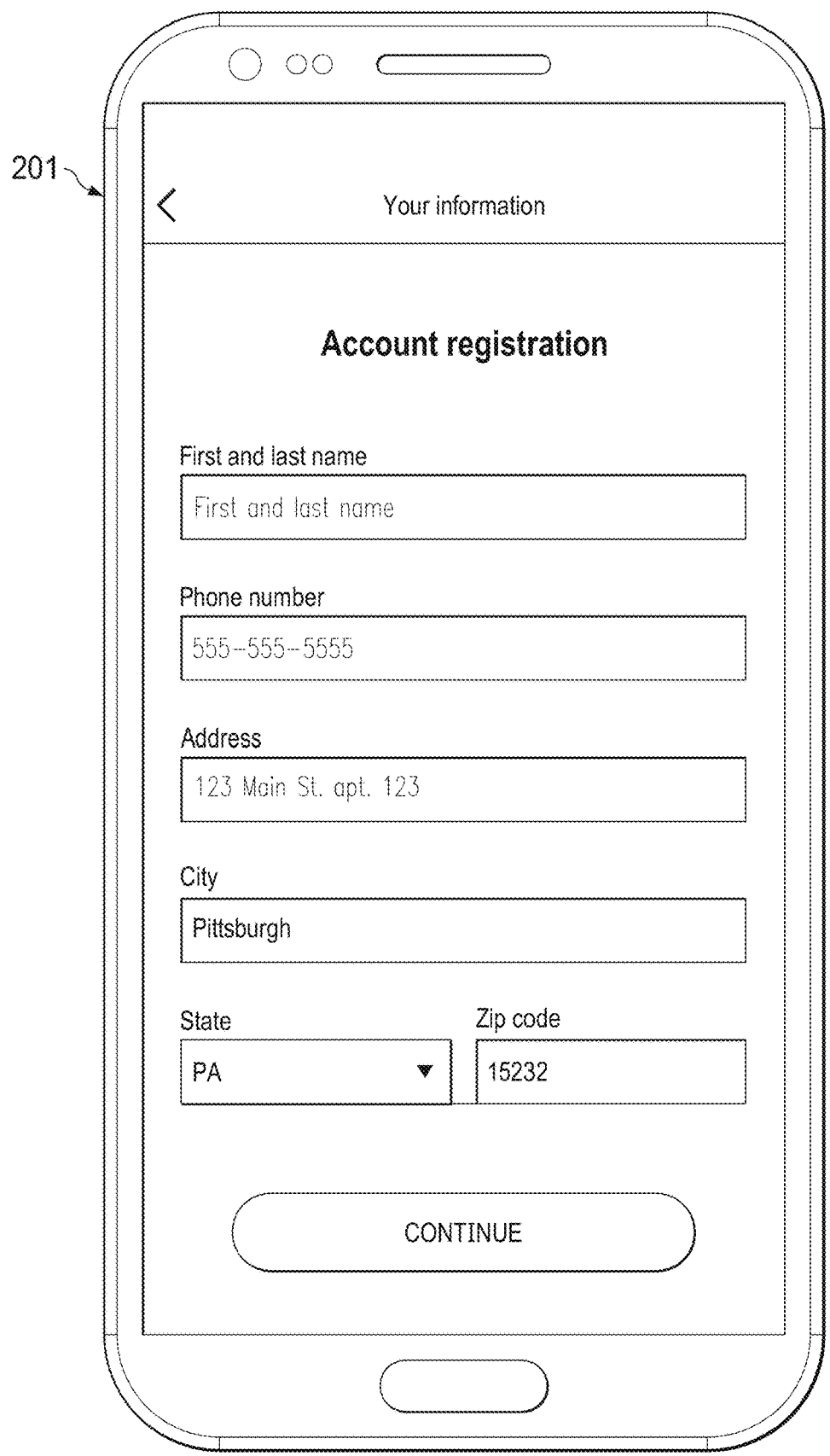
FIG. 80 shows a screenshot of an aspect of an embodiment.

FIG. 79 illustrates a flowchart illustrating a method 7900 of performing such a grocery shopping process according to an embodiment of the present disclosure. In more detail, at a step 7911 of the method 7900, a user opens an application (e.g., a mobile application executing on a mobile device such as an APPLE™ IPHONE™ or another suitable smartphone or tablet computer) and first registers with the service. As a part of the registration, the step 7911 allows the user to specify his/her delivery address for the groceries. FIG. 80 illustrates a screenshot of a part of a user interface of the mobile application executing on the mobile device 201 corresponding to the step 7911 according to an example embodiment. The user interface illustrated in FIG. 80 indicates the various data fields required for the account registration of the user, which includes "First and last name", "Phone number", "Address", "City", "State", and "Zip code", as non-limiting examples of the various data fields. The user may be able to specify a delivery address for the grocery items via user input into these data fields. When the user is finished with specifying the delivery address, he/she may press the "Continue" button to proceed to a next screen of the user interface of the mobile application.

Figure 81:
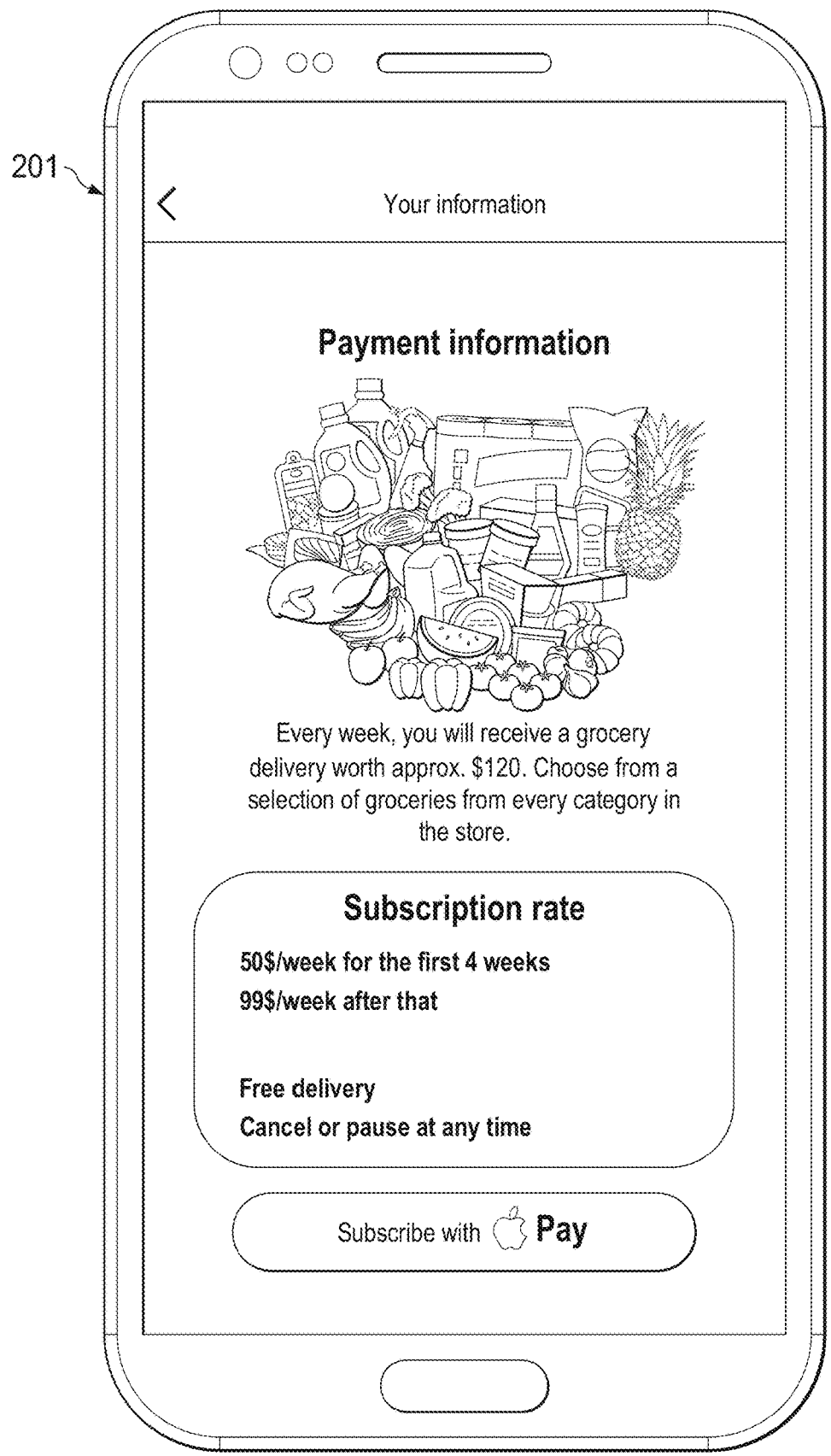
FIG. 81 shows a screenshot of an aspect of an embodiment.

Referring back to FIG. 79, at a step 7912 of the method 7900, the user may purchase a subscription to the grocery-shopping service. FIG. 81 illustrates a screenshot of a part of the user interface of the mobile application executing on the mobile device 201 corresponding to the step 7912 according to an example embodiment. The user interface shown in FIG. 81 may display the text "Payment information", a standard image of groceries, as well as text that states "Every week, you will receive a grocery delivery worth approx $120. Choose from a selection of groceries from every category in the store." The user interface shown in FIG. 81 may also display a text box of "Subscription rate", which may specify that the subscription service will cost "$50/week for the first 4 weeks" and "$99/week after that". The text box may also state "Free delivery" to let the user know that the delivery of the groceries is free of charge and that the user may "Cancel or pause at any time" to cancel or pause the subscription service. The user interface of FIG. 81 may also let the user choose a payment method, for example, via a clickable button "Subscribe with Apple Pay".

Figure 82:
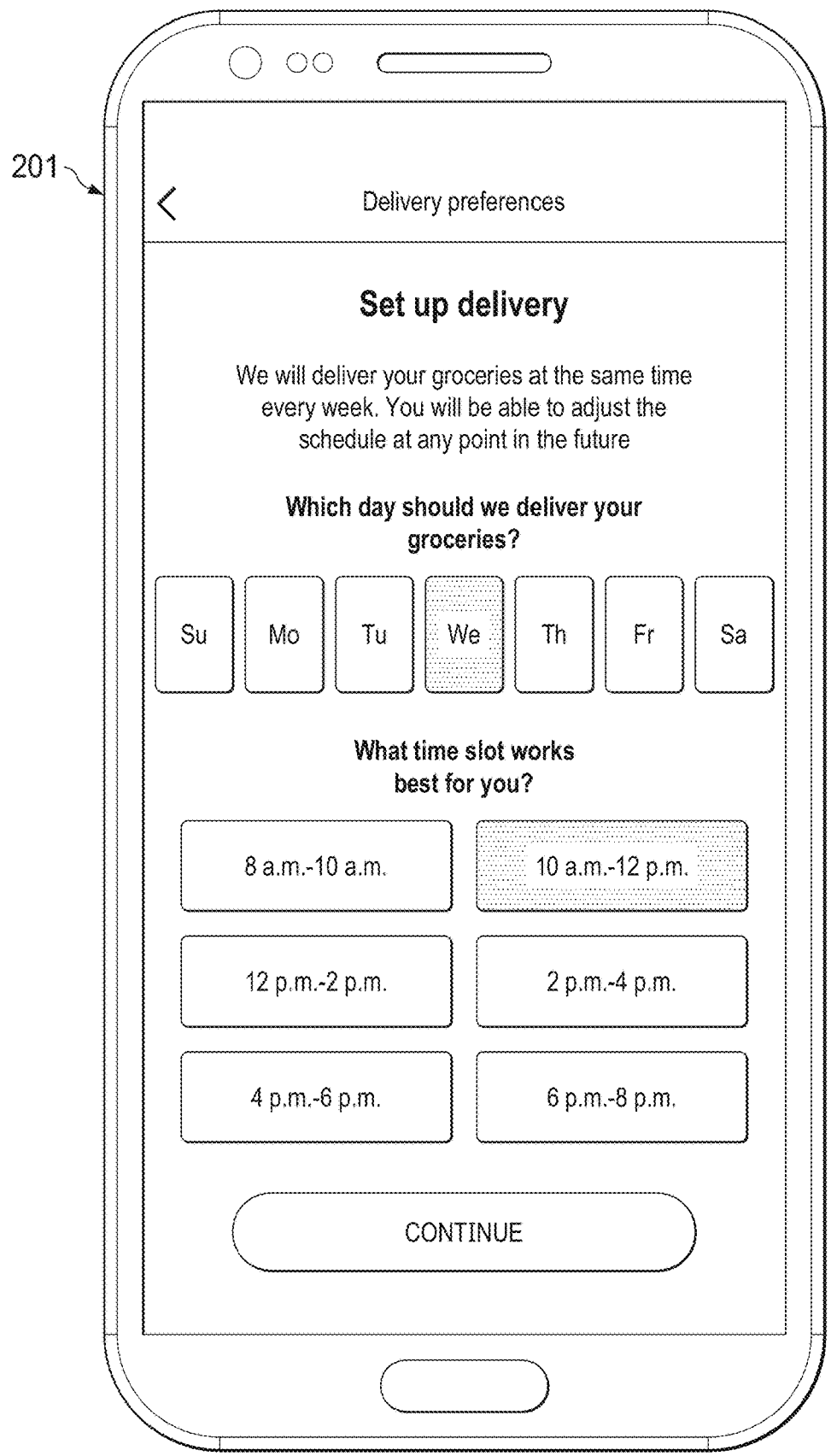
FIG. 82 shows a screenshot of an aspect of an embodiment.

Referring back to FIG. 79, at a step 7913 of the method 7900, the user may set up an order delivery date and time for the grocery-shopping service. FIG. 82 illustrates a screenshot of a part of the user interface of the mobile application executing on the mobile device 201 corresponding to the step 7913 according to an example embodiment. The user interface shown in FIG. 82 may display a menu of "Delivery Preferences", which states a heading "Set up delivery", and an explanation that "We will deliver your groceries at the same time every week. You will be able to adjust the schedule at any point in the future." The user interface may also ask the user "Which day should we deliver your groceries?" Below this question, the user interface may display a set of buttons "Su", "Mo", "Tu", "We", "Th", "Fr", and "Sa", which correspond with Sunday, Monday, Tuesday, Wednesday, Thursday, Friday, and Saturday, respectively. In the illustrated embodiment, the user has selected Wednesday, which is demonstrated by the fact that the button "We" is highlighted. As such, the groceries will be delivered to the user every Wednesday of the week. The user interface may also ask the user "What time slot works best for you?" Below this question, the user interface may display a list of buttons that correspond to time slots "8 a.m.-10 a.m.", "10 a.m.-12 p.m.", "12 p.m.-2 p.m.", "2 p.m.-4 p.m.", "4 p.m.-6 p.m.", and "6 p.m.-8 p.m.", respectively. In the illustrated embodiment, the user has selected the time slot of 10 a.m.-12 p.m., which is demonstrated by the fact that the button "10 a.m.-12 p.m." is highlighted. As such, the groceries will be delivered to the user every Wednesday of the week between 10 a.m. and 12 p.m. The user interface may then click on the button "Continue" to proceed to the next portion of the user interface.

Figure 83:
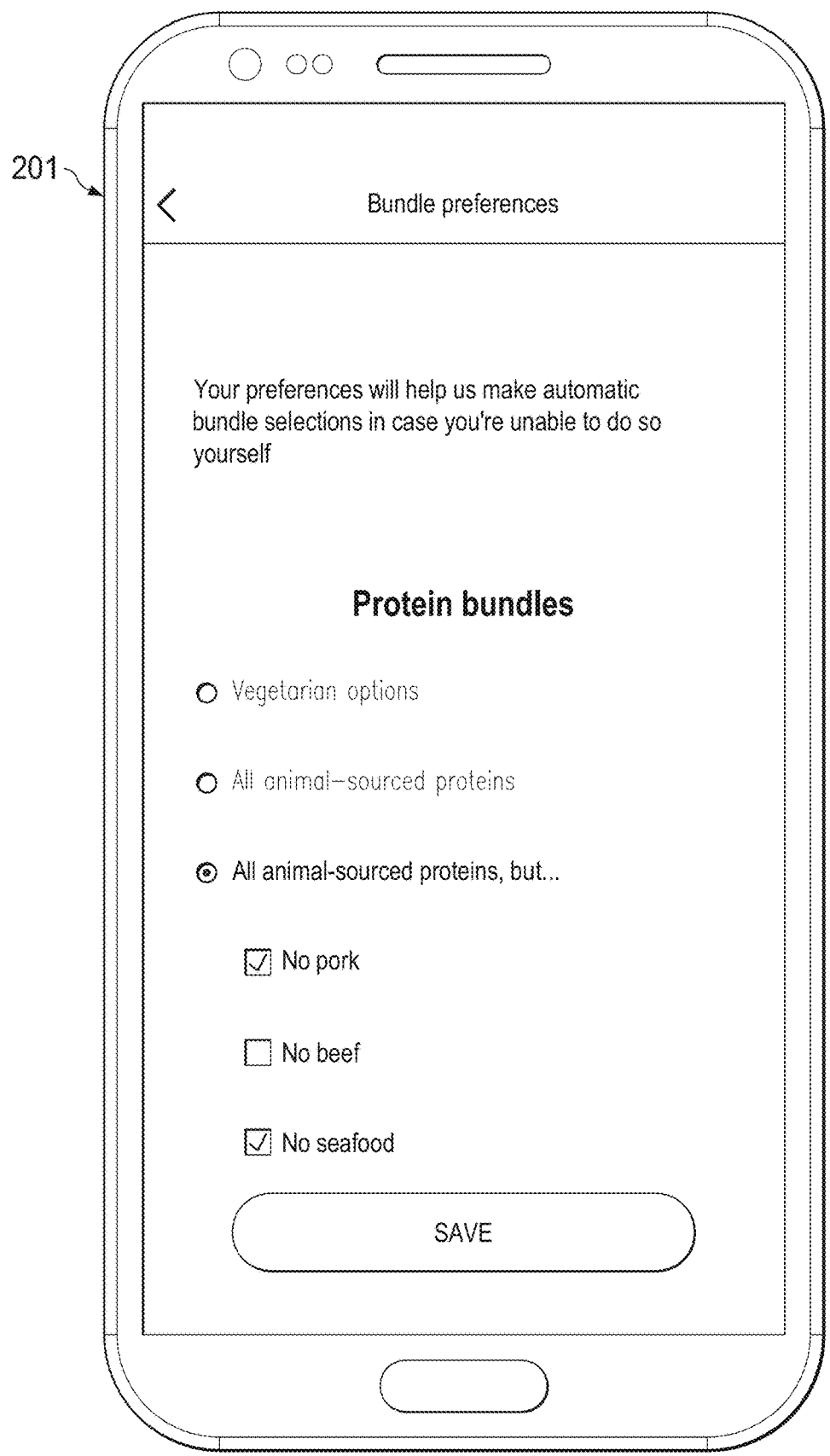
FIG. 83 shows a screenshot of an aspect of an embodiment.

Referring back to FIG. 79, at a step 7914 of the method 7900, the user may indicate a dietary requirement or preference for the grocery-shopping service, such as vegetarianism. FIG. 83 illustrates a screenshot of a part of the user interface of the mobile application executing on the mobile device 201 corresponding to the step 7914 according to an example embodiment. The user interface shown in FIG. 83 may display a menu of "Bundle preferences", which includes an explanation of "Your preference will help us make automatic bundle selections in case you're unable to do so yourself." The user interface may also display a heading of "Protein bundles", below which are three choices "Vegetarian options", "All animal-sourced proteins", and "Animal-sourced proteins, but". The first two choices are grayed-out after the user has selected the third choice of "Animal-sourced proteins, but", which then also allows check-boxes of "No pork", "No beef", and "No seafood" to be displayed. The user has selected the checkboxes "No pork" and "No seafood" to indicate his/her dietary preference. It is understood that other appropriate checkboxes may also be display under the choice "Vegetarian options" and/or "All animal-sourced proteins". The user interface may also display a "Save" button that allows the user to save his/her selected dietary preferences.

Figure 84:
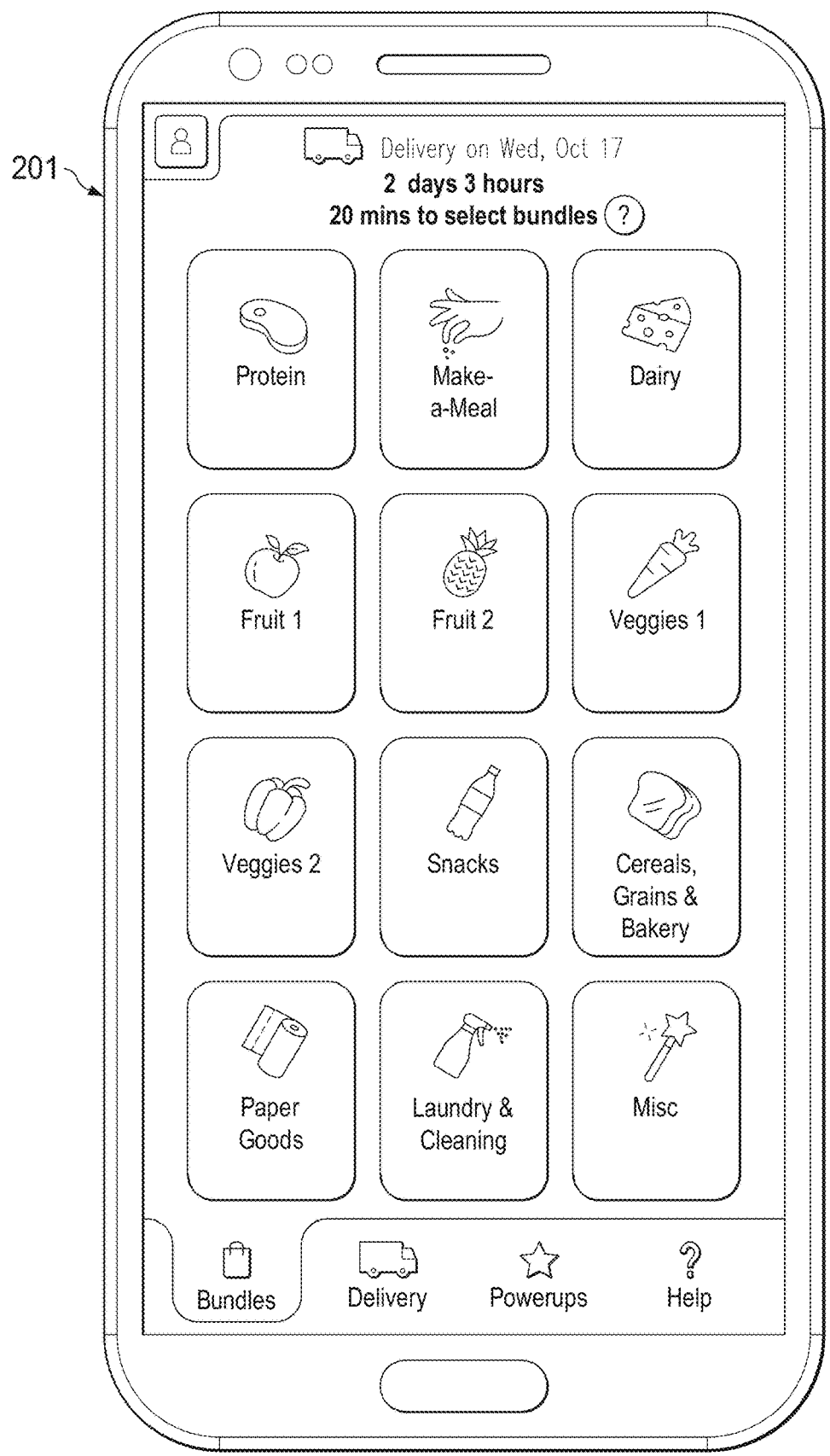
FIG. 84 shows a screenshot of an aspect of an embodiment.

Referring back to FIG. 79, at a step 7915 of the method 7900, the user may select a category from a category selection menu for the grocery-shopping service. FIG. 84 illustrates a screenshot of a part of the user interface of the mobile application executing on the mobile device 201 corresponding to the step 7915 according to an example embodiment. The user interface shown in FIG. 84 may display a notification of the date of the delivery, which in this case is "Delivery on Wed, Oct. 17." The user interface may also display a message to let the user know how much time he/she has to select the bundles for the upcoming week's order, which in this case is "2 days 3 hours 20 minutes to select bundles." The user interface may also display a grid of graphical icons, each of which indicates a type of grocery item. In the non-limiting embodiment shown in FIG. 84, the icons include "Protein", "Make-a-Meal", "Dairy", "Fruit 1", "Fruit 2", "Veggies 1", "Veggies 2", "Snacks", "Cereals, Grains & Bakery", "Paper Goods", "Laundry & Cleaning", and "Misc". Each of these icons may be clicked by the user to select the type(s) of groceries to be included in the grocery bundle for the next batch of the grocery delivery. Also displayed at the bottom of the user interface is a menu of navigational icons "Bundles", "Delivery", "Powerups", and "Help". These navigational icons may allow the user to quickly navigate to a particular set of screens of the user interface. Here, the navigational icon "Bundles" is highlighted, which indicates the user is at one of the user interface screens that pertains to choosing the upcoming grocery bundles.

Referring back to FIG. 79, at a step 7916 of the method 7900, the system (e.g., the server or the entity running the backend of the mobile application) may determine the appropriate food bundles to the user and/or the order in which the food bundles are to be presented. The determination may be based on the stated and revealed user preferences, food availability, price and other factors. In some embodiments, such a determination may take into account the dietary restrictions expressed by the user at the step 7914, the costs of the bundles, and previous choices made by the user in the mobile application. In some embodiments, the system may also use Machine Learning or other artificial intelligence and/or statistical methods to make its determination.

Figure 85:
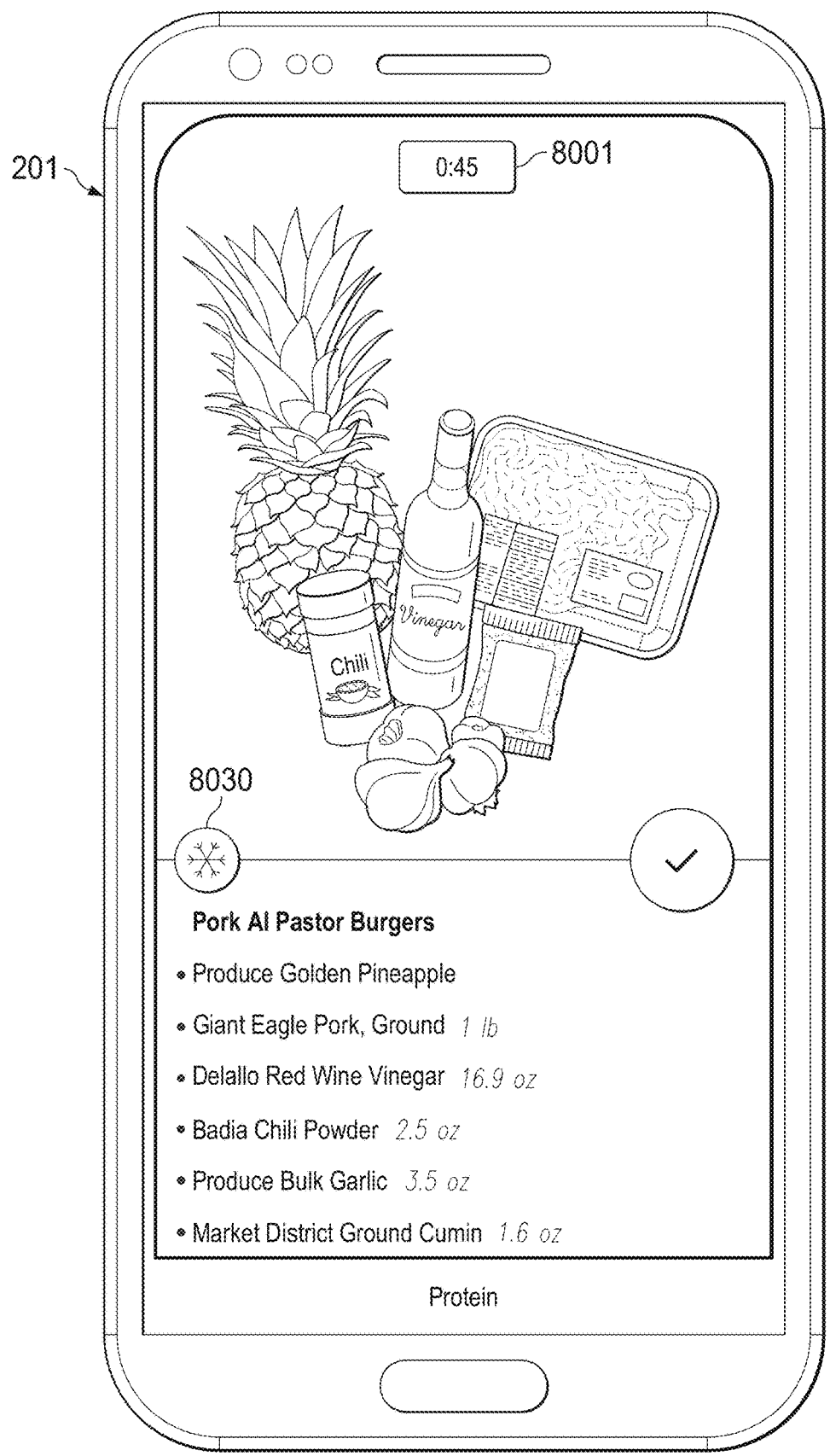
FIG. 85 shows a screenshot of an aspect of an embodiment.

Once the system has determined in the step 7916 which bundles to present and in which order the bundles should be presented, it presents the bundles to the user via the mobile application discussed above. In a step 7917 of the method 7900, the user views a bundle from the category, and in a step 7918 of the method 7900, the user determines if he/she wants the presented bundle from the category. If the user decides to reject the presented bundle in step 7918, the method 7900 returns back to step 7917, in which a new grocery bundle determined by the system is presented to the user again. The steps 7917 and 7918 may be performed using the same unidirectional viewing selection process described herein, subject to a countdown clock. The user interface screenshots of such a viewing selection process are illustrated via FIGS. 85-86. Specifically, the user interface illustrated in FIG. 85 may display an image of a grocery bundle (determined by the system according to step 7916), the names of the foods included in such a bundle, and a title, descriptor, or recipe corresponding to the bundle. As non-limiting examples, the grocery bundle shown in FIG. 85 includes a title of "Pork Al Pastor Burgers"; and individual bundle items: "Produce Golden Pineapple", "Giant Eagle Pork, Ground 1 lb", "Delallo Red Wine Vinegar 16.9 oz", "Badia Chili Powder 2.5 oz", "Produce Bulk Garlic 3.5 oz", and "Market District Ground Cumin 1.6 oz". The user may reject this presented bundle by swiping his/her finger on the user interface in a predefined unidirectional manner, which may be a left direction in some embodiments, or may be a right direction in some other embodiments. Note that the user interface displays a timer or a countdown clock 8001 to let the user know how much time the user has to select a bundle in the category.

Figure 86:
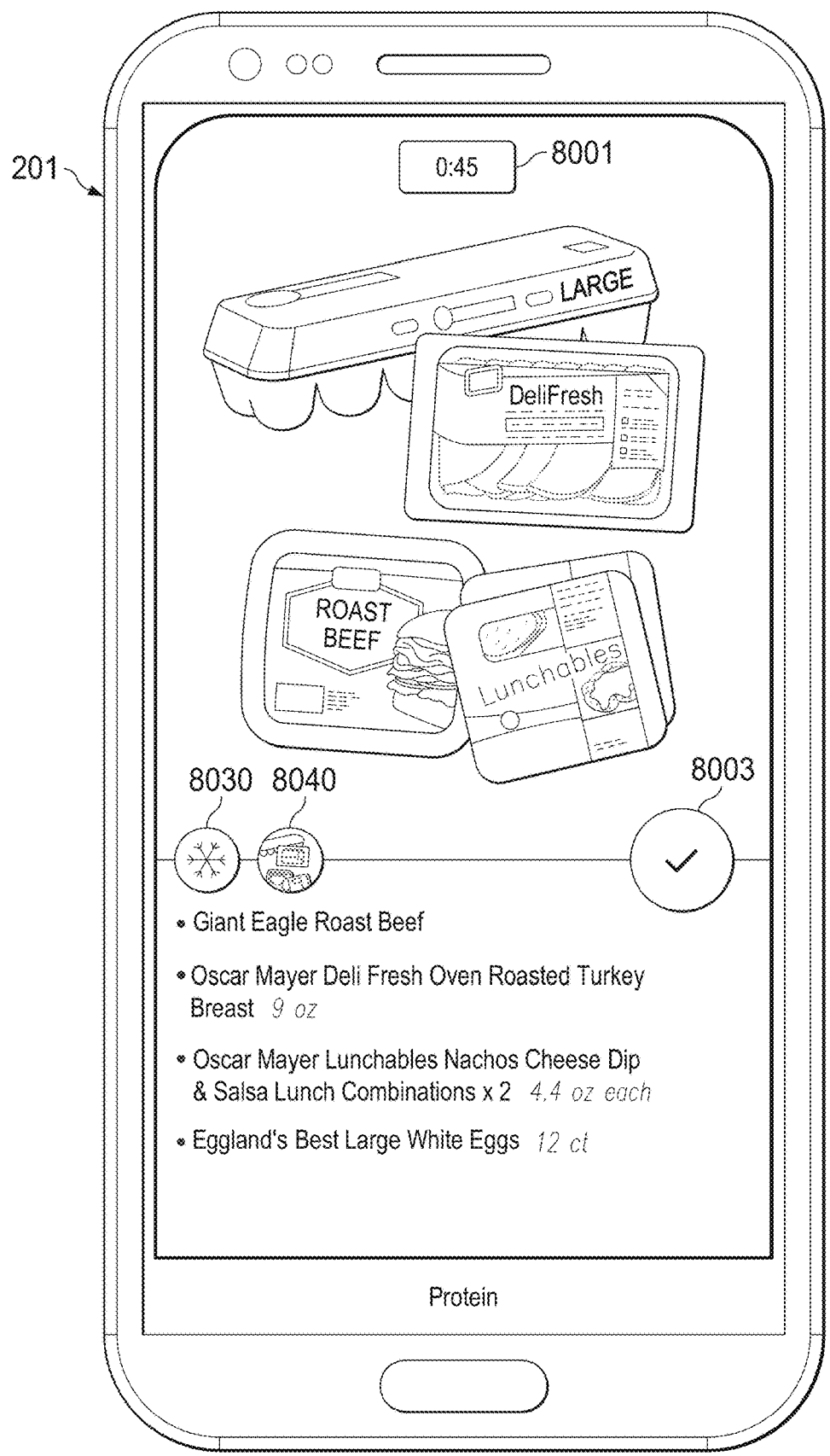
FIG. 86 shows a screenshot of an aspect of an embodiment.

The user may also accept a presented grocery bundle by clicking on a checkmark button 8003, as shown in the user interface presented in FIG. 86. In this case, the accepted grocery bundle includes the items "Giant Eagle Roast Beef 1 lb", "Oscar Mayer Deli Fresh Oven Roasted Turkey Breast 9 oz", "Oscar Mayer Lunchables Nachos Cheese Dip & Salsa Lunch Combinations×2 4.4 oz each", "Eggland's Best Large White Eggs 12 ct". The user interface may also indicate to the user that these items belong the category of "Protein".

Figure 87:
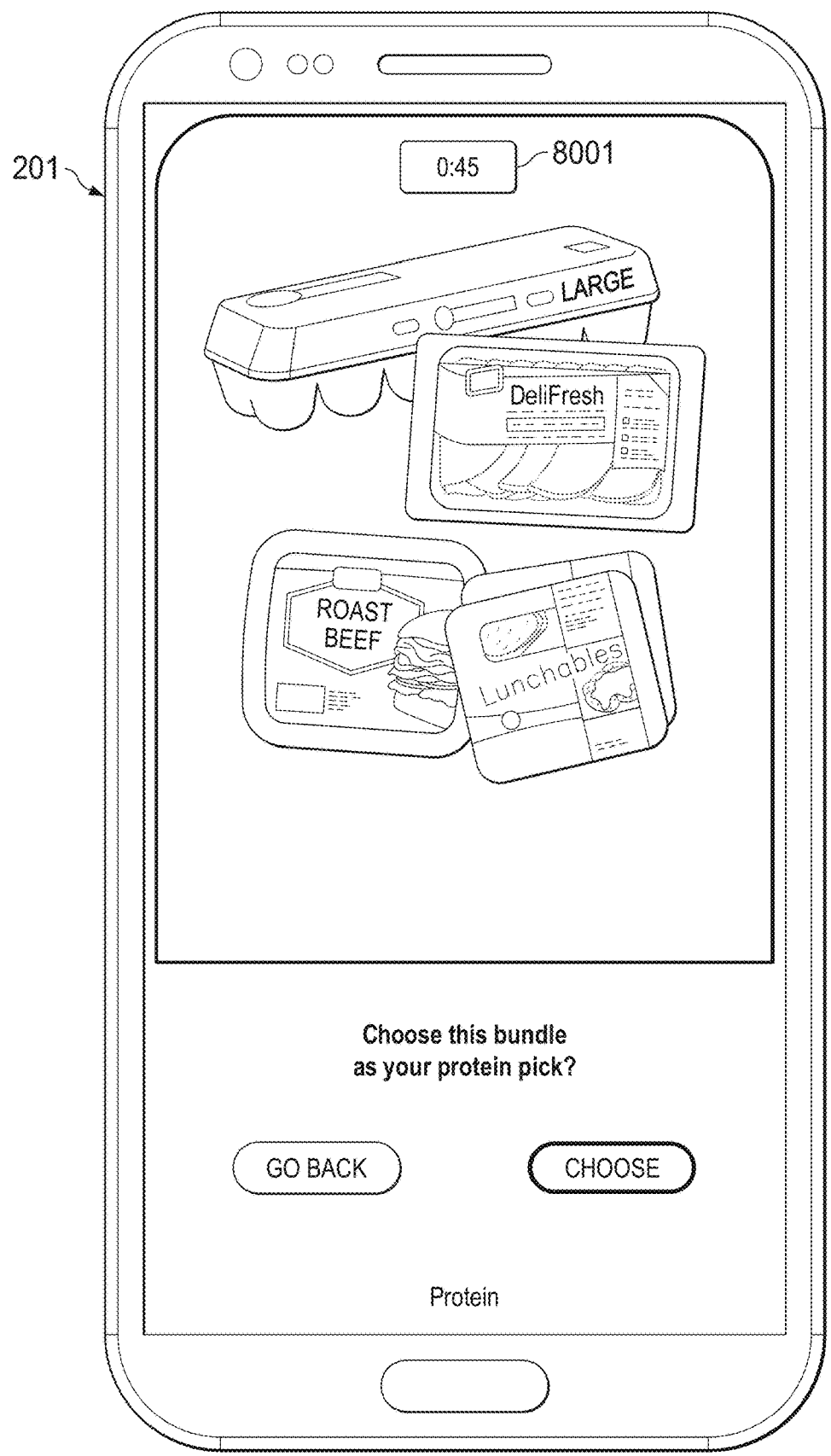
FIG. 87 shows a screenshot of an aspect of an embodiment.

Referring back to FIG. 79, once the user has reached step 7920 of the method 7900, he/she has successfully selected a bundle from the presented category either intentionally, or by default if the countdown clock runs out. The system may attempt to confirm the selection at step 7921, for example, via the user interface illustrated in FIG. 87 according to an embodiment. The user interface may ask the user a question of "Choose this bundle as your protein pick?" The user may click on a button "CHOOSE" to confirm the selection, or another button "GO BACK" to reject the selection and to go back to the bundle selection user interface screens again. Note that multiple categories may be presented to the user, for example sequentially in some embodiments, or non-sequentially in other embodiments. The user performs pick-or-pass selection of a single bundle of grocery get-items from each category.

Figure 88:
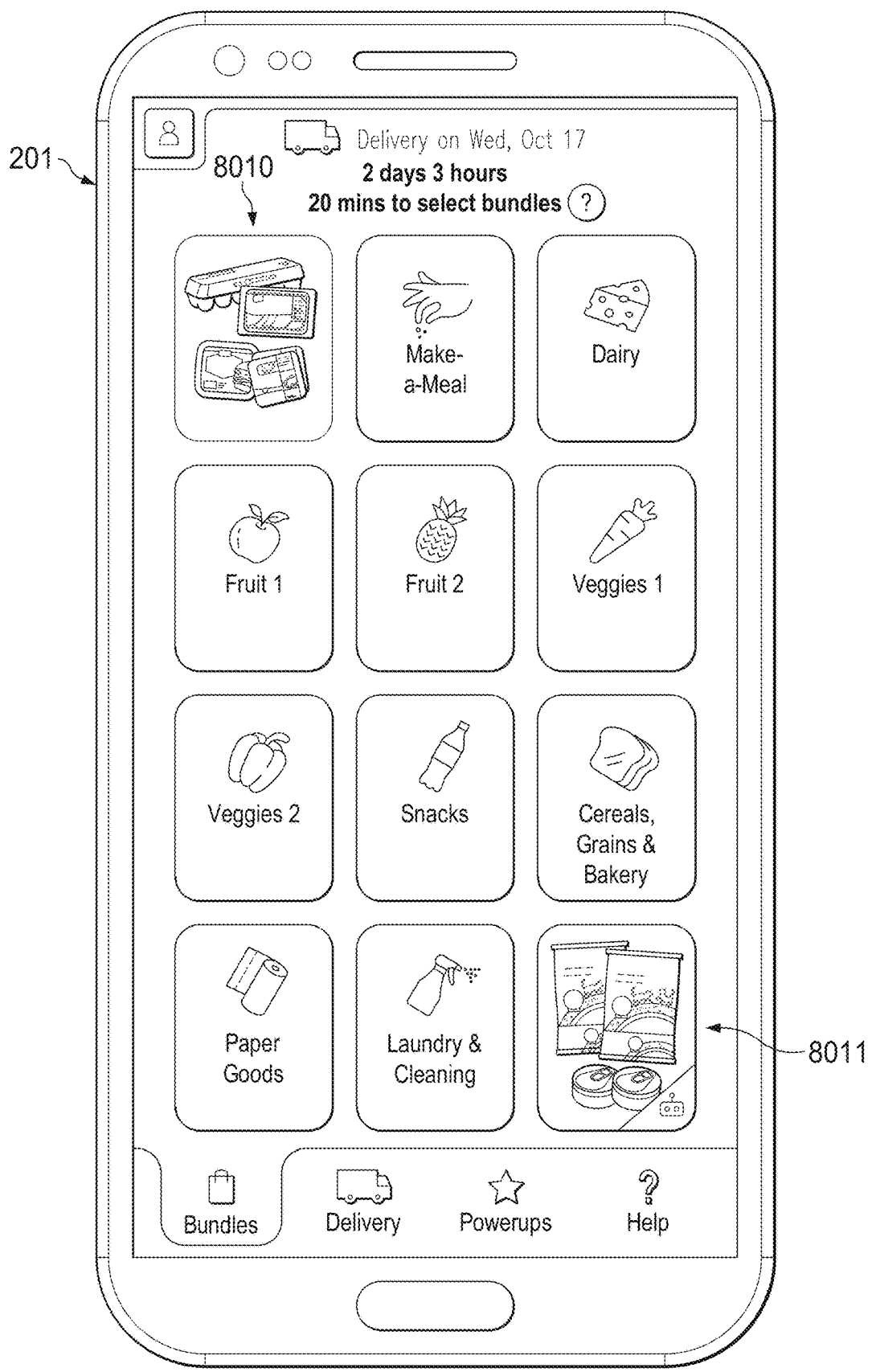
FIG. 88 shows a screenshot of an aspect of an embodiment.

Referring back to FIG. 79, the system determines at a decision step 7922 whether the user has selected the bundles for all categories of the order. If the answer is no, then the method 7900 loops back to step 7915, where the user selects a category of groceries from the category selection menu again. For example, as shown in the user interface screenshot of FIG. 88, the previous bundle selections made by the user are reflected or updated in the grid of grocery icons. In this non-limiting example shown in FIG. 88, the categories "Protein" and "Misc" have already been selected by the user, and their corresponding icons 8010 and 8011 are visually updated with actual graphical images of the grocery items included in the user-selected bundle. Meanwhile, the icons whose corresponding categories have yet to be selected by the user remain mostly "empty", in the sense that they merely include a textual description of the category and a crude sketch of the category, but not actual graphical images of the grocery items (since none has been selected by the user).

Figure 89:
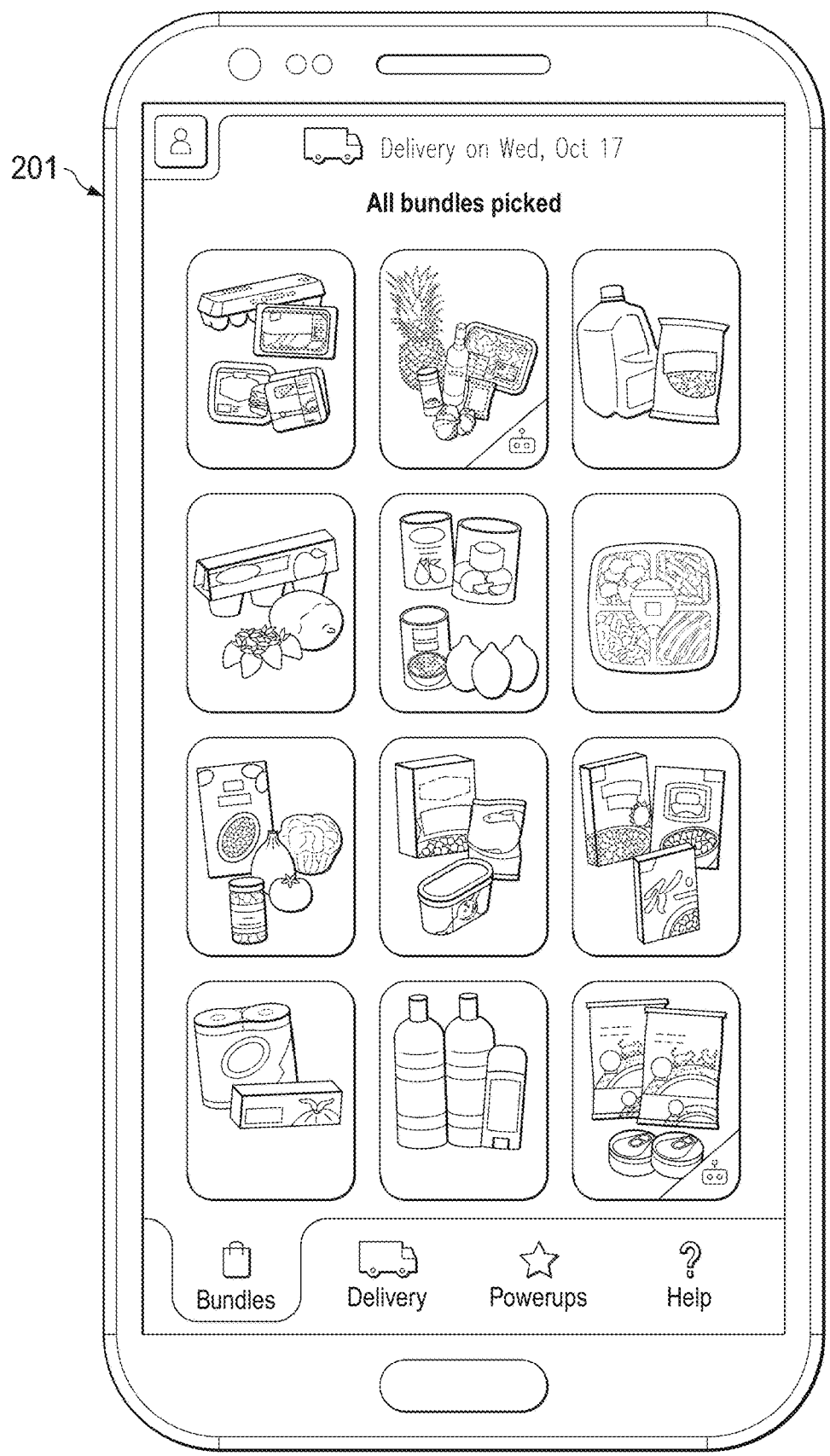
FIG. 89 shows a screenshot of an aspect of an embodiment.

Referring back to FIG. 79, if the answer from the decision step 7922 is yes, then the method 7900 proceeds to step 7924 to confirm that the user has selected a bundle from each category and completed the order. The mobile application may display a user interface screenshot of FIG. 89 as a non-limiting example, where a confirmation message "All bundles picked" and a delivery message of "Delivery on Wed, Oct. 17" are displayed, as well as an updated grid of grocery category icons, where each icon has been updated with the actual graphical images of the grocery items picked by the user.

Referring back to FIG. 79, the method 7900 is completed at step 7925, where the grocery order (i.e., the user-selected grocery bundle) is delivered to the user at the user-specified delivery time and date.

Figure 90:
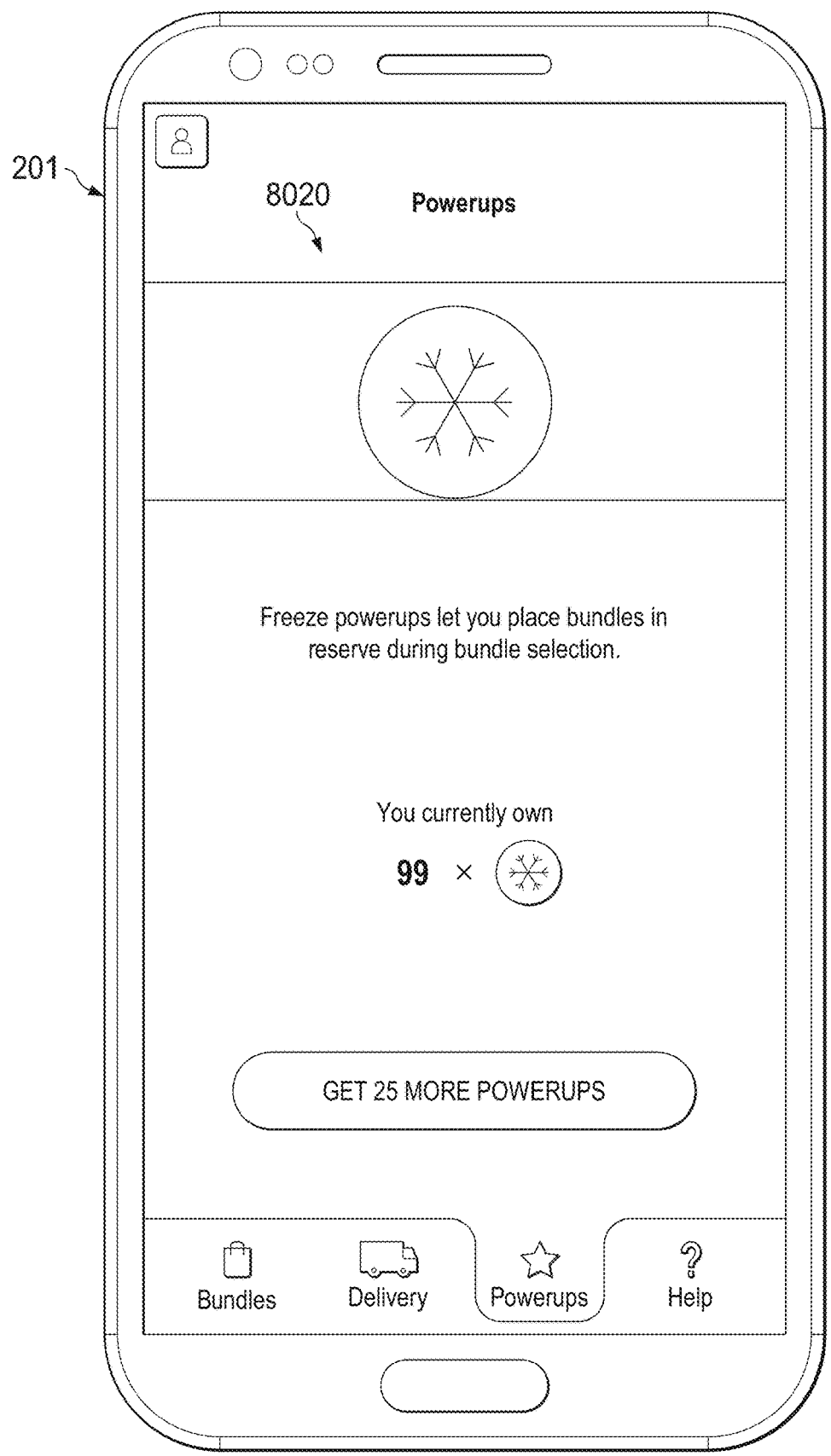
FIG. 90 shows a screenshot of an aspect of an embodiment.

As described in various embodiments herein, powerups can be invoked at various stages in the flowchart illustrated in FIG. 79 to modify the bundle-selection process. For example, as shown in the user interface of FIG. 90, a freeze powerup 8020 can be invoked during steps 7917-7918 by pressing a snowflake button 8030 of the user interface (see FIG. 85 or 86). When a grocery bundle is frozen via a freeze powerup, its corresponding icon 8040 (see FIG. 86) is shown next to the snowflake button 8030, and it is available for selection at the step 7920 of the method 7900. Powerups can be acquired via the user interface illustrated in FIG. 90, which may be invoked by the user pressing the "Powerups" icon at the bottom menu of the user interface screen. The powerups user interface may display the word "Powerups" and a graphical image of a snowflake (or another appropriate image) below, as well as a message of "Freeze powerups let you place bundles in reserve during bundle selection." The powerups user interface also lets the user know how many powerups he/she has by displaying a message of "You currently own" and the number of powerups (e.g., 99 in this example) below. The powerups user interface also offers an option to let the user "GET 25 MORE POWERUPS" in the form of a clickable button.

It is understood that for the discussions above pertaining to FIGS. 79-90, the grocery items are the get-items discussed above in association with FIGS. 1-78.

Figure 91:
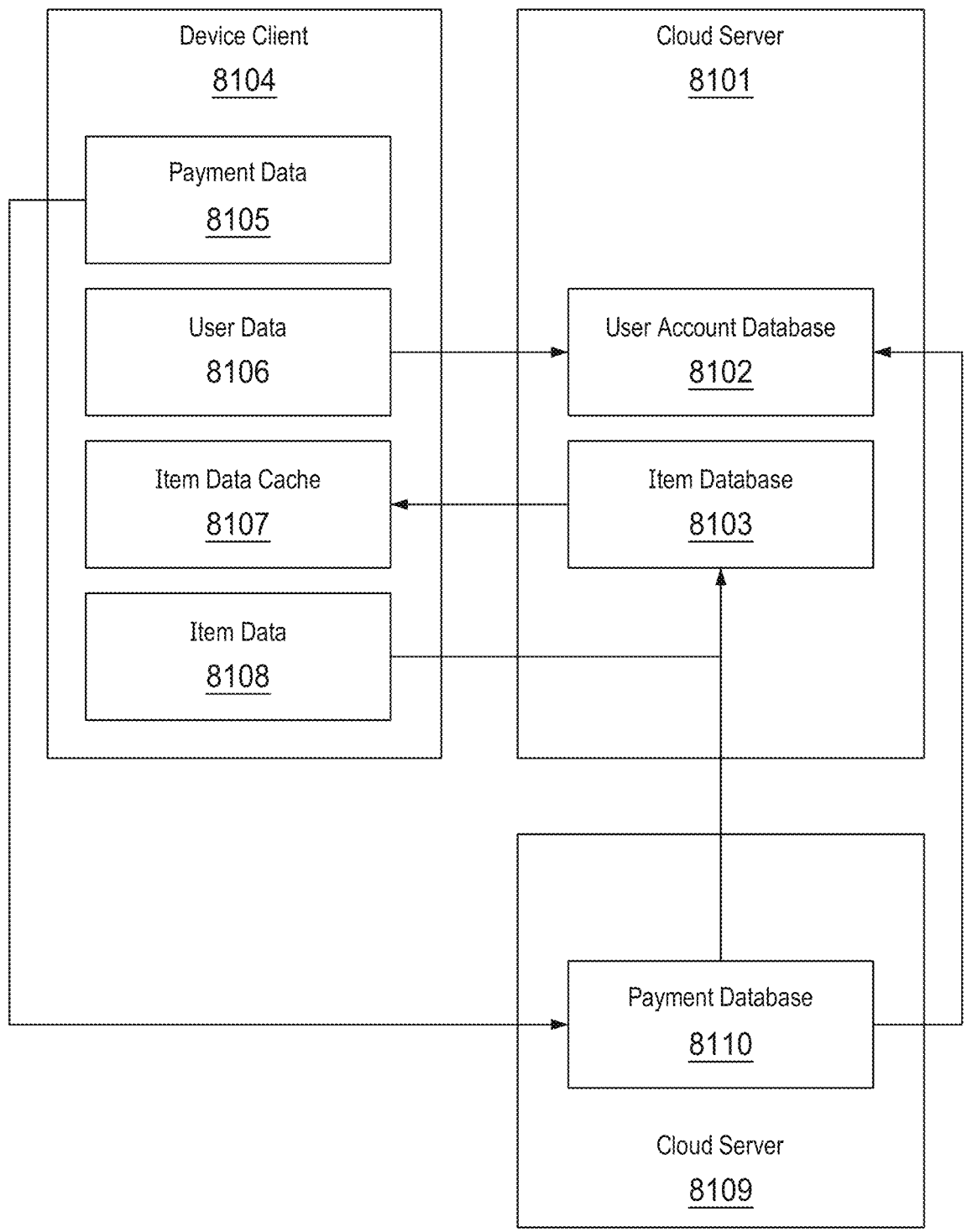
FIG. 91 is a high-level block diagram illustrating an online marketplace platform implemented as a client-server distributed computer system.

FIG. 91 illustrates an online marketplace platform implemented as a client-server distributed computer system that can be further understood by considering the system processes and data flows. In this client-server model, the server is a cloud server 8101 provided by a company such as AMAZON or GOOGLE™, and the client is a device client 8104 running on a desktop computer, laptop computer, tablet computer, mobile phone, or similar device.

The user account database 8102 and the item database 8103 reside on a cloud server 8101. The user account database 8102 contains data about the users of the marketplace platform, such as user id number, login credentials, historical trade data, pending trade data, available trade credits, current amounts of the in-game currency, current open trading levels, social media data, demographic data, app usage data, shipping data, etc. The user account database 8102 is populated with user data 8106 that is entered via a process running on the device client 8104, and communicated via the internet to a server process running on the cloud server 8101.

The item database 8103 contains data about the items that are traded on the online marketplace platform. This data includes text descriptors, images, an id number of the user who submitted the item as a give-item, a username tied to the id number of the user, the trading level of the item, the trading history of the item (e.g., how many times it has been viewed as a get-item), and its current trading status (e.g., its availability as a get-item, whether it is actively being considered as a get-item, etc.). The item database 8103 is populated with item data 8108 that was entered via a process running on the device client 8104, and communicated via the internet to a server process running on the cloud server 8101. Server processes running on the cloud server 8101 can also modify the item data 8108.

To ensure that only one user can claim an item in the item database 8103 as a get-item, a locking mechanism for items is enforced on the cloud server 8101. When an item is sent from the cloud server 8101 to a device client 8104 as a get-item, the item is locked in the item database 8103 on the cloud server 8101. Once a user declines a get-item, the lock for that item may be released by sending a release request from the device client 8104 to the cloud server 8101.

To ensure that item images and text descriptors can be viewed without perceptible delay via a device client 8104, item data is sent from the item database 8103 on the cloud server 8101 to an item data cache 8107 maintained by the device client 8104.

Payments for powerups and trade credits involve the communication of payment data 8105 from the device client 8104 to a payment database 8110 maintained by another cloud server 8109. Payment processing companies such as GOOGLE™ or STRIPE™ might operate the cloud server 8109. The cloud server 8109 also communicates with the cloud server 8101 to acknowledge and record payments in the user account database 8102 and the item database 8103.

Experiences, Entertainment, and Other Items

In some embodiments, the system may desire to offer experiences or items of varying monetary values at the same level. For instance, a user may have paid $200 for a hotel trade credit, but a 5-star hotel and a 3-star hotel with different market values are amongst the give-items. The system may use methods to align restaurants, hotels or other give-items of varying monetary values into a single level. For instance, a 3-star hotel and a 5-star hotel could be aligned by offering a $100 rebate if the 3-star hotel is chosen. Another example could be a free bottle of wine with a 2-star dinner, to align the meal value with a 3-star dinner. Powerup packages for future sessions, additional trade credits or future discounts could also be used as alignment methods.

In one embodiment, users can buy store inventory (e.g., groceries, clothing, books) by first purchasing a credit at a certain price and then choosing the get-item or collection of get-items, using the same or similar unidirectional viewing selection process described herein. Levels may group store inventory by similar value. The same powerups described above could be used. A countdown clock would turn the item selection process into a time-bounded one.

In another implementation, entertainment can be purchased. For instance, a movie or theater show tickets (for home viewing, at a cinema, or in an urban center with multiple theater shows, e.g., Broadway) are pre-purchased, then the system may be used to unidirectionally swipe until the preferred entertainment is chosen. Priority skipping of a theme park ride queue can be purchased using the invention where users unidirectionally swipe until their preferred rides (or set of rides) are chosen. Similarly, designated seats in a venue or on a transportation modality could be offered using pre-purchase, then unidirectional swiping. Admissions to museums, concerts, sporting events, guided tours or other local tourist entertainment can be purchased using a prepayment, then unidirectional swiping until the preferred tours or admissions are chosen. Virtual or real currency could be used to allocate fantasy team sports players to a manager's team in this manner, with managers pre-committing, and then unidirectionally swiping to pick their team's players.

Levels could group entertainment by similar value. The same powerups described above could be used, for instance narrowing the selection to a particular genre of entertainment or location. A countdown clock would turn entertainment selection process into a time-bounded one. Additional combinations of the above variants are envisioned.

In some implementations, incentives could be coupled with the item on offer (e.g., goods, services, hotel rooms, restaurant bookings) in order to create greater parity amongst the items in the item selection queue. The incentives could be the item plus cash back, loyalty points, coupons, or other service or goods add-ons such as free breakfast, a bottle of wine, a lottery entry, etc.

In another implementation, incentives could be used to induce users to view a particular get-item or service being advertised. Alternatively, within-game incentives such as free powerups could be sent to a user in exchange for a referral to a get-item or service or viewing a get-item or service in the item selection queue.

In another implementation, additional items could be made available once the user makes an initial selection. This could include a powerup to win another get-item or going double or nothing on another get-item. This could also be an opportunity to purchase a related get-item.

In another implementation, the system could be as a voting mechanism to select preferred candidates. For example, as each candidate is presented, a list of the candidate's qualifications and positions may be shown. To test marketing information, different levels of information may be presented to different users to see if such information of a particular candidate increase or decreases selection by users.

Data collected as part of the playing of these games and other operations could be collected and processed to form a large dataset that could be mined for marketing details. For example, if the large dataset indicated that there is a much higher probability of a user selecting a red sweater than a blue sweater when the sweater is shown immediately after a picture of a knitted hat, that might be convertible into actionable marketing information.

In another implementation, the system could be used on a gambling device such as a slot machine where with each swipe the output goes up or down in value, but odds may favor large payouts at later times. Powerups could be used to increase the number of swipes, freeze the winnings, allow a replay or limit losses.

In another implementation, get-items are arranged in the item selection queue in a particular order of value, such as increasing value, decreasing value, or increasing, then decreasing value. Such order may be employed to heighten and train a user's desire to purchase powerups so as to take more risk. For example, if the user feels as though the next selection could be much worse, the user may be prompted to select a powerup as insurance to prevent them from losing a get-item they value.

In another implementation, team play is facilitated. Teams can collaborate to select an item or the selector role could be passed amongst a team. Players could select for other team members who are in-turn selecting for them. The system may be used by groups to enhance cooperation and consider risk. For example, get-items may be presented that that may require other players on the team to also take a risk, or use a powerup, to help the current player determine whether to take the current item or select another item.

In another implementation, the system could be used on a video game where a path is chosen, but, similar to chutes and ladders, paths have different reward or penalty structures. The play may train the player to make better choices. Powerups could be used to save the player, but sparingly because they lose points.

In another implementation, the system could be used for match making or dating. User preferences could be inferred by swiping and powerup patterns in order to increase match quality.

In another implementation, the system could be used to conduct market research. Variable-priced powerups could measure a user's perception of value. Imagery or ad copy, such as logos, taglines, models, and product images could be tested within the item selection and A/B tested to see if some images or copy are more appealing than others by measuring dwell times, selection rates, and/or powerup usage.

Data collected as part of the playing of these games and other operations could be collected and processed to identify marketing details that would have otherwise gone unnoticed.

According to one embodiment, the techniques described herein are implemented by one or generalized computing systems programmed to perform the techniques pursuant to executable program instructions in firmware, memory, other storage, or a combination. Special-purpose computing devices may be used, such as desktop computer systems, portable computer systems, handheld devices, networking devices or any other device that incorporates hard-wired and/or program logic to implement the techniques.

Figure 92:
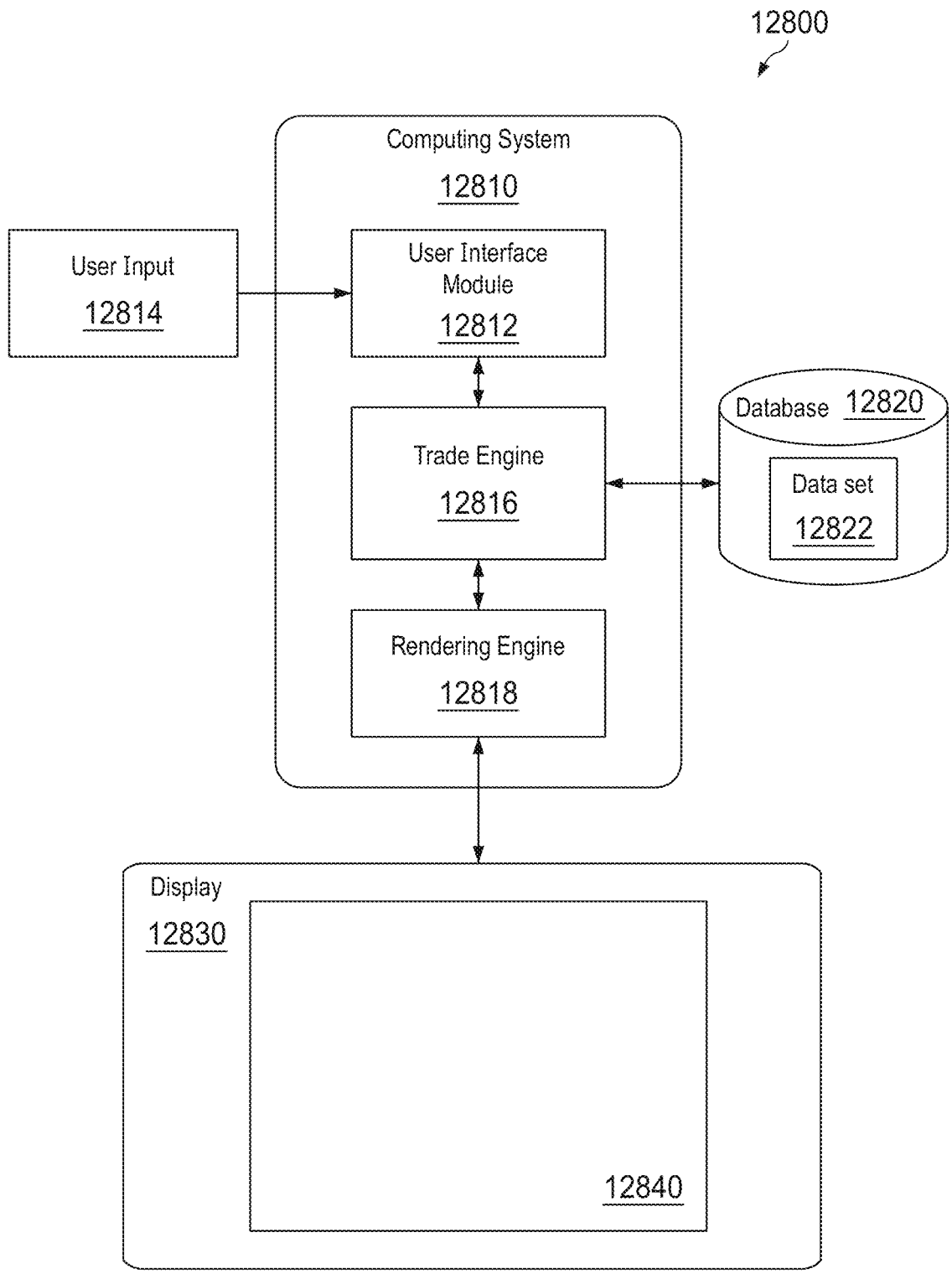
FIG. 92 is a high-level illustration of a networked object trading game and system.

FIG. 92 illustrates computing system 12800 which presents a particular example implementation, where computer code for implementing embodiments may be implemented, at least in part, on one or more server. However, embodiments are not limited thereto. For example, a client-side software application may implement marketplace platform 12810, or portions thereof, in accordance with the present teachings without requiring communications between the client-side software application and a server. Also, the communications need not be continuous, and the client-side software application might be able to run offline, with cached data and rules, or similar arrangements, with the client-side software application updating a server when a connection is available. This could be transparent to the user.

In one exemplary implementation, a server implementing a marketplace platform 12810 is connected to display 12830 configured to display data 12840 (e.g., graphical data), for example, to a user thereof. Display 12830 may be a passive or an active display, adapted to allow a user to view and interact with data 12840 displayed thereon, via user interface 12814. In other configurations, display 12830 may be a touch screen display responsive to touches, gestures, swipes, and the like for use in interacting with and manipulating data 12840 by a user thereof. Gestures may include single gestures, multi-touch gestures, and other combinations of gestures and user inputs adapted to allow a user to introspect, process, convert, model, generate, deploy, maintain, and update data 12840.

In other implementations, computing system 12800 may include a data source such as database 12820. Database 12820 may be connected to the marketplace platform 12810 directly or indirectly, for example via a network connection, and may be implemented as a non-transitory data structure stored on a local memory device, such as a hard drive, Solid State Drive (SSD), flash memory, and the like, or may be stored as a part of a Cloud network, as further described herein.

Database 12820 may contain data sets 12822. Data sets 12822 may include data as described herein such as items, user data, transaction data, etc. Data sets 12822 may also include data pertaining to data attributes, data hierarchy, nodal positions, values, summations, algorithms, code (e.g., C++, Javascript, JSON, etc.), source, security, hashes, and the like. In addition, data sets 12822 may also contain other data, data elements, and information such as data tables, Uniform Resource Locators (URLs), eXtensible Markup Language (XML), schemas, definitions, files, resources, dependencies, metadata, labels, development-time information, run-time information, configuration information, API, interface component information, library information, pointers, and the like.

Marketplace trading platform 12810 may include user interface module 12812, trade engine 12816, and rendering engine 12818. User interface module 12812 may be configured to receive and process data signals and information received from user interface 12814. For example, user interface module 12812 may be adapted to receive and process data from user input associated with data 12822 for processing via marketplace trading platform 12810 via application 120.

In an exemplary implementation, trading engine 12816 may be adapted to receive data from user interface 12814 and/or database 12820 for processing thereof. In one configuration, resource compatibility engine 12816 is a software engine configured to receive and process input data from a user thereof pertaining to data 12840 from user interface module 12814, database 12820, external databases, the Internet, and the like in order to process and validate transactions.

Trading engine 12816 may receive existing data sets 12822 from database 12820 for processing thereof. Such data sets 12822 may include and represent a composite of separate data sets 12822 and data elements pertaining to, for example, item catalogs, organizational data, which may include item data, trade data, salary data, personnel data, and the like. In addition, data sets 12822 may include other types of data, data elements, and information such as contact data, sales data, production data, scientific data, financial data, medical data, census data, and the like. Trading engine 12816 may be implemented as an item selection module using embodiments described herein.

Trade engine 12816 in other implementations may be configured as a data analysis tool to perform analysis functions associated with data 12822. Such analysis functions may include transaction verification, introspection, and the ability for trade engine 12816 to manipulate values, meta-data, properties and/or functions of an object at run-time, recursion, traversing nodes of data hierarchies, determining the attributes associated with the data, determining the type of data, determining the values of the data, determining the relationships to other data, interpreting metadata associated with the data, checking for exceptions, and the like. For example, trade engine 12816 may be configured to receive and analyze data sets 12822 to determine whether to determine if a user is a giver or getter, analyze trade feedback as described herein, etc. and may be used to analyze data processing instructions, data attributes, data hierarchy, nodes, nodal positions within the hierarchy, values, summations, algorithms, source, security, hashes, and the like, associated with data sets 12822.

Rendering engine 12818 may be configured to receive configuration data pertaining to data 12840, associated data sets 12822, and other data associated with data sets 12822 such as user interface components, icons, user pointing device signals, and the like, used to render data 12840 on display 12830. In one exemplary implementation, rendering engine 12818 may be configured to render 2D and 3D graphical models and simulations to allow a user to obtain more information about data sets 12822. In one implementation, upon receiving instruction from a user, for example, through user interface 12814, rendering engine 12818 may be configured to generate a real-time display of interactive changes being made to data 12840 by a user thereof. Rendering engine 12818 may be configured as a presentation module and image management to present the images to the user.

Various functionalities are described herein. In some cases, concrete elements of a computer system, such as a hardware element, a software element or a data element is described according to what the element represents rather than what the element is. In part, some of this is for readability. However, it should be understood that these representations could be embodied in the elements that represent them. For example, the present description might describe that a database of user actions stores records representing user actions and that a software module can access that database to determine what to display in response to what user actions, and further that the software module communicates, through a hardware channel, a data message to a user interface module where the data message contents are consistent with what the software module determined should be displayed. However, this might also be described as indicating that the user interface is updated to reflect user actions.

In an embodiment of a networked computer system, the networked computer system is coupled to a network that allows the networked computer system to send data messages to user computer systems and receive data messages from user computer systems. Those data messages might be in the form of HTML data, API calls and responses, or other protocols for communicating computer-readable and -processable data to a wide variety of user computer systems scalably. This networked computer system can be used to implement some or all of the operations described herein that relate to implementing a trading platform that engages users.

The networked computer system can interface to a plurality of user computer systems, at least some of which are located remote from the networked computer system. The remoteness might be spanned by the Internet or some other network. The networked computer system might itself be implemented as a collection of cloud computing resources and/or virtual or distributed machines.

The networked computer system might include modules and/or servers that perform particular functions and those modules might be implemented by execution by a processor of separately compiled program code corresponding to those modules, program code integrated with other program code, or perhaps even separate physical or virtual single-function servers. For example, networked computer system might include a user interface server, data storage for a user database and an items database, an item selection module, a user presentation module, and an image management module.

The user interface server is programmed to generate user interfaces that might be sent as app pages, web pages, HTML, or the like, to user computer devices so that those user computer devices can present users with the appropriate display and get inputs from those users, such as product selections, user data, user selections of a get-item or passing on a get-item, user interfaces for uploading give-item photos and details, etc. The user interface server might generate a first graphical user interface and a second graphical user interface and sends data representing the first graphical user interface and the second graphical user interface to a user computer system or a user, wherein the first graphical user interface is adapted to receive a user give-item commitment from the user, wherein the user give-item commitment represents a commitment from the user to give away, to a second user, a user give-item in exchange for a get-item of a plurality of get-items, wherein the user give-item is an item, product, service, or right owned by the user and wherein the get-item is an item, product, service, or right not owned by the user but desired by the user, and wherein the second graphical user interface is adapted to present a sequence of images of get-items of the plurality of get-items in sequence, for a predetermined duration and adapted to present the user with indications of allowed user actions. The predetermined duration might be as to each get-item shown or it might be for the entire sequence of get-items, perhaps as controlled by the user presentation module.

The data storage might include a user database and an items database. The user database might have fields for each user, such as name, contact info, IP address, preferences, exchange credit balances and other credit balances, and the like. The user database might also maintain details of where the user is presently in a user interface, where the user's current get-item in a sequence of get-items is, etc.

A clock module might be included to provide for timing, such as where a user is to be provided with a limited time to make a selection. In some embodiments, there is a specific, predetermined period in which a user has to make a selection of a current get-item or the user presentation module updates the second graphical user interface so that the user is shown the next get-item. In some embodiments, the user has a predetermined time period and can stay on one get-item the entire time or flip through as many get-items until the end of the predetermined time period occurs. In some variations, the user can pay or give up credits or perform some other action that allows for extensions of the time periods.

The items database might include records of get-items and give-items and include data fields for an exchange credit value for each get-item and each give-item. The items database might also include photos for items, status (available, taken, tentatively taken, reserved, etc.) for each item.

The item selection module can access the items database and tracks and selects which give-items to present to a particular user, perhaps based on user preferences and a give-item exchange credit value of the user give-item and get-item exchange credit values of get-items in the items database.

The user presentation module might provide the user interface server with item presentation data for the second graphical user interface and receive indications, from the user interface server, of user interactions with the second graphical user interface. For example, the user presentation module might send a data message with photos and details and metadata about the next ten get-items that match the user requirements and exchange credit level, in anticipation of the user scrolling through get-items to make a selection. The data presented by depend on user interactions with the second graphical user interface in that a user is presented with a current get-item and if the user selects, using the second graphical user interface, the current get-item during a current selection period, the current get-item is flagged as a taken get-item and if the user does not select the current get-item during a current selection period or declines the current get-item, the current get-item becomes a past get-item and a next get-item in the sequence of the plurality of get-items becomes the current get-item for user selection.

The user presentation module might control what the user sees as options on the second graphical user interface. For example, the user presentation module might maintain a timer of an overall selection period within which the user would either select a current get-item or receive the last get-item displayed at the expiration of the overall selection period.

The networked computer system might also include an image management module that manages the photos of the get-items in the items database and serves those to the user presentation module. This module might keep track of uploaded photos from users of their give-items (which are get-items to other users) and use those in the presentations of offers of those get-items to users.

Figure 93:
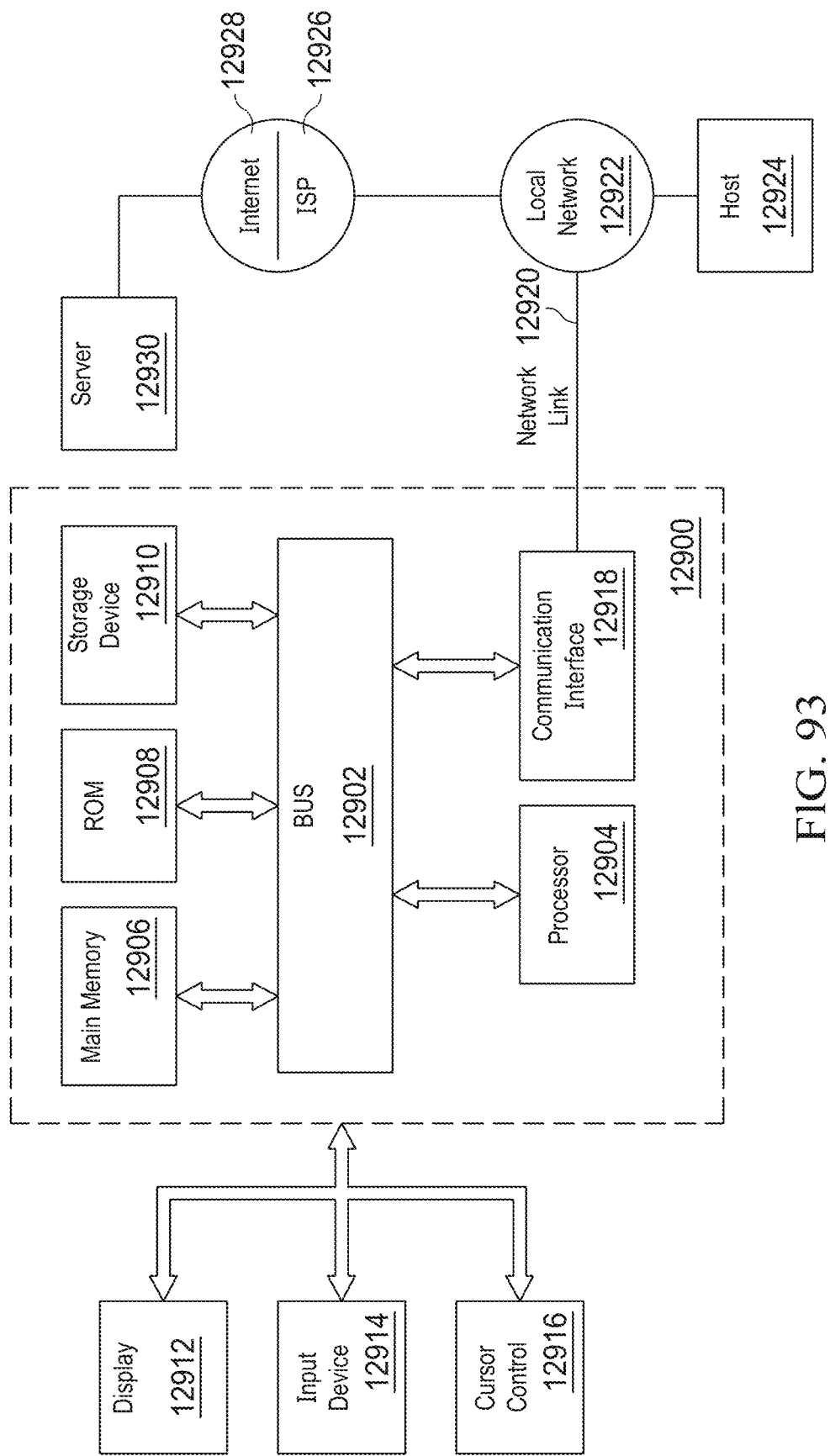
FIG. 93 is a high-level block diagram of an exemplary computer and communication system.

FIG. 93 is a block diagram that illustrates a computer system 12900 upon which an embodiment of the invention may be implemented. Computer system 12900 includes a bus 12902 or other communication mechanism for communicating information, and a processor 12904 coupled with bus 12902 for processing information. Processor 12904 may be, for example, a general-purpose microprocessor.

Computer system 12900 also includes a main memory 12906, such as a random-access memory (RAM) or other dynamic storage device, coupled to bus 12902 for storing information and instructions to be executed by processor 12904. Main memory 12906 also may be used for storing temporary variables or other intermediate information during execution of instructions to be executed by processor 12904. Such instructions, when stored in non-transitory storage media accessible to processor 12904, render computer system 12900 into a special-purpose machine that is customized to perform the operations specified in the instructions.

Computer system 12900 further includes a read only memory (ROM) 12908 or other static storage device coupled to bus 12902 for storing static information and instructions for processor 12904. A storage device 12910, such as a magnetic disk or optical disk, is provided and coupled to bus 12902 for storing information and instructions.

Computer system 12900 may be coupled via bus 12902 to a display 12912, such as a computer monitor, for displaying information to a computer user. An input device 12914, including alphanumeric and other keys, is coupled to bus 12902 for communicating information and command selections to processor 12904. Another type of user input device is cursor control 12916, such as a mouse, a trackball, or cursor direction keys for communicating direction information and command selections to processor 12904 and for controlling cursor movement on display 12912. This input device typically has two degrees of freedom in two axes, a first axis (e.g., x) and a second axis (e.g., y), that allows the device to specify positions in a plane.

Computer system 12900 may implement the techniques described herein using customized hard-wired logic, one or more ASICs or FPGAs, firmware and/or program logic which in combination with the computer system causes or programs computer system 12900 to be a special-purpose machine. According to one embodiment, the techniques herein are performed by computer system 12900 in response to processor 12904 executing one or more sequences of one or more instructions contained in main memory 12906. Such instructions may be read into main memory 12906 from another storage medium, such as storage device 12910. Execution of the sequences of instructions contained in main memory 12906 causes processor 12904 to perform the process steps described herein. In alternative embodiments, hard-wired circuitry may be used in place of or in combination with software instructions.

The term "storage media" as used herein refers to any non-transitory media that store data and/or instructions that cause a machine to operation in a specific fashion. Such storage media may comprise non-volatile media and/or volatile media. Non-volatile media includes, for example, optical or magnetic disks, such as storage device 12910. Volatile media includes dynamic memory, such as main memory 12906. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, an EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 12902. Transmission media can also take the form of acoustic or light waves, such as those generated during radio-wave and infra-red data communications.

Various forms of media may be involved in carrying one or more sequences of one or more instructions to processor 12904 for execution. For example, the instructions may initially be carried on a magnetic disk or solid state drive of a remote computer. The remote computer can load the instructions into its dynamic memory and send the instructions over a network connection. A modem or network interface local to computer system 12900 can receive the data. Bus 12902 carries the data to main memory 12906, from which processor 12904 retrieves and executes the instructions. The instructions received by main memory 12906 may optionally be stored on storage device 12910 either before or after execution by processor 12904.

Computer system 12900 also includes a communication interface 12918 coupled to bus 12902. Communication interface 12918 provides a two-way data communication coupling to a network link 12920 that is connected to a local network 12922. For example, communication interface 12918 may be an integrated services digital network (ISDN) card, cable modem, satellite modem, or a modem to provide a data communication connection to a corresponding type of telephone line. Wireless links may also be implemented. In any such implementation, communication interface 12918 sends and receives electrical, electromagnetic or optical signals that carry digital data streams representing various types of information.

Network link 12920 typically provides data communication through one or more networks to other data devices. For example, network link 12920 may provide a connection through local network 12922 to a host computer 12924 or to data equipment operated by an Internet Service Provider (ISP) 12926. ISP 12926 in turn provides data communication services through the world wide packet data communication network now commonly referred to as the "Internet" 12928. Local network 12922 and Internet 12928 both use electrical, electromagnetic or optical signals that carry digital data streams. The signals through the various networks and the signals on network link 12920 and through communication interface 12918, which carry the digital data to and from computer system 12900, are example forms of transmission media.

Computer system 12900 can send messages and receive data, including program code, through the network(s), network link 12920 and communication interface 12918. In the Internet example, a server 12930 might transmit a requested code for an application program through Internet 12928, ISP 12926, local network 12922 and communication interface 12918. The received code may be executed by processor 12904 as it is received, and/or stored in storage device 12910, or other non-volatile storage for later execution.

The figures may illustrate examples of data structures that might be present in memory or storage accessible to computer processors. In some embodiments, the data structures are used by various components and tools, some of which are described in more detail herein. The data structures and program code used to operate on the data structures may be provided and/or carried by a transitory computer readable medium, e.g., a transmission medium such as in the form of a signal transmitted over a network.

According to some embodiments, the techniques described herein are implemented by one or more generalized computing systems programmed to perform the techniques pursuant to program instructions in firmware, memory, other storage, or a combination. Special-purpose computing devices may be used, such as desktop computer systems, portable computer systems, handheld devices, networking devices or any other device that incorporates hard-wired and/or program logic to implement the techniques.

One embodiment might include a carrier medium carrying data that includes data having been processed by the methods described herein. The carrier medium can comprise any medium suitable for carrying the data, including a storage medium, e.g., solid-state memory, an optical disk or a magnetic disk, or a transient medium, e.g., a signal carrying the data such as a signal transmitted over a network, a digital signal, a radio frequency signal, an acoustic signal, an optical signal or an electrical signal.

Operations of processes described herein can be performed in any suitable order unless otherwise indicated herein or otherwise clearly contradicted by context. Processes described herein (or variations and/or combinations thereof) may be performed under the control of one or more computer systems configured with executable instructions and may be implemented as code (e.g., executable instructions, one or more computer programs or one or more applications) executing collectively on one or more processors, by hardware or combinations thereof. The code may be stored on a computer-readable storage medium, for example, in the form of a computer program comprising a plurality of instructions executable by one or more processors. The computer-readable storage medium may be non-transitory. The code may also be provided carried by a transitory computer readable medium e.g., a transmission medium such as in the form of a signal transmitted over a network.

Conjunctive language, such as phrases of the form "at least one of A, B, and C," or "at least one of A, B and C," unless specifically stated otherwise or otherwise clearly contradicted by context, is otherwise understood with the context as used in general to present that an item, term, etc., may be either A or B or C, or any nonempty subset of the set of A and B and C. For instance, in the illustrative example of a set having three members, the conjunctive phrases "at least one of A, B, and C" and "at least one of A, B and C" refer to any of the following sets: {A}, {B}, {C}, {A, B}, {A, C}, {B, C}, {A, B, C}. Thus, such conjunctive language is not generally intended to imply that certain embodiments require at least one of A, at least one of B and at least one of C each to be present.

The use of examples, or exemplary language (e.g., "such as") provided herein, is intended merely to better illuminate embodiments of the invention and does not pose a limitation on the scope of the invention unless otherwise claimed. No language in the specification should be construed as indicating any non-claimed element as essential to the practice of the invention.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

Further embodiments can be envisioned to one of ordinary skill in the art after reading this disclosure. In other embodiments, combinations or sub-combinations of the above-disclosed invention can be advantageously made. The example arrangements of components are shown for purposes of illustration and combinations, additions, re-arrangements, and the like are contemplated in alternative embodiments of the present invention. Thus, while the invention has been described with respect to exemplary embodiments, one skilled in the art will recognize that numerous modifications are possible.

For example, the processes described herein may be implemented using hardware components, software components, and/or any combination thereof. The specification and drawings are, accordingly, to be regarded in an illustrative rather than a restrictive sense. It will, however, be evident that various modifications and changes may be made thereunto without departing from the broader spirit and scope of the invention as set forth in the claims and that the invention is intended to cover all modifications and equivalents within the scope of the following claims.

All references, including publications, patent applications, and patents, cited herein are hereby incorporated by reference to the same extent as if each reference were individually and specifically indicated to be incorporated by reference and were set forth in its entirety herein.

What is claimed is:

1. A computer implemented method, comprising:
    receiving a commitment from a user to obtain an item from a plurality of items to be presented to the user after receiving an exchange credit from the user;
    in response to receiving the exchange credit to present images, representing each item of the plurality of items individually in sequence for a predetermined duration before showing another image representing another item from the plurality of items to the user;
    monitoring a selection input by the user, wherein prior to end of the predetermined duration, if the image representing an item being presented for selection is rejected by the user using the selection input, the image of the item being presented is removed and the item being presented is permanently removed from the plurality of items to be offered to the user and another image representing another item from the plurality of items is presented to the user for the predetermined duration; and
    in response to the predetermined duration, graphically varying a presentation of the image of the item being presented by visually conveying to the user that an ability to reject the item being presented and view a next item in sequence will end at the end of the predetermined duration unless the user rejects the item being presented.

2. The method of claim 1, wherein the item comprises a grocery bundle.

3. The method of claim 1, wherein the exchange credit comprises an item or a monetary credit provided by another user.

4. The method of claim 1, wherein unless the item being displayed is rejected by the user, an item selection module invokes an image process to vary the image of the item being presented according to a graphical process configured to convey that the item being presented will be selected at the end of the duration.

5. The method of claim 4, wherein the graphical process renders the image of the item being presented as moving toward a selection icon presented in coordination with the duration unless the user rejects the item being displayed.

6. The method of claim 4, wherein the graphical process renders a selection image configured to convey that the image being presented will be captured at the end of the duration unless the user rejects the item being presented.

7. The method of claim 1, wherein an image process comprises displaying a countdown clock.

8. A system, comprising:
    a non-transitory memory; and
    one or more hardware processors coupled to the non-transitory memory and configured to read instructions from the non-transitory memory to cause the system to perform operations comprising:
        receiving a commitment from a user to obtain an item from a plurality of items to be presented to the user after receiving an exchange credit from the user;
        in response to receiving the exchange credit to present images, representing each item of the plurality of items individually in sequence for a predetermined duration before showing another image representing another item from the plurality of items to the user;
        monitoring a selection input by the user, wherein prior to end of the predetermined duration, if the image representing an item being presented for selection is rejected by the user using the selection input, the image of the item being presented is removed and the item being presented is permanently removed from the plurality of items to be offered to the user and another image representing another item from the plurality of items is presented to the user for the predetermined duration; and
        in response to the predetermined duration, graphically varying a presentation of the image of the item being presented by visually conveying to the user that an ability to reject the item being presented and view a next item in sequence will end at the end of the predetermined duration unless the user rejects the item being presented.

9. The system of claim 8, wherein the item comprises a grocery bundle.

10. The system of claim 8, wherein the exchange credit comprises an item or a monetary credit provided by another user.

11. The system of claim 8, wherein unless the item being displayed is rejected by the user, an item selection module invokes an image process to vary the image of the item being presented according to a graphical process configured to convey that the item being presented will be selected at the end of the duration.

12. The system of claim 11, wherein the graphical process renders the image of the item being presented as moving toward a selection icon presented in coordination with the duration unless the user rejects the item being displayed.

13. The system of claim 11, wherein the graphical process renders a selection image configured to convey that the image being presented will be captured at the end of the duration unless the user rejects the item being presented.

14. The system of claim 8, wherein an image process comprises displaying a countdown clock.

15. A non-transitory machine-readable medium having stored thereon machine-readable instructions executable to cause a machine to perform operations comprising:

receiving a commitment from a user to obtain an item from a plurality of items to be presented to the user after receiving an exchange credit from the user;

in response to receiving the exchange credit to present images, representing each item of the plurality of items individually in sequence for a predetermined duration before showing another image representing another item from the plurality of items to the user;

monitoring a selection input by the user, wherein prior to end of the predetermined duration, if the image representing an item being presented for selection is rejected by the user using the selection input, the image of the item being presented is removed and the item being presented is permanently removed from the plurality of items to be offered to the user and another image representing another item from the plurality of items is presented to the user for the predetermined duration; and in response to the predetermined duration, graphically varying a presentation of the image of the item being presented by visually conveying to the user that an ability to reject the item being presented and view a next item in sequence will end at the end of the predetermined duration unless the user rejects the item being presented.

16. The non-transitory machine-readable medium of claim 15, wherein the exchange credit comprises an item or a monetary credit provided by another user, and wherein the item comprises a grocery bundle.

17. The non-transitory machine-readable medium of claim 15, wherein an image process comprises displaying a countdown clock.

18. The non-transitory machine-readable medium of claim 15, wherein unless the item being displayed is rejected by the user, an item selection module invokes an image process to vary the image of the item being presented according to a graphical process configured to convey that the item being presented will be selected at the end of the duration.

19. The non-transitory machine-readable medium of claim 18, wherein the graphical process renders the image of the item being presented as moving toward a selection icon presented in coordination with the duration unless the user rejects the item being displayed.

20. The non-transitory machine-readable medium of claim 18, wherein the graphical process renders a selection image configured to convey that the image being presented will be captured at the end of the duration unless the user rejects the item being presented.

* * * * *